United States Patent
Ross et al.

(10) Patent No.: US 12,527,867 B2
(45) Date of Patent: Jan. 20, 2026

(54) USES FOR AND ARTICLE OF MANUFACTURE INCLUDING HER2 DIMERIZATION INHIBITOR PERTUZUMAB

(71) Applicant: Genentech, Inc., South San Francisco, CA (US)

(72) Inventors: Graham A. Ross, Welwyn Garden (GB); Jayantha Ratnayake, Welwyn Garden (GB)

(73) Assignee: Genentech, Inc., South San Francisco, CA (US)

( * ) Notice: Subject to any disclaimer, the term of this patent is extended or adjusted under 35 U.S.C. 154(b) by 169 days.

(21) Appl. No.: 18/309,452

(22) Filed: Apr. 28, 2023

(65) Prior Publication Data

US 2023/0277663 A1 Sep. 7, 2023

Related U.S. Application Data

(60) Division of application No. 17/656,732, filed on Mar. 28, 2022, now abandoned, which is a division of application No. 16/796,163, filed on Feb. 20, 2020, now abandoned, which is a continuation of application No. 16/123,809, filed on Sep. 6, 2018, now abandoned, which is a continuation of application No. 15/058,520, filed on Mar. 2, 2016, now abandoned, which is a continuation of application No. 13/649,591, filed on Oct. 11, 2012, now abandoned.

(60) Provisional application No. 61/694,584, filed on Aug. 29, 2012, provisional application No. 61/682,037, filed on Aug. 10, 2012, provisional application No. 61/657,669, filed on Jun. 8, 2012, provisional application No. 61/567,015, filed on Dec. 5, 2011, provisional application No. 61/547,535, filed on Oct. 14, 2011.

(51) Int. Cl.
| | |
|---|---|
| A61K 39/395 | (2006.01) |
| A61K 31/337 | (2006.01) |
| A61K 45/06 | (2006.01) |
| A61P 35/00 | (2006.01) |
| C07K 16/32 | (2006.01) |
| A61K 39/00 | (2006.01) |

(52) U.S. Cl.
CPC ...... A61K 39/39558 (2013.01); A61K 31/337 (2013.01); A61K 45/06 (2013.01); C07K 16/32 (2013.01); A61K 2039/507 (2013.01); A61K 2039/545 (2013.01); C07K 2317/24 (2013.01)

(58) Field of Classification Search
CPC .............................................. A61K 39/39558
See application file for complete search history.

(56) References Cited

U.S. PATENT DOCUMENTS

| | | | |
|---|---|---|---|
| 4,968,603 | A | 11/1990 | Slamon et al. |
| 5,183,884 | A | 2/1993 | Kraus et al. |
| 5,470,954 | A | 11/1995 | Neslund et al. |
| 5,480,968 | A | 1/1996 | Kraus et al. |
| 5,641,869 | A | 6/1997 | Vandlen et al. |
| 5,648,237 | A | 7/1997 | Carter et al. |
| 5,677,171 | A | 10/1997 | Hudziak et al. |
| 5,720,937 | A | 2/1998 | Hudziak et al. |
| 5,720,954 | A | 2/1998 | Hudziak et al. |
| 5,725,856 | A | 3/1998 | Hudziak et al. |
| 5,770,195 | A | 6/1998 | Hudziak et al. |
| 5,772,997 | A | 6/1998 | Hudziak et al. |
| 5,783,186 | A | 7/1998 | Arakawa et al. |
| 5,821,337 | A | 10/1998 | Carter et al. |
| 5,824,311 | A | 10/1998 | Greene et al. |
| 6,015,567 | A | 1/2000 | Hudziak et al. |
| 6,054,297 | A | 4/2000 | Carter et al. |
| 6,127,526 | A | 10/2000 | Blank et al. |
| 6,165,464 | A | 12/2000 | Hudziak et al. |
| 6,267,958 | B1 | 7/2001 | Andya et al. |
| 6,333,169 | B1 | 12/2001 | Hudziak et al. |
| 6,333,398 | B1 | 12/2001 | Blank et al. |
| 6,339,142 | B1 | 1/2002 | Basey et al. |
| 6,387,371 | B1 | 5/2002 | Hudziak et al. |
| 6,399,063 | B1 | 6/2002 | Hudziak et al. |
| 6,407,213 | B1 | 6/2002 | Carter et al. |
| 6,417,335 | B1 | 7/2002 | Basey et al. |
| 6,489,447 | B1 | 12/2002 | Basey et al. |
| 6,573,043 | B1 | 6/2003 | Cohen et al. |
| 6,627,196 | B1 | 9/2003 | Baughman et al. |
| 6,632,979 | B2 | 10/2003 | Erickson et al. |
| 6,639,055 | B1 | 10/2003 | Carter et al. |

(Continued)

FOREIGN PATENT DOCUMENTS

| | | |
|---|---|---|
| EP | 1187632 A1 | 3/2002 |
| EP | 1846030 B1 | 11/2018 |

(Continued)

OTHER PUBLICATIONS

Evans et Al. (Q. J. Med 1999: 92: 299-307) (Year: 1999).*

(Continued)

Primary Examiner — Michael Allen
(74) Attorney, Agent, or Firm — Haley Guiliano LLP; Brian M. Gummow

(57) ABSTRACT

The present application describes uses for Pertuzumab, a first-in-class HER2 dimerization inhibitor. In particular, the application describes methods for extending progression free survival in a HER2-positive breast cancer patient population; and combining two HER2 antibodies to treat HER2-positive cancer without increasing cardiac toxicity.

13 Claims, 34 Drawing Sheets

Specification includes a Sequence Listing.

(56) References Cited

U.S. PATENT DOCUMENTS

| | | |
|---|---|---|
| 6,685,940 B2 | 2/2004 | Andya et al. |
| 6,719,971 B1 | 4/2004 | Carter et al. |
| 6,797,814 B2 | 9/2004 | Blank et al. |
| 6,800,738 B1 | 10/2004 | Carter et al. |
| 6,821,515 B1 | 11/2004 | Cleland et al. |
| 6,905,830 B2 | 6/2005 | Cohen et al. |
| 6,949,245 B1 | 9/2005 | Sliwkowski |
| 6,984,494 B2 | 1/2006 | Ralph |
| 7,018,809 B1 | 3/2006 | Carter et al. |
| 7,041,292 B1 | 5/2006 | Sliwkowski |
| 7,060,268 B2 | 6/2006 | Andya et al. |
| 7,074,404 B2 | 7/2006 | Basey et al. |
| 7,097,840 B2 | 8/2006 | Erickson et al. |
| 7,129,051 B2 | 10/2006 | Cohen et al. |
| 7,279,287 B2 | 10/2007 | Ralph |
| 7,344,840 B2 | 3/2008 | Cohen et al. |
| 7,371,376 B1 | 5/2008 | Fendly |
| 7,371,379 B2 | 5/2008 | Baughman et al. |
| 7,435,797 B2 | 10/2008 | Lowman et al. |
| 7,449,184 B2 | 11/2008 | Allison et al. |
| 7,468,252 B2 | 12/2008 | Cohen et al. |
| 7,485,302 B2 | 2/2009 | Adams et al. |
| 7,485,704 B2 | 2/2009 | Fahrner et al. |
| 7,498,030 B2 | 3/2009 | Adams et al. |
| 7,501,122 B2 | 3/2009 | Adams et al. |
| 7,531,645 B2 | 5/2009 | Basey et al. |
| 7,537,931 B2 | 5/2009 | Adams et al. |
| 7,560,111 B2 | 7/2009 | Kao et al. |
| 7,575,748 B1 | 8/2009 | Erickson et al. |
| 7,618,631 B2 | 11/2009 | Sliwkowski |
| 7,674,589 B2 | 3/2010 | Cohen et al. |
| 7,682,609 B2 | 3/2010 | Andya et al. |
| 7,700,299 B2 | 4/2010 | Moecks et al. |
| 7,807,799 B2 | 10/2010 | Fahrner et al. |
| 7,811,773 B2 | 10/2010 | Ralph |
| 7,846,441 B1 | 12/2010 | Hellmann |
| 7,850,966 B2 | 12/2010 | Lowman et al. |
| 7,862,817 B2 | 1/2011 | Adams et al. |
| 7,879,325 B2 | 2/2011 | Kao et al. |
| 7,892,549 B2 | 2/2011 | Paton et al. |
| 7,919,254 B2 | 4/2011 | Cohen et al. |
| 7,981,418 B2 | 7/2011 | Amler et al. |
| 7,993,834 B2 | 8/2011 | Mass |
| 8,044,017 B2 | 10/2011 | Emery et al. |
| 8,075,890 B2 | 12/2011 | Carter et al. |
| 8,075,892 B2 | 12/2011 | Hellmann et al. |
| 8,076,066 B2 | 12/2011 | Mass |
| 8,142,784 B2 | 3/2012 | Ebens, Jr. et al. |
| 8,163,287 B2 | 4/2012 | Sliwkowski et al. |
| 8,241,630 B2 | 8/2012 | Kao et al. |
| 8,247,397 B2 | 8/2012 | Belvin et al. |
| 8,309,087 B2 | 11/2012 | Hellmann |
| 8,333,964 B2 | 12/2012 | Agus et al. |
| 8,337,856 B2 | 12/2012 | Blattler et al. |
| 8,343,955 B2 | 1/2013 | Blaquiere et al. |
| 8,372,396 B2 | 2/2013 | Andya et al. |
| 8,404,234 B2 | 3/2013 | Allison et al. |
| 8,425,908 B2 | 4/2013 | Hellman |
| 8,440,402 B2 | 5/2013 | Mass |
| 8,529,901 B2 | 9/2013 | Hasmann et al. |
| 8,591,897 B2 | 11/2013 | Bryant |
| 8,592,152 B2 | 11/2013 | Mass |
| 8,597,654 B2 | 12/2013 | Bryant |
| 8,604,014 B2 | 12/2013 | Belvin et al. |
| 8,642,036 B2 | 2/2014 | Hellmann |
| 8,652,474 B2 | 2/2014 | Harris et al. |
| 8,652,479 B2 | 2/2014 | Ebens, Jr. et al. |
| 8,663,643 B2 | 3/2014 | Berry et al. |
| 8,691,232 B2 | 4/2014 | Derynck et al. |
| 8,710,196 B2 | 4/2014 | Emery et al. |
| 8,758,747 B2 | 6/2014 | Kallmeyer et al. |
| 8,840,896 B2 | 9/2014 | Lowman et al. |
| 8,940,302 B2 | 1/2015 | Amler et al. |
| 9,017,671 B2 | 4/2015 | Andya et al. |
| 9,090,700 B2 | 7/2015 | Friess et al. |
| 9,107,926 B2 | 8/2015 | Belvin et al. |
| 9,180,185 B2 | 11/2015 | Bauss et al. |
| 9,180,189 B2 | 11/2015 | Andya et al. |
| 9,181,346 B2 | 11/2015 | Harris et al. |
| 9,249,218 B2 | 2/2016 | Basey et al. |
| 9,283,273 B2 | 3/2016 | Andya et al. |
| 9,345,661 B2 | 5/2016 | Adler et al. |
| 9,376,715 B2 | 6/2016 | Brophy et al. |
| 9,551,033 B2 | 1/2017 | Lee-Hoeflich et al. |
| 9,687,568 B2 | 6/2017 | Hasmann et al. |
| 9,815,904 B2 | 11/2017 | Gennaro et al. |
| 9,868,760 B2 | 1/2018 | Emery et al. |
| 9,896,478 B2 | 2/2018 | Lebreton et al. |
| 9,968,676 B2 | 5/2018 | Adler et al. |
| 9,969,811 B2 | 5/2018 | Gennaro et al. |
| 10,160,811 B2 | 12/2018 | Baughman et al. |
| 10,280,228 B2 | 5/2019 | Baughman et al. |
| 10,385,405 B2 | 8/2019 | Lee-Hoeflich et al. |
| 10,501,491 B2 | 12/2019 | Emery et al. |
| 10,689,457 B2 | 6/2020 | Paton et al. |
| 10,849,849 B2 | 12/2020 | Eng-Wong et al. |
| 10,898,570 B2 | 1/2021 | Phillips et al. |
| 11,077,189 B2 | 8/2021 | Benyunes et al. |
| 11,414,498 B2 | 8/2022 | Harris et al. |
| 11,597,776 B2 | 3/2023 | Harris et al. |
| 11,638,756 B2 | 5/2023 | Benyunes et al. |
| 11,654,105 B2 | 5/2023 | Eng-Wong et al. |
| 11,655,305 B2 | 5/2023 | Paton et al. |
| 11,992,529 B2 | 5/2024 | Benyunes et al. |
| 12,110,341 B2 | 10/2024 | Harris et al. |
| 12,128,103 B2 | 10/2024 | Benyunes et al. |
| 12,145,998 B2 | 11/2024 | Gennaro et al. |
| 12,252,549 B2 | 3/2025 | Badovinac-Crnjevic et al. |
| 2001/0014326 A1 | 8/2001 | Andya et al. |
| 2002/0001587 A1 | 1/2002 | Erickson et al. |
| 2002/0035736 A1 | 3/2002 | Erickson et al. |
| 2002/0064785 A1 | 5/2002 | Mass |
| 2002/0090662 A1 | 7/2002 | Ralph |
| 2003/0040509 A1 | 2/2003 | Moskowitz |
| 2003/0078388 A1* | 4/2003 | Basey ............... C07K 16/065 424/143.1 |
| 2003/0086924 A1 | 5/2003 | Sliwkowski et al. |
| 2003/0134344 A1 | 7/2003 | Mass |
| 2003/0147884 A1 | 8/2003 | Paton et al. |
| 2003/0152987 A1 | 8/2003 | Cohen et al. |
| 2003/0162796 A1 | 8/2003 | Hilberg et al. |
| 2003/0170234 A1 | 9/2003 | Hellmann |
| 2003/0170235 A1 | 9/2003 | Cohen et al. |
| 2003/0202972 A1 | 10/2003 | Andya et al. |
| 2003/0232399 A1 | 12/2003 | Robertson et al. |
| 2004/0013667 A1 | 1/2004 | Kelsey et al. |
| 2004/0014694 A1 | 1/2004 | Chakroun |
| 2004/0037823 A9 | 2/2004 | Paton et al. |
| 2004/0048525 A1 | 3/2004 | Sagucio |
| 2004/0082047 A1 | 4/2004 | Emery et al. |
| 2004/0106161 A1 | 6/2004 | Bossenmaier et al. |
| 2004/0106180 A1 | 6/2004 | Blank |
| 2004/0258685 A1 | 12/2004 | Brunetta et al. |
| 2005/0002928 A1 | 1/2005 | Hellmann |
| 2005/0025753 A1 | 2/2005 | Han et al. |
| 2005/0063972 A1 | 3/2005 | Basey et al. |
| 2005/0100944 A1 | 5/2005 | Cohen et al. |
| 2005/0158303 A1 | 7/2005 | Liu et al. |
| 2005/0208043 A1 | 9/2005 | Adams et al. |
| 2005/0238640 A1 | 10/2005 | Sliwkowski |
| 2005/0244417 A1 | 11/2005 | Ashkenazi et al. |
| 2005/0244929 A1 | 11/2005 | Carter |
| 2005/0260204 A1 | 11/2005 | Allan |
| 2005/0276812 A1 | 12/2005 | Ebens et al. |
| 2006/0013819 A1 | 1/2006 | Kelsey |
| 2006/0018899 A1 | 1/2006 | Kao et al. |
| 2006/0034840 A1 | 2/2006 | Agus |
| 2006/0034842 A1 | 2/2006 | Adams et al. |
| 2006/0046270 A1 | 3/2006 | Ralph |
| 2006/0067930 A1 | 3/2006 | Adams et al. |
| 2006/0073143 A1 | 4/2006 | Adams et al. |
| 2006/0083739 A1 | 4/2006 | Sliwkowski |
| 2006/0088523 A1 | 4/2006 | Andya et al. |
| 2006/0099201 A1 | 5/2006 | Andya et al. |

(56) References Cited

U.S. PATENT DOCUMENTS

| | | | |
|---|---|---|---|
| 2006/0100168 A1* | 5/2006 | Ravid | A61K 31/56 514/182 |
| 2006/0121044 A1 | 6/2006 | Amler et al. | |
| 2006/0165702 A1* | 7/2006 | Allison | A61P 35/00 424/155.1 |
| 2006/0182739 A1 | 8/2006 | Basey et al. | |
| 2006/0183150 A1 | 8/2006 | Cohen et al. | |
| 2006/0188509 A1 | 8/2006 | Derynck et al. | |
| 2006/0193854 A1 | 8/2006 | Adams et al. | |
| 2006/0198843 A1 | 9/2006 | Adams et al. | |
| 2006/0204505 A1 | 9/2006 | Sliwkowski et al. | |
| 2006/0210561 A1 | 9/2006 | Baughman et al. | |
| 2006/0212956 A1 | 9/2006 | Crocker et al. | |
| 2006/0216285 A1 | 9/2006 | Adams et al. | |
| 2006/0228745 A1 | 10/2006 | Mass | |
| 2006/0263434 A1 | 11/2006 | Desai et al. | |
| 2006/0275305 A1 | 12/2006 | Bryant | |
| 2006/0275306 A1 | 12/2006 | Andya et al. | |
| 2007/0009976 A1 | 1/2007 | Lenz et al. | |
| 2007/0020261 A1 | 1/2007 | Sliwkowski et al. | |
| 2007/0026001 A1 | 2/2007 | Ashkenazi et al. | |
| 2007/0037228 A1 | 2/2007 | Moecks et al. | |
| 2007/0166753 A1 | 7/2007 | Mass | |
| 2007/0184055 A1 | 8/2007 | Sliwkowski | |
| 2007/0202516 A1 | 8/2007 | Mass | |
| 2007/0224203 A1 | 9/2007 | Friess et al. | |
| 2007/0269429 A1 | 11/2007 | Kelsey et al. | |
| 2007/0292419 A1 | 12/2007 | Hellmann | |
| 2008/0038271 A1 | 2/2008 | Amler et al. | |
| 2008/0050373 A1 | 2/2008 | Cohen | |
| 2008/0050385 A1 | 2/2008 | Friess et al. | |
| 2008/0050748 A1 | 2/2008 | Cohen et al. | |
| 2008/0102069 A1 | 5/2008 | Friess et al. | |
| 2008/0108096 A1 | 5/2008 | Ralph | |
| 2008/0112957 A1 | 5/2008 | Fendly et al. | |
| 2008/0112958 A1 | 5/2008 | Mass | |
| 2008/0160026 A1 | 7/2008 | Ashkenazi et al. | |
| 2008/0171040 A1 | 7/2008 | Ebens, et al. | |
| 2008/0187533 A1 | 8/2008 | Hellmann | |
| 2008/0226659 A1 | 9/2008 | Erickson et al. | |
| 2008/0241146 A1 | 10/2008 | Ashkenazi et al. | |
| 2008/0286280 A1 | 11/2008 | Kallmeyer et al. | |
| 2008/0317753 A1 | 12/2008 | Amler et al. | |
| 2009/0081223 A1 | 3/2009 | Allison et al. | |
| 2009/0087432 A1 | 4/2009 | Sliwkowski | |
| 2009/0098135 A1 | 4/2009 | Belvin et al. | |
| 2009/0099344 A1 | 4/2009 | Fahrner et al. | |
| 2009/0131529 A1 | 5/2009 | Sherman et al. | |
| 2009/0148402 A1 | 6/2009 | Brunetta et al. | |
| 2009/0148435 A1 | 6/2009 | Lebreton et al. | |
| 2009/0155259 A1 | 6/2009 | Derynck et al. | |
| 2009/0155803 A1 | 6/2009 | Cohen et al. | |
| 2009/0187007 A1 | 7/2009 | Lowman et al. | |
| 2009/0202536 A1 | 8/2009 | Ebens et al. | |
| 2009/0202546 A1 | 8/2009 | Harris et al. | |
| 2009/0203015 A1* | 8/2009 | Chang | C12Q 1/6886 435/6.14 |
| 2009/0220492 A1 | 9/2009 | Basey et al. | |
| 2009/0226455 A1 | 9/2009 | Filvaroff | |
| 2009/0239236 A1 | 9/2009 | Mass | |
| 2009/0285837 A1 | 11/2009 | Kao et al. | |
| 2009/0317387 A1 | 12/2009 | Paton et al. | |
| 2010/0008975 A1 | 1/2010 | Amler et al. | |
| 2010/0015157 A1 | 1/2010 | Andya et al. | |
| 2010/0016556 A1 | 1/2010 | Carter et al. | |
| 2010/0112603 A1 | 5/2010 | Moecks et al. | |
| 2010/0120053 A1 | 5/2010 | Cohen et al. | |
| 2010/0158899 A1 | 6/2010 | Andya et al. | |
| 2010/0196363 A1 | 8/2010 | Vanhauwere et al. | |
| 2010/0285010 A1 | 11/2010 | Friess et al. | |
| 2010/0298156 A1 | 11/2010 | Lee-Hoeflich et al. | |
| 2011/0027190 A1 | 2/2011 | Hasmann et al. | |
| 2011/0033460 A1 | 2/2011 | Fendly et al. | |
| 2011/0044977 A1 | 2/2011 | Adler et al. | |
| 2011/0064736 A1 | 3/2011 | Friess et al. | |
| 2011/0064737 A1 | 3/2011 | Agus | |
| 2011/0117096 A1 | 5/2011 | Bossenmaier et al. | |
| 2011/0117097 A1 | 5/2011 | Kao et al. | |
| 2011/0129464 A1 | 6/2011 | Adams et al. | |
| 2011/0151454 A1 | 6/2011 | Lee-Hoeflich et al. | |
| 2011/0159014 A1 | 6/2011 | Lowman et al. | |
| 2011/0165157 A1 | 7/2011 | Derynck et al. | |
| 2011/0223159 A1 | 9/2011 | Friess et al. | |
| 2011/0223619 A1 | 9/2011 | Belvin et al. | |
| 2011/0236383 A1 | 9/2011 | Andya et al. | |
| 2011/0245103 A1 | 10/2011 | Amler et al. | |
| 2011/0246399 A1 | 10/2011 | Amler et al. | |
| 2011/0250194 A1 | 10/2011 | Hellmann | |
| 2012/0003217 A1 | 1/2012 | Bryant | |
| 2012/0034213 A1 | 2/2012 | Hellmann | |
| 2012/0034609 A1 | 2/2012 | Mass | |
| 2012/0065381 A1 | 3/2012 | Emery et al. | |
| 2012/0093838 A1 | 4/2012 | Mass | |
| 2012/0107302 A1 | 5/2012 | Berry et al. | |
| 2012/0107391 A1 | 5/2012 | Kelsey | |
| 2012/0121586 A1 | 5/2012 | Kiermaier et al. | |
| 2012/0251530 A1 | 10/2012 | Sliwkowski et al. | |
| 2013/0039909 A1 | 2/2013 | Amler et al. | |
| 2013/0071384 A1 | 3/2013 | Andya et al. | |
| 2013/0095172 A1 | 4/2013 | Alavattam et al. | |
| 2013/0108620 A1 | 5/2013 | Blattler et al. | |
| 2013/0142865 A1 | 6/2013 | Allison et al. | |
| 2013/0149299 A1 | 6/2013 | Baughman et al. | |
| 2013/0183292 A1 | 7/2013 | Friess et al. | |
| 2013/0195845 A1 | 8/2013 | Fendly et al. | |
| 2013/0195851 A1 | 8/2013 | Alavattam et al. | |
| 2013/0209459 A1 | 8/2013 | Hellmann | |
| 2013/0216532 A1 | 8/2013 | Adler et al. | |
| 2013/0224185 A1 | 8/2013 | Andya et al. | |
| 2013/0323180 A1 | 12/2013 | Hasmann et al. | |
| 2013/0345217 A1 | 12/2013 | Belvin et al. | |
| 2014/0018523 A1 | 1/2014 | Basey et al. | |
| 2014/0044704 A1 | 2/2014 | Paton et al. | |
| 2014/0044706 A1 | 2/2014 | Belvin et al. | |
| 2014/0044709 A1 | 2/2014 | Klencke et al. | |
| 2014/0079692 A1 | 3/2014 | Baughman et al. | |
| 2014/0086940 A1 | 3/2014 | Bryant | |
| 2014/0093458 A1 | 4/2014 | Dobosz et al. | |
| 2014/0128580 A1 | 5/2014 | Ebens, Jr. et al. | |
| 2014/0140993 A1 | 5/2014 | Ross et al. | |
| 2014/0186343 A1 | 7/2014 | Harris et al. | |
| 2014/0186347 A1 | 7/2014 | Derynck et al. | |
| 2014/0186867 A1 | 7/2014 | Harris et al. | |
| 2014/0212411 A1 | 7/2014 | Blattler et al. | |
| 2014/0227255 A1 | 8/2014 | Bauss et al. | |
| 2014/0248274 A1 | 9/2014 | Kallmeyer et al. | |
| 2014/0248609 A1 | 9/2014 | Mass | |
| 2014/0308277 A1 | 10/2014 | Gennaro et al. | |
| 2014/0322202 A1 | 10/2014 | Cohen | |
| 2014/0341886 A1 | 11/2014 | Hellmann | |
| 2015/0037332 A1 | 2/2015 | Paton et al. | |
| 2015/0056196 A1 | 2/2015 | Lebreton et al. | |
| 2015/0072918 A1 | 3/2015 | Emery et al. | |
| 2015/0079076 A1 | 3/2015 | Brophy et al. | |
| 2015/0086545 A1 | 3/2015 | Sliwkowski et al. | |
| 2015/0093381 A1 | 4/2015 | Allison et al. | |
| 2015/0110816 A1 | 4/2015 | Blattler et al. | |
| 2015/0111211 A1 | 4/2015 | Amler et al. | |
| 2015/0150970 A1 | 6/2015 | Mass | |
| 2015/0196642 A1 | 7/2015 | Andya et al. | |
| 2015/0239969 A1 | 8/2015 | Friess et al. | |
| 2015/0252113 A1 | 9/2015 | Fendly et al. | |
| 2015/0273059 A1 | 10/2015 | Derynck et al. | |
| 2015/0283238 A1 | 10/2015 | Friess et al. | |
| 2016/0045515 A1 | 2/2016 | Belvin et al. | |
| 2016/0060353 A1 | 3/2016 | Lowman et al. | |
| 2016/0159912 A1 | 6/2016 | Bauss et al. | |
| 2016/0166689 A1 | 6/2016 | Adler et al. | |
| 2016/0175438 A1 | 6/2016 | Alavattam et al. | |
| 2016/0376377 A1 | 12/2016 | Basey et al. | |
| 2017/0008971 A1 | 1/2017 | Dennis et al. | |
| 2017/0029527 A1 | 2/2017 | Paton et al. | |
| 2017/0035907 A1 | 2/2017 | Green et al. | |
| 2017/0037147 A1 | 2/2017 | Allison et al. | |

(56) References Cited

U.S. PATENT DOCUMENTS

| | | |
|---|---|---|
| 2017/0073777 A1 | 3/2017 | Lee-Hoeflich et al. |
| 2017/0106097 A1 | 4/2017 | Blattler et al. |
| 2017/0136026 A1 | 5/2017 | Sliwkowski et al. |
| 2017/0166656 A1 | 6/2017 | Lowman et al. |
| 2017/0174785 A1 | 6/2017 | Harris et al. |
| 2017/0190786 A1 | 7/2017 | Fendly et al. |
| 2017/0226224 A1 | 8/2017 | Basey et al. |
| 2017/0360928 A1 | 12/2017 | Mass |
| 2018/0037660 A1 | 2/2018 | Gennaro et al. |
| 2018/0037661 A1 | 2/2018 | Gennaro et al. |
| 2018/0037662 A1 | 2/2018 | Gennaro et al. |
| 2018/0118781 A1 | 5/2018 | Lebreton et al. |
| 2018/0134803 A1 | 5/2018 | Douthwaite et al. |
| 2018/0162951 A1 | 6/2018 | Cohen |
| 2018/0201692 A1 | 7/2018 | Lowman et al. |
| 2018/0221481 A1 | 8/2018 | Beattie et al. |
| 2018/0221488 A1 | 8/2018 | Andya et al. |
| 2018/0228895 A1 | 8/2018 | Adler et al. |
| 2018/0236072 A1 | 8/2018 | Derynck et al. |
| 2018/0236093 A1 | 8/2018 | Bryant |
| 2018/0244715 A1 | 8/2018 | Emery et al. |
| 2018/0250397 A1 | 9/2018 | Benyunes et al. |
| 2018/0251536 A1 | 9/2018 | Friess et al. |
| 2018/0251557 A1 | 9/2018 | Chui et al. |
| 2018/0274038 A1 | 9/2018 | Belousov et al. |
| 2018/0280408 A1 | 10/2018 | Belvin et al. |
| 2018/0282428 A1 | 10/2018 | Fendly et al. |
| 2018/0296470 A1 | 10/2018 | Eng-Wong et al. |
| 2018/0327510 A1 | 11/2018 | Allison et al. |
| 2019/0055317 A1 | 2/2019 | Baughman et al. |
| 2019/0070291 A1 | 3/2019 | Mass |
| 2019/0117769 A1 | 4/2019 | Benyunes et al. |
| 2019/0240185 A1 | 8/2019 | Desmond-Hellman et al. |
| 2019/0298861 A1 | 10/2019 | Dobosz et al. |
| 2019/0322761 A1 | 10/2019 | Harris et al. |
| 2019/0323089 A1 | 10/2019 | Lee-Hoeflich et al. |
| 2019/0345258 A1 | 11/2019 | Gennaro et al. |
| 2019/0352331 A1 | 11/2019 | Emery et al. |
| 2019/0352332 A1 | 11/2019 | Emery et al. |
| 2019/0352333 A1 | 11/2019 | Emery et al. |
| 2019/0374547 A1 | 12/2019 | Sliwkowski et al. |
| 2020/0048362 A1 | 2/2020 | Blattler et al. |
| 2020/0155701 A1 | 5/2020 | Bryant |
| 2020/0157238 A1 | 5/2020 | Gennaro et al. |
| 2020/0179515 A1 | 6/2020 | Andya et al. |
| 2020/0199690 A1 | 6/2020 | Belousov et al. |
| 2020/0237910 A1 | 7/2020 | Beattie et al. |
| 2020/0239595 A1 | 7/2020 | Allison et al. |
| 2020/0246267 A1 | 8/2020 | Haas et al. |
| 2020/0376120 A1 | 12/2020 | Benyunes et al. |
| 2021/0015919 A1 | 1/2021 | Benyunes et al. |
| 2021/0040216 A1 | 2/2021 | Chui et al. |
| 2021/0042016 A1 | 2/2021 | Geis et al. |
| 2021/0047429 A1 | 2/2021 | Paton et al. |
| 2021/0085597 A1 | 3/2021 | Eng-Wong et al. |
| 2021/0130398 A1 | 5/2021 | Emery et al. |
| 2021/0130399 A1 | 5/2021 | Emery et al. |
| 2021/0171571 A1 | 6/2021 | Emery et al. |
| 2021/0213130 A1 | 7/2021 | Phillips et al. |
| 2021/0330789 A1 | 10/2021 | Benyunes et al. |
| 2021/0353753 A1 | 11/2021 | Adler et al. |
| 2021/0403599 A1 | 12/2021 | Badovinac-Crnjevic et al. |
| 2022/0090212 A1 | 3/2022 | Belousov et al. |
| 2022/0170115 A1 | 6/2022 | Belousov et al. |
| 2022/0282337 A1 | 9/2022 | Belousov et al. |
| 2022/0363780 A1 | 11/2022 | Harris et al. |
| 2023/0000977 A1 | 1/2023 | Benyunes et al. |
| 2023/0047103 A1 | 2/2023 | Gennaro et al. |
| 2023/0092354 A1 | 3/2023 | Eng-Wong et al. |
| 2023/0212311 A1 | 7/2023 | Allison et al. |
| 2023/0250187 A1 | 8/2023 | Paton et al. |
| 2023/0263895 A1 | 8/2023 | Andya et al. |
| 2023/0277664 A1 | 9/2023 | Ross et al. |
| 2023/0310455 A1 | 10/2023 | Schutzman et al. |
| 2023/0314420 A1 | 10/2023 | Avenal et al. |
| 2023/0416401 A1 | 12/2023 | Harris et al. |
| 2024/0207400 A1 | 6/2024 | Adler et al. |
| 2024/0262932 A1 | 8/2024 | Harris et al. |
| 2024/0269064 A1 | 8/2024 | Eng-Wong et al. |
| 2025/0018032 A1 | 1/2025 | Benyunes et al. |
| 2025/0084181 A1 | 3/2025 | Gennaro et al. |
| 2025/0090660 A1 | 3/2025 | Adler et al. |
| 2025/0121059 A1 | 4/2025 | Adler et al. |
| 2025/0177364 A1 | 6/2025 | Eiger et al. |

FOREIGN PATENT DOCUMENTS

| | | |
|---|---|---|
| EP | 2766040 B1 | 5/2019 |
| EP | 4234033 A2 | 8/2023 |
| EP | 4241849 A2 | 9/2023 |
| WO | 99/31140 A1 | 6/1999 |
| WO | 2001/00245 A3 | 1/2001 |
| WO | 01/89566 A1 | 11/2001 |
| WO | 2006/048749 A1 | 5/2006 |
| WO | 2006/078307 A1 | 7/2006 |
| WO | 2006/096861 A2 | 9/2006 |
| WO | 2007/143004 A2 | 12/2007 |
| WO | 2009/051815 A1 | 4/2009 |
| WO | 2009/154651 A1 | 12/2009 |
| WO | 2010/042705 A1 | 4/2010 |
| WO | 2010/059969 A2 | 5/2010 |
| WO | 2010/102276 A2 | 9/2010 |
| WO | 2010/136569 A1 | 12/2010 |
| WO | 2011/069074 A3 | 6/2011 |
| WO | 2011/146568 A1 | 11/2011 |
| WO | 2011/146568 A8 | 11/2011 |
| WO | 2012/120004 A1 | 9/2012 |
| WO | 2013/055874 A2 | 4/2013 |
| WO | 2013/083810 A1 | 6/2013 |
| WO | 2014/027056 A1 | 2/2014 |
| WO | 2014/083178 A1 | 6/2014 |
| WO | 2015/095418 A1 | 6/2015 |
| WO | 2022/013189 A1 | 1/2022 |
| WO | 2022/125483 A1 | 6/2022 |
| WO | 2023/178019 A1 | 9/2023 |

OTHER PUBLICATIONS

Schiffman et Al. (The New England Journal of Medicine, Vo. 353, No. 20, p. 2101-2104, 2005) (Year: 2005).*

Cuzick et Al. (The Lancet, vol. 361, p. 296-300, 2003) (Year: 2003).*

Hernandez-Ledesma (Peptides, vol. 30, p. 426-430, 2009) (Year: 2009).*

Komenaka et Al., Clinics in Dermatology, 2004, vol. 22, p. 251-265 (Year: 2004).*

European Medicines Agency, "Assessment Report for Herceptin (Trastuzumab), Procedure No. EMEA/H/C/000278/II/57" Committee for Medicinal Products for Human Use EMA/36190/2012:1-58 (Nov. 17, 2011).

"Guidelines of Chinese Society of Clinical Oncology (CSCO), Breast Cancer, w/Eng translation" Chinese Society of Clinical Oncology (CSCO):12, 14 (2022).

"Pertuzumab Combined With Herceptin and Chemotherapy Significantly Extended the Time People With HER2-Positive Metastatic" Fiercepharma:1-4 (Jul. 15, 2011).

Tabaries, S. et al., "Chapter 10: Breast Cancer Liver Metastasis" Liver Metastasis: Biology and Clinical Management:273-303 (Jan. 1, 2011).

ClinicalTrials.gov, "History of Changes for Study: NCT00545688 A Study of Pertuzumab in Combination With Herceptin in Patients With HER2 Positive Breast Cancer, Last Updated Jul. 18, 2023":1-66 (Dec. 16, 2015).

ClinicalTrials.gov, "History of Changes for Study: NCT01358877 A Study of Pertuzumab in Addition to Chemotherapy and Trastuzumab as Adjuvant Therapy in Participants With Human Epidermal Growth Receptor 2 (HER2)-Positive Primary Breast Cancer, Last Updated Jul. 18, 2023":1-44 (Sep. 1, 2016).

ClinicalTrials.gov, "History of Changes for Study: NCT02132949 A Study Evaluating Pertuzumab (Perjeta) Combined With Trastuzumab

(56) References Cited

OTHER PUBLICATIONS (Herceptin) and Standard Anthracycline-based Chemotherapy in Participants With Human Epidermal Growth Factor Receptor 2 (HER2)-Positive Locally Advanced, Inflammatory, or Early-stage Breast Cancer, Last Updated Jul. 18, 2023":1-53 (Mar. 1, 2017).
Agus, D., et al., "Clinical Activity in a Phase I Trial of HER-2-Targeted rhuMAb 2C4 (pertuzumab) in Patients with Advanced Solid Malignancies (AST)" Proceedings of the American Society of Clinical Oncology (Abstract No. 771), 22:192 ( 2003).
Agus, D., et al., "Targeting ligand-activated ErbB2 signaling inhibits breast and prostate tumor growth" Cancer Cell 2(2):127-137 (Aug. 1, 2002).
Ahn, E., et al., "Dual HER2-targeted approaches in HER2-positive breast cancer" Breast Cancer Res Treat 131(2):371-383 (Jan. 1, 2012).
Ajani, J., "Evolving chemotherapy for advanced gastric cancer" Oncologist 10(53):49-58 (Oct. 1, 2005).
Albain et al., "Adjuvant chemohormonal therapy for primary breast cancer should be sequential instead of concurrent: initial results from intergroup trial 0100 (SWOG-8814). [Abstract]" Proceedings of the American Society of Clinical Oncology Thirty-Eighth Annual Meeting, May 18-21, 2002, Orlando, Fla., Abstract 143, (2002).
Allison et al., "Pharmacokinetics of HER2-targeted rhuMAb 2C4 (pertuzumab) in patients with advanced solid malignancies: Phase Ia results" Proc Am Soc Clin Oncol (Abstract 790), 22:197 ( 2003).
Allison, D., et al., "Pharmacokinetics of HER2-Targeted rhuMAb 2C4 (Omnitarg) in Patients with Advanced Solid Malignancies: Phase IA Results" Poster (No. 790) 2003 ASCO Annual Meeting, Chicago, Ill—USA, pp. 1 ( Spring May 31-Jun. 3, 2003).
American Cancer Society et al., "Breast Cancer: Treatment Guide for Patients" NCCN 8:1-92 (Sep. 1, 2006).
American Joint Comm Cancer et al. AJCC Cancer Staging Manual (Entire Manual), Greene, F., eds, Sixth edition, New York, NY—US:Springer,:1-388 ( 2002).
American Joint Comm Cancer et al. AJCC Cancer Staging Manual "Part VII: Breast" Edge, S., eds., 7th edition, New York, NY—US:Springer,:1-29 ( 2010).
Amler et al., "HER pathway gene expression analysis in a phase II study of pertuzumab + gemcitabine vs. gemcitabine + placebo in patients with platinum-resistant epithelial ovarian cancer" J Clin Oncol (Abstract 5552), 26( Suppl May 20):1-4 ( 2008).
Amler, L.C., et al., "Identification of a predictive expression pattern for phosphorylated HER2 and clinical activity of pertuzumab (OmnitargTM), a HER dimerization inhibitor in tumors from ovarian cancer patients" Proc Amer Assoc Cancer Res, AACR Meeting Abstracts (Abstract 4497, Retrieved May 31, 2013), 47:1-2 (Apr. 1, 2006) http://www.aacrmeetingabstracts.org/cgi/content/abstract/2006/1/1055-b.
Andersson, M., et al., "Phase III Randomized Study Comparing Docetaxel Plus Trastuzumab With Vinorelbine Plus Trastuzumab As First-Line Therapy of Metastatic or Locally Advanced Human Epidermal Growth Factor Receptor 2-Positive Breast Cancer: The Hernata Study" J Clin Oncol 29(3):284-271 (Jan. 20, 2011).
ANZCTR [Australian New Zealand Clinical Trials Registry] et al., "A Study of Pertuzumab in Combination With Herceptin and Chemotherapy in Participants With HER2-Positive Breast Cancer, 2009-012019-17" (ANZCTR—A Study of Pertuzumab in Combination With Herceptin and Chemotherapy in Participants With HER2-Positive Breast Cancer; NCT00976989; ID No. 2009-012019-17; Date Submitted: Sep. 14, 2009; Date Registered: Sep. 15, 2009 and Last Update Posted: Jun. 6, 2017: Printed: Feb. 12, 2020).
Archive History for NCT01358877, A Study of Pertuzumab in Addition to Chemotherapy and Trastuzumab as Adjuvant Therapy in Participants with Human Epidermal Growth Receptor 2 (HER2)-Positive Primary Breast Cancer, pp. 1-46 (Feb. 1, 2021) http://clinicaltrials.gov/ct2/history/NCT01358877?V_112=View#StudyPageTop.
Archive History for NCT01358877, A Study of Pertuzumab in Addition to Chemotherapy and Trastuzumab as Adjuvant Therapy in Participants with Human Epidermal Growth Receptor 2 (HER2)-Positive Primary Breast Cancer, pp. 1-10 (May 8, 2018) http://clinicaltrials.gov/ct2/history/NCT01358877?V_112=View#StudyPageTop.
Attard, G., et al., "A phase Ib study of pertuzumab, a recombinant humanised antibody to HER2, and docetaxel in patients with advanced solid tumours" Brit J Cancer 97(10):1338-1343 (Nov. 19, 2007).
Au, H., et al., "BCIRG 006: Quality of life (QoL) of patients (pts) treated with docetaxel and trastuzumab-based regimens in node positive and high risk node negative HER2 positive early breast cancer" San Antonio Breast Cancer Symposium, pp. 1 (2007).
Au, H., et al., "BCIRG 006: Quality of life (QoL) of patients (pts) treated with docetaxel and trastuzumab-based regimens in node positive and high risk node negative HER2 positive early breast cancer" (Abstract 3064; Conference: SABCS (San Antonio Breast Cancer Symposium)),:p. 1 ( 2006).
Au, H., et al., "BCIRG 006: Quality of life of patients treated with docetaxel and trastuzumab-based regimens in node positive and high risk node negative HER2 positive early breast cancer" (Poster Presented by: Dr. Au from the Cross Cancer Institute in Edmonton Alberta (Canada) at SABCS (San Antonio Breast Cancer Symposium)),:1-3 ( 2006).
Bang, Y., et al., "Trastuzumab in combination with chemotherapy versus chemotherapy alone for treatment of HER2-positive advanced gastric or gastro-oesophageal junction cancer (ToGA): a phase 3, open-label, randomised controlled trial" Lancet 376(9742):687-697 (Aug. 28, 2010).
Baselga, J., et al., "Cleopatra: a phase III evaluation of pertuzumab and trastuzumab for HER2-positive metastatic breast cancer" Clinical Breast Cancer 10(6):489-491 (Dec. 1, 2010).
Baselga, J., et al., "Efficacy, safety, and tolerability of dual monoclonal antibody therapy with Pertuzumab + Trastuzumab in HER2+ metastatic breast cancer patients previously treated with Trastuzumab" (Poster 3138) 2008 San Antonio Breast Cancer Symposium (SABCS), San Antonio, TX, pp. 1 ( Dec. 10-14, 2008).
Baselga, J., et al., "Objective response rate in a phase II multicenter trial of pertuzumab (P), a HER2 dimerization inhibiting monoclonal antibody, in combination with trastuzumab (T) in patients (pts) with HER2-positive metastatic breast cancer (MBC) which has progressed during treatment with T" J Clin Oncol (Abstract 1004; 2007 ASCO Annual Meeting), 25(18S):1-2 (Jun. 20, 2007).
Baselga, J., et al., "Pertuzumab plus trastuzumab plus docetaxel for metastatic breast cancer" N Engl J Med 366(2):109-119 (Jan. 12, 2012).
Baselga, J., et al., "Phase II study of weekly intravenous recombinant humanized anti-p185HER2 monoclonal antibody in patients with HER2/neu-overexpressing metastatic breast cancer" J Clin Oncol 14(3):737-744 (Mar. 1, 1996).
Baselga, J., et al., "Phase II Trial of Pertuzumab and Trastuzumab in Patients With Human Epidermal Growth Factor Receptor 2-Positive Metastatic Breast Cancer That Progressed During Prior Trastuzumab Therapy" J Clin Oncol 28(7):1138-1144 (Mar. 1, 2010).
Bayraktar, S., et al., "Efficacy of Neoadjuvant Therapy with Trastuzumab Concurrent with Anthracycline- and Non-anthracycline-based Regimens for HER2-Positive Breast Cancer" Cancer 118(9):2385-2393 (May 1, 2012).
Bear et al., "Sequential preoperative or postoperative docetaxel added to preoperative doxorubicin plus cyclophosphamide for operable breast cancer:National Surgical Adjuvant Breast and Bowel Project Protocol B-27" J Clin Oncol. 24(13):2019-27 ( 2006).
Bellenger et al., "Comparison of left ventricular ejection fraction and volumes in heart failure by echocardiography, radionuclide ventriculography and cardiovascular magnetic resonance; are they interchangeable?" European Heart Journal 21:1387-1396 ( 2000).
Bendig, M.,, "Humanization of Rodent Monoclonal Antibodies by CDR Grafting" Methods 8:83-93 ( 1995).
Bhargava, R., et al., "Semiquantitative hormone receptor level influences response to trastuzumab-containing neoadjuvant chemotherapy in HER2-positive breast cancer" Modern Pathol 24(3):367-374 (Mar. 1, 2011).
Biosimilar and Interchangeable Products, U.S. Food and Drug Administration, dated Oct. 23, 2017. Aviaible on the web at <https://

(56) References Cited

OTHER PUBLICATIONS www.fda.gov/drugs/biosimilars/biosimilar-and-interchangeable-products> printed Nov. 12, 2020, pp. 1-5.
Bitzan, M., et al., "Safety and pharmacokinetics of chimeric anti-Shiga toxin 1 and anti-Shiga toxin 2 monoclonal antibodies in healthy volunteers" Antimicrob Agents Chemother 53(7):3081-3087 (Jul. 1, 2009).
Bray, F., et al., "Ovarian cancer in Europe: Cross-sectional trends in incidence and mortality in 28 countries, 1953-2000" Int J Cancer 113(6):977-990 (Mar. 1, 2005).
Breast Cancer Facts & Figures 2006-2008 published by Korean Breast Cancer Association (2008), pp. 1-28. Concise explanation in English attached.
"Breast Cancer Hormone Receptor Status" American Cancer Society:24-26 (Sep. 20, 2019).
Breast Cancer.org et al., "Early-Stage Breast Cancer More Deadly in Men Than Women" breastcancer.org:1 (May 9, 2007) https://www.breastcancer.org/research-news/20070509.
Burris et al., "Abstract A6: Pazopanib combination with paclitaxel and carboplatin in patients with advanced solid tumors and gynecological cancers: Results of two phase I studies" Mol Cancer Ther 8( Suppl 12):A6 ( 2009).
Calvo et al., "Phase I study of PM00104 in combination with carboplatin (C) in patients (pts) with advanced solid tumors." J Clin Oncol 29(15):1-5 ( 2011).
Cameron, D. et al., "Adjuvant bevacizumab-containing therapy in triple-negative breast cancer (Beatrice): primary results of a randomised, phase 3 trial" Lancet Oncol (http://dx.doi.org/10.1016/S1470-2045(13)70335-8), 14:933942 (Aug. 7, 2013).
Campiglio, M., et al., "Characteristics of EGFR family-mediated HRG signals in human ovarian cancer" J Cell Biochem 73(4):522-532 (Jun. 15, 1999).
Carlson, R.W., et al., "HER2 testing in breast cancer: NCCN Task Force report and recommendations" J National Comprehensive Cancer Network 4( Suppl 3):S1-S24 (Jul. 1, 2006).
Catalano, V. et al., "Gastric cancer" Crit Rev Oncol/Hematol 54(3):209-241 (Jun. 1, 2005).
Chan et al., "Phase II study of gemcitabine and carboplatin in metastatic breast cancers with prior exposure to anthracyclines and taxanes" Invest New Drugs 28:859-865 ( 2010).
Chang, H., et al., "110: Clinical Advantages of Neoadjuvant Docetaxel (T) and Carboplatin (C) ± Trastuzumab (H) in Locally Advanced Breast Cancer (LABC)" Cancer Res 69( Suppl 24):571s (Dec. 15, 2009).
Chang, H., et al., "Differential response of triple-negative breast cancer to a docetaxel and carboplatin-based neoadjuvant treatment" Cancer 116(18):4227-4237 (Sep. 15, 2010).
Charfare, H., et al., "Neoadjuvant chemotherapy in breast cancer: Review" Br J Surg 92(1):14-23 (Jan. 1, 2005).
Chlebowski et al., "A Decade of Breast Cancer Clinical Investigation: Results as Reported in the Program/Proceedings of the American Society of Clinical Oncology" J Clin Oncol 12(9):1789-1795 ( 1994).
Cho, H.S., et al., "Structure of the extracellular region of HER2 alone and in complex with the Herceptin Fab" Nature 421(6924):756-760 (Feb. 13, 2003).
Chu, E., et al. Cancer Principles and Practices of Oncology "Chapter 7: Principles of Cancer Management: Chemotherapy" De Vita, V., eds, 6th edition, Philadelphia, PA:Lippincott Williams & Wilkins,:289-306 ( 2001).
"Clinical trail NCT10966471 (version 78), A Study of Trastuzumab Emtansine Plus Pertuzumab Following Anthracyclines in Comparison With Trastuzumab Plus Perjeta and a Taxane Following Anthracyclines as Adjuvant Therapy in Patients With Operable HER2-Positive Primary Breast Cancer":1-47 (Feb. 24, 2017).
"Clinical trial NCT01358877 (version 111), A Study of Pertuzumab in Addition to Chemotherapy and Trastuzumab as Adjuvant Therapy in Participants With Human Epidermal Growth Receptor 2 (HER2)-Positive Primary Breast Cancer":1-8 (Sep. 1, 2016).
"Clinical trial NCT10966471 (version 77), A Study of Trastuzumab Emtansine Plus Pertuzumab Following Anthracyclines in Comparison With Trastuzumab Plus Perjeta and a Taxane Following Anthracyclines as Adjuvant Therapy in Patients With Operable HER2-Positive Primary Breast Cancer":1-34 (Nov. 19, 2015).
Clinical Trials.gov et al., "A Study of Pertuzumab in Addition to Chemotherapy and Herceptin (Trastuzumab) as Adjuvant Therapy in Patients With HER2-Positive Primary Breast Cancer" (Chemotherapy and Herceptin (Trastuzumab); NCT01358877; Protocol ID: BO25126; Submitted Date: Feb. 1, 2016 (v105); Last Updated Posted: Feb. 2, 2016; Printed: May 21, 2020),:1-22 (Feb. 2, 2016).
Clinical Trials.gov et al., "A Study of Pertuzumab in Combination With Herceptin and Chemotherapy in Participants With HER2-Positive Breast Cancer" (Pertuzumab in Combination With Herceptin and Chemotherapy; NCT 00976989; Key Record Dates; First Submitted: Sep. 14, 2009; First Posted: Sep. 15, 2009; Results First Submitted: Mar. 28, 2016; Results First Posted: Jun. 20, 2016; Last Updated Posted: Feb. 6, 2017; Date Printed: unknown),:1.
Clinical Trials.gov et al., "A Study of Pertuzumab in Combination With Herceptin in Patients With HER2 Positive Breast Cancer" (Pertuzumab in Combination With Herceptin—NCT00545688; Study Protocol ID: WO20697 ; Date Submitted: Oct. 16, 2007; Date First Posted: Oct. 17, 2007; Last Updated: Jul. 5, 2017; Printed: Feb. 12, 2020),:1-12 https://clinicaltrials.gov/ct2/show/study/NCT00545688?id=00545688&draw=2&rank=1.
Clinical Trials.gov, A Study of Neo ALTTO (Neoadjuvant Lapatinib and/or Trastuzumab Treatment Optimization) (NEO ALTTO) NCT0055358; Protocol ID: EGF106903 ; First Submitted: May 20, 2011, Last Updated Posted: Oct. 12, 2011 Printed: Aug. 24, 2021),:1-24 (Oct. 12, 2011).
Clinical Trials.gov, "A Study of Pertuzumab in Addition to Chemotherapy and Herceptin (Trastuzumab) as Adjuvant Therapy in Patients With HER2-Positive Primary Breast Cancer":1-10 (Feb. 6, 2017).
Clinical Trials.gov, "A Study of Pertuzumab in Addition to Chemotherapy and Herceptin (Trastuzumab) as Adjuvant Therapy in Patients With HER2-Positive Primary Breast Cancer" (Chemotherapy and Herceptin (Trastuzumab); NCT01358877; Protocol ID: BO25126; First Submitted: May 20, 2011, Last Updated Posted: Nov. 2, 2016 [Est.]; Printed: Feb. 1, 2021),:1-46 (Nov. 1, 2016).
Clinical Trials.gov, "A Study of Pertuzumab in Addition to Chemotherapy and Herceptin (Trastuzumab) as Adjuvant Therapy in Patients With HER2-Positive Primary Breast Cancer" (Chemotherapy and Herceptin (Trastuzumab); NCT01358877; Protocol ID: BO25126; Other IDs: TOC4939G, 2010-022902-41 [EudraCT Number], BIG 04-11 [Breast International Group]; Submitted Date: Nov. 1, 2016 (v112); First Submitted: May 20, 2011; First Posted: May 24, 2011; Last Updated Posted: Nov. 2, 2016),:1-20 (Nov. 1, 2016).
Clinical Trials.gov, "A Study of Pertuzumab in Combination With Herceptin and Chemotherapy in Participants With HER2-Positive Breast Cancer" (Pertuzumab in Combination With Herceptin and Chemotherapy; NCT 00976989; First Submitted: Sep. 14, 2009; First Posted; Sep. 15, 2009; Last Updated Posted: Sep. 18, 2009 (v2); Date Printed: unknown),:1-9 https://clinicaltrials.gov/ct2/history/NCT00976989.
Clinical Trials.gov, "A Study of Pertuzumab in Combination With Herceptin in Patients With HER2 Positive Breast Cancer" (Pertuzumab in Combination With Herceptin, NCT00545688—History of Changes for Study—Last Updated Posted: Jul. 5, 2017; Print Dated: Dec. 16, 2019),:1-14 https://clinicaltrials.gov/ct2/show/study/NCT00545688?id=00545688&draw=2&rank=1.
Clinical Trials.gov, "A Study of Pertuzumab in Combination With Herceptin and Chemotherapy in Participants With HER2-Positive Breast Cancer" (Pertuzumab in Combination With Herceptin and Chemotherapy; NCT0976989; History of Changes of Study; First Submitted: Sep. 14, 2009; First Posted: Sep. 15, 2009; Last Updated Posted: Sep. 21, 2011; Printed: unknown),:1-10 https://clinicaltrials.gov/ct2/history/NCT00976989.
Clinical Trials.gov, "A Study of Pertuzumab in Combination With Herceptin and Chemotherapy in Participants With HER2-Positive Breast Cancer" (Pertuzumab in Combination With Herceptin and Chemotherapy; NCT 00976989; History of Changes for Study; Protocol ID: BO22280; First Submitted: Sep. 14, 2009; First

(56) References Cited

OTHER PUBLICATIONS

Postefd: Sep. 15, 2009; Last Updated Posted: Nov. 16, 2011 (v29); Date Printed: unknown),:1-10 https://clinicaltrials.gov/ct2/history/NCT00976989.
ClinicalTrials.gov, "A Study of Pertuzumab in Combination With Herceptin and Chemotherapy in Participants With HER2-Positive Breast Cancer (History of Changes for Study as of Dec. 12, 2016)" (Pertuzumab; NCT00976989; First posted Sep. 15, 2009; Last Posted: Feb. 6, 2017; Printed:Dec. 9, 2019),:1-17 https://clinicaltrials.gov/ct2/show/NCT00976989?term=NCT00976989&draw=2&rank=1.
ClinicalTrials.gov, "A Study of Pertuzumab in Combination With Herceptin and Chemotherapy in Participants With HER2-Positive Breast Cancer" (Pertuzumab; NCT00976989; First Posted: Sep. 15, 2009; Last Update Posted: Feb. 6, 2017; Printed Nov. 29, 2019),:1-10.
ClinicalTrials.gov, "A Study of Pertuzumab in Combination With Herceptin and Chemotherapy in Participants With HER2-Positive Breast Cancer (Tryphaena)" (Pertuzumab and Herceptin; NCT00976989; First Posted: Sep. 15, 2009: Last Update Posted: Feb. 6, 2017: Printed Jan. 21, 2020),:1-10 https://clinicaltrials.gov/ct2/show/NCT00976989.
ClinicalTrials.gov, "A Study of Pertuzumab in Combination With Herceptin and Chemotherapy in Patients With HER2Positive Breast Cancer (History of Study as of Nov. 16, 2009)" (Pertuzumab; NCT00976989; BO22280; Printed: Apr. 26, 2017),:1-3.
ClinicalTrials.gov, "A Study of Pertuzumab in Combination With Trastuzumab and Chemotherapy in Participants With Human Epidermal Growth Factor Receptor 2 (HER2)-Positive Metastatic Gastroesophageal Junction or Gastric Cancer (Jacob)" (Pertuzumab and Trastuzumab; NCT01774786; First Posted: Jan. 24, 2013: Last Update Posted: Jan. 2020; Printed: Jan. 21, 2020),:1-12 https://clinicaltrials.gov/ct2/show/NCT01774786.
ClinicalTrials.gov, "A Study of Pertuzumab in Combination With Trastuzumab (Herceptin) and a Taxane in First-Line Treatment in Participants With Human Epidermal Growth Factor 2 (HER2)-Positive Advanced Breast Cancer (Peruse)" (Pertuzumab, Trastuzumab and Taxane; NCT01572038; First Posted: Apr. 5, 2012; Last Update Posted: Jan. 13, 2020; Printed: Jan. 21, 2020),:1-8 https://clinicaltrials.gov/ct2/show/NCT01572038?cond=NCT01572038.
ClinicalTrials.gov, "A Study of Pertuzumab in Combination With Trastuzumab and Chemotherapy in Patients With HER2-Positive Advanced Gastric Cancer (Joshua)" (Pertuzumab and Trastuzumab; NCT01461057; First Posted: Oct. 27, 2011; Last Update Posted: Aug. 9, 2018; Printed: Jan. 21, 2020),:1-7 https://clinicaltrials.gov/ct2/show/study/NCT01461057.
ClinicalTrials.gov, "A Study of Pertuzumab in Combination With Trastuzumab Plus an Aromatase Inhibitor in Participants With Metastatic Human Epidermal Growth Factor Receptor 2 (HER2)-Positive and Hormone Receptor-Positive Advanced Breast Cancer (Pertain)" (Pertuzumab and Trastuzumab Plus an Aromatase Inhibitor; NCT01491737; First Posted: Dec. 14, 2011; Last Update Posted: Dec. 18, 2019; Printed: Jan. 21, 2020),:1-10 https://clinicaltrials.gov/ct2/show/NCT01491737.
ClinicalTrials.gov, "A Study to Assess Efficacy and Safety of Pertuzumab Given in Combination With Trastuzumab and Vinorelbine in Participants With Metastatic or Locally Advanced Human Epidermal Growth Factor Receptor (HER) 2-Positive Breast Cancer (Velvet)" (Pertuzumab, Trastuzumab and Vinorelbine; NCT01565083; First Posted: Mar. 28, 2012; Last Update Posted: Nov. 22, 2016; Printed: Jan. 21, 2020),:1-11 https://clinicaltrials.gov/ct2/show/NCT01565083.
ClinicalTrials.gov, "A Study to Evaluate Pertuzumab + Trastuzumab + Docetaxel vs. Placebo + Trastuzumab + Docetaxel in Previously Untreated HER2-Positive Metastatic Breast Cancer (Cleopatra)" (Pertuzumab + Trastuzumab + Docetaxel vs. Placebo + Trastuzumab + Docetaxel; NCT00567190; First Posted: Dec. 4, 2007; Last Update Posted: Dec. 13, 2019; Printed: Aug. 25, 2021 ),:1-10 https://clinicaltrials.gov/ct2/show/NCT00567190.
ClinicalTrials.gov, "A Study to Evaluate Pertuzumab + Trastuzumab + Docetaxel vs. Placebo + Trastuzumab + Docetaxel in Previously Untreated HER2-Positive Metastatic Breast Cancer (Cleopatra)" (Pertuzumab + Trastuzumab + Docetaxel vs. Placebo + Trastuzumab + Docetaxel; NCT00567190; First Posted: Dec. 4, 2007; Last Update Posted: Dec. 13, 2019; Printed: Jan. 21, 2020),:1-20 https://clinicaltrials.gov/ct2/show/NCT00567190.
ClinicalTrials.gov, "Pertuzumab in Platinum-Resistant Low Human Epidermal Growth Factor Receptor 3 (HER3) Messenger Ribonucleic Acid (mRNA) Epithelial Ovarian Cancer (Penelope)" (Pertuzumab; NCT01684878; First Posted: Sep. 13, 2012; Last Update Posted: May 23, 2017; Printed: Jan. 21, 2020),:1-12 https://clinicaltrials.gov/ct2/show/NCT01684878.
ClinicalTrials.gov et al., "A Study of Pertuzumab in Combination With Herceptin and Chemotherapy in Participants With HER2-Positive Breast Cancer (Tryphaena)" (Pertuzumab and Herceptin; NCT00976989; First Posted: Sep. 15, 2009: Last Update Posted: Feb. 6, 2017: Printed Apr. 11, 2022),:1-19 https://clinicaltrials.gov/ct2/show/NCT00976989.
Coiffier et al., "CHOP Chemotherapy Plus Rituximab Compared with CHOP Alone in Elderly Patients With Diffuse Large-B-Cell Lymphoma" New Engl J Med 346(4):235-242 ( 2012).
"Common Terminology Criteria for Adverse Events v3.0 (CTCAE)" Cancer Therapy Evaluation Program:1-72 (Aug. 9, 2006).
Communication of the Board of Appeal Pursuant to Article 15(1) for European Patent Application No. 15160406.3 dated Oct. 19, 2020, pp. 1-9.
Cortazar et al., "Pathological complete response and long-term clinical benefit in breast cancer: the CTNeoBC pooled analysis" Lancet 384:164-172 ( 2014).
Cortes, J., et al., "Docetaxel combined with targeted therapies in metastatic breast cancer" Cancer Treat Rev 38(5):387-396 (Aug. 1, 2012).
Coudert et al., "Pre-Operative Systemic (Neo-Adjuvant) Therapy with Trastuzumab and Docetaxel for HER2-Overexpressing Stage II or III Breast Cancer: Results of a Multicenter Phase II Trial" Ann Oncol 17:409-414 ( 2006).
Coudert, B., et al., "Multicenter phase II trial of neoadjuvant therapy with trastuzumab, docetaxel, and carboplatin for human epidermal growth factor receptor-2-overexpressing stage II or III breast cancer: results of the GETN(A)-1 trial" J Clin Oncol 25(19):2678-2684 (Jul. 1, 2007).
Cristofanilli et al., "Circulating tumor cells: a novel prognostic factor for newly diagnosed metastatic breast cancer" J Clin Oncol. 23(7):1420-1430 (Mar. 1, 2005).
Crown, J., et al., "Platinum-taxane combinations in metastatic breast cancer: an evolving" Breast Cancer Res Treat 79( Suppl 1):S11-S18 (Mar. 1, 2003).
Cunningham, D., et al., "ESMO minimum clinical recommendations for diagnosis, treatment and follow-up of gastric cancer" Ann Oncol 16( Suppl 1):i22-i23 ( 2005).
De Boer, R.H., et al., "Use of non-anthracycline regimens in early stage breast cancer in Australia" Asia Pac J Clin Oncol 7(1):4-10 (Mar. 1, 2011).
Declaration of Graham Ross regarding U.S. Appl. No. 16/796,163, signed Nov. 20, 2020, pp. 1-8.
Declaration of Graham Ross, dated Nov. 16, 2020, pp. 1-10.
Dickstein, K. et al., "ESC Guidelines for the diagnosis and treatment of acute and chronic heart failure 2008" European Heart Journal 29:2388-2442 (Aug. 30, 2008).
"Docetaxel Prescribing Information" (Nov. 2022).
Doxorubicin Hydrochloride United States Prescribing Information (USPI),:pp. 1-26 (Oct. 2013).
Du Bois, A., et al., "Role of surgical outcome as prognostic factor in advanced epithelial ovarian cancer: A combined exploratory analysis of 3 prospectively randomized phase 3 multicenter trials" Cancer 115(6):1234-1244 (Mar. 15, 2009).
Eisenhauer et al., "New response evaluation criteria in solid tumours: Revised RECIST guideline" Eur J Cancer 45:228-247 ( 2009).
"Epirubicin United States Prescribing Information USPI":1-19 (Dec. 2014).

(56) References Cited

OTHER PUBLICATIONS

European Medicines Agency [EMA] et al., "Assessment Report—Perjeta : International non-proprietary name: pertuzumab" (Procedure No. EMEA/H/C/002547/II/0010),( Suppl EMA/CHMP/285991/2015):1-95 (Jun. 25, 2015).

European Medicines Agency [EMA], "Guideline on the evaluation of anticancer medicinal products in man"( Suppl EMA/CHMP/205/95 Rev.5):1-43 (Sep. 22, 2017).

European Medicines Agency, "Introduction to the Summary of Product Characteristics (SmPC)":1-7 (Aug. 31, 2017).

European Medicines Agency, Science Medicines Health: Guideline on the Investigation of Drug Interactions, Committee for Human Medicinal Products (CHMP), pp. 1-59 ( Jun. 21, 2012).

"European Medicines Agency: Guideline on the Investigation of Drug Interactions": 1-59 ( 2012).

Ewer et al., "Cardiotoxicity Profile of Trastuzumab" Drug Safety 31(8):459-467 ( 2008).

"Excerpt from Section 1.1.1 within Section 2.7.4 (Summary of Clinical Safety) of Perjeta neoadjuvant sBLA submitted to FDA":1-3 (Apr. 30, 2013).

"Excerpt of Roche Clinical Study Report—WO20698C/TOC4129g—A Phase III, Randomized, Double-Blind, Placebo-Controlled Clinical Trial to Evaluate the Efficacy and Safety of Pertuzumab + Trastuzumab + Docetaxel vs. Placebo + Trastuzumab + Docetaxel in Previously Untreated HER2-Positive Metastatic Breast Cancer—Report No. 1046288": pp. 1, 41, 116-118, 140, 1116, 1117 (8 pages) (Oct. 2011).

Expert Declaration of Alison Stopeck with CV dated Sep. 20, 2021 pp. 1-43.

F. Hoffmann La-Roche Ltd., Pertuzumab combined with Herceptin and chemotherapy significantly extended the time people with HER2-positive metastatic breast cancer lived without their disease getting worse, pp. 1-3 (Media Release Jul. 15, 2011) http://www.roche.com/media/media_releases/med-cor-2011-07-15.htm.

F. Hoffmann-La Roche Ltd et al., Clinical Study Protocol, Protocol No. WO20698/TOC4129G, RO4368451 Pertuzumab, IND No. BB-IND 9900, Eudract No. 2007-002997-72, Protocol approved Sep. 14, 2007, A Phase III, Randomized, Double-Blind, Placebo-Controlled Clinical Trial to Evaluate the Efficacy and Safety of Pertuzumab + Trastuzumab + Docetaxel vs. Placebo + Trastuzumab + Docetaxel in Previously Untreated HER2-Positive Metastatic Breast Cancer, pp. 1-19 ( Dec. 8, 2011).

F. Hoffmann-La Roche Ltd, "Pertuzumab and Herceptin plus chemotherapy significantly improved the rate of complete tumour disappearance in study of women with newly diagnosed, early-stage HER2-positive breast cancer" (Roche Media Release),:1-4 (Dec. 10, 2010).

Fang, L. et al., "Targeted Therapy in breast cancer: what's new?" Swiss Med Wkly 141(Suppl w13231):1-9 (Jun. 27, 2011).

Fasano et al., "Phase II Evaluation of Liposomal Doxorubicin with Docetaxel in Patients with Metastatic Breast Cancer" Breast Care 5:17-21 ( 2010).

FDA, "FDA Approves TCH Combination for HER2-Positive Early Breast Cancer" 22(5):pp. 1-2 (Jun. 1, 2008).

Fisher et al., "Effect of Preoperative Chemotherapy on the Outcome of Women With Operable Breast Cancer" J Clin Oncol 16(8):2672-2685 ( 1998).

Forbes, J.F., et al., "BCIRG 007: randomized phase III trial of trastuzumab plus docetaxel with or without carboplatin first line in HER2 positive metastatic breast cancer (MBC)" J Clin Oncol (Abstract No. LBA516), 24(18S):1-2 (Jun. 20, 2006).

Fuentes, G., et al., "Synergy between trastuzumab and pertuzumab for human epidermal growth factor 2 (Her2) from colocalization: an in silico based mechanism" Breast Cancer Res 13(3 Suppl R54):1-9 (May 22, 2011).

Galun, E., et al., "Clinical evaluation (phase I) of a combination of two human monoclonal antibodies to HBV: safety and antiviral properties" Hepatology 35(3):673-679 (Mar. 1, 2002).

"Genentech Inc., "Pertuzumab combined with Herceptin and chemotherapy significantly extended the time people with HER2-positive metastatic breast cancer lived without their disease getting worse"" Press Release:1-7 (Jul. 14, 2011).

Genentech Inc., "Pertuzumab combined with Herceptin and chemotherapy significantly extended the time people with HER2-positive metastatic breast cancer lived without their disease getting worse" (press release retrieved from the Internet Jan. 17, 2013),:1-4 (Jul. 14, 2011) http://www.gene.com/media/press-releases/13547/2011-07-14/pertuzumab-combined-with-herceptin-and-c/.

Genentech, Inc et al., "Pertuzumab and Herceptin Plus Chemotherapy Significantly Improved the Rate of Complete Tumor Disappearance in Study of Wom" (retrieved from fiercebiotech date redacted),:1-4 (Dec. 10, 2010) https://www.fiercebiotech.com/biotech/pertuzumab-and-herceptin-plus-chemotherapy-significantly-improved-rate-of-complete-tumor.

Genentech, Inc et al., "Phase Ill Aphinity Study Shows Genentech's Perjeta® Regimen Helped People with an Aggressive Type of Early Breast Cancer Live Longer without their Disease Returning Compared to Herceptin® and Chemotherapy":1-2 (Mar. 1, 2017) http://www.gene.com/media/press-release/14655/2017-03-01/phase-iii-aphinity-study-shows-genentech.

Genentech, Inc., "A Phase III, Randomized, Double-Blind, Placebo-Controlled Clinical Trial to Evaluate the Efficacy and Safety of Pertuzumab + Trastuzumab + Docetaxel vs. Placebo + Trastuzumab + Docetaxel in Previously Untreated Her2-Positive Metastatic Breast Cancer" (ClinicalTrials Identifier: NCT00567190; view of NCT00567190 on Jan. 1, 2008; retrieved Feb. 7, 2015).:1-4 (Jan. 1, 2008) https://clinicaltrials.gov/archive/NCT00567190/2008_01_01.

Genentech, Inc., "A study to evaluate pertuzumab + trastuzumab + docetaxel vs. placebo + trastuzurnab + docetaxel in previously untreated HER2-positive metastatic breast cancer (Cleopatra)" (ClinicalTrials.gov Identifier NCT00567190; Last updated: Oct. 24, 2012; Last verified Oct. 2012; Retrieved from internet May 8, 2013),:1-4 http://clinicaltrials.gov/ct2/show/NCT00567190.

Genentech, Inc., et al., "Herceptin® (trastuzumab) Prescribing Information—2008" (U.S. BL 103792/5175 Amendment),:1-11 (Jan. 18, 2008).

Genentech, Inc., 'Genentech reports additional data from biooncology pipeline at ASCO' (press release), pp. 1-2 (Jun. 1, 2003).

Genentech, Inc., "Perjeta® (pertuzumab)—Annex I: Summary of Product Characteristics" (Marketing Authorisation—EU/1/13/813/001),:1-40 (Mar. 4, 2013).

Geyer et al., "Cardiac Safety analysis of the first stage of NSABP B-31" 26th Annual San Antonio Breast Cancer Symposium (SABCS), Dec. 2003, Abstract 12.

Geyer, C.E., et al., "Lapatinib plus capecitabine for HER2-positive advanced breast cancer" N Eng J Med 355(26):2733-2743 (Dec. 28, 2006).

Gianni, L., et al., "5-year analysis of neoadjuvant pertuzumab and trastuzumab in patients with locally advanced, inflammatory, or early-stage HER2-positive breast cancer (NeoSphere): a multicentre, open-label, phase 2 randomised trial" Lancet Oncol 17(6):791-800 (Jun. 1, 2016).

Gianni, L., et al., "Efficacy and safety of neoadjuvant pertuzumab and trastuzumab in women with locally advanced, inflammatory, or early HER2-positive breast cancer (NeoSphere): a randomised multicentre, open-label, phase 2 trial" Lancet Oncol 13(01):25-32 (Jan. 1, 2012).

Gianni, L., et al., "Neoadjuvant pertuzumab (P) and trastuzumab (H): antitumor and safety analysis of a randomized phase II study ('NeoSphere')" Cancer Res (Abstract S3-2, CTRC-AACR San Antonio Breast Cancer Symposium), 70( Suppl 24):82s (Dec. 15, 2010).

Gianni, L., et al., "P301: Addition of pertuzumab (P) to trastuzumab (H)-based" Breast 70(Suppl S73):1 (Mar 18, 2011).

Giordano et al., "Clinical progress and the main problems that must be addressed" Breast Cancer Res 5(6):284-288 ( 2003).

Glover, Z.W., et al., "Compatibility and stability of pertuzumab and trastuzumab admixtures in I.V. infusion bags for coadministration" J Pharma SCI 102(3):794-812 (Mar. 1, 2013).

(56) References Cited

OTHER PUBLICATIONS

Gnant, M., et al., "Adjuvant endocrine therapy plus zoledronic acid in premenopausal women with early-stage breast cancer: 62-month follow-up from the ABCSG-12 randomised trial" Lancet Oncol 12(7):631-641 (Jul. 1, 2011).

Goldhirsch, A., et al., "Strategies for subtypes—dealing with the diversity of breast cancer: highlights of the St Gallen International Expert Consensus on the Primary Therapy of Early Breast Cancer 2011" Ann Oncol 22(8):1736-1747 (Aug. 1, 2011).

Grignolo, A., et al., "Phase III Trial Failures: Costly, But Preventable" Applied Clin Trials 25(8):1-10 (Aug. 1, 2016).

Grounds for the Decision Opposition for European Patent No. EP2361085B1 dated Oct. 2, 2017, pp. 1-15.

Grounds for the Decision Opposition for European Patent No. EP2752189B1 dated Jan. 7, 2019, pp. 1-68.

Guiu, S., et al., "Long-term follow-up of HER2-overexpressing stage II or III breast cancer treated by anthracycline-free neoadjuvant chemotherapy" Ann Oncol 22(2):321-328 (Feb. 1, 2011).

Han, H., et al., "5060: Dose-dense docetaxel, carboplatinum and trastuzumab as" Breast Cancer Res Tr 106( Suppl S226):1 (Dec. 1, 2007).

Harari et al., "Molecular mechanisms underlying ErbB2/HER2 action in breast cancer" Oncogene 19(53):6102-6114 (Dec. 11, 2000).

Harbeck et al., "Adjuvant chemotherapy for breast cancer" Drug Therapy:1-23 ( 2010).

Harbeck, N., et al., "Primary analysis of Kaitlin: A phase III study of trastuzumab emtansine (T-DM1) + pertuzumab versus rastuzumab + pertuzumab + taxane, after anthracyclines as adjuvant therapy for high-risk HER2-positive early breast cancer (EBC)" J Clin Oncol 38(15):500-500 (May 20, 2020).

Harnett et al., "Diagnosis and treatment of early breast cancer, including locally advanced disease—summary of Nice guidance." BMJ 338:598-600 ( 2009).

Healey Bird, B. et al., "Cardiac Toxicity in Breast Cancer Survivors: Review of Potential Cardiac Problems" Clin Cancer Res: 14-24 (Jan. 1, 2008).

Heinzlef et al., "Severe neuropathy after high dose carboplatin in three patients receiving multidrug chemotherapy" J Neurol Neurosurg Psychiatry 64:667-669 ( 1998).

Herceptin® (trastuzumab) Prescribing Information, pp. 1-32 ( Oct. 2010).

"Herzuma Leaflet":1-29 (Dec. 21, 2021).

Hoffmann-La Roche, "A Study of Pertuzumab in Combination With Herceptin and Chemotherapy in Patients With HER2-Positive Breast Cancer" (Clinical Trials Identifier: NCT00976989: view of NCT00976989 on Nov. 16, 2009; retrieved on May 31, 2015); 1-3 (Nov. 16, 2009) https://clinicaltrials.gov/archive/NCT00976989/2009_11_16.

Hoffmann-La Roche, "A Study of Pertuzumab in Combination With Herceptin (Trastuzumab) And Vinorelbine in First Line in Patients With Metastatic or Locally Advanced HER2-Positive Breast Cancer" (ClinicalTrials.gov identifier NCT01565083, Study ID MO27782, Last updated May 12, 2014, Last verified May 2014, retrieved May 15, 2014),:1-3 (May 2014) http://clinicaltrials.gov/ct2/show/NCT01565083?term=MO27782&rank=1.

Humphreys et al., "Gemcitabine-associated thrombotic microangiopathy" Cancer 100(12):2664-2670 ( 2004).

Hurvitz, S. et al., "Neoadjuvant Trastuzumab Emtansine and Pertuzumab in Human Epidermal Growth Factor Receptor 2-Positive Breast Cancer: Three-Year Outcomes From the Phase III Kristine Study" Journal of Clinical Oncology 37(25):1-17 (Jun. 3, 2019).

Hurvitz, S., et al., "Neoadjuvant trastuzumab, pertuzumab, and chemotherapy versus trastuzumab emtansine plus pertuzumab in patients with HER2-positive breast cancer (Kristine): a randomised, open-label, multicentre, phase 3 trial" Lancet Oncol 19(1):115-126 (Jan. 1, 2018).

Inoue, M., et al., "Epidemiology of Gastric Cancer in Japan" Postgrad Med J 81(957):419-424 (Jul. 1, 2005).

Jayaram, A., et al., "Neoadjuvant Trastuzumab, Docetaxel, and Carboplatin (TCH) for human epidermal growth factor receptor-2 (Her-2) positive breast cancer: pathological tumour response rates in an Irish teaching hospital" Ann Oncol 21( Suppl 8):1 (Oct. 1, 2010).

Joensuu, H., et al., "Adjuvant docetaxel or vinorelbine with or without trastuzumab for breast cancer" N Eng J Med 354(8):809-820 (Feb. 23, 2006).

Kaufmann et al., "Recommendations From an International Expert Panel on the Use of Neoadjuvant (Primary) Systemic Treatment of Operable Breast Cancer: An Update" J Clin Oncol 24:1940-1949 ( 2006).

Kaye, S.B., et al., "A randomised Phase II study evaluating the combination of carboplatin-based chemotherapy with pertuzumab (P) versus carboplatin-based therapy alone in patients with relapsed, platinum sensitive ovarian cancer" Slides (American Society of Clinical Oncology (ASCO) 44th Annual Meeting, May 30-Jun. 3, 2008) American Society of Clinical Oncology (ASCO), Chicago, IL, pp. 1-16 ( May 30, 2008).

Kaye, S.B., et al., "A randomised Phase II study evaluating the combination of carboplatin-based chemotherapy with pertuzumab (P) versus carboplatin-based therapy alone in patients with relapsed, platinum sensitive ovarian cancer" Poster ASCO, Chicago, IL, USA, pp. 1 (Spring May 30-Jun. 3, 2008).

Kaye, S.B., et al., "A randomised phase II study evaluating the combination of carboplatin-based chemotherapy with pertuzumab (P) versus carboplatin-based therapy alone in patients with relapsed, platinum sensitive ovarian cancer" J Clin Oncl (Abstract 5520, Retrieved May 31, 2013), 26( Suppl 15S):1-2 (May 20, 2008) http://meeting.ascopubs.org/cgi/content/abstract/26/15_suppl/5520?SID=482d7d8a-4bfd-49.

Kaye, S.B., et al., "A randomized phase II study evaluating the combination of carboplatin-based chemotherapy with pertuzumab versus carboplatin-based therapy alone in patients with relapsed, platinum-sensitive ovarian cancer" Ann Oncol 24(1):145-152 ( 2013).

Kelley, J.R., et al., "Gastric cancer epidemiology and risk factors" J Clin Epidemiol 56(1):1-9 (Jan. 1, 2003).

Koh, J., et al., "Introduction of a New Staging System of Breast Cancer for Radiologists: An Emphasis on the Prognostic Stage" Korean J Radiol 20(1):69-82 (Jan. 1, 2019).

Kola et al., "Can the pharmaceutical industry reduce attrition rates?" Nat Rev Drug Discov 3(8):711-715 (Aug. 2004).

Kolberg, H.C., et al., "Neoadjuvant Chemotherapy with Docetaxel, Carboplatin and Weekly Trastuzumab Is Active in HER2-Positive Early Breast Cancer: Results after a Median Follow-Up of over 4 Years" Breast Care (Basel) 11(5):323-327 (Oct. 11, 2016).

Kolberg, H.C., et al., "P304 Docetaxel, carboplatin and weekly trastuzumab are active as neoadjuvant therapy in operable HER2-positive breast cancer" Breast 20(6 Suppl 1, S74 Poster):1 (Mar. 18, 2011).

Konecny et al., "Docetaxel and trastuzumab: A Combination With Clinical Relevance" Onkologie 23( Suppl 6):7-9 ( 2000).

Korean Pharmacology Association Pharmacology "Chapter 57: Drug Resistance" (Concise explanation in English attached.), Seoul, KR:Korean Pharmacology Association,:1-39 ( 2009).

Kurosumi, "Significance of Histopathological Evaluation in Primary Therapy for Breast Cancer—Recent Trends in Primary Modality with Pathological Complete Response (pCR) as Endpoint" Breast Cancer 11(2):139-147 ( 2004).

Lee-Hoeflich, S., et al., "A central role for HER3 in HER2-amplified breast cancer: implications for targeted therapy" Cancer Res 68(14):5878-5887 (Jul. 15, 2008).

Lemieux, J., et al., "The role of neoadjuvant her2-targeted therapies in her2-overexpressing breast cancers" Curr Oncol 16(5):48-57 (Sep. 1, 2009).

Lenihan, D., et al., "Pooled analysis of cardiac safety in patients with cancer treated with pertuzumab" Ann Oncol 23(3):791-800 (Mar. 1, 2012).

Loi, S., "Fine-tuning chemotherapy in the era of dual HER2 targeting" Lancet Oncl 19(12):1551-1554 (Dec. 1, 2018).

Macagno et al., "Isolation of human monoclonal antibodies that potently neutralize human cytomegalovirus infection by targeting

(56) References Cited

OTHER PUBLICATIONS different epitopes on the gH/gL/UL128-131A complex" Journal of Virology 84(2):1005-1013 ( 2010).

Mackey et al., "Cardiac management during adjuvant trastuzumab therapy: recommendations of the Canadian Trastuzumab Working Group" Curr Onc 15(1):24-35 ( 2008).

Malik, M.A., et al., "Dose-Response Studies of Recombinant Humanized Monoclonal Antibody 2C4 in Tumor Xenograft Models" P Am Assoc Canc Res (Abstract No. 773), 44:150 (Jul. 2003).

Malik, M.A., et al., "Dose-Response Studies of Recombinant Humanized Monoclonal Antibody 2C4 (Pertuzumab) in Tumor Xenograft Models" Poster (No. 773) American Association for Cancer Research, Washington, D.C.—USA, pp. 1 ( Jul. 11-14, 2003).

Mamounas, E., et al., "Preoperative (neoadjuvant) chemotherapy in patients with breast cancer" Semin Oncol 28(4):389-399 (Aug. 1, 2001).

Mancini et al., "Chemotherapy Administration Sequence: A Review of the Literature and Creation of a Sequencing Chart" J Hematol Oncol Pharm 1(1):17-25 ( 2011).

Martin, M., et al., "Adjuvant docetaxel for node-positive breast cancer" N Eng J Med 352(22):2302-2313 (Jun. 2, 2005).

Marty, M., et al., "Randomized phase II trial of the efficacy and safety of trastuzumab combined with docetaxel in patients with human epidermal growth factor receptor 2-positive metastatic breast cancer administered as first-line treatment: the M77001 study group" J Clin Oncol 23(19):4265-4274 (Jul. 1, 2005).

McWhinney et al., "Platinum neurotoxicity pharmacogenetics" Mol Cancer Ther 8(1):10-16 ( 2009).

Meric-Bernstam, F., et al., "Advances in targeting human epidermal growth factor receptor-2 signaling for cancer therapy" Clin Cancer Res 12(21):6326-6330 (Nov. 1, 2006).

Merriam Webster Thesaurus Entry for Concomitant (Printed Oct. 7, 2011) pp. 1.

Metivier et al., "Pathophysiology of Anemia: Focus on the Heart and Blood Vessles" Nephrol Dial Transplant 15( Suppl 3):14-18 ( 2000).

MFDS Regulatory Provision for examining Drug Approval Applications. Concise explanation in English attached., pp. 1-61 (2011).

Moy et al., "Bosutinib and exemestane (EXE) versus EXE alone in postmenopausal (postm) women with hormone receptor-positive (HR+) HER2-negative (HER2−) advanced breast cancer (ABC)." J Clin Oncol 29(15):631 ( 2011).

Muss, H., et al., "Adjuvant Chemotherapy in Older Women with Early-Stage Breast Cancer" N Engl J Med 360(20):2055-2065 (May 14, 2009).

Nabholtz, J., et al., "Results of two open label Multicentre phase II pilot studies with Herceptln in combination with docetaxel and platinum" Eur J Cancer 37( Suppl S6):S190 (Apr. 1, 2001).

Nahta, R. et al., "The HER-2-targeting antibodies trastuzumab and pertuzumab synergistically inhibit the survival of breast cancer cells" Cancer Res 64(7):2343-2346 (Apr. 1, 2004).

Nahta, R., et al., "Growth factor receptors in breast cancer: potential for therapeutic intervention" Oncologist 8(1):5-17 ( 2003).

Naruki, Y., et al., "Radioimmunodetection of cancer of gastrointestinal tract and liver metastasis with I-131 anti-CEA and I-131 anti-CA19-9 monoclonal antibody cocktail (IMACIS-1)" Ann Nucl Med 8(3):163-169 (Aug. 1, 1994).

National Cancer Institute (NCI), "Hazard Ratio" The Wayback Machine (Definition of hazard ratio printed on Apr. 13, 2023),:p. 1 http://web.archive.org/web/20110727141129/http://www.cancer.gov/dictionary?CdrID=618612.

NCCN—National Comprehensive Cancer Network, "Clinical Practice Guidelines in Oncology: Breast Cancer" NCCN—National Comprehensive Cancer Network (National Comprehensive Cancer Network, NCCN Clinical Practice Guidelines in Oncology, Breast Cancer, version 2.2011), 2011(2):1-148 (Mar. 25, 2011).

NCCN—National Comprehensive Cancer Network, "Clinical Practice Guidelines in Oncology: Gastric Cancer" NCCN—National Comprehensive Cancer Network 1(2006):1-26 (Mar. 3, 2006).

NCI Thesaurus Results for "Multigated Acquisition Scan" Released Jun. 30, 2022 pp. 1.

NCI Thesaurus Results for "Radionuclide Ventriculography" Released Aug. 30, 2021 pp. 1.

Neoadjuvant Trastuzumab in Patients with HER-2 Positive Locally Advanced Breast Cancer, ISRCT Registry, pp. 1-7 (Last Edited Mar. 15, 2010).

NIH-National Cancer Institute et al., "NCI Dictionary of Cancer Terms—Early Breast Cancer":1 https://www.cancer.gov/publications/dictionaries/cancer-terms/def/early-stage-breast-cancer, Printed on Oct. 20, 2020.

NIH-National Cancer Institute, "NCI Dictionary of Cancer Terms—Visceral'" https://www.cancer.gov/publications/dictionaries/cancer-terms/def/visceral, Printed on Aug. 22, 2022.

Ogston et al., "A new histological grading system to assess response of breast cancers to primary chemotherapy: prognostic significance and survival" The Breast 12( Suppl 320-327) (2003).

Oken et al., "Toxicity and response criteria of the Eastern Cooperative Oncology Group" Am J Clin Oncol 5:649-655 ( 1982).

Olayioye, M., et al., "The ErbB signaling network: receptor heterodimerization in development and cancer" EMBO J 19(13):3159-3167 (Jul. 3, 2000).

Paik, S. et al., "Successful quality assurance program for HER2 testing in the NSABP Trial for Herceptin" Abstract (76(S1):S31,) San Antonio Breast Cancer Symposium, San Antonio, Texas—USA, pp. 1 ( Dec. 10-14, 2002).

Paik, S., et al., "HER2 and choice of adjuvant chemotherapy for invasive breast cancer: National Surgical Adjuvant Breast and Bowel Project Protocol B-15" J Natl Cancer Inst 92(24):1991-1998 (Dec. 20, 2000).

Paik, S., et al., "Real-World Performance of HER2 Testing—National Surgical Adjuvant Breast and Bowel Project Experience" J Natl Cancer Inst 94(11):852-854 (Jun. 5, 2002).

Paraplatin (carboplatin) United States Prescribing Information (USPI),:1-21 (Jul. 2010).

Parkin, D., "International Variation" Oncogene 23(38):6329-6340 (Aug. 1, 2004).

Pegram, M., "Breast cancer: review of platinum-based cooperative group trials" J Natl Compr Canc Netw( Suppl S2):S2-S9 (Sep. 1, 2004).

Pegram, M., et al., "Rational combinations of trastuzumab with chemotherapeutic drugs used in the treatment of breast cancer" J Natl Cancer Inst 96(10):739-749 (May 19, 2004).

Pegram, M., et al., "Results of Two Open-Label, Multicenter Phase II" J Natl Cancer Inst 96(10):759-769 (May 19, 2004).

Penault-Llorca et al., "Comparison of the prognostic significance of Chevallier and Sataloff's pathologic classifications after neoadjuvant chemotherapy of operable breast cancer" Hum Pathol 39:1221-1228 ( 2008).

Perez, E. et al., "Trastuzumab Emtansine With or Without Pertuzumab Versus Trastuzumab Plus Taxane for Human Epidermal Growth Factor Receptor 2-Positive, Advanced Breast Cancer: Primary Results From the Phase III Marianne Study" Journal of Clinical Oncology 35(2):141-158 (Jan. 10, 2017).

Perez, E. et al., "Trastuzumab Emtansine With or Without Pertuzumab Versus From Marianne Receptor 2-Positive Advanced Breast Cancer: Final Results Trastuzumab With Taxane for Human Epidermal Growth Factor" Wiley Online Library:3974-3984 (Jul. 18, 2019).

Perez, E., et al., "A combination of pertuzumab, trastuzumab, and vinorelbine for first-line treatment of patients with HER2-positive metastatic breast cancer: An open-label, two-cohort, phase II study (Velvet)" J Clin Oncol (2012 ASCO Annual Meeting, suppl. abstr TPS653, Retrieved Mar. 13, 2013), 30(15 Suppl 1):1 (May 30, 2012) http://meetinglibrary.asco.org/content/93917-114.

Perjeta, "Pertuzumab (Perjeta) United States Prescribing Information (USPI)":1-14 (Jun. 2012) https://www.accessdata.fda.gov/drugsatfda_docs/label/2012/125409lbl.pdf.

Perjeta, "Pertuzumab (Perjeta) United States Prescribing Information (USPI),":1-36 (Feb. 2021)—Pertuzumab (Perjeta) United States Prescribing Information (USPI).

Perjeta, "Pertuzumab (Perjeta) United States Prescribing Information (USPI),":1-36 (Jan. 2020)—Pertuzumab (Perjeta) United States Prescribing Information (USPI).

(56) References Cited

OTHER PUBLICATIONS

Perjeta® (pertuzumab) Full Prescribing Information, pp. 1-15 (revised Jun. 2012).
Perjeta® (pertuzumab) Full Prescribing Information, pp. 1-16 (revised Apr. 2013).
"Pertuzumab SmPC":1-31 ( 2013).
Pharmacology Review et al., "BLA File No. 125409—Perjeta (Pertuzumab)" Center for Drug Evaluation & Res (Report of Dr. John K. Leighton, Acting Dir. DABT—Division of Hematology Oncology Toxicology, Office of Hematology & Oncology Products, Application No. 125409ORIG1s000; Ref. ID. 3131984),:1-51 (May 16, 2012).
Phase Ill Aphinity Study Shows Genentech's Perjeta® Regimen Helped People with an Aggressive Type of Early Breast Cancer Live Longer without their Disease Returning Compared to Herceptin® and Chemotherapy, pp. 1-11 ( Mar. 1, 2017) http://www.gene.com/media/press-release/14655/2017-03-01/phase-iii-aphinity-study-shows-genentech.
Piccart-Gebhart, M. et al., "First results from the phase III Altto trial (BIG 2-06; NCCTG [Alliance] N063D) comparing one year of anti-HER2 therapy with lapatinib alone (L), trastuzumab alone (T), their sequence (T→L), or their combination (T+L) in the adjuvant treatment of HER2-positive early breast cancer (EBC)" Journal of Clinical Oncology (abstr LBA4; 2014 ASCO Annual Meeting II), 32( Suppl 18):1-4 ( 2014).
Pinkas-Kramarski, R., et al., "Diversification of neu differentiation factor and epidermal growth factor signaling by combinatorial receptor interactions" EMBO J 15(10):2452-2467 (May 15, 1996).
Pishvaian, M. et al., "A global, multicenter phase II trial of lapatinib plus capecitabine in gastric cancer" J Clin Oncol (Abstract 88), 29(4):1-2 (Feb. 1, 2011).
Plummer, M., et al. Mechanisms of carcinogenesis: contributions of molecular epidemiology "Epidemiology of gastric cancer" (IARC Scientific Publications No. 157), Buffler et al., Lyon, France:International Agency for Research on Cancer,:311-326 ( 2004).
Poole, C.J., et al., "Epirubicin and cyclophosphamide, methotrexate, and fluorouracil as adjuvant therapy for early breast cancer" N Eng J Med 355(18):1851-1862 (Nov. 2, 2006).
Portera, C.C., et al., "A report of cardiac events in a phase II clinical study using trastuzumab combined with pertuzumab in HER2-positive metastatic breast cancer (MBC)" J Clin Oncol (Abstract No. 1028 (2007 ASCO Annual Meeting)), 25(18S):1028 (Jun. 20, 2007).
Portera, C.C., et al., "Cardiac toxicity and efficacy of trastuzumab combined with pertuzumab in patients with Trastuzumab-insensitive human epidermal growth factor receptor 2-positive metastatic breast cancer" Clin Cancer Res 14(9):2710-2716 (May 1, 2008).
Portolano, S., et al., "Lack of promiscuity in autoantigen-specific H and L chain combinations as revealed by human H and L chain 'Roulette'" J Immunol 150(3):880-887 (Feb. 1, 1993).
"Prescribing Information for Herceptin (trastuzumab)" Genentech, Inc. (Oct. 2010).
Qin et al., "Clinicopathologic characteristics and prognostic factors for HER2-positive patients with metastatic breast cancer in southern China" Arch Med Sci . 11(3):544-550 ( 2013).
Quartino, A., et al., "Population pharmacokinetic and exposure-response analysis for trastuzumab administered using a subcutaneous 'manual syringe' injection or intravenously in women with HER2-positive early breast cancer" Cancer Chemother Pharmacol 77:77-88 (Jan. 1, 2016).
Rastogi, P., et al., "Preoperative chemotherapy: updates of National Surgical Adjuvant Breast and Bowel Project Protocols B-18 and B-27" J Clin Oncol 26(5):778-785 (Feb. 10, 2008).
Reichert et al., "Development trends for new cancer therapeutics and vaccines" Drug Discovery Today 13(1):30-37 ( 2008).
Riese II, D.J., et al., "The cellular response to neuregulins is governed by complex interactions of the erbB receptor family" Mol Cell Biol (published erratum appears in Mol Cell Biol 16(2):735 (1996)), 15(10):5770-5776 (Oct. 1, 1995).

Robert, N.J., et al., "BCIRG 006: Docetaxel and trastuzumab-based regimens improve DFS and OS over AC-T in node positive and high risk node negative HER2 positive early breast cancer patients: Quality of life (QOL) at 36 months follow-up" J Clin Oncl (Abstract 19647, Retrieved May 21, 2014), 25(18S Suppl Jun. 20):1 (Jun. 20, 2007) http://meeting.ascopubs.org/cgi/content/short/25/18_suppl/19647.
Robert, N.J., et al., "Randomized phase III study of trastuzumab, paclitaxel, and carboplatin compared with trastuzumab and paclitaxel in women with HER-2-overexpressing metastatic breast cancer" J Clin Oncol 24(18):2786-2792 (Jun. 20, 2006).
Roche et al., "Concordance between local and central laboratory HER2 testing in the breast intergroup trial N9831" J Natl Cancer Inst. 94(11):855-7 ( 2002).
Roche, "First Quarter—Q1 2011 Sales":1-126 (Apr. 14, 2011).
Roche, "Investor Update—2010" (Last Updated: Dec. 10, 2010; Printed: Dec. 16, 2019),:1-6 (Dec. 10, 2010) https://www.roche.com/investors/updates.
Roche, "Late-stage Pipeline Update 2010":1-98 (Dec. 9, 2010).
Roche, "Nine Months YTD 2011 Sales":1-142 (Oct. 13, 2011).
Roche, "Roche Annual Report 2018":1-160 (Jan. 2019).
Roche, "Roche to present important new data for HER2-positive breast cancer at 2011 San":1-4 (Nov. 30, 2011) https://www.roche.com/dam/jcr:e32f53c2-251c-4432-8bf6-32fa5efc0764/en/med-cor-2011-11-30.
Romond, E.H., et al., "Trastuzumab plus adjuvant chemotherapy for operable HER2-positive breast cancer" N Eng J Med 353(16):1673-1684 (Oct. 20, 2005).
Rudikoff et al., Proc. Natl. Acad. Sci. USA, Immunology, vol. 79, (1982), pp. 1979-1983.
Rudikoff, S., et al., "Single amino acid substitution altering antigen-binding specificity" PNAS USA 79(6):1979-1983 (Mar. 1, 1982).
Rugo, "Highlights in Breast Cancer from the 2016 American Society of Clinical Oncology Annual Meeting" Clinical Advances in Hematology & Oncology 14(7):494-497 (Jul. 1, 2016).
Saboo, A., "Pertuzumab and Herceptin plus chemotherapy significantly improved the rate of complete tumor disappearance in study of wom" FierceBiotech (retrieved Oct. 30, 2015),:1-5 (Dec. 10, 2010) http://www.fiercebiotech.com/node/96166/print.
Saboo, A., "Pertuzumab combined with Herceptin and chemotherapy significantly extended the time people with HER2-positive metastatic B" FierceBiotech (retrieved Oct. 30, 2015),:1-5 (Jul. 15, 2011) http://http://www.fiercebiotech.com/node/139289/print.
Saiyed et al., "Hematological Toxicities Associated with Pazopanib Use in Cancer Patients: A Meta-Analysis" Value in Health 18(7):1-4 ( 2015).
Saloustros et al., "Vinorelbine metronomic plus bevacizumab as salvage therapy for patients with metastatic breast cancer (MBC): A multicenter phase II study." J Clin Oncol 28(15):1133 ( 2010).
Scheuer, W., et al., "Strongly enhanced antitumor activity of trastuzumab and pertuzumab combination treatment on HER2-positive human xenograft tumor models" Cancer Res 69(24):9330-9336 (Dec. 15, 2009).
Schilsky et al., "Success and pitfalls of targeted therapy combinations" Eur J Cancer 8(7):16-17 ( 2010).
Schmidinger et al., "Cardiac Toxicity of Sunitinib and Sorafenib in Patients With Metastatic Renal Cell Carcinoma" J Clin Oncol 26(52):5204-5212 ( 2008).
Schneeweiss et al., "Biomarker (BM) analyses of a Phase II study of neoadjuvant pertuzumab and trastuzumab with and without anthracycline (ATC)-containing chemotherapy for treatment of HER2-positive early breast cancer (BC) (Tryphaena)" Annals of Oncology (Abstract 202P), 23( Suppl 9):1 (Sep. 2012).
Schneeweiss et al., "Neoadjuvant pertuzumab and trastuzumab concurrent or sequential with an anthracycline-containing or concurrent with an anthracycline-free standard regimen: a randomized phase II study (Tryphaena)" Cancer Research (Abstract S5-6), 71(24 Suppl 3):1-3 (Dec. 15, 2011).
Schneeweiss, A. et al., "Pertuzumab plus trastuzumab in combination with standard neoadjuvant anthracycline-containing and anthracycline-free chemotherapy regimens in patients with HER2-positive early breast cancer: a randomized phase II cardiac safety

(56) References Cited

OTHER PUBLICATIONS study (Tryphaena)" Ann Oncol (With Supplementary Figure S1 and Supplementary Tables S2-S7), 24(9):2278-2284 ( 2013).

Schneeweiss, A., et al., "Long-term efficacy analysis of the randomised, phase II Tryphaena cardiac safety study: Evaluating pertuzumab and trastuzumab plus standard neoadjuvant anthracycline-containing and anthracycline-free chemotherapy regimens in patients with HER2-positive early breast cancer" Eur J Cancer 89:27-35 (Jan. 1, 2018).

Schneeweiss, A., et al., "Pertuzumab plus trastuzumab in combination with standard neoadjuvant anthracycline-containing and anthracycline-free chemotherapy regimens in patients with HER2-positive early breast cancer: a randomized phase II cardiac safety study (Tryphaena)" Ann Oncol 24(9):2278-2284 (Sep. 1, 2013).

Shin, S.G., et al., "New Drug Application Process" J Korean Soc Clin Pharmacol Ther (Concise explanation in English attached.), 9(2):127-136 (Dec. 1, 2001).

Singh et al., "Phase II Trial of RAD001 Plus Carboplatin in Patients with Triple-Negative Metastatic Breast Cancer" J Clin Oncol 29(27 Suppl 1):293 ( 2011).

Singh, J.C., et al., "Pathologic Complete Response with Neoadjuvant Doxorubicin and Cyclophosphamide Followed by Paclitaxel with Trastuzumab and Pertuzumab in Patients with HER2-Positive Early Stage Breast Cancer: A Single Center Experience" Oncologist 22(2):139-143 (Feb. 1, 2017).

Slamon et al., "Human Breast Cancer: Correlation of Relapse and Survival with Amplification of the hHER-2/new Oncogene" Science 9:177-192 ( 1987).

Slamon, D., et al., "Adjuvant trastuzumab in HER2-positive breast cancer" N Engl J Med 365(14):1273-1283 (Oct. 6, 2011).

Slamon, D., et al., "Use of chemotherapy plus a monoclonal antibody against HER2 for metastatic breast cancer that overexpresses HER2" New Engl J Med 344(11):783-792 (Mar. 15, 2001).

Sliwkowski et al., "Ready to partner" Nat Struct Biol 10(3):158-159 (Mar. 2003).

Sonnenblick, A. et al., "Adjuvant systemic therapy in breast cancer: quo vadis?" Annals of Oncology (Published online, revised Feb. 9, 2015; accepted Feb. 16, 2015), 26:1629-1634 (Feb. 23, 2015).

Specifications Manual for Joint Commission of National Quality Core Measures, pp. 1-4, accessed Oct. 11, 2021 (Published 2010).

Sreedhara, A., et al., "Stability of IgG1 monoclonal antibodies in intravenous infusion bags under clinical in-use conditions" J Pharma Sci 101(1):21-30 (Jan. 1, 2012).

Steffensen, K.D., et al., "Protein levels and gene expressions of the epidermal growth factor receptors, HER1, HER2, HER3 and HER4 in benign and malignant ovarian tumors" Int J Oncol 33(1):195-204 (Jul. 1, 2008).

Tanner, B., et al., "ErbB-3 predicts survival in ovarian cancer" J Clin Oncol 24(26):4317-4323 (Sep. 10, 2006).

Therasse et al., "New guidelines to evaluate the response to treatment in solid tumors" J Natl Cancer Institute 92(3):205-216 ( 2000).

Thirumaran, R., et al. Cancer Immunotherapy: Immune Suppression and Tumor Growth "Charpter 7: Cytotoxic Chemotherapy in Clinical Treatment of Cancer" George Prendergast, Elizabeth Jaffee, eds., 1st edition, New York, NY US:Academic Press—Elsevier,:102-116 (Jul. 4, 2007).

Tiersten et al., "A phase I trial of dose-dense (biweekly) carboplatin combined with paclitaxel and pegfilgrastim: A feasibility study in patients with untreated Stage III and IV ovarian, tubal or primary peritoneal cancer: A Gynecologic Oncology Group study" Gynecol Oncol 118:303-307 ( 2010).

Tiwari, S., et al., "Retrospective study of the efficacy and safety of neoadjuvant docetaxel, carboplatin, trastuzumab/pertuzumab (TCH-P) in nonmetastatic HER2-positive breast cancer" Breast Cancer Res Treat 158(1):189-193 (Jul. 1, 2016).

"Trastuzumab (Herceptin) United States Prescribing Information (USPI),":1-33 (Oct. 2010)—Trastuzumab (Herceptin) United States Prescribing Information (USPI).

"Trastuzumab (Herceptin) United States Prescribing Information (USPI),":1-38 (Nov. 2018)—Trastuzumab (Herceptin) United States Prescribing Information (USPI).

"Trastuzumab (Herceptin) United States Prescribing Information (USPI),":1-38 (Apr. 2017)—Trastuzumab (Herceptin) United States Prescribing Information (USPI).

United Kingdom—Health Research Authority [HRA] et al., "BO22280 Pertuzumab + Trastuzumab in HER2+ Early BC (NeoAdjuvant)" (BO22280 Pertuzumab + Trastuzumab in HER2+ Early BC (NeoAdjuvant); IRAS ID 27700; REC reference 09/H0504/106; First Posted: Sep. 17, 2009: Last Update Posted: Sep. 17, 2009: Printed: Feb. 12, 2020),:1-4 https://www.hra.nhs.uk/planning-and-improving-research/application-summaries/research-summaries/bo22280-pertuzumab-trastuzumab-in-her2-early-bc-neoadjuvant/.

Untch et al., "Nab-paclitaxel versus solvent-based paclitaxel in neoadjuvant chemotherapy for early breast cancer (GeparSepto—GBG 69): a randomised, phase 3 trial" www.thelancet/oncology 17:345-356 (Mar. 2016).

Untch, M., "Targeted Therapy for Early and Locally Advanced Breast Cancer" Breast Care 5(3):144-152 (Jun. 1, 2010).

US ClinicalTrails.gov., A Dose-Finding Study of Pertuzumab (Perjeta) in Combination With Trastuzumab (Herceptin) in Healthy Male Participants and Women With Early Breast Cancer (EBC)' (ClinicalTrials.gov Identifier NCT02738970; Study ID: BO30185; First Posted Apr. 14, 2016; Last Updated Posted Jun. 12, 2018; Retrieved Feb. 7, 2020), 1-10 (Feb. 7, 2020) https://clinicaltrials.gov/ct2/show/NCT02738970.

US ClinicalTrails.gov., "A Study of Pertuzumab in Combination With Herceptin in Patients With HER2 Positive Breast Cancer (Neosphere)" (Pertuzumab and Herceptin; NCT00545688; First Posted; Oct. 17, 2007; Last Update Posted: Aug. 15, 2017; Printed: Jan. 21, 2020),:1-13 https://clinicaltrials.gov/ct2/show/NCT00545688.

US ClinicalTrials.gov, "A Study of Pertuzumab in Combination With Herceptin and Chemotherapy in Participants With HER2-Positive Breast Cancer" (ClinicalTrials.gov Identifier: NCT00976989; History of Changes of Study; First Posted: Sep. 15, 2009; Results First Posted: Jun. 20, 2016; Last Updated Posted: Feb. 6, 2017; Retrieved: Aug. 27, 2020),:1-10 (Aug. 27, 2020) https://clinicaltrials.gov/ct2/show/study/NCT00976989.

US Department of Health and Human Services—FDA, CDER and CBER, "Guidance for Industry: FDA Approval of New Cancer Treatment Uses for Marketed Drug and Biological Products" Clin 7:1-13 (Dec. 1, 1998).

USPTO, "Public Patent Application Information Retrieval—PCT/US12/59683—Assignment Data Tab" (Last Page Update: Oct. 17, 2012; Retrieval Date: Feb. 11, 2020—Assignment Tab Information),:1-2 (Oct. 17, 2012).

Valachis, A., et al., "Long-term follow-up of HER2-overexpressing stage II or III breast cancer treated by anthracycline-free neoadjuvant chemotherapy" Breast 20(6):485-490 (Dec. 1, 2011).

Valero, V., et al., "Future Direction of Neoadjuvant Therapy for Breast Cancer" Semin Oncol 25(2 Suppl 3):36-41 (Apr. 1, 1998).

Valero, V., et al., "Multicenter phase III randomized trial comparing docetaxel and trastuzumab with docetaxel, carboplatin, and trastuzumab as first-line chemotherapy for patients with HER2-gene-amplified metastatic breast cancer (BCIRG 007 study): two highly active therapeutic regimens" J Clin Oncol 29(2):149-156 (Jan. 10, 2011).

Van Warmerdam, L.J., et al., "The use of the Calvert formula to determine the optimal carboplatin dosage" J Cancer Res Clin Oncol 121(8):478-486 (Aug. 1, 1995).

Verma et al., "Is cardiotoxicity being adequately assessed in current trials of cytotoxic and targeted agents in breast cancer?" Ann Oncol 22:1011-1018 ( 2011).

Von Haehling et al., "Anaemia among patients with heart failure and preserved or reduced ejection fraction: results from the Seniors study" European Journal of Heart Failure 13:656-663 ( 2011).

Von Minckwitz et al., "Capecitabine vs. capecitabine + trastuzumab in patients with HER2-positive metastatic breast cancer progressing during trastuzumab treatment: The TBP phase III study (GBG 26/BIG 3-05)" Journal of Clinical Oncology 26( Suppl 15S (May 20 Supplement)): 1025 ( 2008).

(56) References Cited

OTHER PUBLICATIONS

Von Minckwitz et al., "Correlation of various pathologic complete response (pCR) definitions with long-term outcome and the prognostic value of pCR in various breast cancer subtypes: Results from the German neoadjuvant meta-analysis." J Clin Oncol (Abstract 1028), 29( Suppl 9) ( 2011).

Von Minckwitz et al., "Supplementary Appendix—Adjuvant Pertuzumab and Trastuzumab in Early HER2-Positive Breast Cancer" N Engl J Med 377:1-46 ( 2017).

Von Minckwitz, G., et al., "Adjuvant Pertuzumab and Herceptin IN IniTial TherapY of Breast Cancer: APHINITY (Big 4—11/BO25126/TOC4939g)" Poster 34th Annual CTRC-AACR San Antonio Breast Cancer Symposium, San Antonio, Texas—USA, pp. 1 ( Dec. 6-10, 2011).

Von Minckwitz, G., et al., "Adjuvant Pertuzumab and Trastuzumab in Early HER2-Positive Breast Cancer" N Engl J Med 377(2):122-131 (Jul. 13, 2017).

Von Minckwitz, G., et al., "OT1-02-04: Adjuvant Pertuzumab and Herceptin IN IniTial TherapY of Breast Cancer: APHINITY (Big 4—11/BO25126/TOC4939g)." Cancer Res (Abstracts: Thirty-Fourth Annual CTRC-AACR San Antonio Breast Cancer Symposium—Dec. 6-10, 2011; San Antonio, TX), 71(24):1 (Dec. 15, 2011).

Vose et al., "Phase II Study of Rituximab in Combination with CHOP Chemotherapy in Patients with Previously Untreated Intermediate- or High-Grade Non Hodgkin's Lymphoma (NHL)" Annals of Oncology (Abstract 195), 10( Suppl 3):58 ( 1999).

Wagner, A.D., et al., "Chemotherapy in advanced gastric cancer: A systematic review and meta-analysis based on aggregate data" J Clin Oncol 24(18):2903-2909 (Jun. 20, 2006).

Walshe, J., et al., "A Phase II Trial with Trastuzumab and Pertuzumab in Patients with HER2-Overexpressed Locally Advanced and Metastatic Breast Cancer" Clin Breast Cancer 6(6):535-539 (Feb. 1, 2006).

Wang, S., et al., "HER2 Kinase Domain Mutation Results in Constitutive Phosphorylation and Activation of HER2 and EGFR and Resistance to EGFR Tyrosine Kinase Inhibitors" Cancer Cell 10(1):25-38 (Jul. 1, 2006).

"Webster's Comprehensive Dictionary entries for 'concomitant and 'concurrent'":271 ( 1972).

Webster's Comprehensive Dictionary:271 ( 1992).

Wolff, A., et al., "American Society of Clinical Oncology/College of American Pathologists guideline recommendations for human epidermal growth factor receptor 2 testing in breast cancer" Arch Pathol Lab Med 131(1):18-43 (Jan. 1, 2007).

Wolmark, N., et al., "Preoperative Chemotherapy in Patients With Operable Breast Cancer: Nine-Year Results From National Surgical Adjuvant Breast and Bowel Project B-18" J Natl Cancer Inst Monogr 2001(30):96-102 (Dec. 1, 2001).

Wong et al., "Gemcitabine and Platinum Pathway Pharmacogenetics in Asian Breast Cancer Patients" Cancer Genomics & Proteomics 8:255-260 ( 2011).

Wulfing, P., et al., "HER2-Positive Circulating Tumor Cells Indicate Poor Clinical Outcome in Stage I to III Breast Cancer Patients" Clin Cancer Res 12(6):1715-1720 (Mar. 15, 2006).

Wynne, C. et al., "Comparison of Subcutaneous and Intravenous Administration of Trastuzumab: A Phase I/Ib Trial in Healthy Male Volunteers and Patients with HER2-Positive Breast Cancer" J Clin Pharmacol 53(2):192-201 (Jan. 24, 2013).

Xu et al., "Hematologic toxicities associated with mTOR inhibitors temsirolimus and everolimus in cancer patients: a systematic review and meta-analysis" Curr Med Res Opin 30(1):67-74 ( 2014).

Yamashita, Y. et al., "Abstract 3477: Pertuzumab in combination with trastuzumab enhanced the anti-tumor activity in HER2-positive human gastric cancers" Cancer Res 70(8 Suppl 1):1-5 (Apr. 1, 2010).

Yamashita-Kashima, Y. et al., "Abstract 1761: Anti-tumor activity of trastuzumab-DM1 in combination with pertuzumab in a gastric cancer model" Cancer Res 71(8 Suppl 1):1-4 ( 2011).

Yamashita-Kashima, Y. et al., "Pertuzumab in combination with trastuzumab shows significantly enhanced antitumor activity in HER2-positive human gastric cancer xenograft models" Clin Cancer Res 17(15):5060-5070 (Aug. 1, 2011).

Yao, E. et al., "Suppression of HER2/HER3-mediated growth of breast cancer cells with combinations of GDC-0941 PI3K inhibitor, trastuzumab, and pertuzumab" Clin Cancer Res 15(12):4147-4156 (Jun. 15, 2009).

Yarden, Y., et al., "Untangling the ErbB signalling network" Nat Rev Mol Cell Biol 2(2):127-137 (Feb. 1, 2001).

Yardley et al., "Phase II Trial of Docetaxal Plus Imatinib Mesylate in the Treatment of Patients With Metastatic Breast Cancer" Clin Breast Cancer:237-242 ( 2009).

Yardley, et al., "A Phase II Trial of Oxaliplatin and Trastuzumab in the Treatment of HER2-Positive Metastatic Breast Cancer" Cancer Invest 28:865-871 ( 2010).

Yardley, "Visceral Disease in Patients With Metastatic Breast Cancer: Efficacy and Saftey of Treatment With Ixabepilone and Other Chemotherapeutic Agents" Clin Breast Cancer 10(1):64-73 ( 2010).

Yeboah et al., "Prognosis of Low Normal Left Ventricular Ejection Fraction in an Asymptomatic Population-based Adult Cohort. Mesa" J Card Fail. 22(10):763-768 ( 2016).

Young et al., "Comparison of ECOG/WHO Performace Status and ASA Score as a Measure of Functional Status" Journal of Pain and Symptom Management 49(2):258-264 ( 2015).

Zia, M., et al., "Comparison of outcomes of phase II studies and subsequent randomized control studies using identical chemotherapeutic regimens" J Clin Oncol 23(28):6982-6991 (Oct. 1, 2005).

Ahn, E. et al., "Dual HER2-targeted approaches in HER2-positive breast cancer" Breast Cancer Research and Treatment 131(2):371-383 (Sep. 29, 2011).

Anderson et al., "Predicting and preventing the cardiotoxicity of cancer therapy" Expert Rev. Cardiovasc. Ther. 6(7):1023-1033 ( 2008,).

"Epirubicin United States Prescribing Information USPI" (Jul. 2011).

Gnant, M. et al., "Adjuvant endocrine therapy plus zoledronic acid in premenopausal women with early-stage breast cancer: 62-month follow-up from the ABCSG-12 randomised trial, epublished Jun. 4, 2011" Lancet Oncol 12:631-641 (Jun. 4, 2011).

Hammond et al., ""American Society of Clinical Oncology/College Of American Pathologists guideline recommendations for immunohistochemical testing of estrogen and progesterone receptors in breast cancer."" Journal of Clinical Oncology 134:48-72 (Jul. 2010).

Hammond et al., "American Society of Clinical Oncology/College Of American Pathologists guideline recommendations for immunohistochemical testing of estrogen and progesterone receptors in breast cancer." J Clin Oncol. 28(16):2784-95 (Jun. 2010).

"How Do I Use Prescription Drug Labeling" US Food and Drug Adminstration (FDA) https://www.fda.gov/about-fda/oncology-center-excellence/how-do-i-use-prescription-drug-labeling last updated:1-3 (Mar. 29, 2023).

Jahanzeb, M, "Adjuvant Trastuzumab Therapy for HER2-Positive Breast Cancer" Clinical Breast Cancer 8(4):324-333 (Aug. 2008).

Joensuu, H. et al., "Fluorouracil, Epirubicin, and Cyclophosphamide With Either Docetaxel or Vinorelbine, With or Without Trastuzumab, As Adjuvant Treatments of Breast Cancer: Final Results of the FinHer Trial" Journal of Clinical Oncology 27(34):5685-5692 (Dec. 1, 2009).

Lenihan, D. et al., "Pooled analysis of cardiac safety in patients with cancer treated with Pertuzumab, e-published Jun. 10, 2011" Annals of Oncology 23(3):791-800 (Jun. 10, 2011).

NCBI Database, X03363, (Genebank accession No. X03363 https://www.ncbi.nlm.nih.gov/nuccore/X03363; retrieved from the internet on Dec. 12, 2023), pp. 1-3 Mar. 30, 1995.

"Pertuzumab Summary of Product Characteristics (SmPC)" 1-43 ( 2022).

Semba et al., "A v-erbB-related protooncogene, c-erbB-2, is distinct from the c-erbB-1/epidermal growth factor-receptor gene and is amplified in a human salivary gland adenocarcinoma" P Natl Acad Sci USA 82:6497-6501 (Oct. 1985).

Slamon, et al., "Supplementary Appendix—Adjuvant trastuzumab in HER2-positive breast cancer" N Engl J Med:1-16 (Oct. 12, 2011).

(56) References Cited

OTHER PUBLICATIONS

Vaz-Luis et al., "Impact of hormone receptor status on patterns of recurrence and clinical outcomes among patients with human epidermal growth factor-2-positive breast cancer in the National Comprehensive Cancer Network: a prospective cohort study" Breast Cancer Research 14:R1 29:1-14 ( 2012).
Yamamoto et al., "Similarity of protein encoded by the human c-erb-B-2 gene to epidermal growth factor receptor" Nature 319:230-234 (Jan 16, 1986).
Amiri-Kordestani, et al., "First FDA Approval of Neoadjuvant Therapy for Breast Cancer: Pertuzumab for the Treatment of Patients with HER2-Positive Breast Cancer" Clinical Cancer Research, 20(21):5359-5364 (2014).
Bear et al. Journal of Clinical Oncology; 2006, vol. 24(13), 2012-2027.
Center for Drug Evaluation and Research Approval Package for "Perjeta," Application No. 125409Orig1s0051, pp. 1-104 (2013).
"Clinical trial NCT01358877—V111, A Study of Pertuzumab in Addition to Chemotherapy and Trastuzumab as Adjuvant Therapy in Participants With Human Epidermal Growth Receptor 2 (HER2)-Positive Primary Breast Cancer" posted Sep. 1, 2016, last updated Dec. 21, 2023:1-48 (2023).
Constantini et al., "Trastuzumab-Resistant Breast Cancer Cells Remain Sensitive to the Auger Electron-Emitting Radiotherapeutic Agent 111 In-NLS-Trastuzumab and Are Radiosensitized by Methotrexate" The Journal of Nuclear Medicine, 49(9):1498-1505 (2008).
Cortazar et al., "Implications of the CTNeoBC Meta-analysis" AACR ASCO Workshop, :1-50 (2013).
Cortazar, "S1-11. Meta-analysis Results from the Collaborative Trials in Neoadjuvant Breast Cancer (CTNeoBC)" CTRC-AACR San Antonion Breast Cancer Symposium, :1-32 (2012).
Doisneau-Sixou et al., "Estrogen and antiestrogen regulation of cell cycle progression in breast cancer cells" Endocrine-Related Cancer, 10:179-186 (2003).
Eschenhagen et al., "Cardiovascular side effects of cancer therapies: a position statement fromthe Heart Failure Association of the European Society of Cardiology" European Journal of Heart Failure, 13:1-10 (2011).
Esserman et al., "Accelerated Approval for Pertuzumab in the Neoadjuvant Setting: Winds of Change?" Clinical Cancer Research, 20(14):3632-3636 (2014).
Franklin, M., et al., "Insights into ErbB Signaling from the Structure of the ErbB2-pertuzumab Complex." Cancer Cell, 5(4):317-328 (2004).
Genentech, Inc., "FDA Approves Herceptin for the Adjuvant Treatment of HER2-Positive Node-Positive Breast Cancer" Press Release (Nov. 16, 2006).
Gianni et al., "Follow-up results of Noah, a randomized phase III trial evaluating neoadjuvant chemotherapy with Trastuzumab (CT ☐ H) followed by adjuvant H versus CT alone, in patients with HER2-positive locally advanced breast cancer" J Clin Oncol, 31( Suppl 15 abstr 503) (2013).
"Guidance for Industry—Pathological Complete Response in Neoadjuvant Treatment of High-Risk Early-Stage Breast Cancer: Use as an Endpoint to Support Accelerated Approval" Center for Drug Evaluation and Research, :1-16 (2012).
Huober et al., "Higher efficacy of letrozole in combination with trastuzumab compared to letrozole monotherapy as first-line treatment in patients with HER2-positive, hormone-receptor-positive metastatic breast cancer—Results of the eLEcTRA trial" The Breast, 21:27-33 (2012).
Leonessa, et al., "The Biology of Breast Tumor Progression: Acquisition of hormone independence and resistance to cytotoxic drugs" Acta Oncologica, 31(2):115-123 (1992).
Narod et al., "Are two-centimeter breast cancers large or small?" Current Oncology, 20(4):205-211 (2013).
"Neoadjuvant Treatment of Early Breast Cancer, A Conversation With FDA's Office of Hematology and Oncology Products" The ASCO Post Staff, :1-5 (2013).

Outhoff, "The art of prescribing trastuzumab for HER2-positive breast cancer" Southern African Journal of Gynaecological Oncology, 3(1):16-26 (2011).
Parker et al., "Impact of Biomarkers on Clinical Trial Risk in Breast Cancer, published online" Breast Cancer Research and Treatment, 136:179-185 (2012).
Perez et al., "Trastuzumab Plus Adjuvant Chemotherapy for Human Epidermal Growth Factor Receptor 2-Positive Breast Cancer: Planned Joint Analysis of Overall Survival From NSABP B-31 and NCCTG N9831" Journal of Clinical Oncology, 32(33):3744-3753 (2014).
"Perjeta (Pertuzumab) Prescribing Information, Revised":1-24 (2013).
Piccart et al., "Adjuvant Pertuzumab and Trastuzumab in Early HER2-Positive Breast Cancer in the Aphinity Trial: 6 Years' Follow-Up" J Clin Oncol, 39(Suppl 1448-1457) (2021).
Putti et al., "Estrogen receptor-negative breast carcinomas: a review of morphology and immunophenotypical analysis" Modern Pathology, 18(1):26-35 (2005).
Roche, "Roche Annual Report":1-220 ( 2022).
Soerjomataram et al., "An overview of prognostic factors for long-term survivors of breast cancer" Breast Cancer Research and Treatment, 107:309330 (2008).
Swain et al., "Pertuzumab, trastuzumab, and docetaxel in HER2-positive metastatic breast cancer" N Engl J Med, 372(8):724-734 (2015).
Untch et al., "Current and future role of neoadjuvant therapy for breast cancer" The Breast, 23:526-537 (2014).
Untch, "Dose-Dense Therapy" Breast Care, 3:134-138 (2008).
Valero V et al. J. Clin Onc. 2011, vol. 29(2): 149-156.
Witteles et al., "Chemotherapy—Associated Cardiotoxicity: How Often Does it Really Occur and How Can it Be Prevented?" Heart Failure Clinics, 7(3):333-344 (2011).
Wolmark, "Therapy with Abraxane and 5-Fluorouracil, Epirubicin, Cyclophosphamide (FEC) for Patients with Breast Cancer, NCT00110695, clinical trials.gov" NSABP Foundation Inc., :1-13 (2010).
Clinicaltrials.gov, "A Study of Pertuzumab in Combination With Herceptin and Chemotherapy in Patients With HER2-Positive Breast Cancer" History of changes NCT00976989 V69; First submitted Sep. 14, 2009; Results first posted Jun. 20, 2016 [Est]; Submitted Dec. 12, 2016, printed on Mar. 26, 2024:1-29.
Clinicaltrials.gov, "A Study of Pertuzumab in Combination With Herceptin and Chemotherapy in Patients With HER2-Positive Breast Cancer" History of changes NCT00976989 V68; First submitted Sep. 14, 2009; Last updated Jan. 1, 2016 [Est]; Submitted Dec. 12, 2016, printed on Mar. 26, 2024:1-12.
Paul et al., Fundamental Immunology, 3rd ed. Raven Press, NY, Chap. 9:292-295 (Oct. 15, 2019).
Amneal Pharmaceuticals, Inc., "Amneal Announces FDA Approval of Cyclophosphamide for Injection USP, Generic to Cytoxan®" Press Release: 1-5 (May 30, 2018).
Barrett-Lee et al., "Expert opinion on the use of anthracyclines in patients with advanced breast cancer at cardiac risk" Annals of Oncology 20:816-827 (Jan. 19, 2009).
"Carboplatin LiverTox" U.S. National Library of Medicine: 1-5 (Sep. 15, 2020).
Chang et al., "Survival of Patients with Metastatic Breast Carcinoma, Importance of Prognostic Markers of the Primary Tumor" American Cancer Society. Presented in part at the 37th annual meeting of the American Society of Clinical Oncology, San Francisco, California, May 12-15, 2001.:545-553 ( 2003).
Chia et al., "Locally Advanced and Inflammatory Breast Cancer" Journal of Clinical Oncology 26(5):786-790 (Feb. 10, 2008).
"Fluorouracil Uses, Interactions, Mechanism of Action" DrugBank Online, updated May 28, 2024:1-31 (Jun. 13, 2005).
Garg, "Methodology for research I" Indian Journal of Anaesthesia 60(9):640-645 (Sep. 2016).
"Generic Docetaxel Approved" U.S. Pharmacist:1-2 (Apr. 20, 2011).
"Generic Ellence Availability" Drugs.com:103 (Apr. 10, 2024).
Guha, M., "PARP inhibitors stumble in breast cancer" Nature Biotechnology 29(5):373-374 (May 2011).
Helwig, "Iniparib Fails to Improve Outcomes in Triple-negative Breast Cancer" The Asco Post, retrieved from the internet https://

(56) References Cited

OTHER PUBLICATIONS ascopost.com/issues/july-1-2011/iniparib-fails-to-improve-outcomes-in-triple-negative-breast-cancer/:1-3 (Jul. 1, 2011).
Imkampe et al., "The significance of the site of recurrence to subsequent breast cancer survival" EJSO The Journal of Cancer Surgery 33:420-423 ( 2006).
Jacobsen, "Trastuzumab Biosimilars: What to Know About Ogivri and other Herceptin Alternatives" GoodRx Health:1-19 (Mar. 3, 2023).
Joerger et al., "Small HER2-positive, node-negative breast cancer: who should receive systemic adjuvant treatment?" Annals of Oncology 22(1):17-23 (Jan. 2011).
Li, A, "Accurate prediction of human drug toxicity: A major challenge in drug development" Chemico-Biological Interactions 150(1):3-7 (Dec. 2004).
Maughan et al., "Treatment of Breast Cancer" American Family Physician 81(11):1339-1346 (Jun. 1, 2010).
NIH—National Cancer Institute, "Inflammatory Breast Cancer":1 (Sep. 25, 2006) http://https://web.archive.org/web/20060925081109/http://newscenter.cancer.gov/Templates/db_alpha.aspx?CdrID=45313.
Stanley, "Design of Randomized Controlled Trials" American Heart Association, Inc. 115:1164-1169 ( 2007).
Unicol, "Inflammatory Breast Cancer" Cancer Dictionary:1-3 ( 2004).
Voskoglou-Nomikos, T. et al., "Clinical Predictive Value of the in Vitro Cell Line, Human Xenograft, and Mouse Allograft Preclinical Cancer Models" Clin Cancer Res 9(11):4227-4239 (Sep. 15, 2003).
Xia et al., "The History and Development of HER2 Inhibitors" Pharmaceuticals 16:1-16 (Oct. 12, 2023).
Zhang et al., "Predicting Drug-Drug Interactions: An FDA Perspective" The AAPS Journal 11(2):300-306 (Jun. 2009).
Seidman A., et al., "Cardiac Dysfunction in the Trastuzumab Clinical Trials Experience", Journal of Clinical Oncology, vol. 20, No. 5, Mar. 1, 2002, pp. 1215-1221.
Semiglazov V., et al., "Surgery following neoadjuvant therapy in patients with HER2-positive locally advanced or inflammatory breast cancer participating in the NeOAdjuvant Herceptin (NOAH) study", Science Direct, vol. 37, 2011, 856-863.
Swain S.M., et al., "Cardiac Tolerability of Pertuzumab Plus Trastuzumab Plus Docetaxel in Patients With HER2-Positive Metastatic Breast Cancer in Cleopatra: A Randomized, Double-Blind, Placebo-Controlled Phase III Study" The Oncologist, vol. 18, 2013, pp. 257-264.
Swain S.M., et al., "One-Two Punch with Pertuzumab & Trastuzumab Curbs Tumor Growth", Supplement to Oncology Times, Clinical Spotlight on Trastuzumab, Feb. 25, 2009, 2 Pages.
Symmans W.F., et al., "Measurement of Residual Breast Cancer Burden to Predict Survival After N eoadjuvant Chemotherapy" Journal of Clinical Oncology, vol. 25, No. 28, Oct. 1, 2007, pp. 4414-4422.
Toi M., et al., "Phase II study of preoperative sequential FEC and docetaxel predicts of pathological response and disease free survival", Breast Cancer Research and Treatment, vol. 110, 2008, pp. 531-539.
Untch M., et al., "Abstract S3-1: Lapatinib vs Trastuzumab in Combination with Neoadjuvant Anthracycline-Taxane-Based Chemotherapy: Primary Efficacy Endpoint Analysis of the Geparquinto Study (GBG 44)", Cancer Research, vol. 70, No. 24, Supplement, Dec. 15, 2010, 2 Pages.
Untch M., et al., "Neoadjuvant Treatment With Trastuzumab in HER2-Positive Breast Cancer: Results From the GeparQuattro Study" Journal of Clinical Oncology, vol. 28, No. 12, Apr. 20, 2010, pp. 2024-2031.
Untch M., et al., "Pathologic Complete Response After N eoadjuvantChemotherapy Plus Trastuzumab Predicts Favorable Survival in Human Epidermal Growth Factor Receptor 2-Overexpressing Breast Cancer: Results From the Techno Trial of the AGO and GBG Study Groups" Journal of Clinical Oncology, vol. 29, No. 25, Sep. 1, 2011, pp. 3351-3357.
Valachis A., et al., "Trastuzumab combined to neoadjuvant chemotherapy in patients with HER2-positive breast cancer: A systematic review and meta-analysis" The Breast, vol. 20, 2011, pp. 485-490.
Vogel C.L., et al., "Efficacy and Safety of Trastuzumab as a Single Agent in First-Line Treatment of HER2-Overexpressing Metastatic Breast Cancer", Journal of Clinical Oncology, vol. 20, No. 3, Feb. 1, 2002, pp. 719-726.
Von Minckwitz G., et al., "Incorporating Agents that Target HER2 in the Neoadjuvant Setting" Current Breast Cancer Reports, vol. 3, 2011, pp. 190-196.
Vose J.M., et al., "Phase II Study of Rituximab in Combination With CHOP Chemotherapy in Patients With Previously Untreated, Aggressive Non-Hodgkin's Lymphoma", Journal of Clinical Oncology, vol. 19, No. 2, Jan. 15, 2001, pp. 389-397.
Wang M., "Chapter 6—Blood and Tumor Diseases", Diagnosis and treatment of cardiovascular damage in systemic diseases, 2003, pp. 279-284 (7 Pages).
Xu J., et al., "Hematologic toxicities associated with mTOR inhibitors temsirolimus and everolimus in cancer patients: a systematic review and meta-analysis" Current Medical Research and Opinion, vol. 30, No. 1, Jan. 2014, 2 Pages.
Xue, et al., "Introduction to breast cancer TNM staging system (7th edition)", Journal of Diagnostic Pathology, vol. 17, No. 4, 241-244, 2010, 8 Pages.
Zeynalova K.R., et al., "High pathological complete response rate of neo-adjuvant combination of docetaxel, carboplatin and trastuzumab in patients with HER2-overexpressing breast cancer: preliminary results", Poster Sessions, Mar. 24, 2010, pp. 93-94.
Buzdar A.U., "Fluorouracil, epirubicin, and cyclophosphamide (FEC-75) followed by paclitaxel plus trastuzumab versus paclitaxel plus trastuzumab followed by FEC-75 plus trastuzumab as neoadjuvant treatment for patients with HER2-positive breast cancer (Z1041): a randomised, controlled, phase 3 trial", Lancet Oncology, vol. 14, No. 13, Dec. 2013, pp. 1317=1325.
Buzdar A.U., "Neoadjuvant Therapy with Paclitaxel followed by 5-Fluorouracil, Epirubicin, and Cyclophosphamide Chemotherapy and Concurrent Trastuzumab in Human Epidermal Growth Factor Receptor 2-Positive Operable Breast Cancer: An Update of the Initial Randomized Study Population and Data of Additional Patients Treated with the Same Regimen", Cancer Therapy: Clinical, vol. 13, No. 1, Jan. 1, 2007, pp. 228-233.
Buzdar A.U., "Significantly Higher Pathologic Complete Remission Rate After Neoadjuvant Therapy With Trastuzumab, Paclitaxel, and Epirubicin Chemotherapy: Results of a Randomized Trial in Human Epidermal Growth Factor Receptor 2-Positive Operable Breast Cancer", Journal of Clinical Oncology, vol. 23, No. 16, Jun. 1, 2005, pp. 3676-3685.
Carlson R.W., et al., "Invasive Breast Cancer" Journal of the National Comprehensive Cancer Network, vol. 9, No. 2, Feb. 2011, pp. 136-175.
Chang H.R., "A phase II study of neoadjuvant docetaxel/carboplatin with or without trastuzumab in locally advanced breast cancer: Response and cardiotoxicity", Journal of Clinical Oncology, Jun. 20, 2006, 3 Pages.
Chen et al., "Internal Medicine", People's Health Publishing House, 1996, pp. 135-136, 5 Pages.
Chevallier B., et al., "Pilot Study of Intensive Induction Chemotherapy (FEC-HD) Results in a High Histologic Response Rate", American Journal of Clinical Oncology, vol. 16, No. 3, 1993, pp. 223-228.
Chollet P.J., "Pathologic complete response (pCR) in HER2 positive breast cancer to sequential FEC 100-docetaxel (D) plus trastuzumab (T) neoadjuvant chemotherapy (NCT)", Journal of Clinical Oncology, May 20, 2009, 3 Pages.
ClinicalTrails.gov, "A Study to Evaluate Pertuzumab + Trastuzumab + Docetaxel vs. Placebo + Trastuzumab + Docetaxel inPreviously Untreated HER2-Positive Metastatic Breast Cancer (Cleopatra)", Record History, NCT00567190, Ver. 26, Dec. 8, 2011, 19 Pages.
Coiffier B., "Chop Chemotherapy Plus Rituximab Compared With Chop Alone In Elderly Patients With Diffuse Large-B-cell Lymphoma", The New England Journal of Medicine, vol. 346, No. 4, Jan. 24, 2002, pp. 235-242.

(56) References Cited

OTHER PUBLICATIONS

Collins English Dictionary, Harper Collins Publishers, 1995, pp. 334-335, 5 Pages.
Collins English Dictionary, Harper Collins Publishers, 2004, pp. 332-333, 3 Pages.
Cortazar P., et al., "Relationship between OS and PFS in metastatic breast cancer (MBC): Review of FDA submission data", Meeting Abstract: 2011 ASCO Annual Meeting I, Journal of Clinical Oncology, vol. 29, No. 15, May 20, 2011, 2 Pages.
Cortes J., "The Cleopatra Trial", Oncology, vol. 29, No. 10, Oct. 15, 2015, 4 Pages.
Cortes J., "Unexpectedly Huge Survival Benefit With Pertuzumab and Trastuzumab in HER2-Positive Metastatic Breast Cancer", HSP News Service, 2024, 4 Pages.
Dai F., "What is early breast cancer," Experts answer questions about breast diseases, E12, 2004, 5 Pages.
Dawood S., et al., "Efficacy and Safety of Neoadjuvant Trastuzumab Combined With Paclitaxel and Epirubicin", Sep. 15, 2007, vol. 110, No. 6, pp. 1195-1200.
De Azambuja E., et al., Trastuzumab-Associated Cardiac Events at 8 Years of Median Follow-Up in the Herceptin Adjuvant Trial (Big 1-01), Journal of Clinical Oncology, vol. 32, No. 20, Jul. 10, 2014, pp. 2159-2165 (7 Pages).
Definition of Overall Survival Rate, Dictionary of Cancer Terms, National Cancer Institute, Nov. 22, 2024, 1 Page.
Definition of progression-free survival, Dictionary of Cancer Terms, National Cancer Institute, Nov. 22, 2024, 1 Page.
Feldman L.D., et al., "Pathological Assessment of Response to Induction Chemotherapy in Breast Cancer", Cancer Research, vol. 46, May 1986, pp. 2578-2581.
Gelmon K.A., "Results of a phase II trial of trastuzumab (H) and pertuzumab (P) in patients (pts) with HER2-positive metastatic breast cancer (MBC) who had progressed during trastuzumab therapy", Journal of Clinical Oncology, Meeting Absract: 2008 ASCO Annual Meeting, May 20, 2008, 3 Pages.
Genentech, "Pertuzumab Combined with Herceptin and Chemotherapy Significantly Extended the Time People with HER2-Positive Metastatic Breast Cancer Lived without Their Disease Getting Worse", Jul. 14, 2011, 5 Pages.
Gianni L., et al., Abstract S3-2: Neoadjuvant Pertuzumab (P) and Trastuzumab (H): Antitumor and Safety Analysis of a Randomized Phase II Study ('NeoSphere'), General Session Abstracts, vol. 70, No. 24, Dec. 15, 2010, 12 Pages.
Gianni L., et al., "Neoadjuvant chemotherapy with trastuzumab followed by adjuvant trastuzumab versus neoadjuvant chemotherapy alone, in patients with HER2-positive locally advanced breast cancer (the Noah trial): a randomised controlled superiority trial with a parallel HER2-negative cohort", The Lancet, vol. 375, Jan. 30, 2010, pp. 377-384.
Guidelines and Protocols for Breast Cancer Diagnosis and Treatment of Chinese Anti-Cancer Association (2011 Edition), China Oncology, vol. 21, No. 5, 2011, 53 Pages.
Heller W., et al., "Neoadjuvant 5-fluorouracil, epirubicin and cyclophosphamide chemotherapy followed by docetaxel in refractory patients with locally advanced breast cancer", Oncology Reports, vol. 17, 2007, pp. 253-259.
Horiguchi J., et al., "Pathological Complete Response and Prognosis in Patients Receiving Neoadjuvant Paclitaxel and Trastuzumab with and without Anthracyclines for Stage II and III, HER2-positive Operable Breast Cancer: A Single-institute Experience", Anticancer Research, vol. 31, 2011, pp. 3041-3046.
Hurley J., et al., "Docetaxel, Cisplatin, and Trastuzumab As Primary Systemic Therapy for Human Epidermal Growth Factor Receptor 2-Positive Locally Advanced Breast Cancer", Journal of Clinical Oncology, vol. 24, No. 12, Apr. 20, 2006, pp. 1831-1838.
Iwata H., "Docetaxel Followed by Fluorouracil/Epirubicin/Cyclophosphamide as Neoadjuvant Chemotherapy for Patients with Primary Breast Cancer", Japanese Journal of Clinical Oncology, vol. 41, No. 7, 2011, pp. 867-875.
Kaufmann M., et al., "Recommendations from an international expert panel on the use of neoadjuvant (primary) systemic treatment of operable breast cancer: new perspectives 2006", Annals of Oncology, vol. 18, 2007, pp. 1927-1934.
Konencny G.E., "News from the San Antonio Breast Cancer Symposium 2010", Breast Care, vol. 6, 2011, pp. 56-61.
Lehmann-Che J., et al., "Immunohistochemical and molecular analyses of HER2 status in breast cancers are highly concordant and complementary approaches", British Journal of Cancer, vol. 104, 2011, pp. 1739-1746.
Li et al., "Neoadjuvant chemotherapy for primary breast cancer", Chinese journal of oncology, vol. 26, No. 8, 2004, pp. 493-495.
Ma, et al., "Research status of neoadjuvant chemotherapy for breast cancer", Oncology Progress, vol. 9, No. 2, 2011, 165-171, 12 Pages.
Ma, et al., "Theory and Practice of Breast Cancer", Sichuan Science and Technology Press, 2010, 34 Pages.
Mazouni C., et al., "Residual Ductal Carcinoma In Situ in Patients With Complete Eradication of Invasive Breast Cancer After Neoadjuvant Chemotherapy Does Not Adversely Affect Patient Outcome", Journal of Clinical Oncology, vol. 25, No. 19, Jul. 1, 2007, pp. 2650-2655.
Miller K., et al., "Paclitaxel plus Bevacizumab versus Paclitaxel Alone for Metastatic Breast Cancer", The New England Journal of Medicine, vol. 357, 2007, pp. 2666-2676.
Minotti G., et al., "Anthracyclines: Molecular Advances and Pharmacologic Developments in Antitumor Activity and Cardiotoxicity", Pharmacological Reviews, vol. 56, No. 2, pp. 185-229, 2004.
Mittendorf E.A., et al., "Loss of HER2 Amplification Following Trastuzumab-Based Neoadjuvant Systemic Therapy and Survival Outcomes", Clinical Cancer Research, vol. 15, No. 23, Dec. 1, 2009, pp. 7381-7388.
Mouret-Reynier M-A., et al., "Neoadjuvant FEC 100 for Operable Breast Cancer: Eight-Year Experience at Centre Jean Perrin", Clinical Breast Cancer, vol. 5, No. 4, Oct. 2004, pp. 303-307.
Ozyigit G., et al., Basic Radiation Oncology, Breast Cancer, 2010, pp. 329-361.
Perjeta, Application No. 125409Orig1s113, Center for Drug Evaluation and Research, Genentech, Inc., Dec. 20, 2017, 4 Pages.
Petrelli F., et al., "Surrogate endpoints in metastatic breast cancer treated with targeted therapies: an analysis of the first-line phase III trials", Medical Oncology, vol. 31, 776, 2014, 8 Pages.
Pivot X., et al., "Cardiac toxicity events in the Phare trail, an adjuvant trastuzumab randomised phase III study", Science Direct, European Journal of Cancer, vol. 51, 2015, pp. 1660-1666.
Procter M., "Longer-Term Assessment of Trastuzumab-Related Cardiac Adverse Events in the Herceptin Adjuvant (HERA) Trial" Journal of Clinical Oncology, vol. 28, No. 21, Jul. 20, 2010, pp. 3422-3428.
Rakha E.A., et al., "Combinatorial biomarker expression in breast cancer", Breast Cancer Research and Treatment, vol. 120, 2010, pp. 293-308.
Roche F.H-L., "Clinical trial results: An Exploratory Phase II, Single Arm, Multicenter Study to Evaluate the Efficacy and Safety of the Combination of Pertuzumab and Herceptin (Trastuzumab) in Patients With HER2-Positive Metastatic Breast Cancer", EU Clinical Trials Register, Clinical trial results 2005-003493-19, Version 1, Aug. 5, 2016, 24 Pages.
Roche, "Pertuzumab Combined with Herceptin and Chemotherapy Significantly Extended the Time People with HER2-Positive Metastatic Breast Cancer Lived without Their Disease Getting Worse", Jul. 14, 2011, 5 Pages.
Romond E.H., "Seven-Year Follow-Up Assessment of Cardiac Function in NSABP B-31, a Randomized Trial Comparing Doxorubicin and Cyclophosphamide Followed by Paclitaxel (ACP) With ACP Plus Trastuzumab As Adjuvant Therapy for Patients With Node-Positive, Human Epidermal Growth Factor Receptor 2-Positive Breast Cancer", Journal of Clinical Oncology, vol. 30, No. 31, Nov. 1, 2012, pp. 3792-3799.
"33rd Annual San Antonio Breast Cancer Symposium (SABCS)", Medscape, Feb. 18, 2025, 5 Pages.
"A Study of Pertuzumab in Combination With Herceptin and Chemotherapy in Participants With HER2-Positive Breast Cancer", NCT00545688, Version 1, Oct. 16, 2007, 16 Pages.

(56) References Cited

OTHER PUBLICATIONS

"A Study of Pertuzumab in Combination With Herceptin and Chemotherapy in Participants With HER2-Positive Breast Cancer", NCT00545688, Version 49, Aug. 15, 2017, 9 Pages.
"A Study of Pertuzumab in Combination With Herceptin and Chemotherapy in Participants With HER2-Positive Breast Cancer", NCT00545688, Version 49, Nov. 15, 2011, 18 Pages.
"A Study of Pertuzumab in Combination With Herceptin and Chemotherapy in Participants With HER2-Positive Breast Cancer", NCT00976989, Feb. 6, 2017, 15 Pages.
"A Study of Pertuzumab in Combination With Herceptin and Chemotherapy in Participants With HER2-Positive Breast Cancer", NCT00976989, Version 10, Apr. 15, 2010, 14 Pages.
"A Study of Pertuzumab in Combination With Herceptin and Chemotherapy in Participants With HER2-Positive Breast Cancer", NCT00976989, Version 11, May 25, 2010, 14 Pages.
"A Study of Pertuzumab in Combination With Herceptin and Chemotherapy in Participants With HER2-Positive Breast Cancer", NCT00976989, Version 12, Jun. 15, 2010, 14 Pages.
"A Study of Pertuzumab in Combination With Herceptin and Chemotherapy in Participants With HER2-Positive Breast Cancer", NCT00976989, Version 13, Jul. 15, 2010, 14 Pages.
"A Study of Pertuzumab in Combination With Herceptin and Chemotherapy in Participants With HER2-Positive Breast Cancer", NCT00976989, Version 14, Aug. 16, 2010, 14 Pages.
"A Study of Pertuzumab in Combination With Herceptin and Chemotherapy in Participants With HER2-Positive Breast Cancer", NCT00976989, Version 15, Sep. 23, 2010, 14 Pages.
"A Study of Pertuzumab in Combination With Herceptin and Chemotherapy in Participants With HER2-Positive Breast Cancer", NCT00976989, Version 16, Oct. 15, 2010, 14 Pages.
"A Study of Pertuzumab in Combination With Herceptin and Chemotherapy in Participants With HER2-Positive Breast Cancer", NCT00976989, Version 17, Nov. 19, 2010, 14 Pages.
"A Study of Pertuzumab in Combination With Herceptin and Chemotherapy in Participants With HER2-Positive Breast Cancer", NCT00976989, Version 18, Jan. 18, 2011, 14 Pages.
"A Study of Pertuzumab in Combination With Herceptin and Chemotherapy in Participants With HER2-Positive Breast Cancer", NCT00976989, Version 19, Feb. 15, 2011, 14 Pages.
"A Study of Pertuzumab in Combination With Herceptin and Chemotherapy in Participants With HER2-Positive Breast Cancer", NCT00976989, Version 20, Mar. 15, 2011, 14 Pages.
"A Study of Pertuzumab in Combination With Herceptin and Chemotherapy in Participants With HER2-Positive Breast Cancer", NCT00976989, Version 21, Apr. 18, 2011, 14 Pages.
"A Study of Pertuzumab in Combination With Herceptin and Chemotherapy in Participants With HER2-Positive Breast Cancer", NCT00976989, Version 22, May 18, 2011, 14 Pages.
"A Study of Pertuzumab in Combination With Herceptin and Chemotherapy in Participants With HER2-Positive Breast Cancer", NCT00976989, Version 23, Jun. 15, 2011, 14 Pages.
"A Study of Pertuzumab in Combination With Herceptin and Chemotherapy in Participants With HER2-Positive Breast Cancer", NCT00976989, Version 24, Jul. 4, 2011, 14 Pages.
"A Study of Pertuzumab in Combination With Herceptin and Chemotherapy in Participants With HER2-Positive Breast Cancer", NCT00976989, Version 25, Jul. 19, 2011, 14 Pages.
"A Study of Pertuzumab in Combination With Herceptin and Chemotherapy in Participants With HER2-Positive Breast Cancer", NCT00976989, Version 26, Sep. 19, 2011, 14 Pages.
"A Study of Pertuzumab in Combination With Herceptin and Chemotherapy in Participants With HER2-Positive Breast Cancer", NCT00976989, Version 28, Oct. 14, 2011, 14 Pages.
"A Study of Pertuzumab in Combination With Herceptin and Chemotherapy in Participants With HER2-Positive Breast Cancer", NCT00976989, Version 3, Oct. 15, 2009, 11 Pages.
"A Study of Pertuzumab in Combination With Herceptin and Chemotherapy in Participants With HER2-Positive Breast Cancer", NCT00976989, Version 4, Nov. 16, 2009, 14 Pages.
"A Study of Pertuzumab in Combination With Herceptin and Chemotherapy in Participants With HER2-Positive Breast Cancer", NCT00976989, Version 5, Dec. 16, 2009, 14 Pages.
"A Study of Pertuzumab in Combination With Herceptin and Chemotherapy in Participants With HER2-Positive Breast Cancer", NCT00976989, Version 6, Jan. 21, 2010, 14 Pages.
"A Study of Pertuzumab in Combination With Herceptin and Chemotherapy in Participants With HER2-Positive Breast Cancer", NCT00976989, Version 7, Feb. 15, 2010, 14 Pages.
"A Study of Pertuzumab in Combination With Herceptin and Chemotherapy in Participants With HER2-Positive Breast Cancer", NCT00976989, Version 8, Feb. 26, 2010, 14 Pages.
"A Study of Pertuzumab in Combination With Herceptin and Chemotherapy in Participants With HER2-Positive Breast Cancer", NCT00976989, Version 9, Mar. 25, 2010, 14 Pages.
"A Study to Evaluate Pertuzumab + Trastuzumab + Docetaxel vs. Placebo + Trastuzumab + Docetaxel in Previously Untreated HER2-Positive Metastatic Breast Cancer (Cleopatra)", NCT00567190, Version 25, Jul. 28, 2010, 10 Pages.
"Breast Cancer Stages", Breastcancer.org, 2021, 8 Pages.
"Concomitantly", Synonyms and analogies for concomitantly in English, Reverso Dictionary, Retrieved from URL: https://synonyms.reverso.net/synonym/en/concomitantly, Jul. 24, 2025, 1 Page.
"Diagnosis and Treatment Specification for Breast cancer (2011 Edition)", Ministry of Health (CN), Chinese Journal of Practical Surgery, vol. 31, No. 10, 2011, pp. 902-907 (10 Pages).
"ESMO 2014 Press Release: Pertuzumab Adds 16 Months Survival Benefit to Trastuzumab and Chemotherapy Treatment for HER2-Positive Metastatic Breast Cancer", Sep. 28, ESMO, 2014, 2 Pages.
"Final Overall Survival Results from the Aphinity Trial Confirm Long-Term Benefit of Adjuvant Pertuzumab in Early HER2-Positive Breast Cancer" Oncolibrary, May 15, 2025, 3 Pages.
"Genentech to Present Important New Data for HER2-Positive Breast Cancer at 2011 San Antonio Breast Cancer Symposium" Biotech, Nov. 30, 2011, 3 Pages.
"Summary of Product Characteristics", Annex I, 2017, 28 Pages.
Abair T., "The Clinical Utility of HER2-Targeted Therapy in the Neoadjuvant Setting: Recent Results From the San Antonio Breast Cancer Symposium", Clinical Breast Cancer, Feb. 2011, pp. 15-19.
Abdel-Razeq H., et al., "Current neoadjuvant treatment options for HER2-positive breast cancer", Biologics: Targets and Therapy, vol. 5, 2011, pp. 87-94.
Agus D.B., et al., "Phase I Clinical Study of Pertuzumab, a Novel HER Dimerization Inhibitor, in Patients With Advanced Cancer" Journal of Clinical Oncology, vol. 23, No. 11, Apr. 10, 2005, pp. 2534-2543.
American Joint Committee on Cancer (AJCC), Cancer Staging Manual 8th edition, Breast, 2017, 48, pp. 595-596, 619-620, (4 Pages).
Application No. 125409Orig1s051, Cross Discipline Team Leader Review, Center for Drug Evaluation and Research, Genentech, Inc., Sep. 25, 2013, 27 Pages.
Arpino G., et al., "Treatment of Human Epidermal Growth Factor Receptor 2-Overexpressing Breast Cancer Xenografts With Multiagent HER-Targeted Therapy", JNCI, vol. 99, No. 9, May 2, 2007, pp. 694-705.
Arteaga C.L., et al., "Treatment of HER2-positive breast cancer: current status and future perspectives", Nature Reviews, Clinical Oncology, 2011, pp. 1-17.
Bae E-J., et al., "Fluorouracil, Epirubicin, and Cyclophosphamide (FEC1) for Breast Cancer", Cancer Chemotherapy Update, vol. 44, No. 1, Jan. 2009, pp. 26-31.
Baselga J., et al., "Efficacy, safety and tolerability of dual monoclonal antibody therapy with pertuzumab + trastuzumab in HER2+ metastatic breast cancer patients previously treated with trastuzumab", Cancer Research, (Poster 3138), vol. 69, 2_Supplement, Jan. 15, 2009, 2 Pages, (Dec. 10-14, 2008).
Bhargava R., et al., "Semiquantitative hormone receptor level influences response to trastuzumab-containing neoadjuvant chemotherapy in HER2-positive breast cancer", Modern Pathology, vol. 24, 2011, pp. 367-374.
Boidot R., et al., "Predictive value of survivin alternative transcript expression in locally advanced breast cancer patients treated with

(56) References Cited

OTHER PUBLICATIONS neoadjuvant chemotherapy", International Journal of Molecular Medicine, vol. 23, 2009, pp. 285-291.
Bonadonna G., et al., "Preoperative chemotherapy in operable breast cancer", The Lancet, vol. 341, Jun. 5, 1993, p. 1485.
Ando, et al., "Sequence effect of docetaxel and carboplatin on toxicity, tumor response and pharmacokinetics in non-small lung cancer patients: a phase I study of two sequences" Cancer Chemother Pharmacol 55:552-558 (2005).
Bayraktar, et al., "Neoadjuvant dose-dense docetaxel, carboplatinum, and trastuzumab (ddTCH) chemotherapy for HER2 overexpressing breast cancer" Journal of Clinical Oncology, Abstract e11557 27 (SUPPL 15):1-2 (May 20, 2009).
Beumer, et al., "Improving Carboplatin Dosing Based on Estimated GFR" Am J Kidney Dis. (AJKD) 71(2):163-165 (Feb. 2018).
Bullock et al., "Clinical efficacy of taxane-trastuzumab combination regiments for HER-2-positive metastatic breast cancer" Oncologist 13:515-525 (2008).
Calvert, et al., "Carboplatin Dosage: Prospective Evaluation Of A Simple Formula Based On Renal Function" J. Clin. Oncol. 7(11):pp. 1748-1756 (Nov. 1989).
ClinicalTrials.gov, "Clinical trial NCT01358877, A Study of Pertuzumab in Addition to Chemotherapy and Trastuzumab as Adjuvant Therapy in Participants With Human Epidermal Growth Receptor 2 (HER-2)-Positive Primary Breast Cancer (APHINITY)" 7:1-79 (Dec. 20, 2011).
Costa, et al., "Efficacy and cardiac saftey of adjuvant trastuzumab based chemotherapy regimens for HER2-positive early breast cancer, published online" Annals of Oncology 21:2153-2160 (Mar. 29, 2010).
CV of Dr. Dirk Schrijvers, submitted alongside his Expert Declaration on Oct. 13, 2025, in invalidation actions against Dutch patents based on EP4234033 and EP4241849, pp. 1-2.
Donahue, et al. "Measured versus estimated glomerular filtration rate in the Calvert equation: influence on carboplatin dosing" Cancer Chemother Pharmacol, published online 47:373-379 (Feb. 23, 2001).
Expert Declaration of Prof. Dr. Dirk Schrijvers dated Oct. 13, 2025, pp. 1-17, cited in invalidation action against Dutch patent based on EP PAT 4241849.
Expert Declaration of Prof. Dr. Dirk Schrijvers dated Oct. 13, 2025, pp. 1-17, cited in invalidation action against Dutch patent based on EP PAT 4234033.
"Guideline Summary: American Society of Clinical Oncology/ College of American Pathologist Guideline Recommendations for Human Epidermal Growth Factor Receptor HER2 Testing in Breast Cancer" Journal of Oncology Practice 3(1):48-50 (2007).
Langdon, et al., "Pertuzumab for the treatment of overian cancer" Expert Opin. Biol. Ther 10(7):1-8 (2010).
Leone, et al., "Survival in male breast cancer over the past 3 decades" Journal of the National Cancer Institute 115(4):421-428 (2023).
List of Publications of Dr. Dirk Schrijvers, submitted alongside his Expert Declarations on Oct. 13, 2025, in invalidation actions Dutch patents based on EP4234033 and EP4241849, pp. 1-43.
Miles, "Update on HER-2 as a target for cancer therapy Herceptin in the clinical setting" Breast Cancer Research 3(6):380-384 (Oct. 11, 2001).
Shahbaz, et al., "Creatinine Clearance" :1-8 (Jul. 27, 2024).
"Summary of opinion (post authorization) Herceptin (trastuzumab)" European Medicines Agency:1-2 (Mar. 17, 2011).
Taxotere, FDA prescribing information, May 2004, pp. 1-35.
Taxotere, FDA prescribing information, Sep. 2004, pp. 1-62.
Yamamoto, et al., "Phase 1 and Pharmacokinetic Study of HER2-targeted rhuMAb 2C4 (Pertuzumab, RO4368451) in Japanese Patients with Solid Tumors" Jpn J Clin Oncol. 39:260-266 (Mar. 4, 2009).

\* cited by examiner

Variable Light

```
                  10           20                30              40
2C4       DTVMTQSHKIMSTSVGDRVSITC  [KASQDVSIGVA]  WYQQRP
            **    **** *          *                    *
574       DIQMTQSPSSLSASVGDRVTITC  [KASQDVSIGVA]  WYQQKP
                                         *  ** ***
hum κI    DIQMTQSPSSLSASVGDRVTITC  [RASQSISNYLA]  WYQQKP 50          60      0           80
2C4       GQSPKLLIY  [SASYRYT]  GVPDRFTGSGSTDFTFTISSVQA
            **                       *  *           *    *  *
574       GKAPKLLIY  [SASYRYT]  GVPSRFSGSGSGTDFTLTISSLQP
                      * ****
hum κI    GKAPKLLIY  [AASSLES]  GVPSRFSGSGSGTDFTLTISSLQP 90          100
2C4       EDLAVYYC  [QQYYIYPYT]  FGGGTKLEIK    (SEQ ID NO:5)
            * *                       * *
574       EDFATYYC  [QQYYIYPYT]  FGQGTKVEIK    (SEQ ID NO:7)
                      *** *
hum κI    EDFATYYC  [QQYNSLPWT]  FGQGTKVEIK    (SEQ ID NO:9)
```

*FIG. 2A*

Variable Heavy

```
                  10          20              30             40
2C4       EVQLQQSGPELVKPGTSVKISCKAS  [GFTFTDYTMD]  WVKQS
            **    **  *  *  ***   *                    * *
574       EVQLVESGGGLVQPGGSLRLSCAAS  [GFTFTDYTMD]  WVRQA
                                          **  *
hum III   EVQLVESGGGLVQPGGSLRLSCAAS  [GFTFSSYAMS]  WVRQA 50       a       60              70         80
2C4       HGKSLEWIG  [DVNPNSGGSIYNQRFKG]  KASLTVDRSSRIVYM
            *   *   **                       ***  *     **** *
574       PGKGLEWVA  [DVNPNSGGSIYNQRFKG]  RFTLSVDRSKNTLYL
                      ****** *** ****          *  *  *
hum III   PGKGLEWVA  [VISGDGGSTYYADSVKG]  RFTISRDNSKNTLYL abc          90       100ab            110
2C4       ELRSLTFEDTAVYYCAR  [NLGPSFYFDY]  WGQGTTLTVSS   (SEQ ID NO:6)
            *** **                                             **
574       QMNSLRAEDTAVYYCAR  [NLGPSFYFDY]  WGQGTLVTVSS   (SEQ ID NO:8)
                                 ********
hum III   QMNSLRAEDTAVYYCAR  [GRVGYSLYDY]  WGQGTLVTVSS   (SEQ ID NO:10)
```

*FIG. 2B*

Amino Acid Sequence for Pertuzumab Light Chain

```
1         10        20        30        40        50        60
|         |         |         |         |         |         |
DIQMTQSPSSLSASVGDRVTITCKASQDVSIGVAWYQQKPGKAPKLLIYSASYRYTGVPS 70        80        90       100       110       120
          |         |         |         |         |         |
RFSGSGSGTDFTLTISSLQPEDFATYYCQQYYIYPYTFGQGTKVEIKRTVAAPSVFIFPP 130       140       150       160       170       180
          |         |         |         |         |         |
SDEQLKSGTASVVCLLNNFYPREAKVQWKVDNALQSGNSQESVTEQDSKDSTYSLSSTLT 190       200       210
          |         |         |
LSKADYEKHKVYACEVTHQGLSSPVTKSFNRGEC (SEQ ID NO: 11)
```

FIG. 3A

Amino Acid Sequence for Pertuzumab Heavy Chain

```
1         10        20        30        40        50        60
|         |         |         |         |         |         |
EVQLVESGGGLVQPGGSLRLSCAASGFTFTDYTMDWVRQAPGKGLEWVADVNPNSGGSIY

70        80        90       100       110       120
          |         |         |         |         |         |
NQRFKGRFTLSVDRSKNTLYLQMNSLRAEDTAVYYCARNLGPSFYFDYWGQGTLVTVSSA 130       140       150       160       170       180
          |         |         |         |         |         |
STKGPSVFPLAPSSKSTSGGTAALGCLVKDYFPEPVTVSWNSGALTSGVHTFPAVLQSSG 190       200       210       220       230       240
          |         |         |         |         |         |
LYSLSSVVTVPSSSLGTQTYICNVNHKPSNTKVDKKVEPKSCDKTHTCPPCPAPELLGGP 250       260       270       280       290       300
          |         |         |         |         |        *|
SVFLFPPKPKDTLMISRTPEVTCVVVDVSHEDPEVKFNWYVDGVEVHNAKTKPREEQYNS 310       320       330       340       350       360
          |         |         |         |         |         |
TYRVVSVLTVLHQDWLNGKEYKCKVSNKALPAPIEKTISKAKGQPREPQVYTLPPSREEM 370       380       390       400       410       420
          |         |         |         |         |         |
TKNQVSLTCLVKGFYPSDIAVEWESNGQPENNYKTTPPVLDSDGSFFLYSKLTVDKSRWQ 430       440       448
          |         |         |
QGNVFSCSVMHEALHNHYTQKSLSLSPG (SEQ ID NO: 12)
```

FIG. 3B

Trastuzumab Light Chain

```
1   DIQMTQSPSSLSASVGDRVTITCRASQDVNTAVAWYQQKPGKAPK   45
46  LLIYSASFLYSGVPSRFSGSRSGTDFTLTISSLQPEDFATYYCQQ   90
91  HYTTPPTFGQGTKVEIKRTVAAPSVFIFPPSDEQLKSGTASVVCL   135
136 LNNFYPREAKVQWKVDNALQSGNSQESVTEQDSKDSTYSLSSTLT  180
181 LSKADYEKHKVYACEVTHQGLSSPVTKSFNRGEC             214
                                    (SEQ ID NO: 13)
```

FIG. 4A

Trastuzumab Heavy Chain

```
  1 EVQLVESGGG LVQPGGSLRL SCAASGFNIK DTYIHWVRQA PGKGL    45
 46 EWVARIYPTN GYTRYADSVK GRFTISADTS KNTAYLQMNS LRAED    90
 91 TAVYYCSRWG GDGFYAMDYW GQGTLVTVSS ASTKGPSVFP LAPSS   135
136 KSTSGGTAAL GCLVKDYFPE PVTVSWNSGA LTSGVHTFPA VLQSS   180
181 GLYSLSSVVT VPSSSLGTQT YICNVNHKPS NTKVDKKVEP KSCDK   225
226 THTCPPCPAP ELLGGPSVFL FPPKPKDTLM ISRTPEVTCV VVDVS   270
271 HEDPEVKFNW YVDGVEVHNA KTKPREEQYN STYRVVSVLT VLHQD   315
316 WLNGKEYKCK VSNKALPAPI EKTISKAKGQ PREPQVYTLP PSREE    360
361 MTKNQVSLTC LVKGFYPSDI AVEWESNGQP ENNYKTTPPV LDSDG    405
406 SFFLYSKLTV DKSRWQQGNV FSCSVMHEAL HNHYTQKSLS LSPG    449
```

(SEQ ID NO: 14)

FIG. 4B

Pertuzumab Variant Light Chain

```
  1 V H S D I Q M T Q S P S S L S A S V G D R V T I T C K A S Q D V S I G V A W Y Q Q K P G
 46 A P K L L I Y S A S Y R Y T G V P S R F S G S G S G T D F T L T I S S L Q P E D F A T Y Y
 91 C Q Q Y Y I Y P Y T F G Q G T K V E I K R T V A A P S V F I F P P S D E Q L K S G T A S V
136 V C L L N N F Y P R E A K V Q W K V D N A L Q S G N S Q E S V T E Q D S K D S T Y S L S S
181 T L T L S K A D Y E K H K V Y A C E V T H Q G L S S P V T K S F N R G E C  (SEQ ID NO: 15)
                                                                         217
```

FIG. 5A

Pertuzumab Variant Heavy Chain

```
1   EVQLVESGGGLVQPGGSLRLSCAASGFTFTDYTMD WVRQAPGKGL     45
46  EWVADVNPNSGGSIYNQRFKGRFTLSVDRSKNTLYLQMNSLRAED      90
91  TAVYYCARNLGPSFYFDYWGQGTLVTVSSASTKGPSVFPLAPSS      135
136 STSGGTAALGCLVKDYFPEPVTVSWNSGALTSGVHTFPAVLQSSG      180
181 LYSLSSVVTVPSSSLGTQTYICNVNHKPSNTKVDKKVEPKSCDKT      225
226 HTCPPCPAPELLGGPSVFLFPPKPKDTLMISRTPEVTCVVVDVSH      270
271 EDPEVKFNWYVDGVEVHNAKTKPREEQYNSTYRVVSVLTVLHQDW      315
316 LNGKEYKCKVSNKALPAPIEKTISKAKGQPREPQVYTLPPSREEM      360
361 TKNQVSLTCLVKGFYPSDIAVEWESNGQPENNYKTTPPVLDSDGS      405
406 FFLYSKLTVDKSRWQQGNVFSCSVMHEALHNHYTQKSLSLSPGK       449
```

(SEQ ID NO: 16)

*FIG. 5B*

Study Schema

Schema HER2 Positive, Neoadjuvant Breast Cancer, Patients with Low Cardiac Risk Factors Samples Taken and Time Points

| Cycle | 1 | | | 2 | | | | 3 | | 4 | | 6 | |
|---|---|---|---|---|---|---|---|---|---|---|---|---|---|
| Day of cycle | 1 | 8 | 15 | 1 | 8 | 15 | | 1 | | 1 | | 1 | |
| Study Day | 1 | 8 | 15 | 22 | 29 | 36 | | 43 | | 64 | | 106 | |
| | PRE[a] | EO[b] | | | PRE[a] | EO[b] | | | | PRE[a] | EO[b] | PRE[a] | EO[b] | PRE[a] | EO[b] |
| Trastuzumab | X | X | X[c] | X | X[c] | X[c] | | X | X | X | X | X | X |
| Pertuzumab | X | X | X[c] | X | X | X[c] | | X[d] | X | X | X | X | X |
| HER2 ECD | X | | | | | | | | | | | | |

EOI = end of infusion; PRE = pre-dose.

Note: Each blood sample will be 5 mL in volume. Separate PK samples will be collected for each drug (i.e., Trastuzumab & Pertuzumab).

a. Sample can be collected up to 6 hours prior to administration of the specified drug (i.e., Trastuzumab or Pertuzumab).
b. Sample can be collected up to 30 minutes after the end of infusion of the specified drug (i.e., Trastuzumab or Pertuzumab).
c. Sample can be collected within ±6 hours (relative to the start of infusion of the specified drug).
d. Cycle 2 trough level = primary study endpoint - must be drawn on Study Day 43 (22 days after Cycle 2 dose) regardless of whether Cycle 3 dose is delayed or not given.

*FIG. 32*

Demographics

| | Arm A<br>420mg (N=15) | Arm B<br>840mg (N=15) |
|---|---|---|
| Age (yr) | | |
| Mean (SD) | 60.6 (14.7) | 57.3 (11.5) |
| Median | 67.0 | 59.0 |
| Min-Max | 29-76 | 27-72 |
| <65 (%) | 6 (40.0) | 10 (66.7) |
| ≥65 (%) | 9 (60.0) | 5 (33.3) |
| Sex | | |
| Male (%) | 14 (93.3) | 10 (66.7) |
| Female (%) | 1 (6.7) | 5 (33.3) |
| Race | | |
| Asian (%) | 9 (60.0) | 8 (53.5) |
| White (%) | 6 (40.0) | 7 (46.7) |
| Weight (kg) at baseline | | |
| Mean (SD) | 67.55 (8.64) | 67.69 (11.68) |
| Median | 67.00 | 66.80 |
| ECOG | | |
| 0 | 10 (66.7) | 6 (40.0) |
| 1 | 5 (33.3) | 9 (60.0) |

*FIG. 33*

Gastric Cancer History

|  | Pertuzumab 420mg (N=15) | Pertuzumab 840mg (N=15) |
|---|---|---|
| Extent of Disease on Entry | | |
| n | 15 | 15 |
| Metastatic disease | 13 (86.7%) | 12 (80.0%) |
| Unresectable locally advanced disease | 2 (13.3%) | 3 (20.0%) |
| Primary Site | | |
| n | 15 | 15 |
| Stomach | 12 (80.0%) | 13 (86.7%) |
| Gastroesophageal junction | 3 (20.0%) | 2 (13.3%) |
| Measurability | | |
| n | 15 | 15 |
| Measurable disease | 11 (73.3%) | 13 (86.7%) |
| Non-measurable evaluable disease only | 4 (26.7%) | 2 (13.3%) |
| Histological Subtypes | | |
| n | 15 | 15 |
| Intestinal | 6 (40.0%) | 5 (33.3%) |
| Diffuse | 1 (6.7%) | 3 (20.0%) |
| Not known | 8 (53.3%) | 7 (46.7%) |

*FIG. 34*

Patient Disposition

|  | Arm A Pertuzumab 840mg (N=15) | Arm B Pertuzumab 840mg (N=15) |
|---|---|---|
| Completed six cycles of pertuzumab (%) | 5 (33.3) | 5 (33.3) |
| Discontinued treatment (%) | 1 (6.7) | 3 (20.0) |
| Safety (%) | 0 | 2 (13.3) |
| Adverse event (%) | 0 | 1 (6.7) |
| Death (%) | 0 | 1 (6.7) |
| Non-safety (%) | 1 (6.7) | 1 (6.7) |
| Physician decision (%) | 0 | 1 (6.7) |
| Progression of disease (%) | 1 (6.7) | 0 |

*FIG. 35*

Overall Response Rate

|  | Arm A Pertuzumab 420mg (N=15) | Arm B Pertuzumab 840mg (N=15) |
|---|---|---|
| Total number of patients with tumor assessment at baseline | 15 | 15 |
| End of Cycle 3 | | |
| n | 12 | 8 |
| Partial response (%) | 8 (66.7) | 5 (62.5) |
| Stable disease (%) | 2 (16.7) | 2 (25.0) |
| Non-complete response/ non-progressive disease (%) [a] | 1 (8.3) | 1 (12.5) |
| Progressive disease (%) | 1 (8.3) | 0 |
| End of Cycle 6 | | |
| n | 4 | 4 |
| Partial response (%) | 3 (75.0) | 3 (75.0) |
| Stable disease (%) | 1 (25.0) | 1 (25.0) |

[a] Non-complete response/non-progressive disease is stable disease in patients with non-measurable disease.

FIG. 36

USES FOR AND ARTICLE OF MANUFACTURE INCLUDING HER2 DIMERIZATION INHIBITOR PERTUZUMAB

This application is a divisional application of U.S. application Ser. No. 17/656,732 filed Mar. 28, 2022, which is a divisional application of U.S. application Ser. No. 16/796, 163, filed on Feb. 20, 2020 (now abandoned) which is a continuation application U.S. application Ser. No. 16/123, 809, filed on Sep. 6, 2018 (now abandoned), which is a continuation application of U.S. application Ser. No. 15/058, 520, filed on Mar. 2, 2016 (now abandoned), which is a continuation application of U.S. application Ser. No. 13/649, 591 filed on Oct. 11, 2012 (now abandoned), which claims the benefit under 35 USC § 119(e) of U.S. Provisional Application Ser. No. 61/547,535, filed on Oct. 14, 2011, U.S. Provisional Application Ser. No. 61/567,015, filed on Dec. 5, 2011, U.S. Provisional Application Ser. No. 61/657, 669, filed on Jun. 8, 2012, U.S. Provisional Application Ser. No. 61/682,037, filed on Aug. 10, 2012 and U.S. Provisional Application Ser. No. 61/694,584, filed on Aug. 29, 2012, all of which are incorporated by reference in their entirety.

SEQUENCE LISTING

This application contains a Sequence Listing which has been submitted electronically in XML format and is hereby incorporated by reference in its entirety. Said XML copy, created on Mar. 22, 2023, is named P04753-US-12_Sequence_Listing.xml and is 32,768 bytes in size.

FIELD OF THE INVENTION

The present invention concerns uses for and articles of manufacture including Pertuzumab, a first-in-class HER2 dimerization inhibitor.

In particular, the invention concerns extending progression free survival in a HER2-positive breast cancer patient population; combining two HER2 antibodies to treat HER2-positive cancer without increasing cardiac toxicity; treating early-stage HER2-positive breast cancer; treating HER2-positive cancer by co-administering a mixture of Pertuzumab and Trastuzumab from the same intravenous bag; treating HER2-positive metastatic gastric cancer; treating HER2-positive breast cancer with Pertuzumab, Trastuzumab and Vinorelbine; treating HER2-positive breast cancer with Pertuzumab, Trastuzumab and aromatase inhibitor; and treating low HER3 ovarian, primary peritoneal, or fallopian tube cancer.

It also concerns an article of manufacture comprising a vial with Pertuzumab therein and a package insert providing safety and/or efficacy data thereon; a method of making the article of manufacture; and a method of ensuring safe and effective use of Pertuzumab related thereto.

In addition the invention concerns an intravenous (IV) bag containing a stable mixture of Pertuzumab and Trastuzumab suitable for administration to a cancer patient.

BACKGROUND OF THE INVENTION

Members of the HER family of receptor tyrosine kinases are important mediators of cell growth, differentiation and survival. The receptor family includes four distinct members including epidermal growth factor receptor (EGFR, ErbB1, or HER1), HER2 (ErbB2 or p185$^{neu}$), HER3 (ErbB3) and HER4 (ErbB4 or tyro2). Members of the receptor family have been implicated in various types of human malignancy.

A recombinant humanized version of the murine anti-HER2 antibody 4D5 (huMAb4D5-8, rhuMAb HER2, Trastuzumab or HERCEPTIN®; U.S. Pat. No. 5,821,337) is clinically active in patients with HER2-overexpressing metastatic breast cancers that have received extensive prior anti-cancer therapy (Baselga et al., *J. Clin. Oncol.* 14:737-744 (1996)).

Trastuzumab received marketing approval from the Food and Drug Administration Sep. 25, 1998 for the treatment of patients with metastatic breast cancer whose tumors overexpress the HER2 protein. At present, Trastuzumab is approved for use as a single agent or in combination with chemotherapy or hormone therapy in the metastatic setting, and as single agent or in combination with chemotherapy as adjuvant treatment for patients with early-stage HER2-positive breast cancer. Trastuzumab-based therapy is now the recommended treatment for patients with HER2-positive early-stage breast cancer who do not have contraindications for its use (Herceptin® prescribing information; NCCN Guidelines, version 2.2011). Trastuzumab plus Docetaxel (or paclitaxel) is a registered standard of care in the first-line metastatic breast cancer (MBC) treatment setting (Slamon et al. N Engl J Med. 2001; 344(11):783-792.; Marty et al. J Clin Oncol. 2005; 23(19):4265-4274).

While the administration of Trastuzumab has led to excellent results in the treatment of breast cancer, recent data from a clinical trial of lapatinib appear to suggest that even with administration of Trastuzumab, HER2 plays an active role in tumor biology (Geyer et al., *N Engl J Med* 2006; 355:2733-2743).

Patients treated with the HER2 antibody Trastuzumab are selected for therapy based on HER2 expression. See, for example, WO99/31140 (Paton et al.), US2003/0170234A1 (Hellmann, S.), and US2003/0147884 (Paton et al.); as well as WO01/89566, US2002/0064785, and US2003/0134344 (Mass et al.). See, also, U.S. Pat. Nos. 6,573,043, 6,905,830, and US2003/0152987, Cohen et al., concerning immunohistochemistry (IHC) and fluorescence in situ hybridization (FISH) for detecting HER2 overexpression and amplification. Thus, the optimal management of metastatic breast cancer now takes into account not only a patient's general condition, medical history, and receptor status, but also the HER2 status.

Pertuzumab (also known as recombinant humanized monoclonal antibody 2C4 (rhuMAb 2C4); Genentech, Inc, South San Francisco) represents the first in a new class of agents known as HER dimerization inhibitors (HDI) and functions to inhibit the ability of HER2 to form active heterodimers or homodimers with other HER receptors (such as EGFR/HER1, HER2, HER3 and HER4). See, for example, Harari and Yarden *Oncogene* 19:6102-14 (2000); Yarden and Sliwkowski. *Nat Rev Mol Cell Biol* 2:127-37 (2001); Sliwkowski *Nat Struct Biol* 10:158-9 (2003); Cho et al. *Nature* 421:756-60 (2003); and Malik et al. *Pro Am Soc Cancer Res* 44:176-7 (2003).

Pertuzumab blockade of the formation of HER2-HER3 heterodimers in tumor cells has been demonstrated to inhibit critical cell signaling, which results in reduced tumor proliferation and survival (Agus et al. *Cancer Cell* 2:127-37 (2002)).

Pertuzumab has undergone testing as a single agent in the clinic with a phase Ia trial in patients with advanced cancers and phase II trials in patients with ovarian cancer and breast cancer as well as lung and prostate cancer. In a Phase I study, patients with incurable, locally advanced, recurrent or metastatic solid tumors that had progressed during or after standard therapy were treated with Pertuzumab given intravenously every 3 weeks. Pertuzumab was generally well tolerated. Tumor regression was achieved in 3 of 20 patients evaluable for response. Two patients had confirmed partial responses. Stable disease lasting for more than 2.5 months was observed in 6 of 21 patients (Agus et al. *Pro Am Soc Clin Oncol* 22:192 (2003)). At doses of 2.0-15 mg/kg, the pharmacokinetics of Pertuzumab was linear, and mean clearance ranged from 2.69 to 3.74 mL/day/kg and the mean terminal elimination half-life ranged from 15.3 to 27.6 days. Antibodies to Pertuzumab were not detected (Allison et al. *Pro Am Soc Clin Oncol* 22:197 (2003)).

US 2006/0034842 describes methods for treating ErbB-expressing cancer with anti-ErbB2 antibody combinations. US 2008/0102069 describes the use of Trastuzumab and Pertuzumab in the treatment of HER2-positive metastatic cancer, such as breast cancer. Baselga et al., *J Clin Oncol*, 2007 ASCO Annual Meeting Proceedings Part I, Col. 25, No. 18S (June 20 Supplement), 2007:1004 report the treatment of patients with pre-treated HER2-positive breast cancer, which has progressed during treatment with Trastuzumab, with a combination of Trastuzumab and Pertuzumab. Portera et al., *J Clin Oncol*, 2007 ASCO Annual Meeting Proceedings Part I. Vol. 25, No. 18S (June 20 Supplement), 2007:1028 evaluated the efficacy and safety of Trastuzumab+Pertuzumab combination therapy in HER2-positive breast cancer patients, who had progressive disease on Trastuzumab-based therapy. The authors concluded that further evaluation of the efficacy of combination treatment was required to define the overall risk and benefit of this treatment regimen.

Pertuzumab has been evaluated in Phase II studies in combination with Trastuzumab in patients with HER2-positive metastatic breast cancer who have previously received Trastuzumab for metastatic disease. One study, conducted by the National cancer Institute (NCI), enrolled 11 patients with previously treated HER2-positive metastatic breast cancer. Two out of the 11 patients exhibited a partial response (PR) (Baselga et al., *J Clin Oncol* 2007 ASCO Annual Meeting Proceedings; 25:18S (June 20 Supplement): 1004. The results of a Phase II neoadjuvant study evaluating the effect of a novel combination regimen of Pertuzumab and Trastuzumab plus chemotherapy (Docetaxel) in women with early-stage HER2-positive breast cancer, presented at the CTRC-AACR San Antonio Breast Cancer Symposium (SABCS), Dec. 8-12, 2010, showed that the two HER2 antibodies plus Docetaxel given in the neoadjuvant setting prior to surgery significantly improved the rate of complete tumor disappearance (pathological complete response rate, pCR, of 45.8 percent) in the breast by more than half compared to Trastuzumab plus Docetaxel (pCR of 29.0 percent), p=0.014.

Patent Publications related to HER2 antibodies include: U.S. Pat. Nos. 5,677,171; 5,720,937; 5,720,954; 5,725,856; 5,770,195; 5,772,997; 6,165,464; 6,387,371; 6,399,063; 6,015,567; 6,333,169; 4,968,603; 5,821,337; 6,054,297; 6,407,213; 6,639,055; 6,719,971; 6,800,738; 8,075,890; 5,648,237; 7,018,809; 6,267,958; 6,685,940; 6,821,515; 7,060,268; 7,682,609; 7,371,376; 6,127,526; 6,333,398; 6,797,814; 6,339,142; 6,417,335; 6,489,447; 7,074,404; 7,531,645; 7,846,441; 7,892,549; 8,075,892; 6,573,043; 6,905,830; 7,129,051; 7,344,840; 7,468,252; 7,674,589; 7,919,254; 6,949,245; 7,485,302; 7,498,030; 7,501,122; 7,537,931; 7,618,631; 7,862,817; 7,041,292; 6,627,196; 7,371,379; 6,632,979; 7,097,840; 7,575,748; 6,984,494; 7,279,287; 7,811,773; 7,993,834; 8,076,066; 8,044,017; 7,435,797; 7,850,966; 7,485,704; 7,807,799; 8,142,784; 7,560,111; 7,879,325; 8,241,630; 7,449,184; 8,163,287; 7,700,299; 7,981,418; 8,247,397; and US 2010/0016556; US 2005/0244929; US 2001/0014326; US 2003/0202972; US 2006/0099201; US 2010/0158899; US 2011/0236383; US 2011/0033460; US 2008/0286280; US 2005/0063972; US 2006/0182739; US 2009/0220492; US 2003/0147884; US 2004/0037823; US 2005/0002928; US 2007/0292419; US 2008/0187533; US 2011/0250194; US 2012/0034213; US 2003/0152987; US 2005/0100944; US 2006/0183150; US 2008/0050748; US 2009/0155803; US 2010/0120053; US 2005/0244417; US 2007/0026001; US 2008/0160026; US 2008/0241146; US 2005/0208043; US 2005/0238640; US 2006/0034842; US 2006/0073143; US 2006/0193854; US 2006/0198843; US 2011/0129464; US 2007/0184055; US 2007/0269429; US 2008/0050373; US 2006/0083739; US 2009/0087432; US 2006/0210561; US 2002/0035736; US 2002/0001587; US 2008/0226659; US 2002/0090662; US 2006/0046270; US 2008/0108096; US 2007/0166753; US 2008/0112958; US 2009/0239236; US 2012/0034609; US 2012/0093838; US 2004/0082047; US 2012/0065381; US 2009/0187007; US 2011/0159014; US 2004/0106161; US 2011/0117096; US 2004/0258685; US 2009/0148402; US 2009/0099344; US 2006/0034840; US 2011/0064737; US 2005/0276812; US 2008/0171040; US 2009/0202536; US 2006/0013819; US 2012/0107391; US 2006/0018899; US 2009/0285837; US 2011/0117097; US 2006/0088523; US 2010/0015157; US 2006/0121044; US 2008/0317753; US 2006/0165702; US 2009/0081223; US 2006/0188509; US 2009/0155259; US 2011/0165157; US 2006/0204505; US 2006/0212956; US 2006/0275305; US 2012/0003217; US 2007/0009976; US 2007/0020261; US 2007/0037228; US 2010/0112603; US 2006/0067930; US 2007/0224203; US 2011/0064736; US 2008/0038271; US 2008/0050385; US 2010/0285010; US 2011/0223159; US 2008/0102069; US 2010/0008975; US 2011/0245103; US 2011/0246399; US 2011/0027190; US 2010/0298156; US 2011/0151454; US 2011/0223619; US 2012/0107302; US 2009/0098135; US 2009/0148435; US 2009/0202546; US 2009/0226455; US 2009/0317387; US 2011/0044977; US 2012/0121586.

SUMMARY OF THE INVENTION

In a first aspect, the invention concerns a method for extending progression free survival in a HER2-positive breast cancer patient population by 6 months or more comprising administering Pertuzumab, Trastuzumab and chemotherapy (e.g. taxane, such as Docetaxel) to the patients in the population. Optionally the method results in an objective response rate of 80% or more in the patients in the population. The breast cancer is optionally metastatic or locally recurrent, unresectable breast cancer, or de novo Stage IV disease. In one embodiment, the patients in the population: have not received previous treatment or have relapsed after adjuvant therapy, have a left ventricular ejection fraction (LVEF) of ≥50% at baseline, and/or have an Eastern Cooperative Oncology Group performance status (ECOG PS) of 0 or 1. Optionally, the HER2-positive breast cancer is defined as immunohistochemistry (IHC) 3+ and/or fluorescence in situ hybridization (FISH) amplification ratio ≥2.0. Optionally, the method reduces the risk of death by about 34% or more relative to a patient treated with Trastuzumab and the chemotherapy.

In another aspect, the invention concerns a method of combining two HER2 antibodies to treat HER2-positive cancer without increasing cardiac toxicity in a HER2-positive cancer patient population, comprising administering Pertuzumab, Trastuzumab, and chemotherapy to the patients in the population. Optionally, cardiac toxicity in the patient population is monitored for incidence of symptomatic left ventricular systolic dysfunction (LVSD) or congestive heart failure (CHF), or for decrease in left ventricular ejection fraction (LVEF). The HER2-positive cancer is optionally, breast cancer, for example metastatic or locally recurrent, unresectable breast cancer, or de novo Stage IV disease.

In another aspect, the invention concerns an article of manufacture comprising a vial with Pertuzumab therein and a package insert, wherein the package insert provides the safety data in Table 3 or Table 4 and/or the efficacy data in Table 2, Table 5, FIG. 8, or FIG. 10.

The invention additionally concerns a method for making an article of manufacture comprising packaging together a vial with Pertuzumab therein and a package insert, wherein the package insert provides the safety data in Table 3 or Table 4 and/or the efficacy data in Table 2, Table 5, FIG. 8, or FIG. 10.

In a related aspect, the invention concerns a method of ensuring safe and effective use of Pertuzumab comprising packaging together a vial with Pertuzumab therein and a package insert, wherein the package insert provides the safety data in Table 3 or Table 4 and/or the efficacy data in Table 2, Table 5, FIG. 8, or FIG. 10.

Optionally, the article of manufacture comprises a single-dose vial containing about 420 mg of Pertuzumab.

Optionally, the package insert further comprises the warning box in Example 4.

Optionally, the package insert further provides the Overall Survival (OS) efficacy data in Example 9 or Table 14.

In another aspect, the invention concerns a method of treating early-stage HER2-positive breast cancer comprising administering Pertuzumab, Trastuzumab, and chemotherapy to a patient with the breast cancer, wherein the chemotherapy comprises anthracycline-based chemotherapy (for example, 5-FU, epirubicin, and cyclophosphamide (FEC)), or carboplatin-based chemotherapy (for example, Docetaxel and Carboplatin). Optionally, Pertuzumab is administered concurrently with the anthracycline-based chemotherapy or the carboplatin-based chemotherapy. In one embodiment of this method, Pertuzumab administration does not increase cardiac toxicity relative to the treatment without Pertuzumab. Such treatment of early-stage HER2-positive breast cancer optionally comprises neoadjuvant or adjuvant therapy.

The invention further concerns a method of treating HER2-positive cancer in a patient comprising co-administering a mixture of Pertuzumab and Trastuzumab from the same intravenous bag to the patient. Such method optionally further comprises administering chemotherapy to the patient.

In a related aspect, the invention provides an intravenous (IV) bag containing a stable mixture of Pertuzumab and Trastuzumab suitable for administration to a cancer patient. The mixture is optionally in saline solution; e.g. comprising about 0.9% NaCl or about 0.45% NaCl. The IV bag is optionally a 250 mL 0.9% saline polyolefin or polyvinyl chloride infusion bag. In one embodiment, the IV bag which contains a mixture of about 420 mg or of about 840 mg of Pertuzumab and from about 200 mg to about 1000 mg of Trastuzumab. In one embodiment, the mixture is stable for up to 24 hours at 5° C. or 30° C. Stability of the mixture can be evaluated by one or more assays selected from: color, appearance and clarity (CAC), concentration and turbidity analysis, particulate analysis, size exclusion chromatography (SEC), ion-exchange chromatography (IEC), capillary zone electrophoresis (CZE), image capillary isoelectric focusing (iCIEF), or potency assay.

The present invention provides a new treatment regimen for gastric cancer. In particular, the present invention concerns the treatment of HER2-positive gastric cancer in human subjects with a combination of Trastuzumab, Pertuzumab and at least one chemotherapy.

In one aspect, the invention concerns a method of treating HER2-positive gastric cancer in a human subject, comprising administering to the subject Pertuzumab, Trastuzumab, and a chemotherapy.

In one aspect, the invention concerns a method of treating gastric cancer in a human subject comprising administering Pertuzumab to the subject with gastric cancer, wherein Pertuzumab is administered at a dose of 840 mg in all treatment cycles.

In another aspect, the invention concerns a method of improving survival in a human subject with HER2-positive gastric cancer, comprising administering to the subject Pertuzumab, Trastuzumab, and a chemotherapy.

In yet another aspect, the invention concerns Pertuzumab for use in the treatment of HER2-positive gastric cancer in a human subject in combination with Trastuzumab and a chemotherapy.

In a further aspect, the invention concerns the use of Pertuzumab in the preparation of a medicament for the treatment of HER2-positive gastric cancer, wherein the treatment comprises administration of Pertuzumab in combination with Trastuzumab and a chemotherapy.

In a still further aspect, the invention concerns the use of Trastuzumab in the preparation of a medicament for the treatment of HER2-positive gastric cancer, wherein the treatment comprises administration of Trastuzumab in combination with Pertuzumab and a chemotherapy.

In another aspect, the invention concerns a kit comprising a container comprising Pertuzumab and instructions for administration of the Pertuzumab to treat HER2-positive gastric cancer in a subject in combination with Trastuzumab and a chemotherapy.

In yet another aspect, the invention concerns a kit comprising a container comprising Trastuzumab and instructions for administration of the Trastuzumab to treat HER2-positive gastric cancer in a subject in combination with Pertuzumab and a chemotherapy.

In all aspects, the gastric cancer can, for example, be non-resectable locally advanced gastric cancer, or metastatic gastric cancer, or advanced, post-operatively recurrent gastric cancer, which may not be amenable to curative therapy by known methods. In all aspects, the gastric cancer includes adenocarcinoma of the stomach or gastroesophageal junction. In all aspects, in a particular embodiment the patient did not receive prior anti-cancer treatment for metastatic gastric cancer. In all aspects, in a particular embodiment, the chemotherapy comprises administration of a platin and/or fluoropyrimidine. In certain embodiments, the platin is cisplatin. In other embodiments, the fluoropyrimidine comprises capecitabine and/or 5-fluorouracil (5-FU). In all aspects, the patient's HER2-positive status may, for example, be IHC 3+ or IHC 2+/ISH+. In all aspects, in particular embodiments, the treatment improves survival, including overall survival (OS) and/or progression free survival (PFS) and/or response rate (RR). In all aspects, in particular embodiments, the patient has an ECOG PS of 0-1. In all aspects, treatment cycles are generally separated from each other by four weeks or less, or by three weeks or less, or by two weeks or less, or by one week or less.

In a particular aspect, the invention concerns a method of treating HER2-positive non-resectable or metastatic adenocarcinoma of the stomach or gastroesophageal junction in a human patient who did not receive prior chemotherapy for metastatic disease, except prior adjuvant or neoadjuvant therapy completed more than six months before the current treatment, comprising administering Pertuzumab, Trastuzumab, cisplatin, and capecitabine and/or fluorouracil (5-FU) to the patient in an amount to improve progression free survival (PFS) and/or overall survival (OS), wherein the patient has an ECOG PS of 0-1. In a particular embodiment, the patient did not receive prior treatment with a platin.

In another aspect, the invention concerns a method of improving progression free survival in a patient with HER2-positive non-resectable or metastatic adenocarcinoma of the stomach or gastroesophageal junction comprising administering Pertuzumab to the patient in combination with Trastuzumab and chemotherapy.

In yet a further aspect, the invention concerns a method of treating HER2-positive breast cancer in a patient comprising administering Pertuzumab, Trastuzumab and vinorelbine to the patient. Optionally the Pertuzumab and Trastuzumab are co-administered to the patient from a single intravenous bag. The breast cancer is optionally metastatic or locally advanced. In one embodiment, the patient has not previously received systemic non-hormonal anticancer therapy in the metastatic setting.

In another aspect, the invention concerns a method of treating HER2-positive breast cancer in a patient comprising administering Pertuzumab, Trastuzumab, and aromatase inhibitor (e.g. anastrazole or letrozole) to the patient. Optionally, the breast cancer is hormone receptor-positive advanced breast cancer, wherein the hormone receptor is estrogen receptor (ER) and/or progesterone receptor (PgR), for example. According to this embodiment of the invention, patient has not previously received systemic nonhormonal anticancer therapy in the metastatic setting. Moreover, the patient herein optionally receives induction chemotherapy (e.g. comprising taxane).

In an additional embodiment, the invention concerns a method of treating a cancer patient comprising administering to the patient an initial dose of 840 mg of Pertuzumab followed every 3 weeks thereafter by a dose of 420 mg of Pertuzumab, and further comprising re-administering an 840 mg dose of Pertuzumab to the patient if the time between two sequential 420 mg doses is 6 weeks or more. Optionally, the method further comprises administering 420 mg of Pertuzumab every 3 weeks after the re-administered 840 mg dose. In one embodiment, the cancer patient has HER2-positive breast cancer.

In a further aspect, the invention concerns a method for treating HER2-positive metastatic or locally recurrent breast cancer in a patient comprising administering Pertuzumab, Trastuzumab and taxoid (e.g. Docetaxel, Paclitaxel, or nab-paclitaxel) to the patient, wherein the patient has been previously treated with a Trastuzumab and/or lapatinib as adjuvant or neoadjuvant therapy.

In yet a further aspect, the invention concerns a method for treating low HER3 ovarian, primary peritoneal, or fallopian tube cancer in a patient comprising administering Pertuzumab and chemotherapy the patient, wherein the chemotherapy comprises taxoid (e.g. paclitaxel) or topotecan.

In an additional aspect, the invention concerns a method for treating low HER3 ovarian, primary peritoneal, or fallopian tube cancer in a patient comprising administering Pertuzumab and chemotherapy to the patient, wherein the low HER3 cancer expresses HER3 mRNA at a concentration ratio equal or lower than about 2.81 as assessed by polymerase chain reaction (PCR). In one embodiment, the chemotherapy comprises gemcitabine, carboplatin, paclitaxel, docetaxel, topotecan, or pegylated liposomal doxorubicin (PLD). Optionally, the chemotherapy comprises paclitaxel or topotecan. In one embodiment, the cancer is epithelial ovarian cancer that is platinum-resistant or platinum-refractory.

BRIEF DESCRIPTION OF THE DRAWINGS

FIGS. 2A and 2B depict alignments of the amino acid sequences of the variable light ($V_L$) (FIG. 2A) and variable heavy ($V_H$) (FIG. 2B) domains of murine monoclonal antibody 2C4 (SEQ ID Nos. 5 and 6, respectively); $V_L$ and $V_H$ domains of variant 574/Pertuzumab (SEQ ID Nos. 7 and 8, respectively), and human $V_L$ and $V_H$ consensus frameworks (hum κ1, light kappa subgroup I; humIII, heavy subgroup III) (SEQ ID Nos. 9 and 10, respectively). Asterisks identify differences between variable domains of Pertuzumab and murine monoclonal antibody 2C4 or between variable domains of Pertuzumab and the human framework. Complementarity Determining Regions (CDRs) are in brackets.

FIGS. 3A and 3B show the amino acid sequences of Pertuzumab light chain (FIG. 3A; SEQ ID NO. 11) and heavy chain (FIG. 3B; SEQ ID No. 12). CDRs are shown in bold. Calculated molecular mass of the light chain and heavy chain are 23,526.22 Da and 49,216.56 Da (cysteines in reduced form). The carbohydrate moiety is attached to Asn 299 of the heavy chain.

FIGS. 4A and 4B show the amino acid sequences of Trastuzumab light chain (FIG. 4A; SEQ ID NO. 13) and heavy chain (FIG. 4B; SEQ ID NO. 14), respectively. Boundaries of the variable light and variable heavy domains are indicated by arrows.

FIGS. 5A and 5B depict a variant Pertuzumab light chain sequence (FIG. 5A; SEQ ID NO. 15) and a variant Pertuzumab heavy chain sequence (FIG. 5B; SEQ ID NO. 16), respectively.

FIG. 32 shows the samples taken and time points for the phase IIa gastric cancer (GC) study in Example 1.

FIG. 33 shows the demographics of the patient population in the two arms of the GC study, treated with 420 mg (Arm A) or 840 mg (Arm B) of Pertuzumab.

FIG. 34 shows the GC history of the patients in Arms A and B, respectively.

FIG. 35 shows the GC patient disposition in Arms A and B, respectively.

FIG. 36 shows the Overall Response Rate in Arms A and B, respectively, of the GC study.

DETAILED DESCRIPTION OF THE PREFERRED EMBODIMENTS

Figure 1:
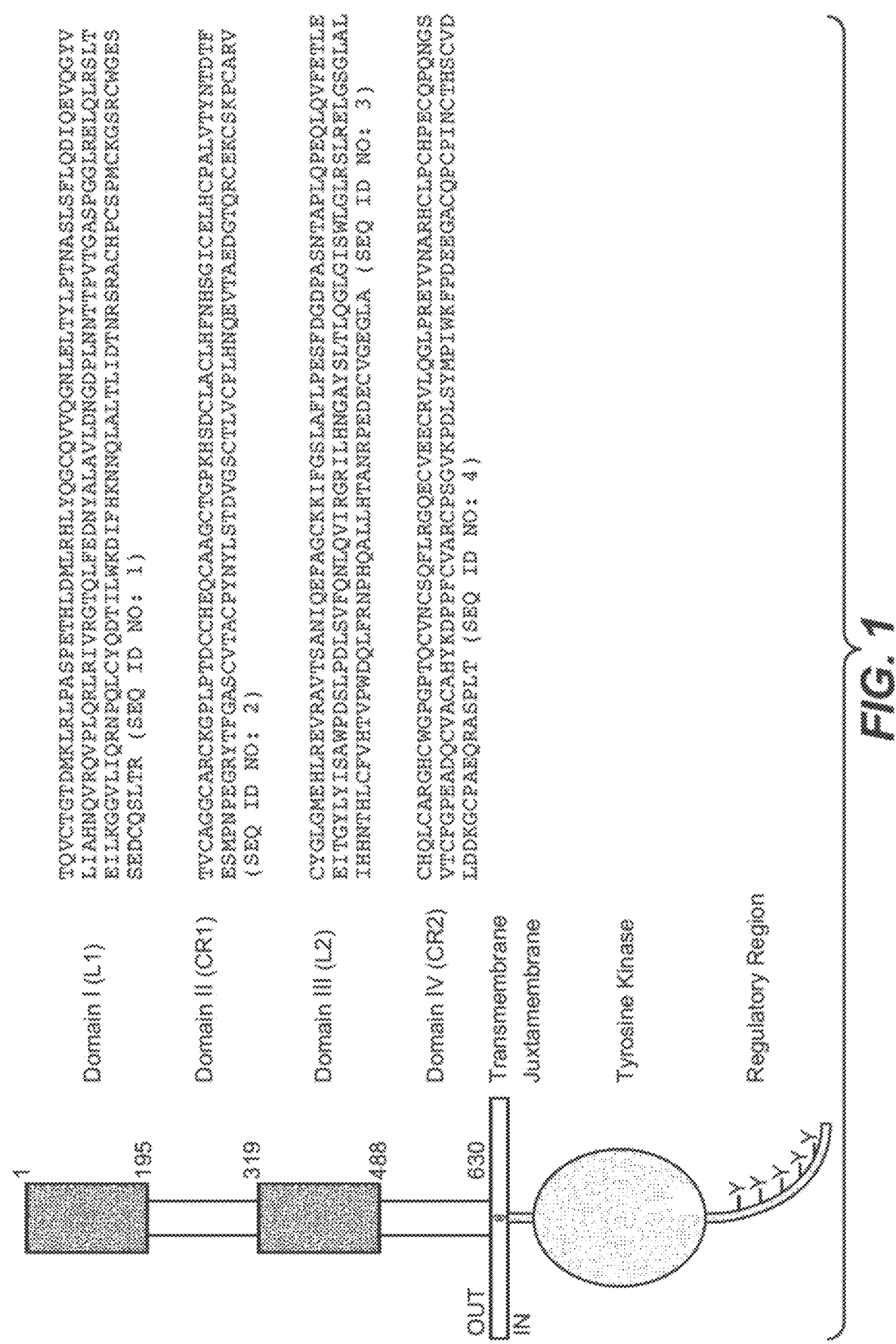
FIG. 1 provides a schematic of the HER2 protein structure, and amino acid sequences for Domains I-IV (SEQ ID Nos.1-4, respectively) of the extracellular domain thereof.

Glossary of some abbreviations used herein: adverse drug reaction (ADR), adverse event (AE), alkaline phosphatase (ALP), absolute neutrophil count (ANC), area under the concentration-time curve (AUC), capillary zone electrophoresis (CZE), color, appearance and clarity (CAC), CLinical Evaluation Of Pertuzumab And TRAstuzumab (CLEOPATRA), confidence interval (CI), chromogenic in situ hybridization (CISH), maximum concentration ($C_{max}$), complete response (CR), case report form (CRF), computed tomography (CT), common terminology criteria for adverse events (CTCAE), Docetaxel (D), dose limiting toxicity (DLT), ethics committee (EC), epirubicin, cisplatin, and 5-fluorouracil (ECF), echocardiogram (ECHO), epidermal growth factor receptor (EGFR), European Union (EU), estrogen receptor (ER), 5-fluorouracil, methotrexate, and doxorubicin (FAMTX), fluorescence in situ hybridization (FISH), 5-fluorouracil (5-FU), hazard ratio (HR), human epidermal growth factor receptor (EGFR), gastric cancer (GC), good clinical practice (GCP), human epidermal growth factor receptor 2 (HER2), ion exchange chromatography (IEC), immunohistochemistry (IHC), independent review facility (IRF), institutional review board (IRB), in situ hybridization (ISH), intravenous (IV), image capillary isoelectric focusing (iCIEF), left ventricular ejection fraction (LVEF), mitomycin C, cisplatin, and 5-fluorouracil (MCF), magnetic resonance image (MRI), metastatic breast cancer (MBC), multiple-gated acquisition (MUGA), not significant (NS), overall survival (OS), pathological complete response (pCR), polyolefin (PO), polyvinyl chloride (PVC), progressive disease (PD), progression free survival (PFS), pharmacokinetic (PK), partial response (PR), progesterone receptor (PgR), response evaluation criteria in solid tumors (RECIST), serious adverse event (SAE), size exclusion chromatography (SEC), stable disease (SD), study management team (SMT), sterile water for injection (SWFI), time to maximum plasma concentration ($t_{max}$), upper limit of normal (ULN).

I. Definitions

The term "chemotherapy" as used herein refers to treatment comprising the administration of a chemotherapy, as defined hereinbelow.

"Survival" refers to the patient remaining alive, and includes overall survival as well as progression free survival.

"Overall survival" or "OS" refers to the patient remaining alive for a defined period of time, such as 1 year, 5 years, etc from the time of diagnosis or treatment. For the purposes of the clinical trial described in the example, overall survival (OS) is defined as the time from the date of randomization of patient population to the date of death from any cause.

"Progression free survival" or "PFS" refers to the patient remaining alive, without the cancer progressing or getting worse. For the purpose of the clinical trial described in the example, progression free survival (PFS) is defined as the time from randomization of study population to the first documented progressive disease, or unmanageable toxicity, or death from any cause, whichever occurs first. Disease progression can be documented by any clinically accepted methods, such as, for example, radiographical progressive disease, as determined by Response Evaluation Criteria in Solid Tumors (RECIST) (Therasse et al., *J Natl Ca Inst* 2000; 92(3):205-216), carcinomatous meningitis diagnosed by cytologic evaluation of cerebral spinal fluid, and/or medical photography to monitor chest wall recurrences of subcutaneous lesions.

By "extending survival" is meant increasing overall or progression free survival in a patient treated in accordance with the present invention relative to an untreated patient and/or relative to a patient treated with one or more approved anti-tumor agents, but not receiving treatment in accordance with the present invention. In a particular example, "extending survival" means extending progression-free survival (PFS) and/or overall survival (OS) of cancer patients receiving the combination therapy of the present invention (e.g. treatment with a combination of Pertuzumab, Trastuzumab and a chemotherapy) relative to patients treated with Trastuzumab and the chemotherapy only. In another particular example, "extending survival" means extending progression-free survival (PFS) and/or overall survival (OS) of cancer patients receiving the combination therapy of the present invention (e.g. treatment with a combination of Pertuzumab, Trastuzumab and a chemotherapy) relative to patients treated with Pertuzumab and the chemotherapy only.

An "objective response" refers to a measurable response, including complete response (CR) or partial response (PR).

By "complete response" or "CR" is intended the disappearance of all signs of cancer in response to treatment. This does not always mean the cancer has been cured.

"Partial response" or "PR" refers to a decrease in the size of one or more tumors or lesions, or in the extent of cancer in the body, in response to treatment.

A "HER receptor" is a receptor protein tyrosine kinase which belongs to the HER receptor family and includes EGFR, HER2, HER3 and HER4 receptors. The HER receptor will generally comprise an extracellular domain, which may bind an HER ligand and/or dimerize with another HER receptor molecule; a lipophilic transmembrane domain; a conserved intracellular tyrosine kinase domain; and a carboxyl-terminal signaling domain harboring several tyrosine residues which can be phosphorylated. The HER receptor may be a "native sequence" HER receptor or an "amino acid sequence variant" thereof. Preferably the HER receptor is native sequence human HER receptor.

The expressions "ErbB2" and "HER2" are used interchangeably herein and refer to human HER2 protein. Semba et al., PNAS (USA) 82:6497-6501 (1985) and Yamamoto et al. Nature 319:230-234 (1986) describe human HER2 protein.

Figure 6:
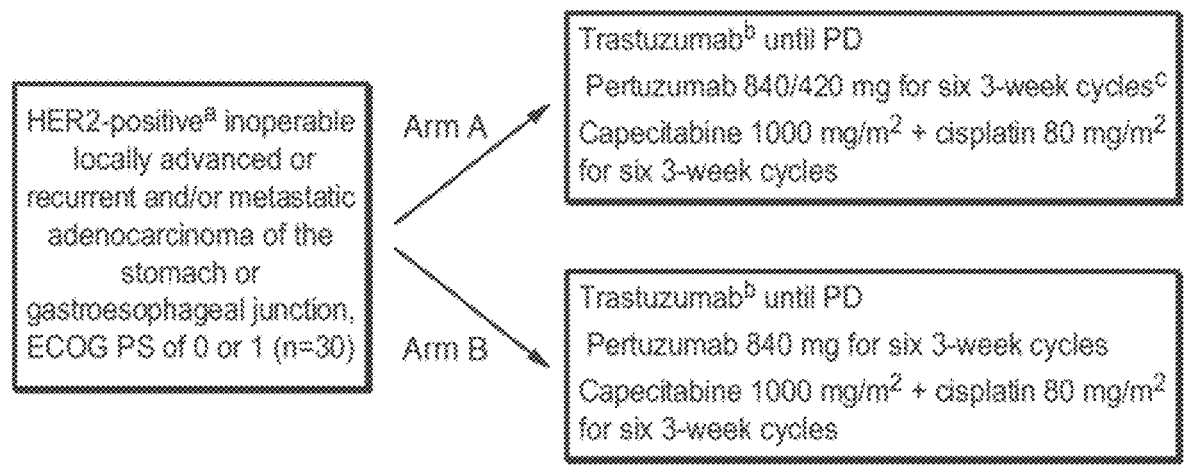
FIG. 6 shows the study schema in Example 1. ECOG=Eastern Cooperative Oncology Group; PD=progressive disease. Notes: Trastuzumab, Pertuzumab, and Cisplatin are administered by IV infusion on Day 1 of each 3-week cycle. Capecitabine is administered orally twice daily, from the evening of Day 1 to the morning of Day 15 of each 3-week cycle. (a) HER2-positive tumor defined as either IHC 3+ or IHC 2+ in combination with ISH+(i.e., IHC 3+/ISH+ or ICH 2+/ISH+); (b) Trastuzumab at a loading dose of 8 mg/kg for Cycle 1 and a dose of 6 mg/kg for subsequent cycles; (c) Pertuzumab on Day 1 of each cycle, at a loading dose of 840 mg for Cycle 1 and a dose of 420 mg for Cycles 2-6.

Herein, "HER2 extracellular domain" or "HER2 ECD" refers to a domain of HER2 that is outside of a cell, either anchored to a cell membrane, or in circulation, including fragments thereof. The amino acid sequence of HER2 is shown in FIG. 1. In one embodiment, the extracellular domain of HER2 may comprise four domains: "Domain I" (amino acid residues from about 1-195; SEQ ID NO:1), "Domain II" (amino acid residues from about 196-319; SEQ ID NO:2), "Domain III" (amino acid residues from about 320-488: SEQ ID NO:3), and "Domain IV" (amino acid residues from about 489-630; SEQ ID NO:4) (residue numbering without signal peptide). See Garrett et al. *Mol. Cell.* 11: 495-505 (2003), Cho et al. *Nature* 421: 756-760 (2003), Franklin et al. *Cancer Cell* 5:317-328 (2004), and Plowman et al. *Proc. Natl. Acad. Sci.* 90:1746-1750 (1993), as well as FIG. 6 herein.

"HER3" or "ErbB3" herein refer to the receptor as disclosed, for example, in U.S. Pat. Nos. 5,183,884 and 5,480,968 as well as Kraus et al. *PNAS (USA)* 86:9193-9197 (1989).

A "low HER3" cancer is one which expresses HER3 at a level less then the median level for HER3 expression in the cancer type. In one embodiment, the low HER3 cancer is epithelial ovarian, peritoneal, or fallopian tube cancer. HER3 DNA, protein, and/or mRNA level in the cancer can be evaluated to determine whether the cancer is a low HER3 cancer. See, for example, U.S. Pat. No. 7,981,418 for additional information about low HER3 cancer. Optionally, a HER3 mRNA expression assay is performed in order to determine that the cancer is a low HER3 cancer. In one embodiment, HER3 mRNA level in the cancer is evaluated, e.g. using polymerase chain reaction (PCR), such as quantitative reverse transcription PCR (qRT-PCR). Optionally, the cancer expresses HER3 at a concentration ratio equal or lower than about 2.81 as assessed qRT-PCR, e.g. using a COBAS z480® instrument.

A "HER dimer" herein is a noncovalently associated dimer comprising at least two HER receptors. Such complexes may form when a cell expressing two or more HER receptors is exposed to an HER ligand and can be isolated by immunoprecipitation and analyzed by SDS-PAGE as described in Sliwkowski et al., *J. Biol. Chem.,* 269(20): 14661-14665 (1994), for example. Other proteins, such as a cytokine receptor subunit (e.g. gp130) may be associated with the dimer. Preferably, the HER dimer comprises HER2.

A "HER heterodimer" herein is a noncovalently associated heterodimer comprising at least two different HER receptors, such as EGFR-HER2, HER2-HER3 or HER2-HER4 heterodimers.

A "HER antibody" is an antibody that binds to a HER receptor. Optionally, the HER antibody further interferes with HER activation or function. Preferably, the HER antibody binds to the HER2 receptor. HER2 antibodies of interest herein are Pertuzumab and Trastuzumab.

"HER activation" refers to activation, or phosphorylation, of any one or more HER receptors. Generally, HER activation results in signal transduction (e.g. that caused by an intracellular kinase domain of a HER receptor phosphorylating tyrosine residues in the HER receptor or a substrate polypeptide). HER activation may be mediated by HER ligand binding to a HER dimer comprising the HER receptor of interest. HER ligand binding to a HER dimer may activate a kinase domain of one or more of the HER receptors in the dimer and thereby results in phosphorylation of tyrosine residues in one or more of the HER receptors and/or phosphorylation of tyrosine residues in additional substrate polypeptides(s), such as Akt or MAPK intracellular kinases.

"Phosphorylation" refers to the addition of one or more phosphate group(s) to a protein, such as a HER receptor, or substrate thereof.

An antibody which "inhibits HER dimerization" is an antibody which inhibits, or interferes with, formation of a HER dimer. Preferably, such an antibody binds to HER2 at the heterodimeric binding site thereof. The most preferred dimerization inhibiting antibody herein is Pertuzumab or MAb 2C4. Other examples of antibodies which inhibit HER dimerization include antibodies which bind to EGFR and inhibit dimerization thereof with one or more other HER receptors (for example EGFR monoclonal antibody 806, MAb 806, which binds to activated or "untethered" EGFR; see Johns et al., J. Biol. Chem. 279(29):30375-30384 (2004)); antibodies which bind to HER3 and inhibit dimerization thereof with one or more other HER receptors; and antibodies which bind to HER4 and inhibit dimerization thereof with one or more other HER receptors.

A "HER2 dimerization inhibitor" is an agent that inhibits formation of a dimer or heterodimer comprising HER2.

A "heterodimeric binding site" on HER2, refers to a region in the extracellular domain of HER2 that contacts, or interfaces with, a region in the extracellular domain of EGFR, HER3 or HER4 upon formation of a dimer therewith. The region is found in Domain II of HER2 (SEQ ID NO: 15). Franklin et al. Cancer Cell 5:317-328 (2004).

A HER2 antibody that "binds to a heterodimeric binding site" of HER2, binds to residues in Domain II (SEQ ID NO: 2) and optionally also binds to residues in other of the domains of the HER2 extracellular domain, such as domains I and III, SEQ ID NOs: 1 and 3), and can sterically hinder, at least to some extent, formation of a HER2-EGFR, HER2-HER3, or HER2-HER4 heterodimer. Franklin et al. Cancer Cell 5:317-328 (2004) characterize the HER2-Pertuzumab crystal structure, deposited with the RCSB Protein Data Bank (ID Code IS78), illustrating an exemplary antibody that binds to the heterodimeric binding site of HER2.

An antibody that "binds to domain II" of HER2 binds to residues in domain II (SEQ ID NO: 2) and optionally residues in other domain(s) of HER2, such as domains I and III (SEQ ID NOs: 1 and 3, respectively). Preferably the antibody that binds to domain II binds to the junction between domains I, II and III of HER2.

For the purposes herein, "Pertuzumab" and "rhuMAb 2C4", which are used interchangeably, refer to an antibody comprising the variable light and variable heavy amino acid sequences in SEQ ID NOs: 7 and 8, respectively. Where Pertuzumab is an intact antibody, it preferably comprises an IgG1 antibody; in one embodiment comprising the light chain amino acid sequence in SEQ ID NO: 11 or 15, and heavy chain amino acid sequence in SEQ ID NO: 12 or 16. The antibody is optionally produced by recombinant Chinese Hamster Ovary (CHO) cells.

For the purposes herein, "Trastuzumab" and rhuMAb4D5", which are used interchangeably, refer to an antibody comprising the variable light and variable heavy amino acid sequences from within SEQ ID Nos: 13 and 14, respectively. Where Trastuzumab is an intact antibody, it preferably comprises an IgG1 antibody; in one embodiment comprising the light chain amino acid sequence of SEQ ID NO: 13 and the heavy chain amino acid sequence of SEQ ID NO: 14. The antibody is optionally produced by Chinese Hamster Ovary (CHO) cells.

The term "antibody" herein is used in the broadest sense and specifically covers monoclonal antibodies, polyclonal antibodies, multispecific antibodies (e.g. bispecific antibodies), and antibody fragments, so long as they exhibit the desired biological activity.

"Humanized" forms of non-human (e.g., rodent) antibodies are chimeric antibodies that contain minimal sequence derived from non-human immunoglobulin. For the most part, humanized antibodies are human immunoglobulins (recipient antibody) in which residues from a hypervariable region of the recipient are replaced by residues from a hypervariable region of a non-human species (donor antibody) such as mouse, rat, rabbit or nonhuman primate having the desired specificity, affinity, and capacity. In some instances, framework region (FR) residues of the human immunoglobulin are replaced by corresponding non-human residues. Furthermore, humanized antibodies may comprise residues that are not found in the recipient antibody or in the donor antibody. These modifications are made to further refine antibody performance. In general, the humanized antibody will comprise substantially all of at least one, and typically two, variable domains, in which all or substantially all of the hypervariable loops correspond to those of a non-human immunoglobulin and all or substantially all of the FRs are those of a human immunoglobulin sequence. The humanized antibody optionally also will comprise at least a portion of an immunoglobulin constant region (Fc), typically that of a human immunoglobulin. For further details, see Jones et al., Nature 321:522-525 (1986); Riechmann et al., Nature 332:323-329 (1988); and Presta, Curr. Op. Struct. Biol. 2:593-596 (1992). Humanized HER2 antibodies specifically include Trastuzumab (HERCEPTIN®) as described in Table 3 of U.S. Pat. No. 5,821,337 expressly incorporated herein by reference and as defined herein; and humanized 2C4 antibodies such as Pertuzumab as described and defined herein.

An "intact antibody" herein is one which comprises two antigen binding regions, and an Fc region. Preferably, the intact antibody has a functional Fc region.

"Antibody fragments" comprise a portion of an intact antibody, preferably comprising the antigen binding region thereof. Examples of antibody fragments include Fab, Fab', F(ab')$_2$, and Fv fragments; diabodies; linear antibodies; single-chain antibody molecules; and multispecific antibodies formed from antibody fragment(s).

"Native antibodies" are usually heterotetrameric glycoproteins of about 150,000 daltons, composed of two identical light (L) chains and two identical heavy (H) chains. Each light chain is linked to a heavy chain by one covalent disulfide bond, while the number of disulfide linkages varies among the heavy chains of different immunoglobulin isotypes. Each heavy and light chain also has regularly spaced intrachain disulfide bridges. Each heavy chain has at one end a variable domain ($V_H$) followed by a number of constant domains. Each light chain has a variable domain at one end ($V_L$) and a constant domain at its other end. The constant domain of the light chain is aligned with the first constant domain of the heavy chain, and the light-chain variable domain is aligned with the variable domain of the heavy chain. Particular amino acid residues are believed to form an interface between the light chain and heavy chain variable domains.

The term "hypervariable region" when used herein refers to the amino acid residues of an antibody which are responsible for antigen-binding. The hypervariable region generally comprises amino acid residues from a "complementarity determining region" or "CDR" (e.g. residues 24-34 (L1), 50-56 (L2) and 89-97 (L3) in the light chain variable domain and 31-35 (H1), 50-65 (H2) and 95-102 (H3) in the heavy chain variable domain; Kabat et al., *Sequences of Proteins of Immunological Interest,* 5th Ed. Public Health Service, National Institutes of Health, Bethesda, MD. (1991)) and/or those residues from a "hypervariable loop" (e.g. residues 26-32 (L1), 50-52 (L2) and 91-96 (L3) in the light chain variable domain and 26-32 (H1), 53-55 (H2) and 96-101 (H3) in the heavy chain variable domain; Chothia and Lesk *J. Mol. Biol.* 196:901-917 (1987)). "Framework Region" or "FR" residues are those variable domain residues other than the hypervariable region residues as herein defined.

The term "Fc region" herein is used to define a C-terminal region of an immunoglobulin heavy chain, including native sequence Fc regions and variant Fc regions. Although the boundaries of the Fc region of an immunoglobulin heavy chain might vary, the human IgG heavy chain Fc region is usually defined to stretch from an amino acid residue at position Cys226, or from Pro230, to the carboxyl-terminus thereof. The C-terminal lysine (residue 447 according to the EU numbering system) of the Fc region may be removed, for example, during production or purification of the antibody, or by recombinantly engineering the nucleic acid encoding a heavy chain of the antibody. Accordingly, a composition of intact antibodies may comprise antibody populations with all K447 residues removed, antibody populations with no K447 residues removed, and antibody populations having a mixture of antibodies with and without the K447 residue.

Unless indicated otherwise, herein the numbering of the residues in an immunoglobulin heavy chain is that of the EU index as in Kabat et al., *Sequences of Proteins of Immunological Interest,* 5th Ed. Public Health Service, National Institutes of Health, Bethesda, MD (1991), expressly incorporated herein by reference. The "EU index as in Kabat" refers to the residue numbering of the human IgG1 EU antibody.

A "functional Fc region" possesses an "effector function" of a native sequence Fc region. Exemplary "effector functions" include C1q binding; complement dependent cytotoxicity; Fc receptor binding; antibody-dependent cell-mediated cytotoxicity (ADCC); phagocytosis; down regulation of cell surface receptors (e.g. B cell receptor; BCR), etc. Such effector functions generally require the Fc region to be combined with a binding domain (e.g. an antibody variable domain) and can be assessed using various assays as herein disclosed, for example.

A "native sequence Fc region" comprises an amino acid sequence identical to the amino acid sequence of an Fc region found in nature. Native sequence human Fc regions include a native sequence human IgG1 Fc region (non-A and A allotypes); native sequence human IgG2 Fc region; native sequence human IgG3 Fc region; and native sequence human IgG4 Fc region as well as naturally occurring variants thereof.

A "variant Fc region" comprises an amino acid sequence which differs from that of a native sequence Fc region by virtue of at least one amino acid modification, preferably one or more amino acid substitution(s). Preferably, the variant Fc region has at least one amino acid substitution compared to a native sequence Fc region or to the Fc region of a parent polypeptide, e.g. from about one to about ten amino acid substitutions, and preferably from about one to about five amino acid substitutions in a native sequence Fc region or in the Fc region of the parent polypeptide. The variant Fc region herein will preferably possess at least about 80% homology with a native sequence Fc region and/or with an Fc region of a parent polypeptide, and most preferably at least about 90% homology therewith, more preferably at least about 95% homology therewith.

Depending on the amino acid sequence of the constant domain of their heavy chains, intact antibodies can be assigned to different "classes". There are five major classes of intact antibodies: IgA, IgD, IgE, IgG, and IgM, and several of these may be further divided into Asubclasses@ (isotypes), e.g., IgG1, IgG2, IgG3, IgG4, IgA, and IgA2. The heavy-chain constant domains that correspond to the different classes of antibodies are called $\alpha$, $\delta$, $\epsilon$, $\gamma$, and $\mu$, respectively. The subunit structures and three-dimensional configurations of different classes of immunoglobulins are well known.

A "naked antibody" is an antibody that is not conjugated to a heterologous molecule, such as a cytotoxic moiety or radiolabel.

An "affinity matured" antibody is one with one or more alterations in one or more hypervariable regions thereof which result an improvement in the affinity of the antibody for antigen, compared to a parent antibody which does not possess those alteration(s). Preferred affinity matured antibodies will have nanomolar or even picomolar affinities for the target antigen. Affinity matured antibodies are produced by procedures known in the art. Marks et al. *Bio/Technology* 10:779-783 (1992) describes affinity maturation by VH and VL domain shuffling. Random mutagenesis of CDR and/or framework residues is described by: Barbas et al. *Proc Nat. Acad. Sci, USA* 91:3809-3813 (1994); Schier et al. *Gene* 169:147-155 (1995); Yelton et al. *J. Immunol.* 155:1994-2004 (1995); Jackson et al., *J. Immunol.* 154(7):3310-9 (1995); and Hawkins et al, *J. Mol. Biol.* 226:889-896 (1992).

A "deamidated" antibody is one in which one or more asparagine residues thereof has been derivitized, e.g. to an aspartic acid, a succinimide, or an iso-aspartic acid.

The terms "cancer" and "cancerous" refer to or describe the physiological condition in mammals that is characterized by unregulated cell growth.

"Gastric cancer" specifically includes metastatic or locally advanced non-resectable gastric cancer, including, without limitation, histologically confirmed adenocarcinoma of the stomach or gastroesophageal junction with inoperable (non-resectable) locally advanced or metastatic disease, not amenable to curative therapy, and post-operatively recurrent advanced gastric cancer, such as adenocarcinoma of the stomach or gastroesophageal junction, when the intent of the surgery was to cure the disease.

An "advanced" cancer is one which has spread outside the site or organ of origin, either by local invasion or metastasis. Accordingly, the term "advanced" cancer includes both locally advanced and metastatic disease.

A "refractory" cancer is one which progresses even though an anti-tumor agent, such as a chemotherapy, is being administered to the cancer patient. An example of a refractory cancer is one which is platinum refractory.

A "recurrent" cancer is one which has regrown, either at the initial site or at a distant site, after a response to initial therapy, such as surgery.

A "locally recurrent" cancer is cancer that returns after treatment in the same place as a previously treated cancer.

A "non-resectable" or "unresectable" cancer is not able to be removed (resected) by surgery.

"Early-stage breast cancer" herein refers to breast cancer that has not spread beyond the breast or the axillary lymph nodes. Such cancer is generally treated with neoadjuvant or adjuvant therapy.

"Neoadjuvant therapy" refers to systemic therapy given prior to surgery.

"Adjuvant therapy" refers to systemic therapy given after surgery.

"Metastatic" cancer refers to cancer which has spread from one part of the body (e.g. the breast) to another part of the body.

Herein, a "patient" or "subject" is a human patient. The patient may be a "cancer patient," i.e. one who is suffering or at risk for suffering from one or more symptoms of cancer, in particular gastric or breast cancer.

A "patient population" refers to a group of cancer patients. Such populations can be used to demonstrate statistically significant efficacy and/or safety of a drug, such as Pertuzumab.

A "relapsed" patient is one who has signs or symptoms of cancer after remission. Optionally, the patient has relapsed after adjuvant or neoadjuvant therapy.

A cancer or biological sample which "displays HER expression, amplification, or activation" is one which, in a diagnostic test, expresses (including overexpresses) a HER receptor, has amplified HER gene, and/or otherwise demonstrates activation or phosphorylation of a HER receptor.

A cancer or biological sample which "displays HER activation" is one which, in a diagnostic test, demonstrates activation or phosphorylation of a HER receptor. Such activation can be determined directly (e.g. by measuring HER phosphorylation by ELISA) or indirectly (e.g. by gene expression profiling or by detecting HER heterodimers, as described herein).

A cancer cell with "HER receptor overexpression or amplification" is one which has significantly higher levels of a HER receptor protein or gene compared to a noncancerous cell of the same tissue type. Such overexpression may be caused by gene amplification or by increased transcription or translation. HER receptor overexpression or amplification may be determined in a diagnostic or prognostic assay by evaluating increased levels of the HER protein present on the surface of a cell (e.g. via an immunohistochemistry assay; IHC). Alternatively, or additionally, one may measure levels of HER-encoding nucleic acid in the cell, e.g. via in situ hybridization (ISH), including fluorescent in situ hybridization (FISH; see WO98/45479 published October, 1998) and chromogenic in situ hybridization (CISH; see, e.g. Tanner et al., *Am. J. Pathol.* 157(5): 1467-1472 (2000); Bella et al., *J. Clin. Oncol.* 26: (May 20 suppl; abstr 22147) (2008)), southern blotting, or polymerase chain reaction (PCR) techniques, such as quantitative real time PCR (qRT-PCR). One may also study HER receptor overexpression or amplification by measuring shed antigen (e.g., HER extracellular domain) in a biological fluid such as serum (see, e.g., U.S. Pat. No. 4,933,294 issued Jun. 12, 1990; WO91/05264 published Apr. 18, 1991; U.S. Pat. No. 5,401,638 issued Mar. 28, 1995; and Sias et al. *J. Immunol. Methods* 132: 73-80 (1990)). Aside from the above assays, various in vivo assays are available to the skilled practitioner. For example, one may expose cells within the body of the patient to an antibody which is optionally labeled with a detectable label, e.g. a radioactive isotope, and binding of the antibody to cells in the patient can be evaluated, e.g. by external scanning for radioactivity or by analyzing a biopsy taken from a patient previously exposed to the antibody.

A "HER2-positive" cancer comprises cancer cells which have higher than normal levels of HER2. Examples of HER2-positive cancer include HER2-positive breast cancer and HER2-positive gastric cancer. HER2-positive cancer has an immunohistochemistry (IHC) score of 3+ and/or an in situ hybridization (ISH) amplification ratio ≥2.0.

Herein, an "anti-tumor agent" refers to a drug used to treat cancer. Non-limiting examples of anti-tumor agents herein include chemotherapy agents, HER dimerization inhibitors, HER antibodies, antibodies directed against tumor associated antigens, anti-hormonal compounds, cytokines, EGFR-targeted drugs, anti-angiogenic agents, tyrosine kinase inhibitors, growth inhibitory agents and antibodies, cytotoxic agents, antibodies that induce apoptosis, COX inhibitors, farnesyl transferase inhibitors, antibodies that binds oncofetal protein CA 125, HER2 vaccines, Raf or ras inhibitors, liposomal doxorubicin, topotecan, taxene, dual tyrosine kinase inhibitors, TLK286, EMD-7200, Pertuzumab, Trastuzumab, erlotinib, and bevacizumab.

The "epitope 2C4" is the region in the extracellular domain of HER2 to which the antibody 2C4 binds. In order to screen for antibodies which bind essentially to the 2C4 epitope, a routine cross-blocking assay such as that described in *Antibodies, A Laboratory Manual*, Cold Spring Harbor Laboratory, Ed Harlow and David Lane (1988), can be performed. Preferably the antibody blocks 2C4's binding to HER2 by about 50% or more. Alternatively, epitope mapping can be performed to assess whether the antibody binds essentially to the 2C4 epitope of HER2. Epitope 2C4 comprises residues from Domain II (SEQ ID NO: 2) in the extracellular domain of HER2. 2C4 and Pertuzumab binds to the extracellular domain of HER2 at the junction of domains I, II and III (SEQ ID NOs: 1, 2, and 3, respectively). Franklin et al. *Cancer Cell* 5:317-328 (2004).

The "epitope 4D5" is the region in the extracellular domain of HER2 to which the antibody 4D5 (ATCC CRL 10463) and Trastuzumab bind. This epitope is close to the transmembrane domain of HER2, and within Domain IV of HER2 (SEQ ID NO: 4). To screen for antibodies which bind essentially to the 4D5 epitope, a routine cross-blocking assay such as that described in *Antibodies, A Laboratory Manual*, Cold Spring Harbor Laboratory, Ed Harlow and David Lane (1988), can be performed. Alternatively, epitope mapping can be performed to assess whether the antibody binds essentially to the 4D5 epitope of HER2 (e.g. any one or more residues in the region from about residue 529 to about residue 625, inclusive of the HER2 ECD, residue numbering including signal peptide).

"Treatment" refers to both therapeutic treatment and prophylactic or preventative measures. Those in need of treatment include those already with cancer as well as those in which cancer is to be prevented. Hence, the patient to be treated herein may have been diagnosed as having cancer or may be predisposed or susceptible to cancer.

The term "effective amount" refers to an amount of a drug effective to treat cancer in the patient. The effective amount of the drug may reduce the number of cancer cells; reduce the tumor size; inhibit (i.e., slow to some extent and preferably stop) cancer cell infiltration into peripheral organs; inhibit (i.e., slow to some extent and preferably stop) tumor metastasis; inhibit, to some extent, tumor growth; and/or relieve to some extent one or more of the symptoms associated with the cancer. To the extent the drug may prevent growth and/or kill existing cancer cells, it may be cytostatic and/or cytotoxic. The effective amount may extend progression free survival (e.g. as measured by Response Evaluation Criteria for Solid Tumors, RECIST, or CA-125 changes), result in an objective response (including a partial response, PR, or complete response, CR), increase overall survival time, and/or improve one or more symptoms of cancer (e.g. as assessed by FOSI).

The term "cytotoxic agent" as used herein refers to a substance that inhibits or prevents the function of cells and/or causes destruction of cells. The term is intended to include radioactive isotopes (e.g. $At^{211}$, $I^{131}$, $I^{125}$, $Y^{90}$, $Re^{186}$, $Re^{188}$, $Sm^{153}$, $Bi^{212}$, $P^{32}$ and radioactive isotopes of Lu), chemotherapeutic agents, and toxins such as small molecule toxins or enzymatically active toxins of bacterial, fungal, plant or animal origin, including fragments and/or variants thereof.

A "chemotherapy" is use of a chemical compound useful in the treatment of cancer. Examples of chemotherapeutic agents, used in chemotherapy, include alkylating agents such as thiotepa and CYTOXAN® cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethiylenethiophosphoramide and trimethylolomelamine; TLK 286 (TELCYTA™); acetogenins (especially bullatacin and bullatacinone); delta-9-tetrahydrocannabinol (dronabinol, MARINOL®); beta-lapachone; lapachol; colchicines; betulinic acid; a camptothecin (including the synthetic analogue topotecan (HYCAMTIN®), CPT-11 (irinotecan, CAMPTOSAR®), acetylcamptothecin, scopolectin, and 9-aminocamptothecin); bryostatin; callystatin; CC-1065 (including its adozelesin, carzelesin and bizelesin synthetic analogues); podophyllotoxin; podophyllinic acid; tenipo-side; cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; bisphosphonates, such as clodronate; antibiotics such as the enediyne antibiotics (e. g., calicheamicin, especially calicheamicin gammalI and calicheamicin omegaI1 (see, e.g., Agnew, Chem Intl. Ed. Engl., 33: 183-186 (1994)) and anthracyclines such as annamycin, AD 32, alcarubicin, daunorubicin, dexrazoxane, DX-52-1, epirubicin, GPX-100, idarubicin, KRN5500, menogaril, dynemicin, including dynemicin A, an esperamicin, neocarzinostatin chromophore and related chromoprotein enediyne antibiotic chromophores, aclacinomysins, actinomycin, authramycin, azaserine, bleomycins, cactinomycin, carabicin, carminomycin, carzinophilin, chromomycinis, dactinomycin, detorubicin, 6-diazo-5-oxo-L-norleucine, ADRIAMYCIN® doxorubicin (including morpholino-doxorubicin, cyanomorpholino-doxorubicin, 2-pyrrolino-doxorubicin, liposomal doxorubicin, and deoxydoxorubicin), esorubicin, marcellomycin, mitomycins such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, and zorubicin; folic acid analogues such as denopterin, pteropterin, and trimetrexate; purine analogs such as fludarabine, 6-mercaptopurine, thiamiprine, and thioguanine; pyrimidine analogs such as ancitabine, azacitidine, 6-azauridine, carmofur, cytarabine, dideoxyuridine, doxifluridine, enocitabine, and floxuridine; androgens such as calusterone, dromostanolone propionate, epitiostanol, mepitiostane, and testolactone; anti-adrenals such as aminoglutethimide, mitotane, and trilostane; folic acid replenisher such as folinic acid (leucovorin); aceglatone; anti-folate anti-neoplastic agents such as ALIMTA®, LY231514 pemetrexed, dihydrofolate reductase inhibitors such as methotrexate, anti-metabolites such as 5-fluorouracil (5-FU) and its prodrugs such as UFT, S-1 and capecitabine, and thymidylate synthase inhibitors and glycinamide ribonucleotide formyltransferase inhibitors such as raltitrexed (TOMUDEX®, TDX); inhibitors of dihydropyrimidine dehydrogenase such as eniluracil; aldophosphamide glycoside; aminolevulinic acid; amsacrine; bestrabucil; bisantrene; edatraxate; defofamine; demecolcine; diaziquone; elfornithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; 2-ethylhydrazide; procarbazine; PSK7 polysaccharide complex (JHS Natural Products, Eugene, OR); razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine (ELDISINE®, FILDESIN®); dacarbazine; mannomustine; mitobronitol; mitolactol; pipobroman; gacytosine; arabinoside ("Ara-C"); cyclophosphamide; thiotepa; taxanes; chloranbucil; gemcitabine (GEMZAR®); 6-thioguanine; mercaptopurine; platinum; platinum analogs or platinum-based analogs such as cisplatin, oxaliplatin and carboplatin; vinblastine (VELBAN®); etoposide (VP-16); ifosfamide; mitoxantrone; vincristine (ONCOVIN®); vinca alkaloid; vinorelbine (NAVELBINE®); novantrone; edatrexate; daunomycin; aminopterin; xeloda; ibandronate; topoisomerase inhibitor RFS 2000; difluorometlhylornithine (DMFO); retinoids such as retinoic acid; pharmaceutically acceptable salts, acids or derivatives of any of the above; as well as combinations of two or more of the above such as CHOP, an abbreviation for a combined therapy of cyclophosphamide, doxorubicin, vincristine, and prednisolone, and FOLFOX, an abbreviation for a treatment regimen with oxaliplatin (ELOXATIN™) combined with 5-FU and leucovorin.

Also included in this definition are anti-hormonal agents that act to regulate or inhibit hormone action on tumors such as anti-estrogens and selective estrogen receptor modulators (SERMs), including, for example, tamoxifen (including NOLVADEX® tamoxifen), raloxifene, droloxifene, 4-hydroxytamoxifen, trioxifene, keoxifene, LY117018, onapristone, and FARESTON® toremifene; aromatase inhibitors; and anti-androgens such as flutamide, nilutamide, bicalutamide, leuprolide, and goserelin; as well as troxacitabine (a 1,3-dioxolane nucleoside cytosine analog); antisense oligonucleotides, particularly those that inhibit expression of genes in signaling pathways implicated in abherant cell proliferation, such as, for example, PKC-alpha, Raf, H-Ras, and epidermal growth factor receptor (EGF-R); vaccines such as gene therapy vaccines, for example, ALLOVECTIN® vaccine, LEUVECTIN® vaccine, and VAXID® vaccine; PROLEUKIN® rIL-2; LURTOTECAN® topoisomerase 1 inhibitor; ABARELIX® rmRH; and pharmaceutically acceptable salts, acids or derivatives of any of the above.

A "taxane" is a chemotherapy which inhibits mitosis and interferes with microtubules. Examples of taxanes include Paclitaxel (TAXOL®; Bristol-Myers Squibb Oncology, Princeton, N.J.); cremophor-free, albumin-engineered nanoparticle formulation of paclitaxel or nab-paclitaxel (ABRAXANE™; American Pharmaceutical Partners, Schaumberg, Illinois); and Docetaxel (TAXOTERE®; Rhône-Poulenc Rorer, Antony, France).

An "anthacycline" is a type of antibiotic that comes from the fungus Streptococcus peucetius, examples include: Daunorubicin, Doxorubicin, and Epirubicin, etc.

"Anthracycline-based chemotherapy" refers to a chemotherapy regimen that consists of or include one or more anthracycline. Examples include 5-FU, epirubicin, and cyclophosphamide (FEC); 5-FU, doxorubicin, and cyclophosphamide (FAC); doxorubicin and cyclophosphamide (AC); epirubicin and cyclophosphamide (EC); etc.

For the purposes herein, "carboplatin-based chemotherapy" refers to a chemotherapy regimen that consists of or includes one or more Carboplatins. An example is TCH (Docetaxel/TAXOL®, Carboplatin, and Trastuzumab/HERCEPTIN®).

An "aromatase inhibitor" inhibits the enzyme aromatase, which regulates estrogen production in the adrenal glands. Examples of aromatase inhibitors include: 4(5)-imidazoles, aminoglutethimide, MEGASE® megestrol acetate, AROMASIN® exemestane, formestanie, fadrozole, RIVISOR® vorozole, FEMARA® letrozole, and ARIMIDEX® anastrozole. In one embodiment, the aromatase inhibitor herein is letrozole or anastrozole.

An "antimetabolite chemotherapy" is use of an agent which is structurally similar to a metabolite, but can not be used by the body in a productive manner. Many antimetabolite chemotherapy interferes with the production of the nucleic acids, RNA and DNA. Examples of antimetabolite chemotherapeutic agents include gemcitabine (GEMZAR®), 5-fluorouracil (5-FU), capecitabine (XELODA™), 6-mercaptopurine, methotrexate, 6-thioguanine, pemetrexed, raltitrexed, arabinosylcytosine ARA-C cytarabine (CYTOSAR-U®), dacarbazine (DTIC-DOME®), azocytosine, deoxycytosine, pyridmidene, fludarabine (FLUDARA®), cladrabine, 2-deoxy-D-glucose etc.

By "chemotherapy-resistant" cancer is meant that the cancer patient has progressed while receiving a chemotherapy regimen (i.e. the patient is "chemotherapy refractory"), or the patient has progressed within 12 months (for instance, within 6 months) after completing a chemotherapy regimen.

The term "platin" is used herein to refer to platinum based chemotherapy, including, without limitation, cisplatin, carboplatin, and oxaliplatin.

The term "fluoropyrimidine" is used herein to refer to an antimetabolite chemotherapy, including, without limitation, capecitabine, floxuridine, and fluorouracil (5-FU).

A "fixed" or "flat" dose of a therapeutic agent herein refers to a dose that is administered to a human patient without regard for the weight (WT) or body surface area (BSA) of the patient. The fixed or flat dose is therefore not provided as a mg/kg dose or a mg/m² dose, but rather as an absolute amount of the therapeutic agent.

A "loading" dose herein generally comprises an initial dose of a therapeutic agent administered to a patient, and is followed by one or more maintenance dose(s) thereof. Generally, a single loading dose is administered, but multiple loading doses are contemplated herein. Usually, the amount of loading dose(s) administered exceeds the amount of the maintenance dose(s) administered and/or the loading dose(s) are administered more frequently than the maintenance dose(s), so as to achieve the desired steady-state concentration of the therapeutic agent earlier than can be achieved with the maintenance dose(s).

A "maintenance" dose herein refers to one or more doses of a therapeutic agent administered to the patient over a treatment period. Usually, the maintenance doses are administered at spaced treatment intervals, such as approximately every week, approximately every 2 weeks, approximately every 3 weeks, or approximately every 4 weeks, preferably every 3 weeks.

"Infusion" or "infusing" refers to the introduction of a drug-containing solution into the body through a vein for therapeutic purposes. Generally, this is achieved via an intravenous (IV) bag.

An "intravenous bag" or "IV bag" is a bag that can hold a solution which can be administered via the vein of a patient. In one embodiment, the solution is a saline solution (e.g. about 0.9% or about 0.45% NaCl). Optionally, the IV bag is formed from polyolefin or polyvinal chloride.

By "co-administering" is meant intravenously administering two (or more) drugs during the same administration, rather than sequential infusions of the two or more drugs. Generally, this will involve combining the two (or more) drugs into the same IV bag prior to co-administration thereof.

"Cardiac toxicity" refers to any toxic side effect resulting from administration of a drug or drug combination. Cardiac toxicity can be evaluated based on any one or more of: incidence of symptomatic left ventricular systolic dysfunction (LVSD) or congestive heart failure (CHF), or decrease in left ventricular ejection fraction (LVEF).

The phrase "without increasing cardiac toxicity" for a drug combination including Pertuzumab refers to an incidence of cardiac toxicity that is equal or less than that observed in patients treated with drugs other than Pertuzumab in the drug combination (e.g. equal or less than that resulting from administration of Trastuzumab and the chemotherapy, e.g. Docetaxel).

A "vial" is a container suitable for holding a liquid or lyophilized preparation. In one embodiment, the vial is a single-use vial, e.g. a 20-cc single-use vial with a stopper.

A "package insert" is a leaflet that, by order of the Food and Drug Administration (FDA) or other Regulatory Authority, must be placed inside the package of every prescription drug. The leaflet generally includes the trademark for the drug, its generic name, and its mechanism of action; states its indications, contraindications, warnings, precautions, adverse effects, and dosage forms; and includes instructions for the recommended dose, time, and route of administration.

The expression "safety data" concerns the data obtained in a controlled clinical trial showing the prevalence and severity of adverse events to guide the user regarding the safety of the drug, including guidance on how to monitor and prevent adverse reactions to the drug. Table 3 and Table 4 herein provide safety data for Pertuzumab. The safety data comprises any one or more (e.g. two, three, four or more) of the most common adverse events (AEs) or adverse reactions (ADRs) in Tables 3 and 4. For example, the safety data comprises information about neutropenia, febrile neutropenia, diarrhea and/or cardiac toxicity as disclosed herein.

"Efficacy data' refers to the data obtained in controlled clinical trial showing that a drug effectively treats a disease, such as cancer. Efficacy data for Pertuzumab is provided in the examples herein. As to HER2-positive metastatic or locally recurrent, unresectable breast cancer, efficacy data for Pertuzumab is found in Table 2, Table 5, FIG. 8 and FIG. 10 herein. The safety data comprises any one or more (e.g. two, three, four or more) of the primary endpoint (progression free survival, PFS, by IRF) and/or secondary endpoints (overall survival (OS); progression free survival (PFS) by investigator; objective response rate (ORR), including complete response (CR), partial response (PR), stable disease (SD), and progressive disease (PD), and/or duration of response) in Table 2, Table 5, FIG. 8 and FIG. 10. For example, the efficacy data comprises information about progression free survival (PFS) and/or overall survival (OS) as disclosed herein.

By "stable mixture" when referring to a mixture of two or more drugs, such as Pertuzumab and Trastuzumab" means that each of the drugs in the mixture essentially retains its physical and chemical stability in the mixture as evaluated by one or more analytical assays. Exemplary analytical assays for this purpose include: color, appearance and clarity (CAC), concentration and turbidity analysis, particulate analysis, size exclusion chromatography (SEC), ion-exchange chromatography (IEC), capillary zone electrophoresis (CZE), image capillary isoelectric focusing (iCIEF), and potency assay. In one embodiment, mixture has been shown to be stable for up to 24 hours at 5° C. or 30° C.

A drug that is administered "concurrently" with one or more other drugs is administered during the same treatment cycle, on the same day of treatment as the one or more other drugs, and, optionally, at the same time as the one or more other drugs. For instance, for cancer therapies given every 3-weeks, the concurrently administered drugs are each administered on day-1 of a 3-week cycle.

II. Antibody and Chemotherapy Compositions

The HER2 antigen to be used for production of antibodies may be, e.g., a soluble form of the extracellular domain of a HER2 receptor or a portion thereof, containing the desired epitope. Alternatively, cells expressing HER2 at their cell surface (e.g. NIH-3T3 cells transformed to overexpress HER2; or a carcinoma cell line such as SK-BR-3 cells, see Stancovski et al. *PNAS (USA)* 88:8691-8695 (1991)) can be used to generate antibodies. Other forms of HER2 receptor useful for generating antibodies will be apparent to those skilled in the art.

Various methods for making monoclonal antibodies herein are available in the art. For example, the monoclonal antibodies may be made using the hybridoma method first described by Kohler et al., *Nature,* 256:495 (1975), by recombinant DNA methods (U.S. Pat. No. 4,816,567).

The anti-HER2 antibodies used in accordance with the present invention, Trastuzumab and Pertuzumab, are commercially available.

(i) Humanized Antibodies

Methods for humanizing non-human antibodies have been described in the art. Preferably, a humanized antibody has one or more amino acid residues introduced into it from a source which is non-human. These non-human amino acid residues are often referred to as "import" residues, which are typically taken from an "import" variable domain. Humanization can be essentially performed following the method of Winter and co-workers (Jones et al., *Nature,* 321:522-525 (1986); Riechmann et al., *Nature,* 332:323-327 (1988); Verhoeyen et al., *Science,* 239:1534-1536 (1988)), by substituting hypervariable region sequences for the corresponding sequences of a human antibody. Accordingly, such "humanized" antibodies are chimeric antibodies (U.S. Pat. No. 4,816,567) wherein substantially less than an intact human variable domain has been substituted by the corresponding sequence from a non-human species. In practice, humanized antibodies are typically human antibodies in which some hypervariable region residues and possibly some FR residues are substituted by residues from analogous sites in rodent antibodies.

The choice of human variable domains, both light and heavy, to be used in making the humanized antibodies is very important to reduce antigenicity. According to the so-called "best-fit" method, the sequence of the variable domain of a rodent antibody is screened against the entire library of known human variable-domain sequences. The human sequence which is closest to that of the rodent is then accepted as the human framework region (FR) for the humanized antibody (Sims et al., *J. Immunol.,* 151:2296 (1993); Chothia et al., *J. Mol. Biol.,* 196:901 (1987)). Another method uses a particular framework region derived from the consensus sequence of all human antibodies of a particular subgroup of light or heavy chains. The same framework may be used for several different humanized antibodies (Carter et al., *Proc. Natl. Acad. Sci. USA,* 89:4285 (1992); Presta et al., *J. Immunol.,* 151:2623 (1993)).

It is further important that antibodies be humanized with retention of high affinity for the antigen and other favorable biological properties. To achieve this goal, according to a preferred method, humanized antibodies are prepared by a process of analysis of the parental sequences and various conceptual humanized products using three-dimensional models of the parental and humanized sequences. Three-dimensional immunoglobulin models are commonly available and are familiar to those skilled in the art. Computer programs are available which illustrate and display probable three-dimensional conformational structures of selected candidate immunoglobulin sequences. Inspection of these displays permits analysis of the likely role of the residues in the functioning of the candidate immunoglobulin sequence, i.e., the analysis of residues that influence the ability of the candidate immunoglobulin to bind its antigen. In this way, FR residues can be selected and combined from the recipient and import sequences so that the desired antibody characteristic, such as increased affinity for the target antigen(s), is achieved. In general, the hypervariable region residues are directly and most substantially involved in influencing antigen binding.

U.S. Pat. No. 6,949,245 describes production of exemplary humanized HER2 antibodies which bind HER2 and block ligand activation of a HER receptor.

Humanized HER2 antibodies specifically include Trastuzumab (HERCEPTIN®) as described in Table 3 of U.S. Pat. No. 5,821,337 expressly incorporated herein by reference and as defined herein; and humanized 2C4 antibodies such as Pertuzumab as described and defined herein.

The humanized antibodies herein may, for example, comprise nonhuman hypervariable region residues incorporated into a human variable heavy domain and may further comprise a framework region (FR) substitution at a position selected from the group consisting of 69H, 71H and 73H utilizing the variable domain numbering system set forth in Kabat et al., *Sequences of Proteins of Immunological Interest,* 5th Ed. Public Health Service, National Institutes of Health, Bethesda, MD (1991). In one embodiment, the humanized antibody comprises FR substitutions at two or all of positions 69H, 71H and 73H.

An exemplary humanized antibody of interest herein comprises variable heavy domain complementarity determining residues GFTFTDYTMX (SEQ ID NO: 17), where X is preferably D or S; DVNPNSGGSIYNQRFKG (SEQ ID NO:18); and/or NLGPSFYFDY (SEQ ID NO:19), optionally comprising amino acid modifications of those CDR residues, e.g. where the modifications essentially maintain or improve affinity of the antibody. For example, an antibody variant for use in the methods of the present invention may have from about one to about seven or about five amino acid substitutions in the above variable heavy CDR sequences. Such antibody variants may be prepared by affinity maturation, e.g., as described below.

The humanized antibody may comprise variable light domain complementarity determining residues KASQDVSIGVA (SEQ ID NO:20); SASYX$^1$X$^2$X$^3$, where X$^1$ is preferably R or L, X$^2$ is preferably Y or E, and X$^3$ is preferably T or S (SEQ ID NO:21); and/or QQYYIYPYT (SEQ ID NO:22), e.g. in addition to those variable heavy domain CDR residues in the preceding paragraph. Such humanized antibodies optionally comprise amino acid modifications of the above CDR residues, e.g. where the modifications essentially maintain or improve affinity of the antibody. For example, the antibody variant of interest may have from about one to about seven or about five amino acid substitutions in the above variable light CDR sequences. Such antibody variants may be prepared by affinity maturation, e.g., as described below.

The present application also contemplates affinity matured antibodies which bind HER2. The parent antibody may be a human antibody or a humanized antibody, e.g., one comprising the variable light and/or variable heavy sequences of SEQ ID Nos. 7 and 8, respectively (i.e. comprising the VL and/or VH of Pertuzumab). An affinity matured variant of Pertuzumab preferably binds to HER2 receptor with an affinity superior to that of murine 2C4 or Pertuzumab (e.g. from about two or about four fold, to about 100 fold or about 1000 fold improved affinity, e.g. as assessed using a HER2-extracellular domain (ECD) ELISA). Exemplary variable heavy CDR residues for substitution include H28, H30, H34, H35, H64, H96, H99, or combinations of two or more (e.g. two, three, four, five, six, or seven of these residues). Examples of variable light CDR residues for alteration include L28, L50, L53, L56, L91, L92, L93, L94, L96, L97 or combinations of two or more (e.g. two to three, four, five or up to about ten of these residues).

Humanization of murine 4D5 antibody to generate humanized variants thereof, including Trastuzumab, is described in U.S. Pat. Nos. 5,821,337, 6,054,297, 6,407,213, 6,639,055, 6,719,971, and 6,800,738, as well as Carter et al. PNAS (USA), 89:4285-4289 (1992). HuMAb4D5-8 (Trastuzumab) bound HER2 antigen 3-fold more tightly than the mouse 4D5 antibody, and had secondary immune function (ADCC) which allowed for directed cytotoxic activity of the humanized antibody in the presence of human effector cells. HuMAb4D5-8 comprised variable light (V$_L$) CDR residues incorporated in a V$_L$ κ subgroup I consensus framework, and variable heavy (V$_H$) CDR residues incorporated into a V$_H$ subgroup III consensus framework. The antibody further comprised framework region (FR) substitutions as positions: 71, 73, 78, and 93 of the V$_H$ (Kabat numbering of FR residues; and a FR substitution at position 66 of the V$_L$ (Kabat numbering of FR residues). Trastuzumab comprises non-A allotype human γ 1 Fc region.

Various forms of the humanized antibody or affinity matured antibody are contemplated. For example, the humanized antibody or affinity matured antibody may be an antibody fragment. Alternatively, the humanized antibody or affinity matured antibody may be an intact antibody, such as an intact IgG1 antibody.

(ii) Pertuzumab Compositions

In one embodiment of a HER2 antibody composition, the composition comprises a mixture of a main species Pertuzumab antibody and one or more variants thereof. The preferred embodiment herein of a Pertuzumab main species antibody is one comprising the variable light and variable heavy amino acid sequences in SEQ ID Nos. 7 and 8, and most preferably comprising a light chain amino acid sequence of SEQ ID No. 11, and a heavy chain amino acid sequence of SEQ ID No. 12 (including deamidated and/or oxidized variants of those sequences). In one embodiment, the composition comprises a mixture of the main species Pertuzumab antibody and an amino acid sequence variant thereof comprising an amino-terminal leader extension. Preferably, the amino-terminal leader extension is on a light chain of the antibody variant (e.g. on one or two light chains of the antibody variant). The main species HER2 antibody or the antibody variant may be an full length antibody or antibody fragment (e.g. Fab of F(ab=)2 fragments), but preferably both are full length antibodies. The antibody variant herein may comprise an amino-terminal leader extension on any one or more of the heavy or light chains thereof. Preferably, the amino-terminal leader extension is on one or two light chains of the antibody. The amino-terminal leader extension preferably comprises or consists of VHS-. Presence of the amino-terminal leader extension in the composition can be detected by various analytical techniques including, but not limited to, N-terminal sequence analysis, assay for charge heterogeneity (for instance, cation exchange chromatography or capillary zone electrophoresis), mass spectrometry, etc. The amount of the antibody variant in the composition generally ranges from an amount that constitutes the detection limit of any assay (preferably N-terminal sequence analysis) used to detect the variant to an amount less than the amount of the main species antibody. Generally, about 20% or less (e.g. from about 1% to about 15%, for instance from 5% to about 15%) of the antibody molecules in the composition comprise an amino-terminal leader extension. Such percentage amounts are preferably determined using quantitative N-terminal sequence analysis or cation exchange analysis (preferably using a high-resolution, weak cation-exchange column, such as a PROPAC WCX-10™ cation exchange column). Aside from the amino-terminal leader extension variant, further amino acid sequence alterations of the main species antibody and/or variant are contemplated, including but not limited to an antibody comprising a C-terminal lysine residue on one or both heavy chains thereof, a deamidated antibody variant, etc.

Moreover, the main species antibody or variant may further comprise glycosylation variations, non-limiting examples of which include antibody comprising a G1 or G2 oligosaccharide structure attached to the Fc region thereof, antibody comprising a carbohydrate moiety attached to a light chain thereof (e.g. one or two carbohydrate moieties, such as glucose or galactose, attached to one or two light chains of the antibody, for instance attached to one or more lysine residues), antibody comprising one or two non-glycosylated heavy chains, or antibody comprising a sialidated oligosaccharide attached to one or two heavy chains thereof etc.

The composition may be recovered from a genetically engineered cell line, e.g. a Chinese Hamster Ovary (CHO) cell line expressing the HER2 antibody, or may be prepared by peptide synthesis.

For more information regarding exemplary Pertuzumab compositions, see U.S. Pat. Nos. 7,560,111 and 7,879,325 as well as US 2009/0202546A1.

(iii) Trastuzumab Compositions

The Trastuzumab composition generally comprises a mixture of a main species antibody (comprising light and heavy chain sequences of SEQ ID NOS: 13 and 14, respectively), and variant forms thereof, in particular acidic variants (including deamidated variants). Preferably, the amount of such acidic variants in the composition is less than about 25%, or less than about 20%, or less than about 15%. See, U.S. Pat.

No. 6,339,142. See, also, Harris et al., *J. Chromatography, B* 752:233-245 (2001) concerning forms of Trastuzumab resolvable by cation-exchange chromatography, including Peak A (Asn30 deamidated to Asp in both light chains); Peak B (Asn55 deamidated to isoAsp in one heavy chain); Peak 1 (Asn30 deamidated to Asp in one light chain); Peak 2 (Asn30 deamidated to Asp in one light chain, and Asp102 isomerized to isoAsp in one heavy chain); Peak 3 (main peak form, or main species antibody); Peak 4 (Asp102 isomerized to isoAsp in one heavy chain); and Peak C (Asp102 succinimide (Asu) in one heavy chain). Such variant forms and compositions are included in the invention herein.

(iv) 5-FU and Cisplatin

There is no single, standard, globally accepted chemotherapeutic regimen for advanced gastric cancer, but 5-fluorouracil (5-FU) plus cisplatin is widely used for this indication. In Phase II studies in patients with no prior chemotherapy, 5-FU+cisplatin produced response rates of approximately 40% and median overall survival of 7-10.6 months (Lacave A J, Baron F J, Anton L M, et al. *Ann Oncol* 1991; 2:751-754; Rougier P, Ducreux M, Mahjoubi M, et al. *Eur J Cancer* 1994; 30A:1263-1269; Vanhoefer U, Wagner T, Lutz M, et al. *Eur J Cancer* 2001; 37 Suppl 6: abstract S27.)

(v) Capecitabine

Capecitabine has been extensively tested in patients with advanced gastric cancer. Phase II efficacy results for capecitabine monotherapy show response rates of 19% and 26% and an overall survival of 8.1 and 10.0 months in studies by Koizumi et al 2003 (Koizumi W, Kurihara M, Sasai T, et al. *Cancer* 1993; 72:658-62; Sakamoto J, Chin K, Kondo K, et al. *Anti-Cancer Drugs* 2006; 17:2331-6. For capecitabine in combination with platinum, there are a number of studies showing response rates ranging from 28% to 65%, time to progression from 5.8 to 9 months, and overall survival from 10.1 to 12 months (Kang Y, Kang W K, Shin D B, et al. *J Clin Oncology* 2006; 24 Suppl 18: abstract LBA4018; Park Y, Kim B, Ryoo B, et al. *Proc Am Soc Clin Oncol* 2006; 24 Suppl 18: abstract 4079; Kim T W, Kang Y K, Ahn J H, et al. *Ann Oncol* 2002; 13:1893-8; Park Y H, Kim B S, Ryoo B Y, et al. *Br J Cancer* 2006; 94:959-63).

III. Selecting Patients for Therapy

Detection of HER2 can be used to select patients for treatment in accordance with the present invention. Several FDA-approved commercial assays are available to identify HER2-positive cancer patients. These methods include HERCEPTEST® (Dako) and PATHWAY® HER2 (immunohistochemistry (IHC) assays) and PathVysion® and HER2 FISH pharmDx™ (FISH assays). Users should refer to the package inserts of specific assay kits for information on the validation and performance of each assay.

For example, HER2 overexpression may be analyzed by IHC, e.g. using the HERCEPTEST® (Dako). Paraffin embedded tissue sections from a tumor biopsy may be subjected to the IHC assay and accorded a HER2 protein staining intensity criteria as follows:

Score 0 no staining is observed or membrane staining is observed in less than 10% of tumor cells.

Score 1+ a faint/barely perceptible membrane staining is detected in more than 10% of the tumor cells. The cells are only stained in part of their membrane.

Score 2+ a weak to moderate complete membrane staining is observed in more than 10% of the tumor cells.

Score 3+ a moderate to strong complete membrane staining is observed in more than 10% of the tumor cells.

Those tumors with 0 or 1+ scores for HER2 overexpression assessment may be characterized as HER2-negative, whereas those tumors with 2+ or 3+ scores may be characterized as HER2-positive.

Tumors overexpressing HER2 may be rated by immunohistochemical scores corresponding to the number of copies of HER2 molecules expressed per cell, and can been determined biochemically:

0=0-10,000 copies/cell,
1+=at least about 200,000 copies/cell,
2+=at least about 500,000 copies/cell,
3+=at least about 2,000,000 copies/cell.

Overexpression of HER2 at the 3+ level, which leads to ligand-independent activation of the tyrosine kinase (Hudziak et al., *Proc. Natl. Acad. Sci. USA*, 84:7159-7163 (1987)), occurs in approximately 30% of breast cancers, and in these patients, relapse-free survival and overall survival are diminished (Slamon et al., *Science*, 244:707-712 (1989); Slamon et al., *Science*, 235:177-182 (1987)).

The presence of HER2 protein overexpression and gene amplification are highly correlated, therefore, alternatively, or additionally, the use of in situ hybridization (ISH), e.g. fluorescent in situ hybridization (FISH), assays to detect gene amplification may also be employed for selection of patients appropriate for treatment in accordance with the present invention. FISH assays such as the INFORM™ (sold by Ventana, Arizona) or PathVysion® (Vysis, Illinois) may be carried out on formalin-fixed, paraffin-embedded tumor tissue to determine the extent (if any) of HER2 amplification in the tumor.

Most commonly, HER2-positive status is confirmed using archival paraffin-embedded tumor tissue, using any of the foregoing methods.

Preferably, HER2-positive patients having a 2+ or 3+ IHC score or who are FISH or ISH positive are selected for treatment in accordance with the present invention.

See also U.S. Pat. No. 7,981,418 and Example 11 for alternative assays for screening patients for therapy with Pertuzumab.

IV. Pharmaceutical Formulations

Therapeutic formulations of the HER2 antibodies used in accordance with the present invention are prepared for storage by mixing an antibody having the desired degree of purity with optional pharmaceutically acceptable carriers, excipients or stabilizers (*Remington's Pharmaceutical Sciences* 16th edition, Osol, A. Ed. (1980)), generally in the form of lyophilized formulations or aqueous solutions. Antibody crystals are also contemplated (see US Pat Appln 2002/0136719). Acceptable carriers, excipients, or stabilizers are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as TWEEN™, PLURONICS™ or polyethylene glycol (PEG). Lyophilized antibody formulations are described in WO 97/04801, expressly incorporated herein by reference.

Lyophilized antibody formulations are described in U.S. Pat. Nos. 6,267,958, 6,685,940 and 6,821,515, expressly incorporated herein by reference. The preferred HERCEPTIN® (Trastuzumab) formulation is a sterile, white to pale yellow preservative-free lyophilized powder for intravenous (IV) administration, comprising 440 mg Trastuzumab, 400 mg α,α-trehalose dehydrate, 9.9 mg L-histidine-HCl, 6.4 mg L-histidine, and 1.8 mg polysorbate 20, USP. Reconstitution of 20 mL of bacteriostatic water for injection (BWFI), containing 1.1% benzyl alcohol as a preservative, yields a multi-dose solution containing 21 mg/mL Trastuzumab, at pH of approximately 6.0. For further details, see the Trastuzumab prescribing information.

The preferred Pertuzumab formulation for therapeutic use comprises 30 mg/mL Pertuzumab in 20 mM histidine acetate, 120 mM sucrose, 0.02% polysorbate 20, at pH 6.0. An alternate Pertuzumab formulation comprises 25 mg/mL Pertuzumab, 10 mM histidine-HCl buffer, 240 mM sucrose, 0.02% polysorbate 20, pH 6.0.

The formulation of the placebo used in the clinical trials described in the Examples is equivalent to Pertuzumab, without the active agent.

The formulation herein may also contain more than one active compound as necessary for the particular indication being treated, preferably those with complementary activities that do not adversely affect each other. Various drugs which can be combined with the HER dimerization inhibitor are described in the Method Section below. Such molecules are suitably present in combination in amounts that are effective for the purpose intended.

The formulations to be used for in vivo administration must be sterile. This is readily accomplished by filtration through sterile filtration membranes.

V. Treatment Methods

In a first aspect of a treatment method herein, a method for extending progression free survival (PFS) in a HER2-positive breast cancer patient population by 6 months or more is provided which comprises administering Pertuzumab, Trastuzumab and chemotherapy (e.g. taxane such as Docetaxel) to the patients in the population. Optionally, the patient population includes a suitable number of patients (e.g. 200 or more, 300 or more or 400 or more patients) so that a statistically significant extension of PFS in the population can be evaluated.

The phase III CLEOPATRA clinical data in Example 3 below show that median PFS assessed by investigators was 12.4 months with placebo plus Trastuzumab plus Docetaxel and 18.5 months with Pertuzumab plus Trastuzumab plus Docetaxel, thus the improvement in median PFS was 6 months or more (e.g. 6.1 months) relative to patients not receiving Pertuzumab (i.e. patients only receiving Trastuzumab and Docetaxel).

In an additional or alternative embodiment, a method of obtaining an objective response rate of 80% or more in a HER2-positive breast cancer patient population is provided which comprises administering Pertuzumab, Trastuzumab and chemotherapy (e.g. taxane, such as Docetaxel) to the patients in the population.

In a related aspect, a method of combining two HER2 antibodies to treat HER2-positive cancer without increasing cardiac toxicity in a HER2-positive cancer patient population is provided which comprises administering Pertuzumab, Trastuzumab, and chemotherapy to the patients in the population. Optionally, the patient population includes a suitable number of patients (e.g. 200 or more, 300 or more or 400 or more patients) so that a statistically significant assessment of lack of cardiac toxicity resulting from the combination can be made. The phase III CLEOPATRA clinical data in Example 3 below show that combining Pertuzumab and Trastuzumab does not exacerbate cardiac toxicity. Cardiac toxicity can be monitored for incidence of symptomatic left ventricular systolic dysfunction (LVSD) or congestive heart failure (CHF), or decrease in left ventricular ejection fraction (LVEF), e.g. as disclosed in Example 3 below.

Optionally, the breast cancer is metastatic or locally recurrent, unresectable breast cancer, or de novo Stage IV disease, is defined as immunohistochemistry (IHC) 3+ and/or fluorescence in situ hybridization (FISH) amplification ratio ≥2.0.

Optionally, the patients in the population have not received previous treatment or have relapsed after adjuvant therapy, have a left ventricular ejection fraction (LVEF) of ≥50% at baseline, and/or have an Eastern Cooperative Oncology Group performance status (ECOG PS) of 0 or 1.

In an alternative embodiment, the invention concerns a method of treating early-stage HER2-positive breast cancer comprising administering Pertuzumab, Trastuzumab, and chemotherapy to a patient with the breast cancer, wherein the chemotherapy comprises anthracycline-based chemotherapy, or carboplatin-based chemotherapy. This aspect of the invention is supported by the clinical data in Example 5. In one embodiment, the chemotherapy comprises anthracycline-based chemotherapy, e.g. comprising 5-FU, epirubicin, and cyclophosphamide (FEC). In an alternative embodiment, the chemotherapy comprises carboplatin-based chemotherapy, e.g. comprising taxane (e.g. Docetaxel), Carboplatin in addition to HERCEPTIN®/Trastuzumab (e.g. TCH regimen). In one embodiment, Pertuzumab is administered concurrently with the anthracycline-based chemotherapy or with the carboplatin-based chemotherapy, e.g. wherein the Pertuzumab, Trastuzumab and chemotherapy are administered in 3-week cycles with Pertuzumab, Trastuzumab and the chemotherapy being administered on day-1 of each cycle. The data in the examples herein demonstrates that Pertuzumab administration does not increase cardiac toxicity relative to the treatment without Pertuzumab (i.e relative to Trastuzumab with anthrycline-based chemotherapy (e.g. FEC) and no Pertuzumab; or relative to Trastuzumab with carboplatin-based chemotherapy and no Pertuzumab (i.e. TCH). The early-stage HER2-positive breast cancer therapy contemplated herein includes neoadjuvant and adjuvant therapy.

The invention herein also concerns a method of treating HER2-positive cancer in a patient comprising co-administering a mixture of Pertuzumab and Trastuzumab from the same intravenous bag to the patient. This embodiment is applicable to treatment of any HER2-positive cancer, including HER2-positive breast cancer, HER2-positive gastric cancer, HER2-positive metastatic or locally recurrent, unresectable breast cancer, or de novo Stage IV disease, early-stage HER2-positive breast cancer, etc. Optionally, this method further comprises administering chemotherapy to the patient.

In yet another embodiment, the treatment methods of the present invention comprise, consist essentially of, or consist of the administration of Pertuzumab, Trastuzumab and a chemotherapy, such as a platin (e.g. cisplatin) and/or a fluoropurimidine (e.g. capecitabine and/or 5-fluorouracil (5-FU)) to treat HER2-positive gastric cancer.

In particular, the treatment methods of the present invention comprise, consist essentially of, or consist of the administration of Pertuzumab, Trastuzumab, and a chemotherapy, such as a platin and/or a fluoropurimidine, e.g. cisplatin and/or capecitabine and/or 5-fluorouracil (5-FU), to a human patient with metastatic gastric cancer, non-resectable locally advanced gastric cancer, or post-operatively recurrent gastric cancer. In certain embodiments, the gastric cancer is not amenable to curative therapy.

In an alternative embodiment, a method of treating HER2-positive breast cancer in a patient is provided comprising administering Pertuzumab, Trastuzumab and vinorelbine to the patient. The breast cancer according to this embodiment is optionally metastatic or locally advanced. Optionally, the patient has not previously received systemic non-hormonal anticancer therapy in the metastatic setting.

In another aspect, the invention provides a method of treating HER2-positive breast cancer in a patient comprising administering Pertuzumab, Trastuzumab, and aromatase inhibitor (e.g. anastrazole or letrozole) to the patient. According to this embodiment, the breast cancer is advanced breast cancer, including hormone receptor-positive breast cancer such as estrogen receptor (ER)-positive and/or progesterone receptor (PgR)-positive breast cancer. Optionally, the patient has not previously received systemic nonhormonal anticancer therapy in the metastatic setting. This treatment method optionally further comprises administering induction chemotherapy (e.g. comprising taxane) to the patient.

Therapy in accordance with the present invention extends progression-free survival (PFS) and/or overall survival (OS) of the patient treated.

The antibodies and chemotherapeutic treatments are administered to a human patient in accord with known methods. Specific administration schedules and formulations are described in the examples herein.

According to one embodiment, Pertuzumab is administered at a dose that produces a steady-state $C_{min}$ of ≥20 g/mL in 90% of patients receiving Pertuzumab and Trastuzumab.

According to one particular embodiment of the invention, a Pertuzumab of approximately 840 mg (loading dose) is administered, followed by one or more doses of approximately 420 mg (maintenance dose(s)) of the antibody. The maintenance doses are preferably administered about every 3 weeks, for a total of at least two doses, until clinical progressive disease, or unmanageable toxicity, preferably up to about 6, or 7, or 8, or 9, or 10, or 11, or 12, or 13, or 14, or 15, or 16, or 17 or more doses. Longer treatment periods, including more treatment cycles, are also contemplated.

According to another particular embodiment, Pertuzumab is administered at a dose of 840 mg for all treatment cycles.

Trastuzumab typically is administered as an intravenous loading dose of about 8 mg/kg, followed by the administration of 6 mg/kg doses in subsequent cycles. Trastuzumab is typically administered every 3 weeks until clinical progressive disease or unmanageable toxicity, preferably up to about 17 or more doses.

In a particular embodiment, Trastuzumab is administered as an intravenous (IV) infusion on Day 1 of each treatment cycle until investigator-assessed disease progression or unmanageable toxicity, at a loading dose of 8 mg/kg for Cycle 1 and a dose of 6 mg/kg for subsequent cycles.

In another particular embodiment, Pertuzumab is administered as an IV infusion on Day 1 of each cycle, for a total of six cycles or until investigator assessed disease progression or unmanageable toxicity, whichever occurs first, either at a loading dose of 840 mg for Cycle 1 and a dose of 420 mg for the subsequent cycles, or a loading dose of 840 mg for Cycle 1 and a dose of 840 mg for the subsequent cycles.

For treating gastric cancer, Cisplatin 80 mg/m$^2$ is typically administered as an IV infusion on Day 1 of each cycle, for a total of at least six cycles.

For treating gastric cancer, Capecitabine 1000 mg/m$^2$ is typically administered orally twice daily, from the evening of Day 1 to the morning of Day 15 of each cycle, for a total of at least six cycles. Capecitabine administration may be prolonged at the discretion of the attending clinician after careful risk-benefit assessment for individual patients.

Dosages and schedules for chemotherapy used to treat HER2-positive breast cancer are disclosed in the examples below, but other dosages and schedules are known and contemplated according to the invention herein.

VI. Articles of Manufacture

One embodiment of an article of manufacture herein comprises an intravenous (IV) bag containing a stable mixture of Pertuzumab and Trastuzumab suitable for administration to a cancer patient. Optionally, the mixture is in saline solution; for example comprising about 0.9% NaCl or about 0.45% NaCl. An exemplary IV bag is a polyolefin or polyvinyl chloride infusion bag, e.g. a 250 mL IV bag. According to one embodiment of the invention, the mixture includes about 420 mg or about 840 mg of Pertuzumab and from about 200 mg to about 1000 mg of Trastuzumab (e.g. from about 400 mg to about 900 mg of Trastuzumab).

Optionally, the mixture in the IV bag is stable for up to 24 hours at 5° C. or 30° C. Stability of the mixture can be evaluated by one or more assays selected from the group consisting of: color, appearance and clarity (CAC), concentration and turbidity analysis, particulate analysis, size exclusion chromatography (SEC), ion-exchange chromatography (IEC), capillary zone electrophoresis (CZE), image capillary isoelectric focusing (iCIEF), and potency assay.

Figure 8:
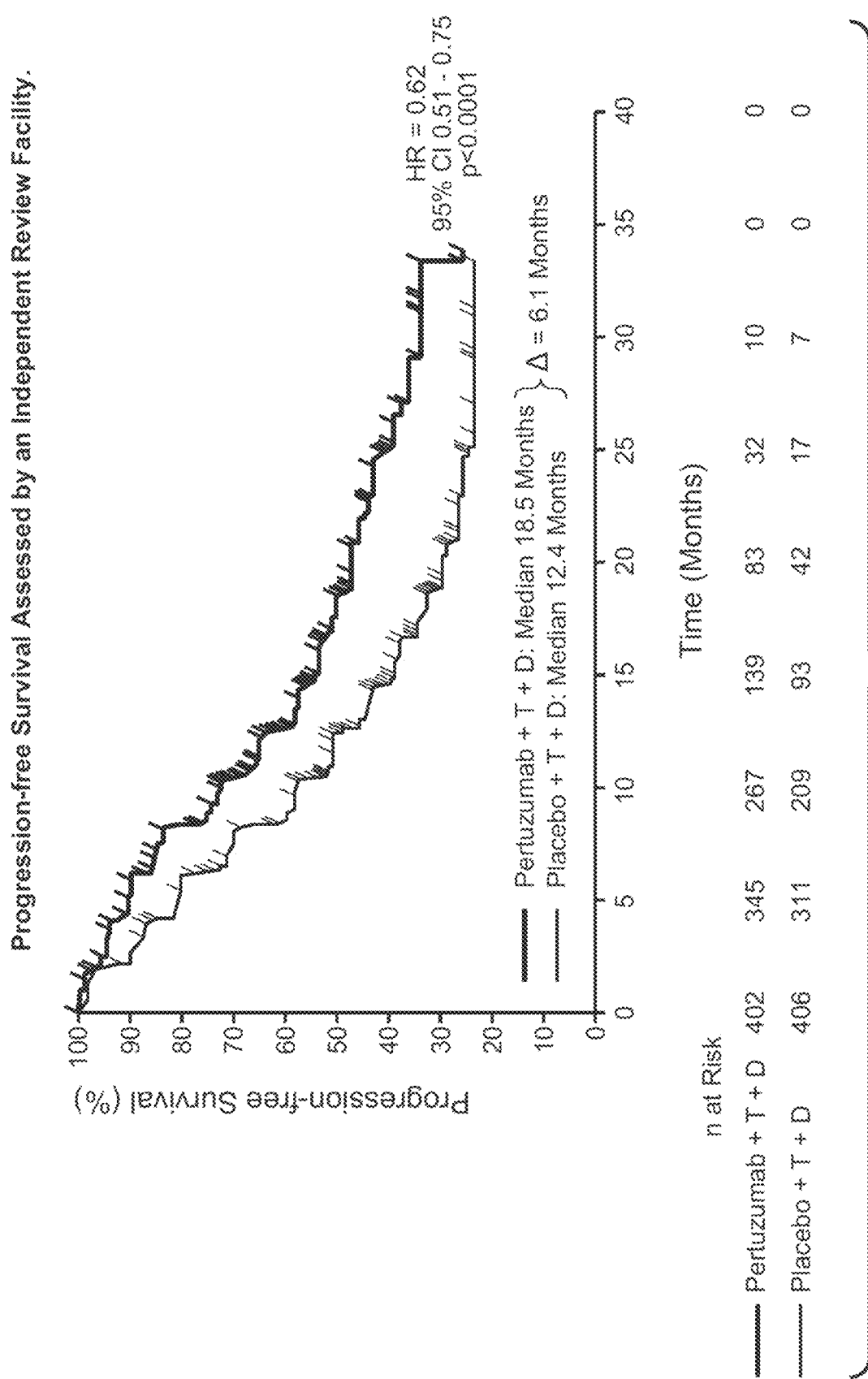
FIG. 8 is a Kaplan-Meier Curve of Progression-Free Survival (PFS) as assessed by an Independent Review Facility (IRF) for the study in Example 3.
Figure 10:
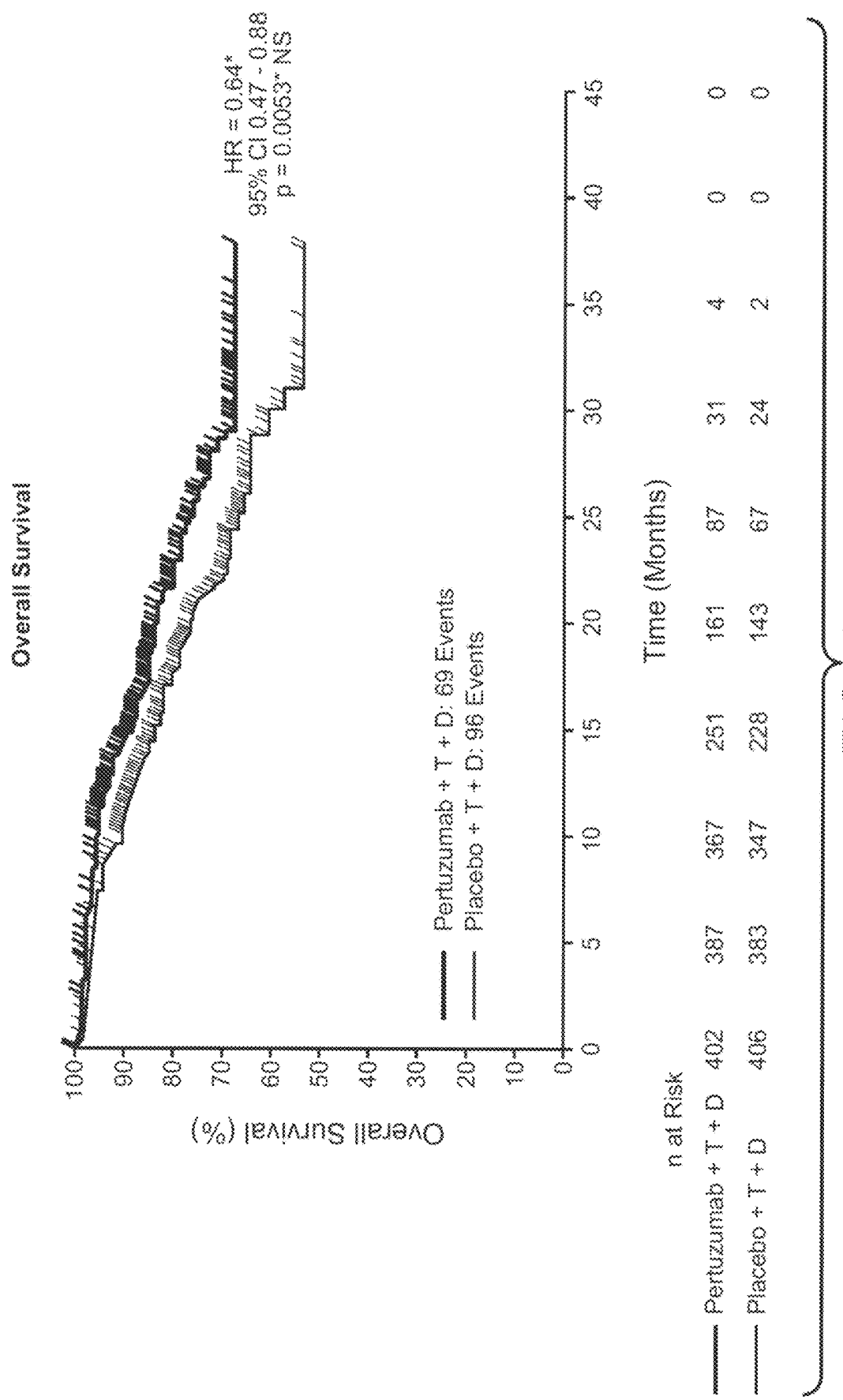
FIG. 10 depicts overall survival for the study in Example 3.

In an alternative embodiment, the invention provides an article of manufacture comprising a vial with Pertuzumab therein and a package insert, wherein the package insert provides the safety data in Table 3 or Table 4 and/or the efficacy data in Table 2, Table 5, FIG. 8, or FIG. 10.

Optionally, the vial is a single-dose vial containing about 420 mg of Pertuzumab. In one embodiment, the vial is provided inside a cardboard carton.

In a related aspect, the invention concerns a method of making an article of manufacture comprising packaging together a vial with Pertuzumab therein and a package insert, wherein the package insert provides the safety data in Table 3 or Table 4 and/or the efficacy data in Table 2, Table 5, FIG. 8, or FIG. 10.

In a further related aspect, the invention provides a method of ensuring safe and effective use of Pertuzumab comprising packaging together a vial with Pertuzumab therein and a package insert, wherein the package insert provides the safety data in Table 3 or Table 4 and/or the efficacy data in Table 2, Table 5, FIG. 8, or FIG. 10.

VII. Deposit of Biological Materials

The following hybridoma cell lines have been deposited with the American Type Culture Collection, 10801 University Boulevard, Manassas, VA 20110-2209, USA (ATCC):

| Antibody Designation | ATCC No. | Deposit Date |
|---|---|---|
| 4D5 | ATCC CRL 10463 | May 24, 1990 |
| 2C4 | ATCC HB-12697 | Apr. 8, 1999 |

Further details of the invention are illustrated by the following non-limiting Examples. The disclosures of all citations in the specification are expressly incorporated herein by reference.

Example 1

Phase IIa Study Evaluating Pertuzumab in Combination with Trastuzumab and Chemotherapy in Patients with HER2-Positive Advanced Gastric Cancer Despite a sharp worldwide decline in incidence and a reduction in mortality during the second half of the twentieth century, gastric cancer remains the world's second leading cause of cancer mortality, after lung cancer (Parkin, D. *Oncogene* 23:6329-40 (2004)). The incidence of gastric cancer varies widely according to geographic region (Kelley et al. *J Clin Epidemiol* 56:1-9 (2003); Plummer et al. Epidemiology of gastric cancer. In: Butlet et al., editors. Mechanisms of carcinogenesis: contribution of molecular epidemiology. Lyon: IARC Scientific Publications No 157, IARC (2004)). In Japan, Korea, China, and certain countries in Central and South America, the incidence is 20 to 95 cases per 100,000 men. In contrast, in the United States, India, and Thailand, the incidence is 4 to 8 cases per 100,000 men. The incidence in Western Europe ranges from 37 cases per 100,000 men in parts of Italy to 12 per 100,000 men in France. The incidence in women follows a similar geographic pattern but is about 50% lower than that in men. There are clear epidemiological differences between cancer localized to the gastric cardia (gastroesophageal junction) and that localized to the rest of the stomach. Cancer of the cardia accounts for 39% of gastric cancer cases in white men in the United States but only 4% of gastric cancers in men in Japan. For reasons that are not clear, cancer of the gastric cardia and lower esophagus has increased rapidly in developed countries since the 1970s.

To date, the only potentially curative treatment for gastric cancer is surgery. Survival rates for gastric cancer improved significantly in Japan in recent years as a result of earlier detection and better surgical techniques (Inoue et al. *Postgrad Med J* 81:419-24 (2005)). However, in Western Europe and North America, gastric cancer is often diagnosed at a late stage when resection is no longer possible. Consequently, the overall 5-year survival in these populations does not exceed 25% (Ajani, J. *The Oncologist* 10 Suppl 3:49-58 (2005); Catalano et al. *Clin Rev Oncol/Hematol* 54: 209-41 (2005)).

Regardless of their geographic region, patients with unresectable disease due to locally advanced growth or metastatic spread have a poor prognosis, with overall 5-year survival within the range of 5%-15% (Cunningham et al., *Annals of Oncology* 16 Suppl 1:i22-3(2005)). For patients with unresectable disease at diagnosis and for patients with recurrent disease after surgery, the main therapeutic option is chemotherapy (National Comprehensive Cancer Network. NCCN clinical practice guidelines in oncology. Gastric cancer. Version 1. National Comprehensive Cancer Network, (2006)). Chemotherapy given with palliative intent has been shown to be superior to best supportive care in patients with advanced gastric cancer (Wagner et al. *J Clin Oncol* 24:2903-9 (2006)).

Study BO18255 (ToGA) was a randomized, open-label, multicenter, international, comparative Phase III trial designed to evaluate the efficacy and safety of Trastuzumab in combination with chemotherapy compared with chemotherapy alone as first-line therapy in patients with inoperable, locally advanced or recurrent and/or metastatic HER2-positive adenocarcinoma of the stomach or gastroesophageal junction. The primary objective of the study was to compare overall survival for patients treated with Trastuzumab combined with fluoropyrimidine (5-FU or capecitabine) plus cisplatin. The results from Study BO18255 demonstrated a significant clinical benefit when Trastuzumab was used in combination with chemotherapy in patients with gastric cancer. Overall survival, the primary endpoint, was significantly improved in the Trastuzumab plus chemotherapy arm compared with the chemotherapy alone arm (p=0.0045, log-rank test; hazard ratio, 0.74). The median survival time was 13.8 months in the Trastuzumab plus chemotherapy arm and 11.1 months in the chemotherapy alone arm, and the risk of death was decreased by 26% for patients in the Trastuzumab plus chemotherapy arm. All other secondary endpoints demonstrated clinical significance with similar hazard and odds ratios. (See, e.g. Bang et al., *Lancet* 28; 376(9742):687-97 (2010)).

As a result of this study, Trastuzumab is now indicated, including the EU and United States, in combination with cisplatin plus capecitabine or 5-FU, for the treatment of patients with HER2-positive metastatic gastric or gastroesophageal junction adenocarcinoma who have not received prior treatment for metastatic disease.

At present, there is no single, standard, globally accepted chemotherapeutic regimen for advanced gastric cancer. Despite the success of the ToGA trial, there is a great need for providing new and effective treatment options for this serious condition. In particular, there is a need for novel therapeutic approaches that aim to avoid treatment-related morbidity and/or to increase survival in gastric cancer patients. Accordingly, this example is a randomized, multi-center, open-label study evaluating two different doses of Pertuzumab in patients with HER2-positive adenocarcinoma of the stomach or gastroesophageal junction. Patients are randomized in a 1:1 ratio to two treatment arms. Patients in Arm A receive a Pertuzumab loading dose of 840 mg for Cycle 1 and a dose of 420 mg for Cycles 2-6, and patients in Arm B receive Pertuzumab 840 mg for all six cycles. Patients in both treatment arms receive Trastuzumab, cisplatin, and capecitabine. Study schema are in FIG. 6. The length of the study is approximately 24 months (4 months for recruitment and 20 months of follow-up after last patient recruited). The end of study will be when progressive disease has occurred in all patients, or all patients have withdrawn or discontinued from the study, whichever is earlier.

Target Population

The trial involves approximately 30 patients.

Patients Must Meet the Following Criteria for Study Entry:

Histologically confirmed adenocarcinoma of the stomach or gastroesophageal junction with inoperable locally advanced or metastatic disease, not amenable to curative therapy.

Patients with advanced disease who present with a recurrence post-operatively (when intent of surgery was cure) are also eligible for entry.

Measurable disease, according to the Response Evaluation Criteria in Solid Tumors (RECIST), v1.1, assessed using imaging techniques (computed tomography (CT) or magnetic resonance imaging (MRI)), or non-measurable disease that can be followed.

HER2-positive tumor defined as either IHC 3+ or IHC 2+ in combination with ISH+, as assessed by central laboratory on primary or metastatic tumor. ISH positivity is defined as a ratio of ≥2.0 for the number of HER2 gene copies to the number of signals for CEP17.

Availability of formalin-fixed paraffin-embedded (FFPE) tissue with at least 5 mm of invasive tumor for central confirmation of HER2 eligibility is mandatory.

Eastern Cooperative Oncology Group (ECOG) Performance Status of 0 or 1.

Baseline left ventricular ejection fraction (LVEF) 55% (measured by echocardiogram (ECHO) or multiple-gated acquisition (MUGA) scan).

Life expectancy of at least 3 months.

Male or female.

Age ≥18 years.

Signed informed consent.

For women of childbearing potential and male participants with partners of childbearing potential: agreement to use a highly effective non-hormonal form of contraception or two effective forms of non-hormonal contraception by the patient and/or partner.

Contraception use must continue for the duration of study treatment and for at least 6 months after the last dose of study medication.

Patients Who Meet any of the Following Criteria are Excluded from Study Entry:

Previous chemotherapy for advanced or metastatic disease, except that prior adjuvant or neoadjuvant therapy is allowed if at least 6 months has elapsed between completion of adjuvant or neoadjuvant therapy and enrollment in the study.

Adjuvant or neoadjuvant therapy with a platin is not allowed.

Lack of physical integrity of the upper gastrointestinal tract or malabsorption syndrome (e.g., patients with partial or total gastrectomy can enter the study, but not those with a jejunostomy probe).

Active (significant or uncontrolled) gastrointestinal bleeding.

Residual relevant toxicity resulting from previous therapy (e.g., neurological toxicity of ≥Grade ≥2 (NCI CTCAE)), with the exception of alopecia.

Other malignancy within the last 5 years, except for carcinoma in situ of the cervix, or basal cell carcinoma.

Any of the following abnormal laboratory tests immediately prior to randomization:

Serum total bilirubin >1.5 times the upper limit of normal (ULN) or, for patients with known Gilberts syndrome, serum total bilirubin >2×ULN For patients with no liver and no bone metastases: AST or ALT>2.5×ULN, and alkaline phosphatase (ALP)>2.5×ULN In patients with liver metastases and no bone metastases: AST or ALT>5×ULN, and ALP>2.5×ULN In patients with liver metastases and bone metastases: AST or ALT>5×ULN, and ALP>10×ULN;

In patients with bone metastases and no liver metastases: AST or ALT>2.5×ULN, and ALP>10×ULN Albumin <25 g/L Creatinine clearance <60 mL/min Total white blood cell (WBC) count <2500/μL (<2.5×10$^9$/L)

Absolute neutrophil count (ANC)<1500/μL (<1.5×10$^9$/L)

Platelets <100,000/μL (<100×10$^9$/L)

Serious cardiac illness or medical conditions including but not confined to:

history of documented heart failure or systolic dysfunction (LVEF<50%);

high-risk uncontrolled arrhythmias, such as atrial tachycardia with a heart rate ≥100/min at rest;

significant ventricular arrhythmia (ventricular tachycardia) or higher-grade AV block (second-degree AV block Type 2 (Mobitz II) or third-degree AV block);

angina pectoris requiring anti-anginal medication;

clinically significant valvular heart disease;

evidence of transmural infarction on ECG; poorly controlled hypertension (e.g., systolic blood pressure >180 mmHg or diastolic blood pressure >100 mmHg);

dyspnea at rest due to complications of advanced malignancy or other disease, or requirement for supportive oxygen therapy;

treatment with chronic or high-dose corticosteroid therapy;

inhaled steroids and short courses of oral steroids for anti-emesis or as an appetite stimulant are allowed;

clinically significant hearing abnormality; known dihydropyrimidine dehydrogenase deficiency;

history or clinical evidence of brain metastases; serious uncontrolled systemic intercurrent illness (e.g., infections or poorly controlled diabetes).

Pregnant or lactating

Women of childbearing potential must have a negative serum pregnancy test within 7 days prior to randomization, irrespective of the method of contraception used.

Radiotherapy within 4 weeks prior to start of study treatment, or within 2 weeks prior to start of study treatment if palliative radiotherapy is given to bone metastatic site peripherally and patient recovers from any acute toxicity.

Major surgery within 4 weeks prior to start of study treatment, without complete recovery.

Known active infection with HIV, hepatitis B virus, or hepatitis C virus.

Known hypersensitivity to any of the study drugs.

Inability to comply with follow-up testing or procedures, as determined by the investigator.

Investigational Medical Products: Dose, Route and Regimen

Treatment cycles are 3 weeks in length.

Trastuzumab is administered as an intravenous (IV) infusion on Day 1 of each cycle until investigator-assessed disease progression or unmanageable toxicity, at a loading dose of 8 mg/kg for Cycle 1 and a dose of 6 mg/kg for subsequent cycles.

Pertuzumab is administered as an IV infusion on Day 1 of each cycle, for a total of six cycles or until investigator assessed disease progression or unmanageable toxicity, whichever occurs first, as follows for each arm:

Arm A: Patients receive Pertuzumab at a loading dose of 840 mg for Cycle 1 and a dose of 420 mg for Cycles 2-6.

Arm B: Patients receive Pertuzumab at 840 mg for Cycles 1-6.

Non-Investigational Medical Products

Treatment cycles are 3 weeks in length.

Cisplatin 80 mg/m$^2$ is administered as an IV infusion on Day 1 of each cycle, for a total of six cycles.

Capecitabine 1000 mg/m² is administered orally twice daily, from the evening of Day 1 to the morning of Day 15 of each cycle, for a total of six cycles. (Capecitabine may be prolonged at the discretion of the investigator after careful risk-benefit assessment for individual patients.)

Formulations

Formulation of Pertuzumab

Each lot of the recombinant antibodies produced for clinical purposes meets viral safety requirements and the United States Pharmacopeia and the European Pharmacopoeia requirements for sterility. Each lot meets the required specifications for identity, purity, and potency.

Pertuzumab is provided as a single-use formulation containing 30 mg/mL Pertuzumab formulated in 20-mM L-histidine-acetate (pH 6.0), 120-mM sucrose, and 0.02% polysorbate 20. Each 20-cc vial (14.0 mL solution per vial) contains approximately 420 mg of Pertuzumab.

Formulation of Trastuzumab

Investigational Trastuzumab is supplied as a freeze-dried preparation at a nominal content of 150 mg per vial in most countries (vial size varies by country).

Trastuzumab is formulated in histidine, trehalose, and polysorbate 20. Once reconstituted, each solution contains 21 mg/mL of active drug at a pH of approximately 6.0.

Assessments

Efficacy

Investigator-assessed tumor response will be used to summarize best overall response at the end of Cycles 3 and 6 for each treatment arm, defined as patients with a complete or partial response as determined by RECIST.

Safety

Safety will be assessed through summaries of adverse events, changes in laboratory test results, and changes in vital signs.

Pharmacokinetics/Pharmacodynamics

Minimum (trough) serum concentration ($C_{min}$) for Pertuzumab at Day 43 will be assessed. In addition, PK parameters such as CL, Vss, AUC, and half-life will be estimated. The evaluation of PK parameters from data collected up to Day 43 will enable modeling and simulation for an estimated dose that predicts a steady-state trough of ≥20 µg/mL in 90% of patients.

Statistical Analyses

Pharmacokinetic Analyses

Individual and mean serum Pertuzumab concentration-time data will be tabulated and plotted by dose level. The serum pharmacokinetics of Pertuzumab will be summarized by estimating total exposure (area under the curve (AUC)), maximum serum concentration ($C_{max}$), minimum serum concentration ($C_{min}$), time to steady-state $C_{max}$ and $C_{min}$, total serum clearance, volume of distribution, and elimination half-life (t½). Estimates for these parameters will be tabulated and summarized by descriptive statistics (mean, standard deviation, minimum, and maximum). Depending on the observed Pertuzumab serum concentration-time data, a population PK approach may be used to estimate the dose that will achieve the PK target concentrations.

Observed $C_{max}$ and $C_{min}$ for Trastuzumab will be tabulated and summarized by descriptive statistics for each specified PK sampling timepoint. For all PK analyses, actual times of sample collection (rather than scheduled) will be used.

PK parameters (AUC, $C_{max}$, t½) of Pertuzumab will be calculated using non-compartmental methods, and the systemic clearance will be derived from the plasma concentrations via standard methods.

Analysis Populations

Intent-to-Treat Population

All randomized patients who receive at least one dose of study medication will be included in the intent-to-treat population (patients will be assigned to treatment groups as randomized for analysis purposes).

Safety Population

All patients who received at least one dose of study medication will be included in the safety-evaluable population (patients will be assigned to treatment groups as treated.)

Sample Size

The purpose of this study is to assess $C_{min}$ for Pertuzumab at Day 43 in patients receiving two different Pertuzumab dose regimens. These data will then be analyzed using a population PK model to identify a dose of Pertuzumab that will achieve a PK target steady-state trough concentration of ≥20 µg/mL in approximately 90% of the advanced gastric cancer patients. Analyses using the assumption that Pertuzumab behaves similarly to Trastuzumab in advanced gastric cancer suggest that with sample size of 15 patients per arm (total of 30 patients in this study), the dose to achieve the desired target concentration can be estimated with an acceptable degree of precision (coefficient of variation <15%).

Clinical Results

The clinical results of this phase IIa gastric cancer (GC) study are shown in FIGS. 32-37.

FIG. 32 shows the samples taken and time points.

FIG. 33 shows the demographics of the patient population in the two arms of the GC study, treated with 420 mg (Arm A) or 840 mg (Arm B) of Pertuzumab.

FIG. 34 shows the GC history of the patients in Arms A and B, respectively.

FIG. 35 shows the patient disposition in Arms A and B, respectively.

FIG. 36 shows the Overall Response Rate in Arms A and B, respectively.

Safety Data

Diarrhea was the most common event occurring in 90% of subjects and was typically Grade 1 and 2 with onset in Cycle 1; no patient discontinued therapy because of diarrhea.

Grade ≥3 adverse events (AEs) (>13%) included diarrhea, stomatitis, fatigue/asthenia, decreased appetite, hyponatremia, anemia, and neutropenia. With the exception of neutropenia and hyponatremia (higher in Arm A) and decreased appetite (higher in Arm B), incidence of these events was similar in the standard and high-dose Pertuzumab arms.

Asymptomatic change in ejection fraction (EF), neutropenic fever, rash, and drug hypersensitivity reaction were not associated with the higher dose of Pertuzumab.

Serious adverse events (SAEs) occurred in 60% of patients, and incidence was not associated with high-dose Pertuzumab.

Although more patients withdrew from treatment in Arm B, it is not clear that this was due to a higher Pertuzumab dose because events peading to treatment discontinuation were not uniform.

Pharmacokinetic (PK) Results

Figure 37:
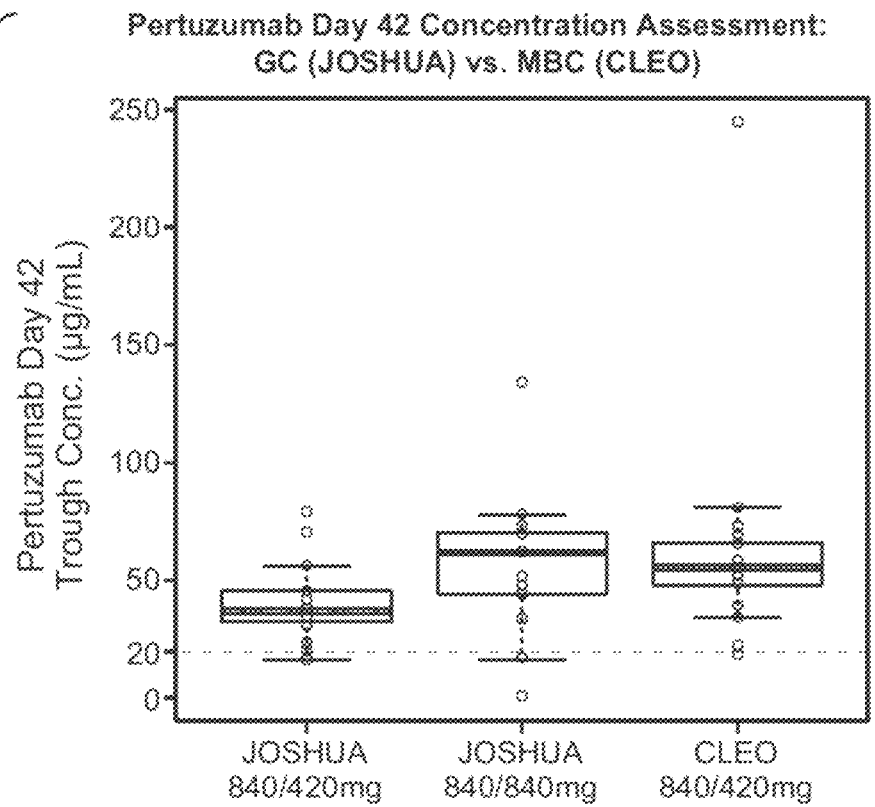
FIG. 37 shows the results of Pertuzumab Day 42 concentration assessment in gastric cancer (GC) versus metastatic breast cancer (MBC). Day 42 Ctrough is ~37% lower in GC (JOSHUA 840/420 mg) vs. MBC (CLEO 840/420 mg). JOSHUA 840/420 mg and 840/840 mg regimens both result in Day 42 Ctrough ≥20 μg/mL in 90% of patients. JOSHUA 840/840 mg regimen results in Day 42 Ctrough in GC comparable to that observed in MBC (CLEO 840/420 mg)

FIG. 37 shows the results of Pertuzumab Day 42 concentration assessment in gastric cancer (GC) (JOSHUA) versus metastatic breast cancer (MBC) (CLEOPATRA).

Summary of the Results

Pertuzumab trough concentrations are lower in GC compared to MBC.
  Between cycle concentrations (i.e. day 7, 14) are in-line with expected MBC concentrations as clearance is linear at these higher concentrations.
  Trough levels with the 840/420 mg dose are about 37% lower compared to the CLEOPATRA trial (Example 3), likely due to non-linear clearance at lower concentrations (incomplete receptor saturation).
840/840 mg dose in GC provides trough concentrations similar to 840/420 mg dose in MBC.
Covariates have no impact on PK.

Conclusions

Based on Pertuzumab PK in GC, 840/840 mg dose will be used for the treatment of gastric cancer. This dose is expected to maintain trough levels above the target of >20 µg/mL in 90% of patients, and provides similar trough levels as those observed in MBC.

Example 2

Phase III Study Evaluating Pertuzumab in Combination with Trastuzumab and Chemotherapy in Patients with HER2-Positive Advanced Gastric Cancer This is a Phase III, randomized, open-label, multicenter clinical study designed to assess the efficacy of Pertuzumab in combination with Trastuzumab and chemotherapy in patients with HER2-positive locally advanced or metastatic gastric cancer.

Patients in the treatment arm receive Trastuzumab, cisplatin, and capecitabine and/or 5-fluorouracil. In the other arm, patients are given either placebo or Pertuzumab.
Treatment Regimens:
  Pertuzumab:
    840 mg dose for cycles 1-6.
  Trastuzumab
    8 mg/kg loading dose followed by 6 mg/kg q3w
  Capecitabine
    1000 mg/m$^2$ bid d1-14 q3w×6
  5-Fluorouracil
    800 mg/m$^2$/day continuous iv infusion d1-5 q3w×6
  Cisplatin
    800 mg/m$^2$ q3w×6
Primary End Point:
  Overall survival (OS)
Secondary End Points:
  Progression-free survival (PFS), time to disease progression (TTP), objective response rate (ORR), Clinical Benefit Rate, Duration of Response, QoL, safety, pain intensity, analgesic consumption, weight change, pharmacokinetics.
Mail Patient Selection Criteria
Inclusion Criteria:
  Adenocarcinoma of stomach or GEJ
  Inoperable locally advanced and/or metastatic disease
  Measurable (RECIST), or non-measurable evaluable disease
  HER2-positive tumor: IHC 2+ or 3+ and/or ISH+
  Adequate organ function and ECOG performance status ≤2
  Written informed consent
Exclusion Criteria
  Previous adjuvant chemotherapy within 6 months
  Chemotherapy for advanced disease
  Congestive heart failure or baseline LVEF<50%
  Creatinine clearance <60 mL/min It is expected that the treatment methods described herein, comprising the administration of Pertuzumab, Trastuzumab and chemotherapy(s), e.g. cisplatin and capecitabine, will meet the primary end point (OS). In particular, it is expected that the treatment methods herein will be therapeutically effective in the gastric cancer patients treated, for example, by extending survival, including overall survival (OS) and/or progression-free survival (PFS) and/or time to disease progression (TTP) and/or objective response rate (ORR) relative to treatment with Trastuzumab and chemotherapy only.

Example 3

Results of a Phase III. Randomized, Double-Bind, Placebo-Controlled Registration Trial to Evaluate the Efficacy and Safety of Placebo+Trastuzumab+Docetaxel Versus Pertuzumab+Trastuzumab+Docetaxel in Patients with Previously Untreated HER2-Positive Metastatic Breast Cancer (CLEOPATRA)

A protocol for evaluating Pertuzumab in HER2-positive metastatic breast cancer is found at Genentech, Inc., "A study to evaluate pertuzumab+trastuzumab+docetaxel vs. placebo+trastuzumab+docetaxel in previously untreated HER2-positive metastatic breast cancer (CLEOPATRA)" (ClinicalTrials.gov Identifier NCT00567190; First received: Dec. 3, 2007; Last updated: Oct. 24, 2012; Last verified October 2012; Retrieved from internet May 8, 2013):1-4 and in US 2009/0137387 as well as WO2009/154651.

This example concerns the clinical data obtained in the randomized, double-blind, placebo-controlled Phase III trial in patients with HER2-positive MBC, who had not received chemotherapy or biologic therapy for their metastatic disease. Patients were randomized 1:1 to receive placebo plus Trastuzumab plus Docetaxel or Pertuzumab plus Trastuzumab plus Docetaxel. The primary endpoint was progression-free survival (PFS), based on tumor assessments. PFS was defined as the time from randomization to the first documented radiographic progressive disease (PD) according to response evaluation criteria in solid tumors (RECIST) version 1.0 (Therasse et al. *J Natl Cancer Inst* 92:205-16 (2000)) or death from any cause, if within 18 weeks of the patient's last tumor assessment. Secondary endpoints included overall survival (OS), PFS by investigator assessment, objective response rate (ORR), and safety.

Patients: Eligible patients had centrally confirmed HER2-positive (defined as immunohistochemistry (IHC) 3+ and/or fluorescence in situ hybridization (FISH) amplification ratio ≥2.0) (Carlson et al. *J Natl Compr Canc Netw* 4 Suppl 3:S1-22 (2006)), locally recurrent, unresectable, or metastatic breast cancer, or de novo Stage IV disease. Patients were aged ≥18 years, had a left ventricular ejection fraction (LVEF) of ≥50% at baseline (determined by echocardiogram or multiple gated acquisition), and an Eastern Cooperative Oncology Group performance status (ECOG PS) of 0 or 1. Patients may have received one hormonal treatment for MBC prior to randomization, or neoadjuvant or adjuvant systemic breast cancer therapy including Trastuzumab and/or taxanes, provided that they experienced a disease-free interval of ≥12 months between completion of neoadjuvant or adjuvant therapy and diagnosis of metastatic disease.

Exclusion criteria included therapy for MBC (other than described above); central nervous system metastases; history of exposure to a cumulative dose of doxorubicin >360 mg/m² or its equivalent; history of LVEF decline to <50% during or after prior Trastuzumab therapy; current uncontrolled hypertension; history of impaired cardiac function; impaired bone marrow, renal, or liver function; current known infection with HIV, HBV, or HCV; pregnancy; lactation; and refusal to use non-hormonal contraception.

Procedures: Patients received a loading dose of 8 mg/kg Trastuzumab, followed by a maintenance dose of 6 mg/kg every 3 weeks until investigator-assessed radiographic or clinical PD, or unmanageable toxicity. Docetaxel was administered every 3 weeks at a starting dose of 75 mg/m², escalating to 100 mg/m² if tolerated. Per protocol, the investigator could reduce the dose by 25% to 55 mg/m² or 75 mg/m² (if the patient had been dose escalated) in order to manage tolerability. It was recommended that patients received at least 6 cycles of Docetaxel. Pertuzumab or placebo was given at a fixed loading dose of 840 mg, followed by 420 mg every 3 weeks until investigator-assessed radiographic or clinical PD, or unmanageable toxicity. In the case of chemotherapy discontinuation due to cumulative toxicity, antibody therapy was continued until PD, unacceptable toxicity, or withdrawal of consent. All drugs were administered intravenously.

Figure 7:
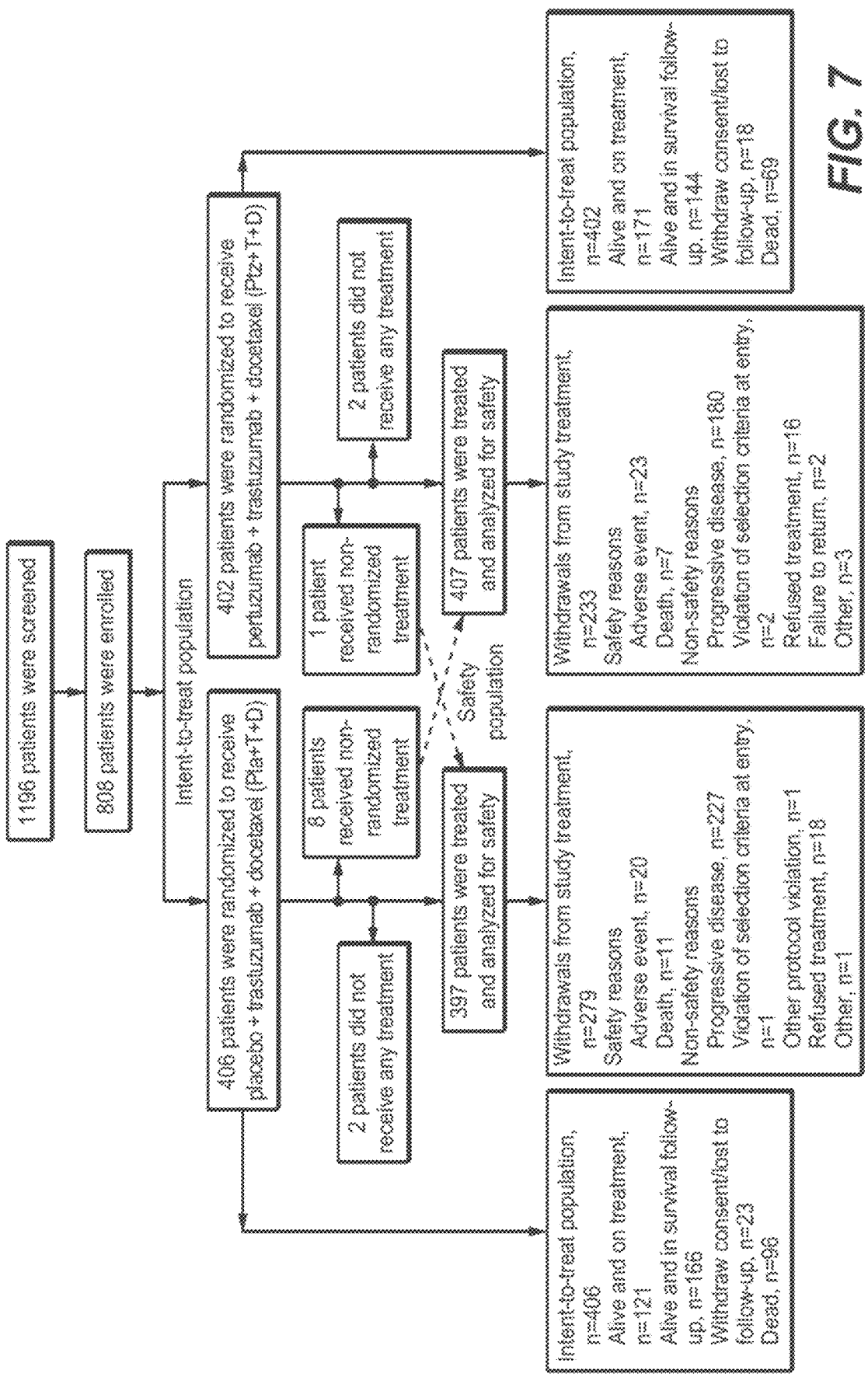
FIG. 7 depicts enrollment, intent-to-treat and safety populations, and patient withdrawals in the study in Example 3.

Assessments: PFS was evaluated by standard RECIST-accepted methodology every 9 weeks by each center and by the IRF until IRF-assessed PD. Assessments of LVEF were performed at baseline, every 9 weeks during the treatment period, at treatment discontinuation, every 6 months in the first year after treatment discontinuation, then annually for up to 3 years in the follow-up period. Laboratory parameters and ECOG status were assessed at every cycle. Adverse events (AEs) were monitored continuously and graded according to NCI-CTCAE version 3.0. All cardiac events and serious adverse events (SAEs) that were ongoing at the time of treatment discontinuation were followed until resolution or stabilization up to 1 year after the final dose. Cardiac events and treatment-related SAEs with onset post-treatment Results Study population: A total of 808 patients were enrolled and randomized to receive placebo plus Trastuzumab plus Docetaxel (n=406) or Pertuzumab plus Trastuzumab plus Docetaxel (n=402) (FIG. 7). Baseline characteristics were similar between treatment arms (Table 1).

TABLE 1

Baseline Characteristics of the Intent-to-Treat Population

|  | Placebo + Trastuzumab + Docetaxel (n = 406) | Pertuzumab + Trastuzumab + Docetaxel (n = 402) |
|---|---|---|
| Sex, n (%) | | |
| Female | 404 (99.5) | 402 (100.0) |
| Age, years | | |
| Median | 54.0 | 54.0 |
| Range | 27-89 | 22-82 |
| Race, n (%) | | |
| Asian | 133 (32.8) | 128 (31.8) |
| Black | 20 (4.9) | 10 (2.5) |
| White | 235 (57.9) | 245 (60.9) |
| Other* | 18 (4.4) | 19 (4.7) |
| Region, n (%) | | |
| Asia | 128 (31.5) | 125 (31.1) |
| Europe | 152 (37.4) | 154 (38.3) |
| North America | 68 (16.7) | 67 (16.7) |
| South America | 58 (14.3) | 56 (13.9) |
| ECOG status, n (%) | | |
| 0 | 248 (61.1) | 274 (68.2) |
| 1 | 157 (38.7) | 125 (31.1) |
| ≥2 | 1 (0.2) | 3 (0.7) |
| Prior treatment status, n (%) | | |
| De novo MBC† | 214 (52.7) | 218 (54.2) |
| Prior adjuvant or neoadjuvant therapy | 192 (47.3) | 184 (45.8) |
| Prior Trastuzumab treatment, n (%) | 41 (10.1) | 47 (11.7) |
| Prior anthracycline treatment, n (%) | 164 (40.4) | 150 (37.3) |
| Prior taxane treatment, n (%) | 94 (23.2) | 91 (22.6) |
| Prior hormone treatment‡, n (%) | 107 (26.4) | 114 (28.4) |
| Disease type at screening, n (%) | | |
| Non-visceral | 90 (22.2) | 88 (21.9) |
| Visceral | 316 (77.8) | 314 (78.1) |
| Hormone receptor status, n (%) | | |
| ER and/or PgR positive | 199 (49.0) | 189 (47.0) |
| ER and PgR negative | 196 (48.3) | 212 (52.7) |
| Unknown | 11 (2.7) | 1 (0.2) |
| HER2 status IHC, n (%) | 405 (100) | 401 (100) |
| 0 and 1+ | 2 (0.5) | 4 (1.0) |
| 2+ | 32 (7.9) | 47 (11.7) |
| 3+ | 371 (91.6) | 350 (87.3) |
| HER2 status FISH, n (%) | 387 (100) | 385 (100) |
| Positive | 383 (99.0) | 384 (99.7) |
| Negative | 4 (1.0) | 1 (0.3) |

Figure 9:
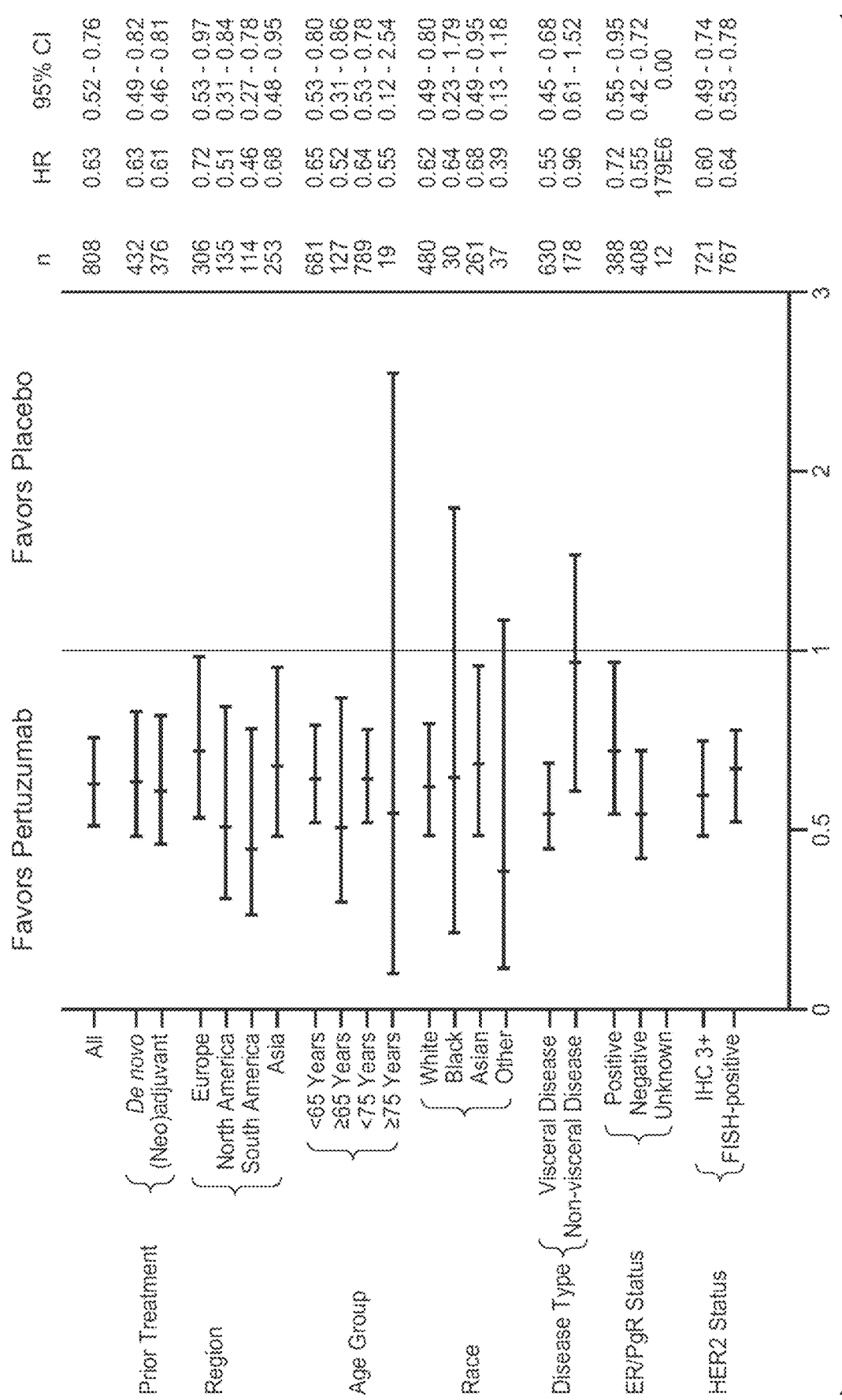
FIG. 9 depicts PFS by Patient Subgroup for the study in Example 3.

*Includes American Indian and Alaska Native
†No prior chemotherapy or biological therapy
‡In the neoadjuvant/adjuvant or metastatic setting Progression-free survival: Treatment with Pertuzumab plus Trastuzumab plus Docetaxel significantly improved PFS-IRF, stratified by prior treatment status and region, compared with placebo plus Trastuzumab plus Docetaxel (HR=0.62; 95% CI 0.51 to 0.75; p<0.0001) (FIG. 8). The median PFS-IVRF was prolonged by 6.1 months from 12.4 months with placebo plus Trastuzumab plus Docetaxel to 18.5 months with Pertuzumab plus Trastuzumab plus Docetaxel. The PFS benefit of Pertuzumab plus Trastuzumab plus Docetaxel treatment was observed across all predefined subgroups (FIG. 9).

Assessment of PFS by investigators closely matched PFS-IRF. Median PFS assessed by investigators was 12.4 months with placebo plus Trastuzumab plus Docetaxel and 18.5 months with Pertuzumab plus Trastuzumab plus Docetaxel (HR=0.65; 95% CI 0.54 to 0.78; p<0.0001).

Key secondary efficacy endpoints: The interim analysis of OS took place when 43% of events (n=165) that are planned for final OS analysis had occurred. More deaths occurred in the placebo plus Trastuzumab plus Docetaxel arm (n=96; 23.6%) than in the Pertuzumab plus Trastuzumab plus Docetaxel arm (n=69; 17.2%) (FIG. 10). The HR (0.64; 95% CI 0.47 to 0.88; p=0.0053) for OS did not meet the O'Brien-Fleming stopping boundary of the Lan-DeMets α-spending function for this interim analysis of survival (HR≤0.603, p≤0.0012), and therefore, was not statistically significant. However, the data showed a strong trend suggestive of a survival benefit in favor of Pertuzumab plus Trastuzumab plus Docetaxel. At the time of data cut-off, patients in both treatments arms had been followed for OS for a median of 19.3 months (Kaplan-Meier estimate). The ORR was 69.3% and 80.2% in the placebo plus Trastuzumab plus Docetaxel arm and Pertuzumab plus Trastuzumab plus Docetaxel arm, respectively The difference in response rates between treatment arms was 10.8% (95% CI 4.2 to 17.5; p=0.0011) (Table 2).

TABLE 2

| Overall Response Rate | Placebo + Trastuzumab + Docetaxel | Pertuzumab + Trastuzumab + Docetaxel |
|---|---|---|
| Patients with IRF-assessed measurable disease at baseline, n (%) | 336 (100) | 343 (100) |
| Objective response rate | 233 (69.3) | 275 (80.2) |
| Complete response rate | 14 (4.2) | 19 (5.5) |
| Partial response rate | 219 (65.2) | 256 (74.6) |
| Stable disease | 70 (20.8) | 50 (14.6) |
| Progressive disease | 28 (8.3) | 13 (3.8) |
| Unable to assess | 2 (0.6) | 2 (0.6) |
| No response assessment | 3 (0.9) | 3 (0.9) |

IRF, independent review facility

Treatment exposure: The median number of cycles administered per patient was 15 and 18 with median time on treatment estimated to be 11.8 and 18.1 months for placebo plus Trastuzumab plus Docetaxel and for Pertuzumab plus Trastuzumab plus Docetaxel, respectively. Dose reductions were not permitted for placebo, Pertuzumab, or Trastuzumab. Patients received a median of eight cycles of Docetaxel in each arm. Based on the safety population, 61 (15.4%) patients in the placebo plus Trastuzumab plus Docetaxel arm received Docetaxel dose escalation to 100 mg/m$^2$ at any cycle compared with 48 (11.8%) patients in the Pertuzumab plus Trastuzumab plus Docetaxel arm. The median Docetaxel dose intensity was 24.8 mg/m$^2$/week in the placebo plus Trastuzumab plus Docetaxel arm and 24.6 mg/m$^2$/week in the Pertuzumab plus Trastuzumab plus Docetaxel arm. Reasons for permanent discontinuation of all study treatment are presented in FIG. 7.

Tolerability and cardiac safety: The AE profile during the treatment period was generally balanced between treatment arms (Table 3). The incidence of the following AEs (all grades) was >5% higher with Pertuzumab plus Trastuzumab plus Docetaxel: diarrhea, rash, mucosal inflammation, febrile neutropenia, and dry skin.

TABLE 3

Adverse Events (All Grades) with ≥25% Incidence in Either Arm or ≥5% Difference Between Arms and Grade ≥3 Adverse Events with ≥2% Incidence in the Safety Population

|  | Placebo + Trastuzumab + Docetaxel (n = 397) | Pertuzumab + Trastuzumab + Docetaxel (n = 407) |
|---|---|---|
| Most common AEs (all grades), n (%) | | |
| Diarrhea | 184 (46.3) | 272 (66.8) |
| Alopecia | 240 (60.5) | 248 (60.9) |
| Neutropenia | 197 (49.6) | 215 (52.8) |
| Nausea | 165 (41.6) | 172 (42.3) |
| Fatigue | 146 (36.8) | 153 (37.6) |
| Rash | 96 (24.2) | 137 (33.7) |
| Decreased appetite | 105 (26.4) | 119 (29.2) |
| Mucosal inflammation | 79 (19.9) | 113 (27.8) |
| Asthenia | 120 (30.2) | 106 (26.0) |
| Edema peripheral | 119 (30.0) | 94 (23.1) |
| Constipation | 99 (24.9) | 61 (15.0) |
| Febrile neutropenia | 30 (7.6) | 56 (13.8) |
| Dry skin | 17 (4.3) | 43 (10.6) |
| Grade ≥3 AEs with an incidence rate ≥2%, n (%) | | |
| Neutropenia | 182 (45.8) | 199 (48.9) |
| Febrile neutropenia | 30 (7.6) | 56 (13.8) |
| Leukopenia | 58 (14.6) | 50 (12.3) |
| Diarrhea | 20 (5.0) | 32 (7.9) |
| Neuropathy peripheral | 7 (1.8) | 11 (2.7) |
| Anemia | 14 (3.5) | 10 (2.5) |
| Asthenia | 6 (1.5) | 10 (2.5) |
| Fatigue | 13 (3.3) | 9 (2.2) |
| Granulocytopenia | 9 (2.3) | 6 (1.5) |
| Left ventricular systolic dysfunction | 11 (2.8) | 5 (1.2) |
| Dyspnea | 8 (2.0) | 4 (1.0) |

AE, adverse event

The incidence of the following grade ≥3 AEs was >2% higher with Pertuzumab plus Trastuzumab plus Docetaxel: neutropenia, febrile neutropenia, and diarrhea (Table 3). The incidence of grade ≥3 febrile neutropenia in patients from Asia was 12% in the placebo plus Trastuzumab plus Docetaxel arm and 26% in the Pertuzumab plus Trastuzumab plus Docetaxel arm; in all other geographical regions the incidence was ≤10% in both arms.

LVSD (all grades) was reported more frequently in the placebo plus Trastuzumab plus Docetaxel arm compared with the Pertuzumab plus Trastuzumab plus Docetaxel arm (8.3% and 4.4%, respectively). Grade ≥3 LVSD was reported in 2.8% of patients receiving placebo plus Trastuzumab plus Docetaxel and in 1.2% of patients receiving Pertuzumab plus Trastuzumab plus Docetaxel. Among patients with a post-baseline LVEF assessment, LVEF declines of ≥10 percentage points from baseline to <50% at any stage during treatment were reported in 6.6% and 3.8% of patients in the placebo plus Trastuzumab plus Docetaxel arm and Pertuzumab plus Trastuzumab plus Docetaxel arm, respectively.

In the safety population, the majority of deaths in both treatment arms were attributed to PD (81 (20.4%) in the placebo arm, 57 (14.0%) in the Pertuzumab arm). Deaths due to causes other than PD were generally balanced and a similar number of patients died due to AEs (10 (2.5%) in the placebo arm, 8 (2.0%) in the Pertuzumab arm), with infections being the most common cause of death due to an AE.

Discussion

These data show that the combination of the anti-HER2 monoclonal antibodies Pertuzumab and Trastuzumab with Docetaxel prolongs PFS in patients with HER2-positive MBC in the first-line setting. Treatment with Pertuzumab plus Trastuzumab plus Docetaxel exceeded expectations by resulting in a statistically significant reduction in PFS risk (HR=0.62) and an improvement in median PFS of 6.1 months.

The combination was well tolerated and Pertuzumab did not increase rates of symptomatic or asymptomatic cardiac dysfunction. Before the data herein, it was expected that treatment with two HER2 antibodies would exacerbate cardiac toxicity. However, these data show this was not the case based on the tests herein for evaluating cardiac toxicity: incidence of symptomatic left ventricular systolic dysfunction (LVSD) including congestive heart failure (CHF), decrease in left ventricular ejection fraction (LVEF).

Pertuzumab-related AEs, including skin rash, mucosal inflammation, and dry skin, were mostly mild. There was an increased rate of grade ≥3 diarrhea and febrile neutropenia with Pertuzumab plus Trastuzumab plus Docetaxel treatment. The control arm in CLEOPATRA had a similar PFS to previous randomized studies that showed that the combination of Trastuzumab and Docetaxel in HER2-positive MBC had a median PFS of 11.7 months Marty et al. *J Clin Oncol* 23:4265-74 (2005).

Without being bound by any one theory, these data indicate that targeting HER2-positive tumors with two anti-HER2 monoclonal antibodies with complementary mechanisms of action results in a more comprehensive blockade of HER2 and highlight the clinical importance of preventing the ligand-dependent formation HER2 dimers to optimally silence HER2 signaling. This study has shown that combined HER2 blockade with Trastuzumab and Pertuzumab improves the outcome of patients with advanced HER2-positive disease in the first-line setting. These data are significant in that they support the first approved use of a HER2 dimerization inhibitor for therapy of HER2-positive cancer patients.

Example 4

Article of Manufacture Including Pertuzumab

The phase III clinical data in Example 3 were used in the development of an article of manufacture comprising a vial (e.g. single-dose vial) with Pertuzumab therein and a package insert providing information about the safety and/or efficacy thereof, as well as a method of making an article of manufacture comprising packaging together Pertuzumab in a vial (e.g. single-dose vial) and a package insert with prescribing information regarding Pertuzumab on a package insert as herein below.

Pertuzumab is a sterile, clear to slightly opalescent, colorless to pale yellow liquid for IV infusion. Each single use vial contains 420 mg of Pertuzumab at a concentration of 30 mg/mL in 20 mM L-histidine acetate (pH 6.0), 120 mM sucrose and 0.02% polysorbate 20.

Pertuzumab is supplied in a single-dose vial containing preservative free liquid concentrate, at a concentration of 30 mg/mL ready for infusion. Each vial of Pertuzumab drug product contains a total of 420 mg Pertuzumab. Store vials in a refrigerator at 2° C. to 8° C. (36° F. to 46° F.) until time of use. Keep vial in the outer carton in order to protect from light.

Full Prescribing Information

---

WARNING: EMBRYO-FETAL TOXICITY
Exposure to PERTUZUMAB can result in embryo-fetal death and birth defects.
Studies in animals have resulted in oligohydramnios, delayed renal development, and death.
Advise patients of these risks and the need for effective contraception. (5.1, 8.1, 8.6)

---

1 Indications and Usage

Pertuzumab is indicated for use in combination with Trastuzumab and docetaxel for the treatment of patients with HER2-positive metastatic breast cancer who have not received prior anti-HER2 therapy or chemotherapy for metastatic disease.

2 Dosage and Administration 2.1 Recommended Doses and Schedules

The initial dose of Pertuzumab is 840 mg administered as a 60-minute intravenous infusion, followed every 3 weeks thereafter by a dose of 420 mg administered as an intravenous infusion over 30 to 60 minutes. When administered with Pertuzumab, the recommended initial dose of Trastuzumab is 8 mg/kg administered as a 90-minute intravenous infusion, followed every 3 weeks thereafter by a dose of 6 mg/kg administered as an intravenous infusion over 30 to 90 minutes. When administered with Pertuzumab, the recommended initial dose of docetaxel is 75 mg/m2 administered as an intravenous infusion. The dose may be escalated to 100 mg/m2 administered every 3 weeks if the initial dose is well tolerated.

2.2 Dose Modification

For delayed or missed doses, if the time between two sequential infusions is less than 6 weeks, the 420 mg dose of Pertuzumab should be administered. Do not wait until the next planned dose. If the time between two sequential infusions is 6 weeks or more, the initial dose of 840 mg Pertuzumab should be re-administered as a 60-minute intravenous infusion followed every 3 weeks thereafter by a dose of 420 mg administered as an intravenous infusion over 30 to 60 minutes. The infusion rate of Pertuzumab may be slowed or interrupted if the patient develops an infusion-associated reaction. The infusion should be discontinued immediately if the patient experiences a serious hypersensitivity reaction [see Warnings and Precautions (5.2)].

Left Ventricular Ejection Fraction (LVEF):

Withhold Pertuzumab and Trastuzumab dosing for at least 3 weeks for either:
 a drop in LVEF to less than 40% or
 LVEF of 40% to 45% with a 10% or greater absolute decrease below pretreatment values [see Warnings and Precautions (5.2)]

Pertuzumab may be resumed if the LVEF has recovered to greater than 45% or to 40% to 45% associated with less than a 10% absolute decrease below pretreatment values.

If after a repeat assessment within approximately 3 weeks, the LVEF has not improved, or has declined further, discontinuation of Pertuzumab and Trastuzumab should be strongly considered, unless the benefits for the individual patient are deemed to outweigh the risks [see Warnings and Precautions (5.2)]. Pertuzumab should be withheld or discontinued if Trastuzumab treatment is withheld or discontinued. If docetaxel is discontinued, treatment with Pertuzumab and Trastuzumab may continue. Dose reductions are not recommended for Pertuzumab. For docetaxel dose modifications, see docetaxel prescribing information.

2.3 Preparation for Administration

Administer as an intravenous infusion only. Do not administer as an intravenous push or bolus. Do not mix Pertuzumab with other drugs.

Preparation: Prepare the solution for infusion, using aseptic technique, as follows:
 Parenteral drug products should be inspected visually for particulates and discoloration prior to administration.
 Withdraw the appropriate volume of Pertuzumab solution from the vial(s).
 Dilute into a 250 mL 0.9% sodium chloride PVC or non-PVC polyolefin infusion bag.
 Mix diluted solution by gentle inversion. Do not shake.
 Administer immediately once prepared.
 If the diluted infusion solution is not used immediately, it can be stored at 2° C. to 8° C. for up to 24 hours.
 Dilute with 0.9% Sodium Chloride injection only. Do not use dextrose (5%) solution.

3 Dosage Forms and Strengths

Pertuzumab 420 mg/14 mL (30 mg/mL) in a single-use vial

4 Contraindications

None

5 Warnings and Precautions 5.1 Embryo-Fetal Toxicity

Pertuzumab can cause fetal harm when administered to a pregnant woman. Treatment of pregnant cynomolgus monkeys with Pertuzumab resulted in oligohydramnios, delayed fetal kidney development, and embryo-fetal death. If Pertuzumab is administered during pregnancy, or if the patient becomes pregnant while receiving this drug, the patient should be apprised of the potential hazard to a fetus [see Use in Specific Populations (8.1)]. Verify pregnancy status prior to the initiation of Pertuzumab. Advise patients of the risks of embryo-fetal death and birth defects and the need for contraception during and after treatment. Advise patients to contact their healthcare provider immediately if they suspect they may be pregnant. If Pertuzumab is administered during pregnancy or if a patient becomes pregnant while receiving Pertuzumab, immediately report exposure to the Genentech Adverse Event Line at 1-888-835-2555. Encourage women who may be exposed during pregnancy to enroll in the MotHER Pregnancy Registry by contacting 1-800-690-6720 [see Patient Counseling Information (17)]. Monitor patients who become pregnant during Pertuzumab therapy for oligohydramnios. If oligohydramnios occurs, perform fetal testing that is appropriate for gestational age and consistent with community standards of care. The efficacy of intravenous hydration in the management of oligohydramnios due to Pertuzumab exposure is not known.

5.2 Left Ventricular Dysfunction

Decreases in LVEF have been reported with drugs that block HER2 activity, including Pertuzumab. In the randomized trial, Pertuzumab in combination with Trastuzumab and docetaxel was not associated with increases in the incidence of symptomatic left ventricular systolic dysfunction (LVSD) or decreases in LVEF compared with placebo in combination with Trastuzumab and docetaxel [see Clinical Studies (14.1)]. Left ventricular dysfunction occurred in 4.4% of patients in the Pertuzumab-treated group and 8.3% of patients in the placebo-treated group. Symptomatic left ventricular systolic dysfunction (congestive heart failure) occurred in 1.0% of patients in the Pertuzumab-treated group and 1.8% of patients in the placebo-treated group [see Adverse Reactions (6.1)]. Patients who have received prior anthracyclines or prior radiotherapy to the chest area may be at higher risk of decreased LVEF. Pertuzumab has not been studied in patients with a pretreatment LVEF value of 50%, a prior history of CHF, decreases in LVEF to <50% during prior Trastuzumab therapy, or conditions that could impair left ventricular function such as uncontrolled hypertension, recent myocardial infarction, serious cardiac arrhythmia requiring treatment or a cumulative prior anthracycline exposure to >360 mg/m$^2$ of doxorubicin or its equivalent. Assess LVEF prior to initiation of Pertuzumab and at regular intervals (e.g., every three months) during treatment to ensure that LVEF is within the institution's normal limits. If LVEF is <40%, or is 40% to 45% with a 10% or greater absolute decrease below the pretreatment value, withhold Pertuzumab and Trastuzumab and repeat LVEF assessment within approximately 3 weeks. Discontinue Pertuzumab and Trastuzumab if the LVEF has not improved or has declined further, unless the benefits for the individual patient outweigh the risks [see Dosage and Administration (2.2)].

5.3 Infusion-Associated Reactions, Hypersensitivity Reactions/Anaphylaxis

Pertuzumab has been associated with infusion and hypersensitivity reactions [see Adverse Reactions (6.1)]. An infusion reaction was defined in the randomized trial as any event described as hypersensitivity, anaphylactic reaction, acute infusion reaction or cytokine release syndrome occurring during an infusion or on the same day as the infusion.

The initial dose of Pertuzumab was given the day before Trastuzumab and docetaxel to allow for the examination of Pertuzumab-associated reactions. On the first day, when only Pertuzumab was administered, the overall frequency of infusion reactions was 13.0% in the Pertuzumab-treated group and 9.8% in the placebo-treated group. Less than 1% were grade 3 or 4. The most common infusion reactions (≥1.0%) were pyrexia, chills, fatigue, headache, asthenia, hypersensitivity, and vomiting. During the second cycle when all drugs were administered on the same day, the most common infusion reactions in the Pertuzumab-treated group (≥1.0%) were fatigue, dysgeusia, hypersensitivity, myalgia, and vomiting. In the randomized trial, the overall frequency of hypersensitivity/anaphylaxis reactions was 10.8% in the Pertuzumab-treated group and 9.1% in the placebo-treated group. The incidence of Grade 3-4 hypersensitivity/anaphylaxis reactions was 2% in the Pertuzumab-treated group and 2.5% in the placebo-treated group according to National Cancer Institute-Common Terminology Criteria for Adverse Events (NCI-CTCAE) (version 3). Overall, 4 patients in Pertuzumab-treated group and 2 patients in the placebo-treated group experienced anaphylaxis. Observe patients closely for 60 minutes after the first infusion and for 30 minutes after subsequent infusions of Pertuzumab. If a significant infusion-associated reaction occurs, slow or interrupt the infusion and administer appropriate medical therapies. Monitor patients carefully until complete resolution of signs and symptoms. Consider permanent discontinuation in patients with severe infusion reactions [see Dosage and Administration (2.2)].

5.4 HER2 Testing

Detection of HER2 protein overexpression is necessary for selection of patients appropriate for Pertuzumab therapy because these are the only patients studied and for whom benefit has been shown [see Indications and Usage (1) and Clinical Studies (14)]. In the randomized trial, patients with breast cancer were required to have evidence of HER2 overexpression defined as 3+ IHC by Dako HERCEPT-EST® or FISH amplification ratio ≥2.0 by Dako HER2 FISH PHARMDX™ test kit. Only limited data were available for patients whose breast cancer was positive by FISH, but did not demonstrate protein overexpression by IHC. Assessment of HER2 status should be performed by laboratories with demonstrated proficiency in the specific technology being utilized. Improper assay performance, including use of sub-optimally fixed tissue, failure to utilize specified reagents, deviation from specific assay instructions, and failure to include appropriate controls for assay validation, can lead to unreliable results.

6 Adverse Reactions

The following adverse reactions are discussed in greater detail in other sections of the label:

Embryo-Fetal Toxicity [see Warnings and Precautions (5.1)]

Left Ventricular Dysfunction [see Warnings and Precautions (5.2)]

Infusion-Associated Reactions, Hypersensitivity Reactions/Anaphylaxis [see Warnings and Precautions (5.3)]

6.1 Clinical Trials Experience

Because clinical trials are conducted under widely varying conditions, adverse reaction rates observed in the clinical trials of a drug cannot be directly compared to rates in the clinical trials of another drug and may not reflect the rates observed in clinical practice. In clinical trials, Pertuzumab has been evaluated in more than 1400 patients with various malignancies and treatment with Pertuzumab was predominantly in combination with other anti-neoplastic agents.

The adverse reactions described in Table 4 were identified in 804 patients with HER2-positive metastatic breast cancer treated in the randomized trial. Patients were randomized to receive either Pertuzumab in combination with Trastuzumab and docetaxel or placebo in combination with Trastuzumab and docetaxel. The median duration of study treatment was 18.1 months for patients in the Pertuzumab-treated group and 11.8 months for patients in the placebo-treated group. No dose adjustment was permitted for Pertuzumab or Trastuzumab. The rates of adverse events resulting in permanent discontinuation of all study therapy were 6.1% for patients in the Pertuzumab-treated group and 5.3% for patients in the placebo-treated group. Adverse events led to discontinuation of docetaxel alone in 23.6% of patients in the Pertuzumab-treated group and 23.2% of patients in the placebo-treated group. Table 4 reports the adverse reactions that occurred in at least 10% of patients in the Pertuzumab-treated group. The most common adverse reactions (>30%) seen with Pertuzumab in combination with Trastuzumab and docetaxel were diarrhea, alopecia, neutropenia, nausea, fatigue, rash, and peripheral neuropathy.

The most common NCI-CTCAE (version 3) Grade 3-4 adverse reactions (>2%) were neutropenia, febrile neutropenia, leukopenia, diarrhea, peripheral neuropathy, anemia, asthenia, and fatigue. An increased incidence of febrile neutropenia was observed for Asian patients in both treatment arms compared with patients of other races and from other geographic regions. Among Asian patients, the incidence of febrile neutropenia was higher in the Pertuzumab-treated group (26%) compared with the placebo-treated group (12%).

TABLE 4

Summary of Adverse Reactions Occurring in ≥10% of Patients on the Pertuzumab Treatment Arm in the Randomized Trial

| Body System/Adverse Reactions | Pertuzumab + Trastuzumab + docetaxel n = 407 Frequency rate % | | Placebo + Trastuzumab + docetaxel n = 397 Frequency rate % | |
|---|---|---|---|---|
| | All Grades % | Grades 3-4 % | All Grades % | Grades 3-4 % |
| General disorders and administration site conditions | | | | |
| Fatigue | 37.6 | 2.2 | 36.8 | 3.3 |
| Asthenia | 26.0 | 2.5 | 30.2 | 1.5 |
| Edema peripheral | 23.1 | 0.5 | 30.0 | 0.8 |
| Mucosal inflammation | 27.8 | 1.5 | 19.9 | 1.0 |
| Pyrexia | 18.7 | 1.2 | 17.9 | 0.5 |
| Skin and subcutaneous tissue disorders | | | | |
| Alopecia | 60.9 | 0.0 | 60.5 | 0.3 |
| Rash | 33.7 | 0.7 | 24.2 | 0.8 |
| Nail disorder | 22.9 | 1.2 | 22.9 | 0.3 |
| Pruritus | 14.0 | 0.0 | 10.1 | 0.0 |
| Dry skin | 10.6 | 0.0 | 4.3 | 0.0 |
| Gastrointestinal disorders | | | | |
| Diarrhea | 66.8 | 7.9 | 46.3 | 5.0 |
| Nausea | 42.3 | 1.2 | 41.6 | 0.5 |
| Vomiting | 24.1 | 1.5 | 23.9 | 1.5 |
| Constipation | 15.0 | 0.0 | 24.9 | 1.0 |
| Stomatitis | 18.9 | 0.5 | 15.4 | 0.3 |

TABLE 4-continued

Summary of Adverse Reactions Occurring in ≥10% of Patients on the Pertuzumab Treatment Arm in the Randomized Trial

| Body System/Adverse Reactions | Pertuzumab + Trastuzumab + docetaxel n = 407 | | Placebo + Trastuzumab + docetaxel n = 397 | |
|---|---|---|---|---|
| | Frequency rate % | | Frequency rate % | |
| | All Grades % | Grades 3-4 % | All Grades % | Grades 3-4 % |
| Blood and lymphatic system disorders | | | | |
| Neutropenia | 52.8 | 48.9 | 49.6 | 45.8 |
| Anemia | 23.1 | 2.5 | 18.9 | 3.5 |
| Leukopenia | 18.2 | 12.3 | 20.4 | 14.6 |
| Febrile neutropenia* | 13.8 | 13.0 | 7.6 | 7.3 |
| Nervous system disorders | | | | |
| Neuropathy peripheral | 32.4 | 3.2 | 33.8 | 2.0 |
| Headache | 20.9 | 1.2 | 16.9 | 0.5 |
| Dysgeusia | 18.4 | 0.0 | 15.6 | 0.0 |
| Dizziness | 12.5 | 0.5 | 12.1 | 0.0 |
| Musculoskeletal and connective tissue disorders | | | | |
| Myalgia | 22.9 | 1.0 | 23.9 | 0.8 |
| Arthralgia | 15.5 | 0.2 | 16.1 | 0.8 |
| Infections and infestations | | | | |
| Upper respiratory tract infection | 16.7 | 0.7 | 13.4 | 0.0 |
| Nasopharyngitis | 11.8 | 0.0 | 12.8 | 0.3 |
| Respiratory, thoracic and mediastinal disorders | | | | |
| Dyspnea | 14.0 | 1.0 | 15.6 | 2.0 |
| Metabolism and nutrition disorders | | | | |
| Decreased appetite | 29.2 | 1.7 | 26.4 | 1.5 |
| Eye disorders | | | | |
| Lacrimation increased | 14.0 | 0.0 | 13.9 | 0.0 |
| Psychiatric disorders | | | | |
| Insomnia | 13.3 | 0.0 | 13.4 | 0.0 |

*In this table this denotes an adverse reaction that has been reported in association with a fatal outcome The Following Clinically Relevant Adverse Reactions were Reported in <10% of Patients in the Pertuzumab-Treated Group:

Skin and subcutaneous tissue disorders: Paronychia (7.1% in the Pertuzumab-treated group vs. 3.5% in the placebo-treated group); Respiratory, thoracic and mediastinal disorders: Pleural effusion (5.2% in the Pertuzumab-treated group vs. 5.8% in the placebo-treated group); Cardiac disorders: Left ventricular dysfunction (4.4% in the Pertuzumab-treated group vs. 8.3% in the placebo-treated group) including symptomatic left ventricular systolic dysfunction (CHF) (1.0% in the Pertuzumab-treated group vs. 1.8% in the placebo-treated group); Immune system disorders: Hypersensitivity (10.1% in the Pertuzumab-treated group vs. 8.6% in placebo-treated group).

Adverse Reactions Reported in Patients Receiving Pertuzumab and Trastuzumab after Discontinuation of Docetaxel In the randomized trial, adverse reactions were reported less frequently after discontinuation of docetaxel treatment. All adverse reactions in the Pertuzumab and Trastuzumab treatment group occurred in <10% of patients with the exception of diarrhea (19.1%), upper respiratory tract infection (12.8%), rash (11.7%), headache (11.4%), and fatigue (11.1%).

6.2 Immunogenicity

As with all therapeutic proteins, there is the potential for an immune response to Pertuzumab. Patients in the randomized trial were tested at multiple time-points for antibodies to Pertuzumab. Approximately 2.8% (11/386) of patients in the Pertuzumab-treated group and 6.2% (23/372) of patients in the placebo-treated group tested positive for anti-Pertuzumab antibodies. Of these 34 patients, none experienced anaphylactic/hypersensitivity reactions that were clearly related to the anti-therapeutic antibodies (ATA). The presence of Pertuzumab in patient serum at the levels expected at the time of ATA sampling can interfere with the ability of this assay to detect anti-Pertuzumab antibodies. In addition, the assay may be detecting antibodies to Trastuzumab. As a result, data may not accurately reflect the true incidence of anti-Pertuzumab antibody development. Immunogenicity data are highly dependent on the sensitivity and specificity of the test methods used. Additionally, the observed incidence of a positive result in a test method may be influenced by several factors, including sample handling, timing of sample collection, drug interference, concomitant medication, and the underlying disease. For these reasons, comparison of the incidence of antibodies to Pertuzumab with the incidence of antibodies to other products may be misleading.

7 Drug Interactions

No drug-drug interactions were observed between Pertuzumab and Trastuzumab, or between Pertuzumab and docetaxel.

8 Use in Specific Populations 8.1 Pregnancy
Pregnancy Category D

Risk Summary

There are no adequate and well-controlled studies of Pertuzumab in pregnant women. Based on findings in animal studies, Pertuzumab can cause fetal harm when administered to a pregnant woman. The effects of Pertuzumab are likely to be present during all trimesters of pregnancy. Pertuzumab administered to pregnant cynomolgus monkeys resulted in oligohydramnios, delayed fetal kidney development, and embryo-fetal deaths at clinically relevant exposures of 2.5 to 20-fold greater than the recommended human dose, based on $C_{max}$. If Pertuzumab is administered during pregnancy, or if a patient becomes pregnant while receiving Pertuzumab, the patient should be apprised of the potential hazard to the fetus. If Pertuzumab is administered during pregnancy or if a patient becomes pregnant while receiving Pertuzumab, immediately report exposure to the Genentech Adverse Event Line at 1-888-835-2555. Encourage women who may be exposed during pregnancy to enroll in the MotHER Pregnancy Registry by contacting 1-800-690-6720 [see Patient Counseling Information (17)].

Animal Data

Reproductive toxicology studies have been conducted in cynomolgus monkeys. Pregnant monkeys were treated on Gestational Day (GD)19 with loading doses of 30 to 150 mg/kg Pertuzumab, followed by bi-weekly doses of 10 to 100 mg/kg. These dose levels resulted in clinically relevant exposures of 2.5 to 20-fold greater than the recommended human dose, based on $C_{max}$ Intravenous administration of Pertuzumab from GD19 through GD50 (period of organogenesis) was embryotoxic, with dose-dependent increases in embryo-fetal death between GD25 to GD70. The incidences of embryo-fetal loss were 33, 50, and 85% for dams treated with bi-weekly Pertuzumab doses of 10, 30, and 100 mg/kg, respectively (2.5 to 20-fold greater than the recommended human dose, based on $C_{max}$). At Caesarean section on GD100, oligohydramnios, decreased relative lung and kidney weights and microscopic evidence of renal hypoplasia consistent with delayed renal development were identified in all Pertuzumab dose groups. Pertuzumab exposure was reported in offspring from all treated groups, at levels of 29% to 40% of maternal serum levels at GD100.

8.3 Nursing Mothers

It is not known whether Pertuzumab is excreted in human milk, but human IgG is excreted in human milk. Because many drugs are secreted in human milk and because of the potential for serious adverse reactions in nursing infants from Pertuzumab, a decision should be made whether to discontinue nursing, or discontinue drug, taking into account the elimination half-life of Pertuzumab and the importance of the drug to the mother [See Warnings and Precautions (5.1), Clinical Pharmacology (12.3)].

8.4 Pediatric Use

The safety and effectiveness of Pertuzumab have not been established in pediatric patients.

8.5 Geriatric Use

Of 402 patients who received Pertuzumab in the randomized trial, 60 patients (15%) were ≥65 years of age and 5 patients (1%) were ≥75 years of age. No overall differences in efficacy and safety of Pertuzumab were observed between these patients and younger patients. Based on a population pharmacokinetic analysis, no significant difference was observed in the pharmacokinetics of Pertuzumab between patients <65 years (n=306) and patients ≥65 years (n=175).

8.6 Females of Reproductive Potential

Pertuzumab can cause embryo-fetal harm when administered during pregnancy. Counsel patients regarding pregnancy prevention and planning. Advise females of reproductive potential to use effective contraception while receiving Pertuzumab and for 6 months following the last dose of Pertuzumab. If Pertuzumab is administered during pregnancy or if a patient becomes pregnant while receiving Pertuzumab, immediately report exposure to the Genentech Adverse Event Line at 1-888-835-2555. Encourage women who may be exposed during pregnancy to enroll in the MotHER Pregnancy Registry by contacting 1-800-690-6720 [see Patient Counseling Information (17)].

8.7 Renal Impairment

Dose adjustments of Pertuzumab are not needed in patients with mild (creatinine clearance [CLcr]60 to 90 mL/min) or moderate (CLcr 30 to 60 mL/min) renal impairment. No dose adjustment can be recommended for patients with severe renal impairment (CLcr less than 30 mL/min) because of the limited pharmacokinetic data available [see Clinical Pharmacology (12.3)].

8.8 Hepatic Impairment

No clinical studies have been conducted to evaluate the effect of hepatic impairment on the pharmacokinetics of Pertuzumab.

10 Overdosage

No drug overdoses have been reported with Pertuzumab to date.

11 Description

Pertuzumab is a recombinant humanized monoclonal antibody that targets the extracellular dimerization domain (Subdomain II) of the human epidermal growth factor receptor 2 protein (HER2). Pertuzumab is produced by recombinant DNA technology in a mammalian cell (Chinese Hamster Ovary) culture containing the antibiotic, gentamicin. Gentamicin is not detectable in the final product. Pertuzumab has an approximate molecular weight of 148 kDa. Pertuzumab is a sterile, clear to slightly opalescent, colorless to pale brown liquid for intravenous infusion. Each single use vial contains 420 mg of Pertuzumab at a concentration of 30 mg/mL in 20 mM L-histidine acetate (pH 6.0), 120 mM sucrose and 0.02% polysorbate 20.

12 Clinical Pharmacology 12.1 Mechanism of Action

Pertuzumab targets the extracellular dimerization domain (Subdomain II) of the human epidermal growth factor receptor 2 protein (HER2) and, thereby, blocks ligand-dependent heterodimerization of HER2 with other HER family members, including EGFR, HER3 and HER4. As a result, Pertuzumab inhibits ligand-initiated intracellular signaling through two major signal pathways, mitogen-activated protein (MAP) kinase and phosphoinositide 3-kinase (PI3K). Inhibition of these signaling pathways can result in cell growth arrest and apoptosis, respectively. In addition, Pertuzumab mediates antibody-dependent cell-mediated cytotoxicity (ADCC). While Pertuzumab alone inhibited the proliferation of human tumor cells, the combination of Pertuzumab and Trastuzumab significantly augmented antitumor activity in HER2-overexpressing xenograft models.

12.2 Pharmacokinetics

Pertuzumab demonstrated linear pharmacokinetics at a dose range of 2-25 mg/kg. Based on a population PK analysis that included 481 patients, the median clearance (CL) of Pertuzumab was 0.24 L/day and the median half-life was 18 days. With an initial dose of 840 mg followed by a maintenance dose of 420 mg every three weeks thereafter, the steady-state concentration of Pertuzumab was reached after the first maintenance dose. The population PK analysis suggested no PK differences based on age, gender, and ethnicity (Japanese vs. non-Japanese). Baseline serum albumin level and lean body weight as covariates only exerted a minor influence on PK parameters. Therefore, no dose adjustments based on body weight or baseline albumin level are needed. No drug-drug interactions were observed between Pertuzumab and Trastuzumab, or between Pertuzumab and docetaxel in a sub-study of 37 patients in the randomized trial. No dedicated renal impairment trial for Pertuzumab has been conducted. Based on the results of the population pharmacokinetic analysis, Pertuzumab exposure in patients with mild (CLcr 60 to 90 mL/min, n=200) and moderate renal impairment (CLcr 30 to 60 mL/min, n=71) were similar to those in patients with normal renal function (CLcr greater than 90 mL/min, n=200). No relationship between CLcr and Pertuzumab exposure was observed over the range of observed CLcr (27 to 244 mL/min).

12.3 Cardiac Electrophysiology

The effect of Pertuzumab with an initial dose of 840 mg followed by a maintenance dose of 420 mg every three weeks on QTc interval was evaluated in a subgroup of 20 patients with HER2-positive breast cancer in the randomized trial. No large changes in the mean QT interval (i.e., greater than 20 ms) from placebo based on Fridericia correction method were detected in the trial. A small increase in the mean QTc interval (i.e., less than 10 ms) cannot be excluded because of the limitations of the trial design.

13 Nonclinical Toxicology

13.1 Carcinogenesis, Mutagenesis, Impairment of Fertility

Long-term studies in animals have not been performed to evaluate the carcinogenic potential of Pertuzumab. Studies have not been performed to evaluate the mutagenic potential of Pertuzumab. No specific fertility studies in animals have been performed to evaluate the effect of Pertuzumab. No adverse effects on male and female reproductive organs were observed in repeat-dose toxicity studies of up to six months duration in cynomolgus monkeys.

14 Clinical Studies

14.1 Metastatic Breast Cancer

The randomized trial was a multicenter, double-blind, placebo-controlled trial of 808 patients with HER2-positive metastatic breast cancer. Breast tumor specimens were required to show HER2 overexpression defined as 3+ IHC or FISH amplification ratio ≥2.0 determined at a central laboratory. Patients were randomized 1:1 to receive placebo plus Trastuzumab and docetaxel or Pertuzumab plus Trastuzumab and docetaxel. Randomization was stratified by prior treatment (prior or no prior adjuvant/neoadjuvant anti-HER2 therapy or chemotherapy) and geographic region (Europe, North America, South America, and Asia). Patients with prior adjuvant or neoadjuvant therapy were required to have a disease-free interval of greater than 12 months before trial enrollment. Pertuzumab was given intravenously at an initial dose of 840 mg, followed by 420 mg every 3 weeks thereafter. Trastuzumab was given intravenously at an initial dose of 8 mg/kg, followed by 6 mg/kg every 3 weeks thereafter. Patients were treated with Pertuzumab and Trastuzumab until progression of disease, withdrawal of consent, or unacceptable toxicity. Docetaxel was given as an initial dose of 75 mg/m$^2$ by intravenous infusion every 3 weeks for at least 6 cycles. The docetaxel dose could be escalated to 100 mg/m$^2$ at the investigator's discretion if the initial dose was well tolerated.

At the time of the primary analysis, the mean number of cycles of study treatment administered was 16.2 in the placebo-treated group and 19.9 in the Pertuzumab-treated group.

The primary endpoint of the randomized trial was progression-free survival (PFS) as assessed by an independent review facility (IRF). PFS was defined as the time from the date of randomization to the date of disease progression or death (from any cause) if the death occurred within 18 weeks of the last tumor assessment. Additional endpoints included overall survival (OS), PFS (investigator-assessed), objective response rate (ORR) and duration of response.

Patient demographic and baseline characteristics were balanced between the treatment arms. The median age was 54 (range 22 to 89 years), 59% were White, 32% were Asian, and 4% were Black. All were women with the exception of 2 patients. Seventeen percent of patients were enrolled in North America, 14% in South America, 38% in Europe, and 31% in Asia. Tumor prognostic characteristics, including hormone receptor status (positive 48%, negative 50%), presence of visceral disease (78%) and non-visceral disease only (22%) were similar in the study arms. Approximately half of the patients received prior adjuvant or neoadjuvant anti-HER2 therapy or chemotherapy (placebo 47%, Pertuzumab 46%). Among patients with hormone receptor positive tumors, 45% received prior adjuvant hormonal therapy and 11% received hormonal therapy for metastatic disease. Eleven percent of patients received prior adjuvant or neoadjuvant Trastuzumab.

The randomized trial demonstrated a statistically significant improvement in IRF-assessed PFS in the Pertuzumab-treated group compared with the placebo-treated group [hazard ratio (HR)=0.62 (95% CI: 0.51, 0.75), p<0.0001] and an increase in median PFS of 6.1 months (median PFS of 18.5 months in the Pertuzumab-treated group vs. 12.4 months in the placebo-treated group) (see FIG. 8). The results for investigator-assessed PFS were comparable to those observed for IRF-assessed PFS. Consistent results were observed across several patient subgroups including age (<65 or ≥65 years), race, geographic region, prior adjuvant/neoadjuvant anti-HER2 therapy or chemotherapy (yes or no), and prior adjuvant/neoadjuvant Trastuzumab (yes or no). In the subgroup of patients with hormone receptor-negative disease (n=408), the hazard ratio was 0.55 (95% CI: 0.42, 0.72). In the subgroup of patients with hormone receptor-positive disease (n=388), the hazard ratio was 0.72 (95% CI: 0.55, 0.95). In the subgroup of patients with disease limited to non-visceral metastasis (n=178), the hazard ratio was 0.96 (95% CI: 0.61, 1.52).

At the time of the PFS analysis, 165 patients had died. More deaths occurred in the placebo-treated group (23.6%) compared with the Pertuzumab-treated group (17.2%). At the interim OS analysis, the results were not mature and did not meet the pre-specified stopping boundary for statistical significance. See Table 5 and FIG. 10.

TABLE 5

Summary of Efficacy from the Randomized Trial

| Parameter | Pertuzumab + Trastuzumab + docetaxel n = 402 | Placebo + Trastuzumab + docetaxel n = 406 | HR (95% CI) | p-value |
|---|---|---|---|---|
| Progression-Free Survival (independent review) | | | 0.62 (0.51, 0.75) | <0.0001 |
| No. of patients with an event | 191 (47.5%) | 242 (59.6%) | | |
| Median months | 18.5 | 12.4 | | |
| Overall Survival (interim analysis) | | | 0.64 (0.47, 0.88) | 0.0053* |
| No. of patients with an event | 69 (17.2%) | 96 (23.6%) | | |
| Objective Response Rate (ORR) No. of patients analyzed | 343 | 336 | | |
| Objective response (CR + PR) | 275 (80.2%) | 233 (69.3%) | | |
| Complete response (CR) | 19 (5.5%) | 14 (4.2%) | | |

TABLE 5-continued

Summary of Efficacy from the Randomized Trial

| Parameter | Pertuzumab + Trastuzumab + docetaxel n = 402 | Placebo + Trastuzumab + docetaxel n = 406 | HR (95% CI) | p-value |
|---|---|---|---|---|
| Partial Response (PR) | 256 (74.6%) | 219 (65.2%) | | |
| Median Duration of Response (months) | 20.2 | 12.5 | | |

*The HR and p-value for the interim analysis of Overall Survival did not meet the pre-defined stopping boundary (HR ≤ 0.603, p ≤ 0.0012).

16 How Supplied/Storage and Handling

16.1 How Supplied

Pertuzumab is supplied as a 420 mg/14 mL (30 mg/mL) single-use vial containing preservative-free solution. NDC 50242-145-01. Store vials in a refrigerator at 2° C. to 8° C. (36° F. to 46° F.) until time of use. Keep vial in the outer carton in order to protect from light.
DO NOT FREEZE. DO NOT SHAKE.

17 Patient Counseling Information

Advise pregnant women and females of reproductive potential that Pertuzumab exposure can result in fetal harm, including embryo-fetal death or birth defects [see Warnings and Precautions (5.1) and Use in Specific Populations (8.1)]

Advise females of reproductive potential to use effective contraception while receiving Pertuzumab and for 6 months following the last dose of Pertuzumab [see Warnings and Precautions (5.1) and Use in Special Populations (8.6)]

Advise nursing mothers treated with Pertuzumab to discontinue nursing or discontinue Pertuzumab, taking into account the importance of the drug to the mother [see Use in Specific Populations (8.3)].

Encourage women who are exposed to Pertuzumab during pregnancy to enroll in the MotHER Pregnancy Registry by contacting 1-800-690-6720 [see Warnings and Precautions (5.1) and Use in Specific Populations (8.1)]

Thus, the comprehensive phase III safety and efficacy data for Pertuzumab as in Example 3 provide for the article of manufacture in this example. This article of manufacture can be used in a method of ensuring safe and effective use of Pertuzumab to treat patients.

Example 5

Early-Stage Breast Cancer Therapy with Pertuzumab

Anthracyclines (generally used in combination with 5-FU and cyclophosphamide) have a central role in the management of breast cancer. Romond et al. *NEJM* 353(16): 1673-1684 (2005), and Poole et al. *NEJM* 355 (18): 1851-1852 (2006).

Taxanes are also integral in standard regimens for the treatment of breast cancer, used in combination with anthracyclines in a regimen known as TAC (Martin et al. *NEJM* 352 (22): 2302-2313 (2005)) or in sequence with anthracyclines in a regimen known as AC→T (Romond et al., supra; Joensuu et al. *NEJM* 354 (8): 809-820 (2006)).

Carboplatin is both an active and well tolerated chemotherapy agent and there are studies in breast cancer which show clear efficacy in combination with a taxane and Trastuzumab in a regimen known as TCH (Slamon et al. *BCIRG* 006. SABS (2007); Robert et al. *J. Clin. Oncol.* 24: 2786-2792 (2006)). However, in metastatic breast cancer, there are negative data (Forbes et al. *BCIRG* 007 *Proc. Am. Soc. Clin. Oncol.* Abstract No. LBA516 (2006)).

A previous neoadjuvant study with Pertuzumab (NeoSphere) evaluated it in combination with Docetaxel and Trastuzumab (Gianni et al. *Cancer Research* 70 (24) (Suppl. 2) (December 2010)), but not in combination with anthracycline-based or carboplatin-based chemotherapy.

The following chemotherapy regimens were evaluated in this example:

FEC Breast cancer therapy consisting of 5-_fluorouracil, epirubicin and cyclophosphamide.

FEC→T Sequential chemotherapy, consisting of courses of FEC chemotherapy followed by courses of Docetaxel.

TCH Chemotherapy regimen for HER2-positive breast cancer combination comprising taxane (Docetaxel), Carboplatin, and Trastuzumab (HERCEPTIN®)

The treatment arms in this study were:

Arm A

Courses of 5-Fluorouracil, Epirubicin and Cyclophosphamide (FEC) followed by courses of Docetaxel (T) (FEC→T) with Trastuzumab and Pertuzumab given from the start of the chemotherapy regimen (i.e. concurrently with the anthracycline)

5-Fluorouracil (500 mg/m$^2$), epirubicin (100 mg/m$^2$) followed by cyclophosphamide (600 mg/m$^2$) for three cycles, followed by Docetaxel for three cycles with Trastuzumab (8 mg/kg on day 1 of the first treatment with epirubicin and 6 mg/kg every 3 weeks thereafter) and Pertuzumab (840 mg on day 1 of the treatment with FEC with 420 mg every 3 weeks thereafter). The starting dose for Docetaxel is 75 mg/m2 for Cycle 4 (first Docetaxel cycle) then 100 mg/m$^2$ for Cycles 5-6, if no dose limiting toxicity occurs. All drugs will be administered by the IV route.

OR

Arm B

FEC→T with Trastuzumab and Pertuzumab given from the start of the taxane treatment (i.e. following the anthracycline)

5-Fluorouracil (500 mg/m$^2$), epirubicin (100 mg/m$^2$) followed by cyclophosphamide (600 mg/m$^2$) for three cycles, followed by Docetaxel for three cycles with Trastuzumab (8 mg/kg on day 1 of the first treatment with Docetaxel and 6 mg/kg every 3 weeks thereafter) and Pertuzumab (840 mg on day 1 on the first day of Docetaxel with 420 mg every 3 weeks thereafter). The starting dose for Docetaxel is 75 mg/m2 for Cycle 4 (first Docetaxel cycle) then 100 mg/m² for Cycles 5-6, if no dose limiting toxicity occurs. All drugs will be administered by the IV route.

OR

Arm C

Taxane (Docetaxel), Carboplatin and Trastuzumab (TCH) with Pertuzumab, with both antibodies being given from the start of the chemotherapy.

Carboplatin (AUC6 using Calvert's Formula) followed by Docetaxel on day 1 with Trastuzumab (8 mg/kg on day 1 of the first treatment with Carboplatin and Docetaxel and 6 mg/kg every 3 weeks thereafter) and Pertuzumab (840 mg on day 1 with 420 mg every 3 weeks thereafter) for six cycles. The dose for Docetaxel is 75 mg/m² for all cycles. All drugs will be administered by the IV route.

All patients will receive Trastuzumab every three weeks for a total of one year from the start of treatment (from Cycle 1-17 for patients in Arms A and C and Cycle 4-20 for patients in Arm B) whether they receive additional chemotherapy or not.

Primary Objective

The primary objective was evaluated when all patients had received six cycles of neoadjuvant treatment, had their surgery and all necessary samples taken or were withdrawn from the study whichever is earlier.

Secondary Objectives

To make a preliminary assessment of the activity associated with each regimen as indicated by the complete pathological response rate.

To evaluate the safety profiles of each treatment regimen, including pre-operative (neoadjuvant) and post-operative (adjuvant) treatment.

To investigate the overall survival, the time to clinical response, time-to-response, disease free survival and progression free survival for each treatment arm.

To investigate the biomarkers that may be associated with primary and secondary efficacy endpoints in accordance with each treatment arm.

To investigate the rate of breast conservative surgery for all patients with T2-3 tumors for whom mastectomy was planned at diagnosis.

An overall assessment of the risk and benefit of each regimen will be made.

Overview of Study Design

Figure 11:
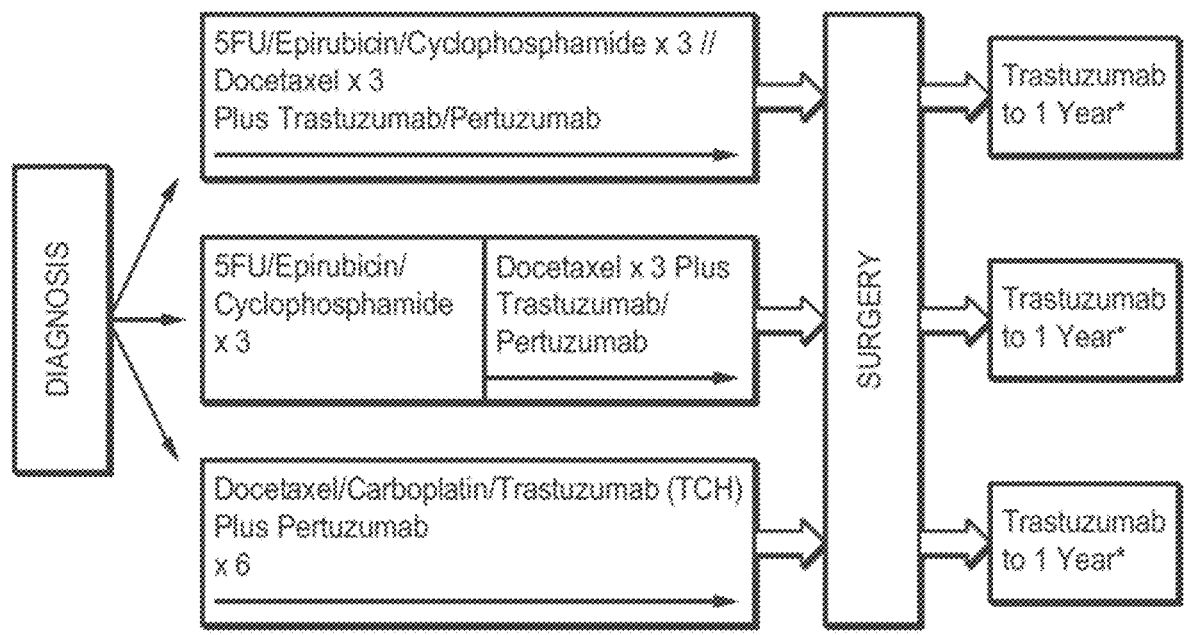
FIG. 11 is an overview of the dosing schedule in HER2-positive, neoadjuvant breast cancer, patients with low cardiac risk factors in Example 5. Additional radiotherapy, hormonal therapy and chemotherapy post surgery and during adjuvant Trastuzumab treatment were allowed if considered necessary by the investigator.

This was a Phase II open-label, randomized, multi-center trial to evaluate the tolerability and activity associated with Trastuzumab and Pertuzumab when used in addition to anthracycline-based or carboplatin-based chemotherapy regimens as neoadjuvant therapy in patients with HER2-positive breast cancer which was early stage and >2 cm in diameter or locally advanced or inflammatory (see FIG. 11).

Six cycles of active chemotherapy were administered. However, if it was considered that patients required further therapy post surgery, it was suggested that those patients who had received FEC→T were given CMF (cyclophosphamide, methotrexate and 5-fluorouracil) and that those patients who had received TCH, but who are deemed to require further chemotherapy received FEC (5-fluorouracil, epirubicin and cyclophosphamide).

After the completion of surgery (and after the completion of post-operative chemotherapy if required), patients received radiotherapy as per local clinical standard and those patients whose tumors were estrogen-receptor positive received hormone manipulation as per local clinical standard.

In summary, all patients received at least 6 cycles of active chemotherapy and the two antibodies, Pertuzumab and Trastuzumab plus surgery and radiotherapy (as per local standard) plus any hormone manipulation indicated (as per local standard) and continued to receive Trastuzumab to one year in total.

Patients whose neoadjuvant study treatment was discontinued prior to surgery were managed as per local practice. Approximately 28 days after the last dose of study medication, patients were asked to perform a final safety assessment (called Final Visit).

Study Population

Overview

Female patients, aged 18 years or more, with early stage HER2-positive breast cancer whose primary tumors are >2 cm with no metastases.

Inclusion Criteria

1. Female patients with locally advanced, inflammatory or early stage, unilateral and histologically confirmed invasive breast cancer. The initial breast cancer assessment should be performed by a physician with experience in surgery for breast cancer. Patients with inflammatory breast cancer must be able to have a core needle biopsy.
2. Primary tumor >2 cm in diameter.
3. HER2-positive breast cancer confirmed by a central laboratory. Tumors must be HER2 3+ by IHC or FISH/CISH+(FISH/CISH positivity mandatory for HER2 2+ tumors).
4. Availability of FFPE tissue (Buffered Formalin method of fixation will be accepted) for central confirmation of HER2 eligibility (FFPE tumor tissue will subsequently be used for assessing status of biomarkers).
5. Female patients, age ≥18 years.
6. Baseline LVEF≥55% (measured by echocardiography or MUGA).
7. Performance status ECOG≤1.
8. At least 4 weeks since major unrelated surgery, with full recovery.

Concomitant Medication and Treatment

Allowed Therapies

Concomitant treatments are any prescription medications, over-the-counter preparations, herbal remedies or radiotherapy used by a patient in the interval beginning 7 days prior to the patient being recruited into the study and continuing through the study.

The following treatments are permitted during the study:

1. Acceptable methods of contraception must be used when the female patient or male partner is not surgical sterilized or does not meet the study definition of post-menopausal (≥12 months of amenorrhea).
2. $H_1$ and $H_2$ antagonist (e.g. diphenhydramine, cimetidine)
3. Analgesics (e.g. paracetamol/acetaminophen, meperidine, opioids)
4. Short term use of corticosteroids to treat or prevent allergic or infusion reactions
5. Antiemetics (approved prophylactic serotonin-antagonists, benzodiazepines, ondansetron etc)
6. Medication to treat diarrhea (e.g. loperamide)
7. Colony stimulating factors (e.g. G-CSF)
8. Estrogen receptor antagonist (e.g. tamoxifen) or aromatase inhibitors (e.g. anastrazole, exemestane) after completion of post-operative chemotherapy as per local practice.

Excluded Therapies

The following therapies are excluded during the treatment period of the study:

9. Anti-cancer therapies other than those administered in this study, including cytotoxic chemotherapy, radiotherapy, (except for adjuvant radiotherapy for breast cancer after completion of chemotherapy or additional adjuvant chemotherapy immediately post-surgery, if deemed necessary) immunotherapy, and biological anti-cancer therapy.
10. Any targeted therapy.
11. Treatment with steroids except for thyroid hormone replacement therapy and short term corticosteroid, in order to treat or prevent allergic or infusion reactions.
12. High doses of systemic corticosteroids. High dose is considered as >20 mg of dexamethasone a day (or equivalent) for >7 consecutive days.
13. Any investigational agent, except for those used for this study.
14. Initiation of herbal remedies. Herbal remedies initiated prior to study entry and continuing during the study are permitted and must be reported on the appropriate eCRF.
15. Any oral, injected or implanted hormonal methods of contraception.

Results

The baseline characteristics of the patients with HER2-positive early-stage breast cancer are provided in Table 6 below.

TABLE 6

Baseline Characteristics in the Safety Population

| | FEC + H + P x3 → T + H + P x3 n = 72 | FEC x3 → T + H + P x3 n = 75 | TCH + P x6 n = 76 |
|---|---|---|---|
| Median age, years (range) | 49.0 (27-77) | 49.0 (24-75) | 50.0 (30-81) |
| ECOG PS 0, n (%) | 65 (91.5) | 66 (88.0) | 67 (88.2) |
| 1, n (%) | 6 (8.5) | 9 (12.0) | 9 (11.8) |
| ER and/or PR-positive, n (%) | 39 (53.4) | 35 (46.7) | 40 (51.9) |
| ER and PR-negative, n (%) | 34 (46.6) | 40 (53.3) | 37 (48.1) |
| Disease type, n (%) | 53 (72.6) | 54 (72.0) | 49 (63.6) |
| Operable | 15 (20.5) | 17 (22.7) | 24 (31.2) |
| Locally advanced | 5 (6.8) | 4 (5.3) | 4 (5.2) |
| Inflammatory | | | |
| HER2 IHC 0 and 1+, n (%) | 1 (1.4) | — | — |
| 2+, n (%) | 5 (6.8) | 1 (1.3) | 2 (2.6) |
| 3+, n (%) | 67 (91.8) | 74 (98.7) | 75 (97.4) |
| HER2 FISH-positive, n (%) | 69 (94.5) | 69 (92.0) | 73 (94.8) |
| FISH-negative, n (%) | — | 1 (1.3) | 2 (2.6) |
| Unknown, n (%) | 4 (5.5) | 5 (6.7) | 2 (2.6) |

Figure 12:
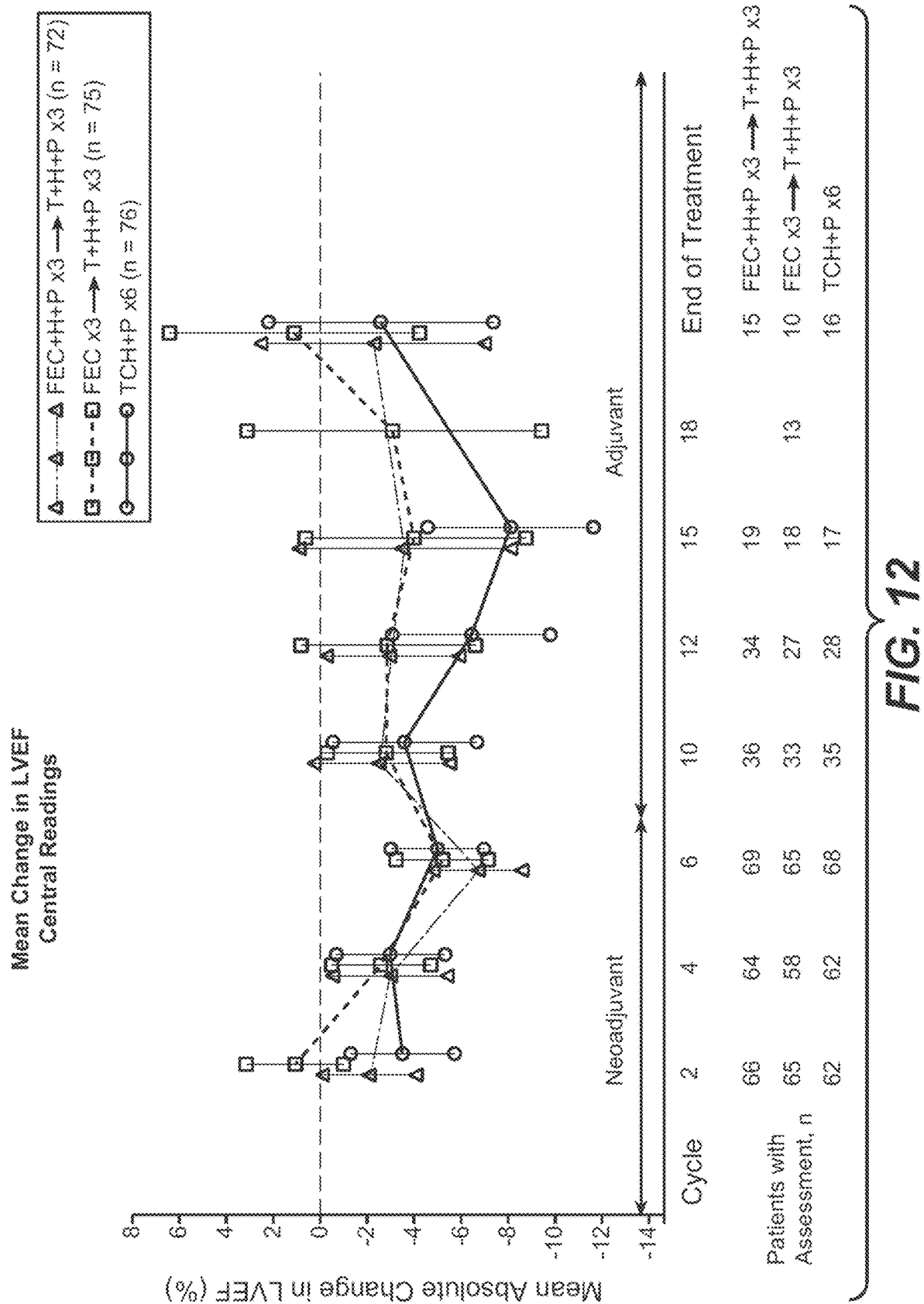
FIG. 12 depicts mean change in LVEF (central readings) for the study in Example 5.

CBE, clinical breast examination; ECOG PS, Eastern Cooperative Oncology Group performance status; ER, estrogen receptor; FEC, 5-fluorouracil, epirubicin, cyclophosphamide; FISH, fluorescence in situ hybridisation; H, Trastuzumab; IHC, immunohistochemistry; P, Pertuzumab; PR, progesterone receptor; T, Docetaxel; TCH, Docetaxel/Carboplatin/Trastuzumab Safety data are shown in FIG. 12 and Tables 7 and 8 below.

TABLE 7

Cardiac Events Overall

| | FEC + H + P x3 → T + H + P x3 n = 72 | FEC x3 → T + H + P x3 n = 75 | TCH + P x6 n = 76 |
|---|---|---|---|
| Symptomatic LVSD (grade ≥3), n (%) | — | 2 (2.7) | 1 (1.3) |
| LVSD (all grades), n (%) | 5 (6.9) | 3 (4.0) | 5 (6.6) |
| LVEF decline ≥10% points from baseline to <50%, n (%) | 5 (6.9) | 5 (6.7) | 5 (6.6) |

FEC, 5-fluorouracil, epirubicin, cyclophosphamide; H, Trastuzumab; LVEF, left ventricular ejection fraction; LVSD, left ventricular systolic dysfunction; P, Pertuzumab; T, Docetaxel; TCH, Docetaxel/Carboplatin/Trastuzumab

TABLE 8

Ten Most Common Adverse Events During Neoadjuvant Treatment Grade ≥3

| Adverse event, n (%) | FEC + H + P x3 → T + H + P x3 n = 72 | FEC x3 → T + H + P x3 n = 75 | TCH + P x6 n = 76 |
|---|---|---|---|
| Neutropenia | 34 (47.2) | 32 (42.7) | 35 (46.1) |
| Febrile neutropenia | 13 (18.1) | 7 (9.3) | 13 (17.1) |
| Leukopenia | 14 (19.4) | 9 (12.0) | 9 (11.8) |
| Diarrhea | 3 (4.2) | 4 (5.3) | 9 (11.8) |
| Anemia | 1 (1.4) | 2 (2.7) | 13 (17.1) |
| Thrombocytopenia | — | — | 9 (11.8) |
| Vomiting | — | 2 (2.7) | 4 (5.3) |
| Fatigue | — | — | 3 (3.9) |
| Alanine aminotransferase inc. | — | — | 3 (3.9) |
| Drug hypersensitivity | 2 (2.8) | — | 2 (2.6) |

Figure 13:
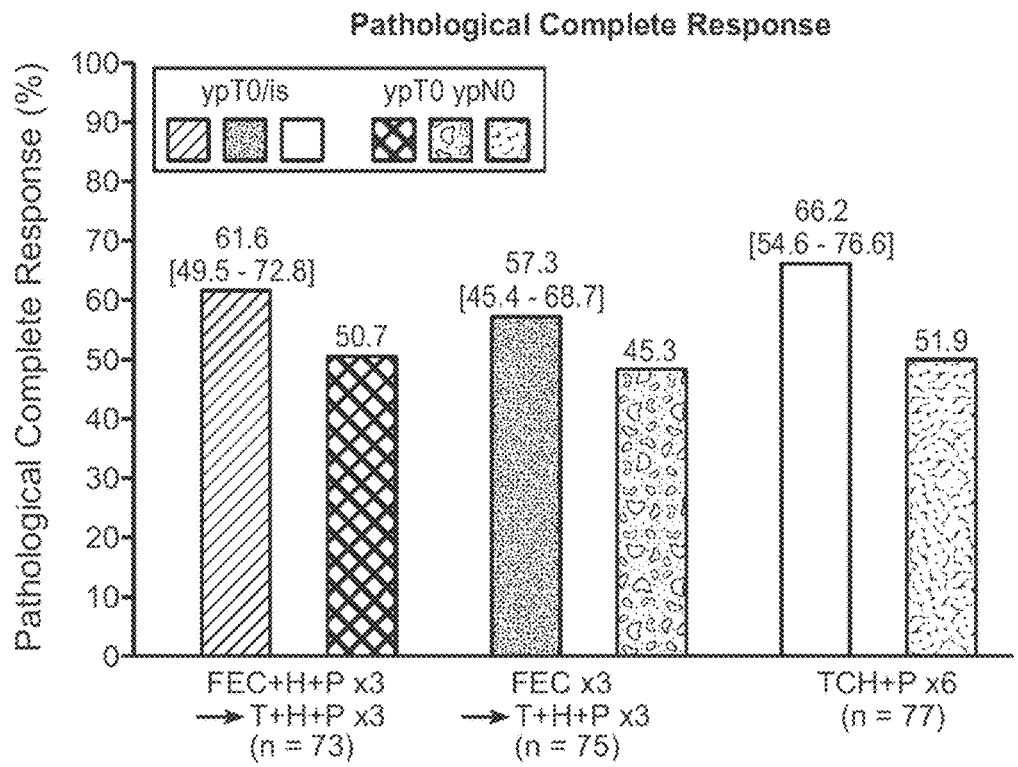
FIG. 13 shows pathological complete response (pCR) for the study in Example 5.
Figure 14:
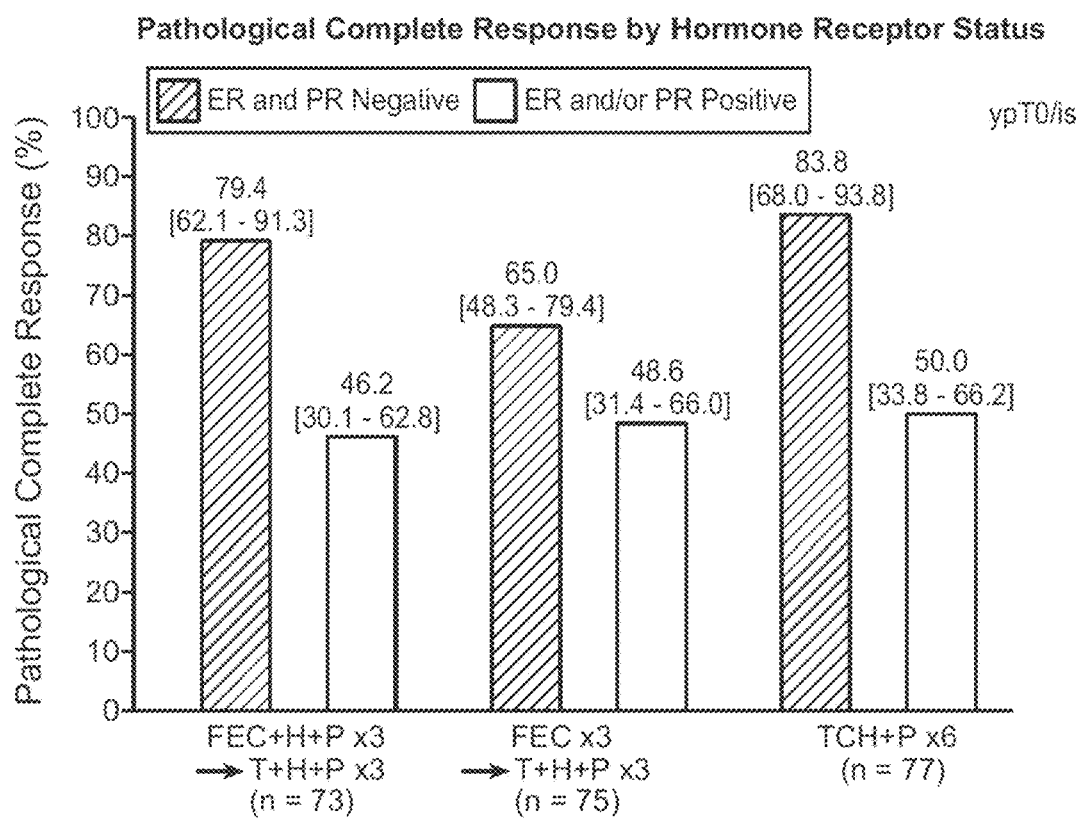
FIG. 14 depicts pathological complete response by hormone receptor status in the Example 5 study.

FEC, 5-fluorouracil, epirubicin, cyclophosphamide; H, Trastuzumab; P, Pertuzumab; T, Docetaxel; TCH, Docetaxel/Carboplatin/Trastuzumab Efficacy data are provided in FIGS. 13 and 14 as well as Tables 9 and 10 below.

TABLE 9

Clinical Response Rate During Neoadjuvant Treatment

| | FEC + H + P x3 → T + H + P x3 n = 73 | FEC x3 → T + H + P x3 n = 75 | TCH + P x6 n = 77 |
|---|---|---|---|
| Objective response rate, n (%) | 67 (91.8) | 71 (94.7) | 69 (89.6) |
| Complete response rate | 37 (50.7) | 21 (28.0) | 31 (40.3) |
| Partial response rate | 30 (41.1) | 50 (66.7) | 38 (49.4) |
| Stable disease, n (%) | 3 (4.1) | 1 (1.3) | 5 (6.5) |
| Progressive disease, n (%) | — | 1 (1.3) | — |
| No assessment, n (%) | 3 (4.1) | 2 (2.7) | 3 (3.9) |

FEC, 5-fluorouracil, epirubicin, cyclophosphamide; H, Trastuzumab; P, Pertuzumab; T, Docetaxel; TCH, Docetaxel/Carboplatin/Trastuzumab

TABLE 10

Breast Conserving Surgery in Patients for Whom Mastectomy was Planned

|  | FEC + H + P x3 → T + H + P x3 n = 46 | FEC x3 → T + H + P x3 n = 36 | TCH + P x6 n = 37 |
| --- | --- | --- | --- |
| Achieved, n (%) | 10 (21.7) | 6 (16.7) | 10 (27.0) |
| (95% CI) | (10.9-36.4) | (6.4-32.8) | (13.8-44.1) |
| Not achieved, n (%) | 36 (78.3) | 30 (83.3) | 27 (73.0) |

CI, confidence interval; FEC, 5-fluorouracil, epirubicin, cyclophosphamide; H, Trastuzumab; P, Pertuzumab; T, Docetaxel; TCH, Docetaxel/Carboplatin/Trastuzumab Conclusions Results from this study indicate a low incidence of symptomatic and asymptomatic LVSD across all arms
Concurrent administration of Pertuzumab plus Trastuzumab with epirubicin resulted in similar cardiac tolerability compared with sequential administration or the anthracycline-free regimen
Neutropenia, febrile neutropenia, leukopenia and diarrhea were most frequently reported adverse events (grade ≥3) across all arms
Regardless of chemotherapy chosen, the combination of Pertuzumab with Trastuzumab in the neoadjuvant setting resulted in high pathological complete response (pCR) rates (57 to 66%)
TRYPHAENA supports the use of Pertuzumab and Trastuzumab plus anthracyline-based or carboplatin-based chemotherapy in the neoadjuvant and adjuvant settings of early-stage breast cancer.

Example 6

Co-Administration of Pertuzumab and Trastuzumab

In the phase III clinical trials above Pertuzumab was administered by intravenous (IV) infusion in saline IV bags to patients with HER2-positive metastatic breast cancer followed by Trastuzumab and the chemotherapeutic agent Docetaxel also using saline IV infusions. The IV infusion process for Pertuzumab and Trastuzumab takes approximately 60 to 90 minutes each with a 30 to 60 minute patient observation period after each drug. Due to this treatment regimen per patient, a visit can take up to 7.5 hours total. As medical payments for both drugs and drug administration services have been under scrutiny in the recent past, there has been emphasis on business practices to shorten time and to increase medical resource utilization in clinical and hospital settings. Increased efficiency of patient care, compliance and treatment is expected by shortening the time patients spend in the clinic for each cycle of treatment.

As part of the phase III Pertuzumab clinical trials, Pertuzumab and Trastuzumab are administered through intravenous (IV) infusion to patients sequentially, i.e. one drug after the other. While Pertuzumab is given as a flat dose (420 mg for maintenance, 840 mg for loading), Trastuzumab is weight based (6 mg/kg for maintenance doses). To increase convenience and minimize the in-clinic time for the patients, the feasibility of co-administering Pertuzumab with Trastuzumab in a single 250 mL 0.9% saline polyolefin (PO) or polyvinyl chloride (PVC) IV infusion bag was assessed. The individual monoclonal antibodies have been demonstrated to be stable in infusion bags (PO and/or PVC) over 24 hours at 5° C. and 30° C. In this study, the compatibility and stability of Pertuzumab (420 mg and 840 mg) mixed with either 420 mg Trastuzumab (6 mg/kg dose for a 70 kg patient) or 720 mg (6 mg/kg for a 120 kg patient) in IV bags for up to 24 hours at 5° C. or 30° C. was evaluated. The controls (i.e. Pertuzumab alone in an IV bag, Trastuzumab alone in an IV bag) and the monoclonal antibody (mAb) mixture samples were assessed using the existing Pertuzumab and Trastuzumab analytical methods, which include color, appearance and clarity (CAC), concentration and turbidity by UV-spec scan, particulate analysis by HIAC-Royco, size exclusion chromatography (SEC), and ion-exchange chromatography (IEC). Additionally, capillary zone electrophoresis (CZE), image capillary isoelectric focusing (iCIEF), and potency (the Pertuzumab anti-proliferation assay only) was utilized to measure the admixtures containing 1:1 of Pertuzumab:Trastuzumab and their respective controls (420 mg Pertuzumab only and 420 mg Trastuzumab only) only as a representative case.

Results showed no observable differences by the above assays in the Pertuzumab/Trastuzumab mixtures between the time zero (T0) control and the sample stored up to 24 hours at either 5° C. or 30° C. The physicochemical assays as listed above were able to detect both molecules as well as the minor variants in the drug mixture, though some overlaps of monoclonal antibody species were seen in the chromatograms. Furthermore, the drug mixture tested by the Pertuzumab specific inhibition of cell proliferation assay showed comparable potency before and after storage. The results from this study showed the Pertuzumab and Trastuzumab admixtures are physically and chemically stable in an IV infusion bag for up to 24 hours at 5° C. or 30° C. and can be used for clinical administration if necessary.

Dose I: 840 mg Pertuzumab/Trastuzumab Mixture (420 mg Pertuzumab and 420 mg Trastuzumab)

Sample Preparation: All procedures were performed aseptically under a laminar flow hood. PO IV infusion bag samples with three types of drug combinations were prepared for this study: 1) 420 mg Pertuzumab/420 mg Trastuzumab mixture, 2) 420 mg Pertuzumab alone, and 3) 420 mg Trastuzumab alone. The Pertuzumab and Trastuzumab alone samples served as controls.

Trastuzumab was reconstituted with 20 mL of bacteriostatic water for injection (BWFI) and left on lab bench for approximately 15 minutes prior to use. To prepare the Pertuzumab/Trastuzumab sample dose, 14 mL of Pertuzumab (420 mg) was diluted directly into the IV infusion bag that contained a nominal 250 mL (±25 mL overage) 0.9% saline solution, without removing an equal amount of saline, followed by 20 mL of the reconstituted Trastuzumab (420 mg) using an 18 gauge needle at room temperature. The total concentration of the two proteins combined in the 250 mL IV bag was expected to be approximately 3 mg/mL. Similarly, the Pertuzumab (420 mg) alone IV bag was prepared with 14 mL of the 30 mg/mL drug product directly diluted into an IV infusion bag. The final expected concentration was approximately 1 mg/mL. The Trastuzumab (420 mg) alone IV infusion bag was also prepared in the same manner except 20 mL of the 21 mg/mL drug product was added into the bag. The final expected concentration was approximately 1 mg/mL.

The PO IV bags were manually mixed thoroughly by a gentle back and forth rocking motion several times to ensure homogeneity. After mixing, 10 mL of sample was removed with a syringe from each bag and stored in sterile 15 cc falcon tubes to be used as the diluted sample control at time zero (T0). The IV bags were then stored covered in foil at 30° C. for 24 hours (T24). Immediately after storage, the remainder of the sample was removed with a syringe from each bag and placed into sterile 250 mL PETG containers. The T0 and T24 samples were held for up to 24 hours at 5° C. or immediately analyzed by CAC, UV-spec scan (concentration and turbidity), SEC, IEC, CZE, iCIEF, HIAC-Royco, as well as potency. The product quality of the samples was tested by the Pertuzumab and Trastuzumab product specific SEC and IEC methods, while only the Pertuzumab specific potency method was performed. The other assays utilized were non-product specific methods. All assays were qualified for the intended testing in their respective molecules and used without further method optimization.

Dose II: 1560 mg Pertuzumab/Trastuzumab Mixture (840 mg Pertuzumab and 720 mg Trastuzumab)

Sample preparation: The upper range of the mAb co-administration dose was examined (1560 mg total mixture: 840 mg Pertuzumab and 720 mg Trastuzumab) in PO and PVC IV infusion bag samples. In the event that an increase in protein aggregation is observed, the propensity of the formation of high molecular weight species (HMWS) would more likely occur at the upper dose of 1560 mg total mAb rather than the mixture containing 840 mg. To mitigate the risk during in-use conditions at the high dose range, both PO and PVC IV infusion bags were studied to ensure no interactions were seen.

Three types of drug combinations (mixture, 840 mg Pertuzumab alone, and 720 mg Trastuzumab alone) were prepared and handled similar to the dose I study. The Pertuzumab/Trastuzumab mixture contained 28 mL of Pertuzumab (840 mg) diluted directly into either PO or PVC IV infusion bags followed by 34 mL of the reconstituted Trastuzumab (720 mg) using an 18 gauge needle at room temperature. The total concentration of the two mAbs combined in a single 250 mL IV bag was expected to be approximately 5 mg/mL. For the controls, Pertuzumab and Trastuzumab alone IV infusion bag samples were prepared and handled similar to the dose I study, except 28 mL of 30 mg/mL Pertuzumab and 34 mL of 21 mg/mL Trastuzumab was directly diluted into each PO or PVC IV infusion bag.

The final expected concentration was approximately 3 mg/mL for the Pertuzumab (840 mg) and Trastuzumab (720 mg) alone samples. The bags were stored uncovered at either 5° C. or 30° C. for up to 24 hours. The T0 and T24 samples were analyzed immediately or held for up to 24 to 48 hours at 5° C. by CAC, UV-spec scan (concentration and turbidity), SEC, IEC, and HIAC-Royco.

Details of the types of doses, IV infusion bags, dose & preparation, storage temperatures, and assays are summarized in Table 11.

TABLE 11

| IV Bag Type, Dose, Preparation & Study Conditions | | | | |
|---|---|---|---|---|
| IV bag type (approx 250 mL, 0.9% NaCl) | Total dose, concentration | Dilution (into approx 250 mL IV bag) | Storage temperature (up to 24 hrs) | Assays |
| Dose I (n = 1) | | | | |
| PO | 840 mg, approx 3 mg/mL | Add 14 mL P (~30 mg/mL) + 20 mL T (~21 mg/mL) | 30° C. | CAC, UV spec scan (concentration, turbidity), SEC, IEC, CZE, iCIEF, HIAC-Royco, potency |
| | 420 mg[b], approx 2 mg/mL | Add 14 mL P (~30 mg/mL) | | |
| | 420 mg[b], approx 1 mg/mL | Add 20 mL T (~21 mg/mL) | | |
| Dose II (n = 1) | | | | |
| PO and PVC[a] | 1560 mg, approx 5 mg/mL | Add 28 mL P (~30 mg/mL) + 34 mL T (~21 mg/mL) | 5° C. | CAC, UV spec scan (concentration & turbidity), SEC, IEC, HIAC-Royco |
| PO and PVC | 840 mg[b], approx 3 mg/mL | Add 22 mL P (~30 mg/mL) | 30° C. | |
| | 720 mg[b], approx 3 mg/mL | Add 34 mL T (~21 mg/mL) | | |

[a] n = 2
[b] control
P = Pertuzumab; T = Trastuzumab

Assays

All samples were held at 5° C. or immediately analyzed. Typically, samples were analyzed within 24 to 48 hours of preparation and storage. The following assays were conducted to ascertain product quality and short term stability of Pertuzumab/Trastuzumab mixture, Pertuzumab alone, and Trastuzumab alone samples diluted into saline IV infusion bags. Since several assays, i.e. SEC, IEC, CZE, iCIEF, and potency, were not optimized for quantitative assessment of the mAb mixtures, only chromatographic or electropherographic overlays of these samples and their individual controls before and after storage at 5° C. or 30° C. are shown here. For consistency, no values, e.g. percent peak area, were calculated for all three sample types from the liquid chromatography and electrophorectic assays that were performed.

Color, Appearance, and Clarity (CAC)

The color, appearance, and clarity of the samples were determined by visual inspection under a white fluorescence light with black and white background at room temperature. A 3 cc glass vial was filled with 1 mL of each sample for CAC testing. A negative control (purified water) with the corresponding sample volume was used for comparison.

UV-Vis Spectrophotometer Scan for Concentration Measurements

The concentration was determined by measurement of the UV-absorbance on an HP8453 spectrophotometer via volumetric sample preparation. The instrument was blanked with 0.9% saline. Absorbance at $A_{max}$ (278 nm or 279 nm) and 320 nm in a quartz cuvette with 1-cm path length were measured for each sample. The absorbance at 320 nm is used to correct for background light scattering in solution. The concentration determination was calculated by using the absorptivity of 1.50 (mg/mL)$^{-1}$ cm$^{-1}$ for both Pertuzumab and Trastuzumab molecules.

$$\text{Protein Concentration (mg/mL)} = \frac{A_{max} - A_{320}}{1.50} \times \text{Dilution Factor} \times \frac{1}{\text{cuvette } pathlength}$$

Size Exclusion Chromatography (SEC: Pertuzumab Specific and Trastuzumab Specific)

Each sample was injected into a TOSOHAAS® column G3000 SWXL, 7.8×300 mm at ambient temperature on an AGILENT 1100® HPLC. The eluted peaks were monitored at 280 nm. Chromatographic integrations were analyzed by the CHROMELEON® software. The autosampler temperature was held at 2-8° C. throughout the run and mobile phases used were 0.2M potassium phosphate, 0.25 mM potassium chloride, pH 6.2 and 100 mM potassium phosphate, pH 6.8 for Pertuzumab-assay and Trastuzumab-assay, respectively. The recommended injection load as specified by the test procedure was 200 µg with an injection volume of 20 µL. The diluted 420 mg sample was injected at a load less than the recommended amount due to the low concentration of the protein after dilution in the IV bags. The maximum injection volume of the HPLC sample loop was 100 µL, which limits the volume that is able to be injected at one time. As a result, the injection volumes were modified to 100 µL at 160 µg protein for the Pertuzumab alone and Trastuzumab alone samples (420 mg dose group) and 73 µL at 200 µg protein for the Pertuzumab/Trastuzumab mixture (840 mg dose group). Modification in the injection volumes have been utilized in previous IV bag studies and are necessary when handling low concentration samples.

Ion-Exchange Chromatography (IEC)

The analysis of carboxypeptidase B (CpB)-digested Pertuzumab and Trastuzumab for charge heterogeneity was employed by IEC for each sample. For the Pertuzumab specific IEC, samples were either tested with regular IEC ("Pertuzumab-regular IEC") or a modified "fast" version of IEC ("Pertuzumab-IEC-fast") for high throughput, method for the purpose of these experiments. The IEC assays utilized the a DIONEX® WCX weak cation exchange column equilibrated with solvent A (20 mM MES, 1 mM Na$_2$EDTA pH 6.00) and solvent B (250 mM sodium chloride in solvent A) monitored at 280 nm for Pertuzumab-regular IEC and Pertuzumab-IEC-fast, whereas solvent A (10 mM sodium phosphate, pH 7.5) and solvent B (100 mM sodium chloride in Solvent A) monitored at 214 nm was used for Trastuzumab on an AGILENT 1100@HPLC. The peaks were eluted at a flow rate of 0.8 mL/min with an increasing gradient of 18%-100% solvent B over 35 minutes and 90 minutes for Pertuzumab-regular-IEC and Pertuzumab-IEC-fast, respectively, and 15%-100% solvent B over 55 minutes for Trastuzumab-IEC. Column temperatures were maintained at either 34° C. or 42° C. and ambient for Pertuzumab-regular-IEC or Pertuzumab-fast-IEC and Trastuzumab-IEC, respectively, while the auto sampler temperature was held at 2-8° C. throughout the run.

HIAC-ROYCO™ Light Obscuration for Sub-Visible Particles

Particulate counts in the diluted drug product were carried out using the HIAC-ROYCO™ Liquid Particulate Counting System model 9703. Average cumulative numbers of particles at ≥10 µm and ≥25 m per milliliter were tabulated in each sample using PHARMSPEC v2.0™. The test procedure was modified for a small-volume method, utilizing either four 1 mL readings or four 0.4 mL readings per a test session while discarding the first reading of each sample. The HIAC-ROYCO™ samples were degassed under vacuum for approximately 10-15 minutes each. The size below 10 m was not collected for this sample set.

UV-Vis Spectrophotometer Scan for Turbidity Measurements

The optical density of the samples from the IV bag (1 mg/mL or 3 mg/mL) was measured in a quartz cuvette with a 1-cm path length on a HP8453 spectrophotometer. The sample readings were blanked against purified water. The absorbance measurements were recorded at 340 nm, 345 nm, 350 nm, 355 nm, and 360 nm and the turbidity was expressed as an average of these wavelengths.

Capillary Zone Electrophoresis, CZE

CZE was performed using a PROTEOMELAB PA800™ capillary electrophoresis system (Beckman Coulter) with neutral-coated capillary (50 µm×50 cm). The buffer consisted of 40 mM ε-amino caproic acid/acetic acid, pH 4.5, 0.2% hydroxypropyl methyl cellulose (HPMC). Samples were diluted to 0.5 mg/mL in water and injected into the capillary at 1 psi for 10 seconds. Separation was performed using a voltage of 30 kV for 15 minutes, and the species were detected by UV at 214 nm.

CE-SDS-LIF, Reduced and Non-Reduced

Each sample was derivatized with 5 carboxytetramethyl-rhodamine succinimidyl ester, a fluorescent dye. After removing the free dye through gel filtration (using NAP-5 columns), non-reduced samples were prepared by adding 40 mM iodoacetamide and heated at 70° C. for 5 minutes. For the analysis of the reduced samples, the derivatized samples were mixed with SDS to a final concentration of 1% (v/v) and 10 mL of a solution containing 1 M DTT, and heated at 70° C. for 20 minutes. The prepared samples were analyzed on a Beckman Coulter ProteomeLab PA800 system using a 50 mm I.D. 31.2 cm fused silica capillary maintained at 20° C. throughout the analysis. Samples were introduced into the capillary by electrokinetic injection at 10 kV for 40 seconds. The separation was conducted at a constant voltage of 15 kV in the reversed polarity (negative to positive) mode using CE-SDS running buffer as the sieving medium. An argon ion laser operating at 488 nm was used for fluorescence excitation with the resulting emission signal monitored at 560 nm.

iCIEF

The distribution of charge variants of the Pertuzumab/Trastuzumab mixture, Pertuzumab alone, and Trastuzumab alone was assessed by iCIEF using an iCE280™ analyzer (Convergent Bioscience) with a fluorocarbon coated capillary cartridge (100 µm×5 cm). The ampholyte solution consisted of a mixture of 0.35% methyl cellulose (MC), 0.47% Pharmalyte 3-10 carrier ampholytes, 2.66% Pharmalyte 8-10.5 carrier ampholytes, and 0.20% pI markers 7.05 and 9.77 in purified water. The anolyte was 80 mM phosphoric acid, and the catholyte was 100 mM sodium hydroxide, both in 0.10% methylcellulose. Samples were diluted in purified water and CpB was added to each diluted sample at an enzyme to substrate ratio of 1:100 followed by incubation at 37° C. for 20 minutes. The CpB treated samples were mixed with the ampholyte solution and then focused by introducing a potential of 1500 V for one minute, followed by a potential of 3000 V for 10 minutes. An image of the focused Pertuzumab charge variants was obtained by passing 280 nm ultraviolet light through the capillary and into the lens of a charge coupled device digital camera. This image was then analyzed to determine the distribution of the various charge variants.

Anti-Proliferation Potency Assay

This test procedure is based on the ability of Pertuzumab to inhibit the proliferation of MDA MB 175 VII human breast carcinoma cells. Briefly, cells were seeded in 96-well tissue culture microtiter plates and incubated overnight at 37° C. under 5% $CO_2$ to allow cell attachment. The following day, the culture medium was removed and serial dilutions of each standard, controls, and sample(s) were added to the plates. The plates were then incubated for fours days at 37° C. under 5% $CO_2$ and the relative number of viable cells was quantified indirectly using a redox dye, ALA-MARBLUE® according to the manufacturer's protocol. Each sample was assayed in triplicate and the changes in color as measured by fluorescence were directly proportional to the number living cells in the culture. The absorbance of each well was then measured on a fluorescence 96-well plate reader. The results, expressed in relative fluorescence units (RFU), were plotted against the antibody concentration. No quantitative measurements were made, or possible, since there was no Pertuzumab/Trastuzumab mixture reference available. Therefore, the results are comparisons of the dose response curves only.

Results and Discussion

Dose I: 840 mg Total Pertuzumab/Trastuzumab Mixture (420 mg Pertuzumab and 420 mg Trastuzumab)

Figure 15:
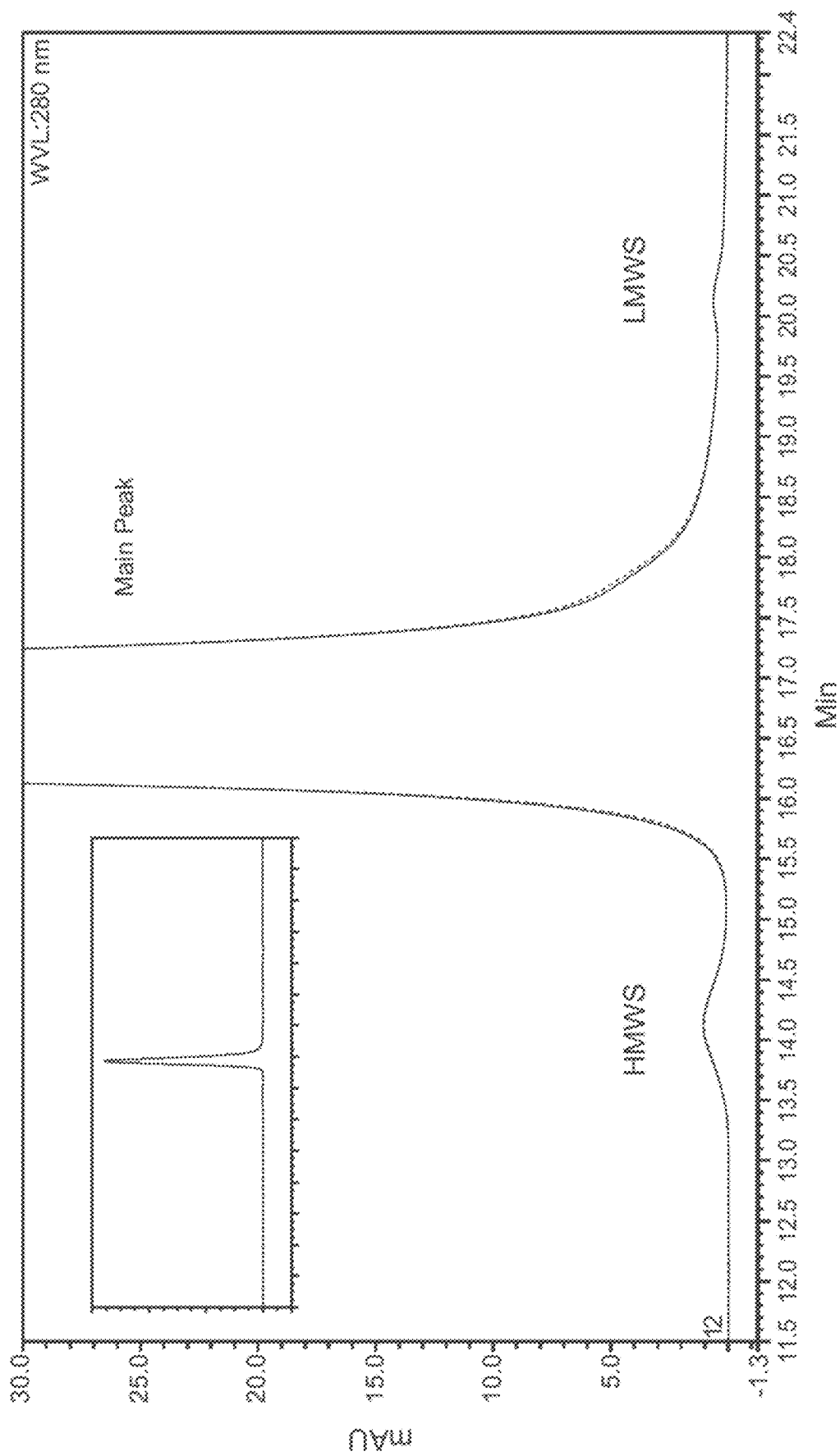
FIG. 15 depicts Pertuzumab SEC profile of Pertuzumab/Trastuzumab mixture (840 mg) at 30° C. in 0.9% saline PO IV infusion bags (1) Time=0; (2) Time=24 hrs. Expanded view; full view (inset).
Figure 16:
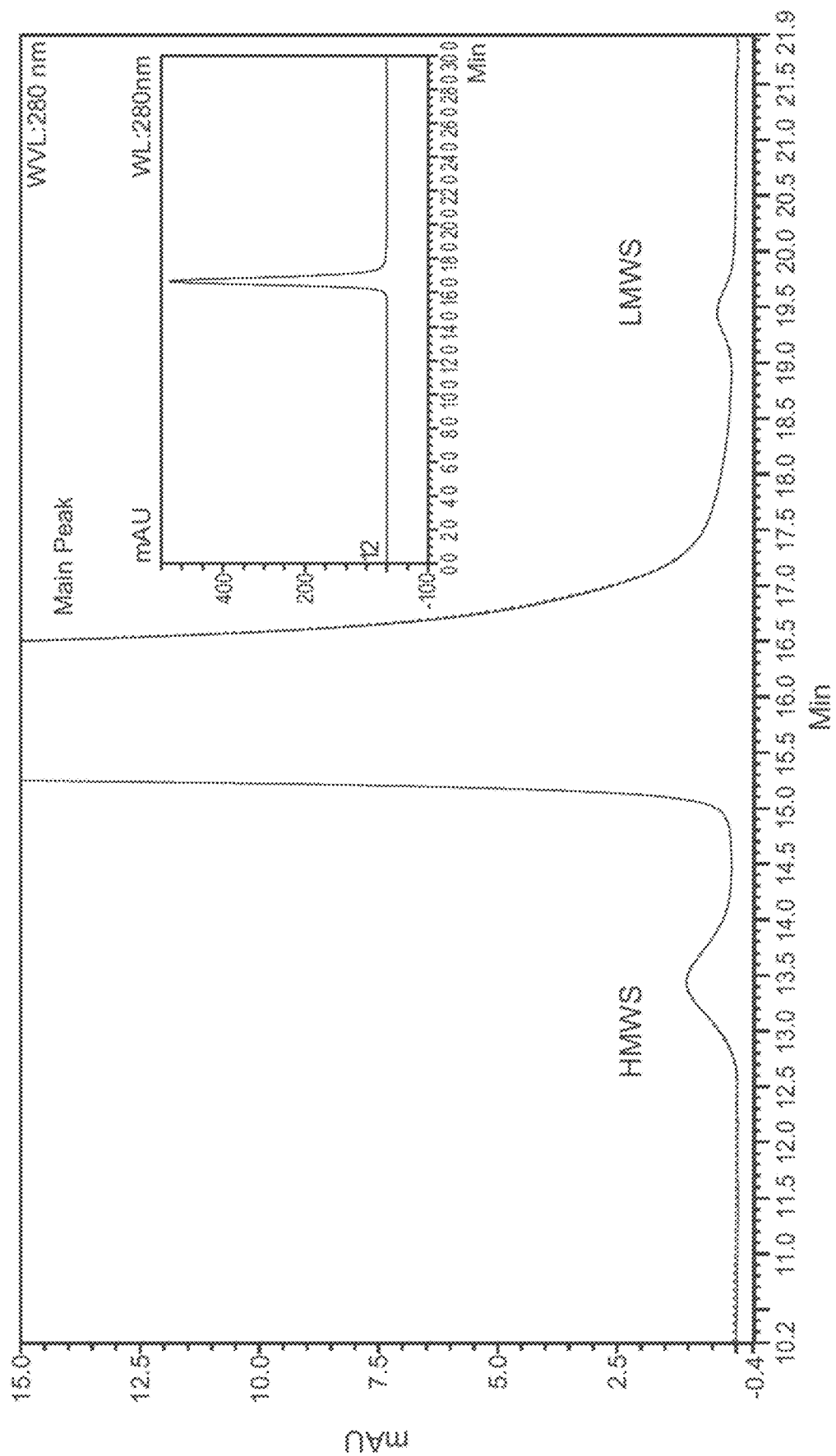
FIG. 16 shows Trastuzumab SEC profile of Pertuzumab/Trastuzumab mixture (840 mg) at 30° C. in 0.9% saline PO IV infusion bags (1) Time=0; (2) Time=24 hrs. Expanded view; full view (inset).

The product quality of the total 840 mg Pertuzumab/Trastuzumab mixture (420 mg Pertuzumab and 420 mg Trastuzumab), Pertuzumab alone (420 mg), and Trastuzumab alone (420 mg) in IV infusion bags (n=1) before and after storage at 30° C. for up to 24 hours was assessed by CAC, concentration measurements by UV-spec scan, turbidity, and HIAC Royco (Table 12). The Pertuzumab and Trastuzumab alone IV infusion bags are considered controls that were also prepared to assess the ability of the assay to pick up the appropriate product attributes.

size for Pertuzumab/Trastuzumab mixture, Pertuzumab alone, or Trastuzumab alone samples post storage. These results are comparable to the 0.9% saline only solution. The lack of visible precipitation or particulates indicates that the admixture and the controls are sufficiently stable upon dilution in the 0.9% saline IV infusion bags. The Pertuzumab/Trastuzumab mixture diluted in saline were run on SEC, both Pertuzumab and Trastuzumab specific methods, and showed comparable peak profiles between T0 and T24 (FIGS. 15 and 16). No increases were observed in the high molecular weight species (HMWS) and low molecular weight species (LMWS). Similarly, no changes were observed in the main peak in any sample. The main peak and the peak area of the HMWS and LMWS overlay and cannot be distinguished in the Pertuzumab/Trastuzumab mixture due the size similarity between Pertuzumab and Trastuzumab (molecular weight approximately 150 kD). Furthermore, comparison of T0 and T24 for both the Pertuzumab and Trastuzumab alone sample showed no observable changes in peak area or profile as detected by the two SEC methods listed above.

Figure 17:
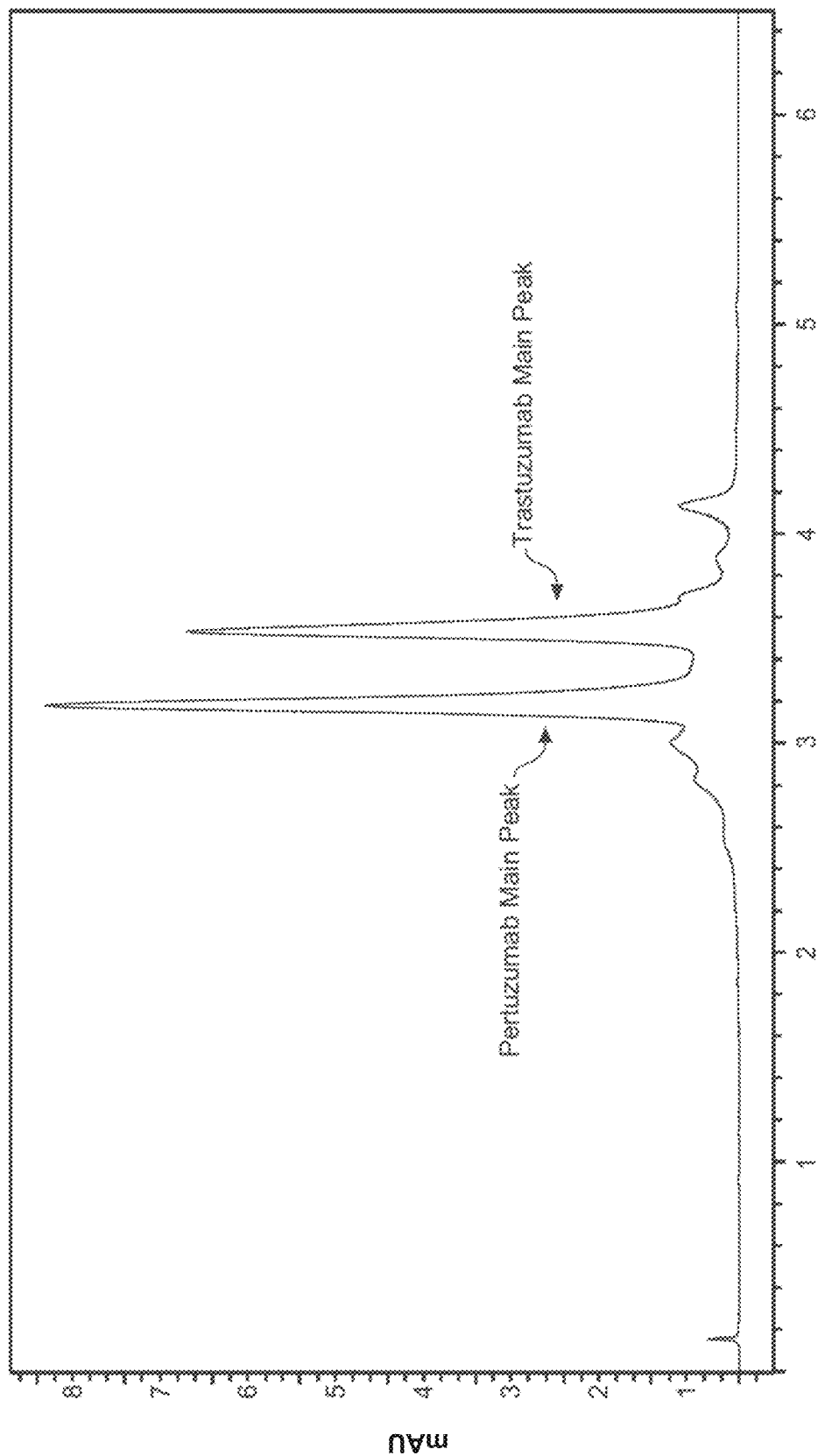
FIG. 17 shows Pertuzumab IEC profile of Pertuzumab/Trastuzumab mixture at 30° C. in 0.9% saline PO IV infusion bags (1) Time=0; (2) Time=24 hrs. Full view.
Figure 18:
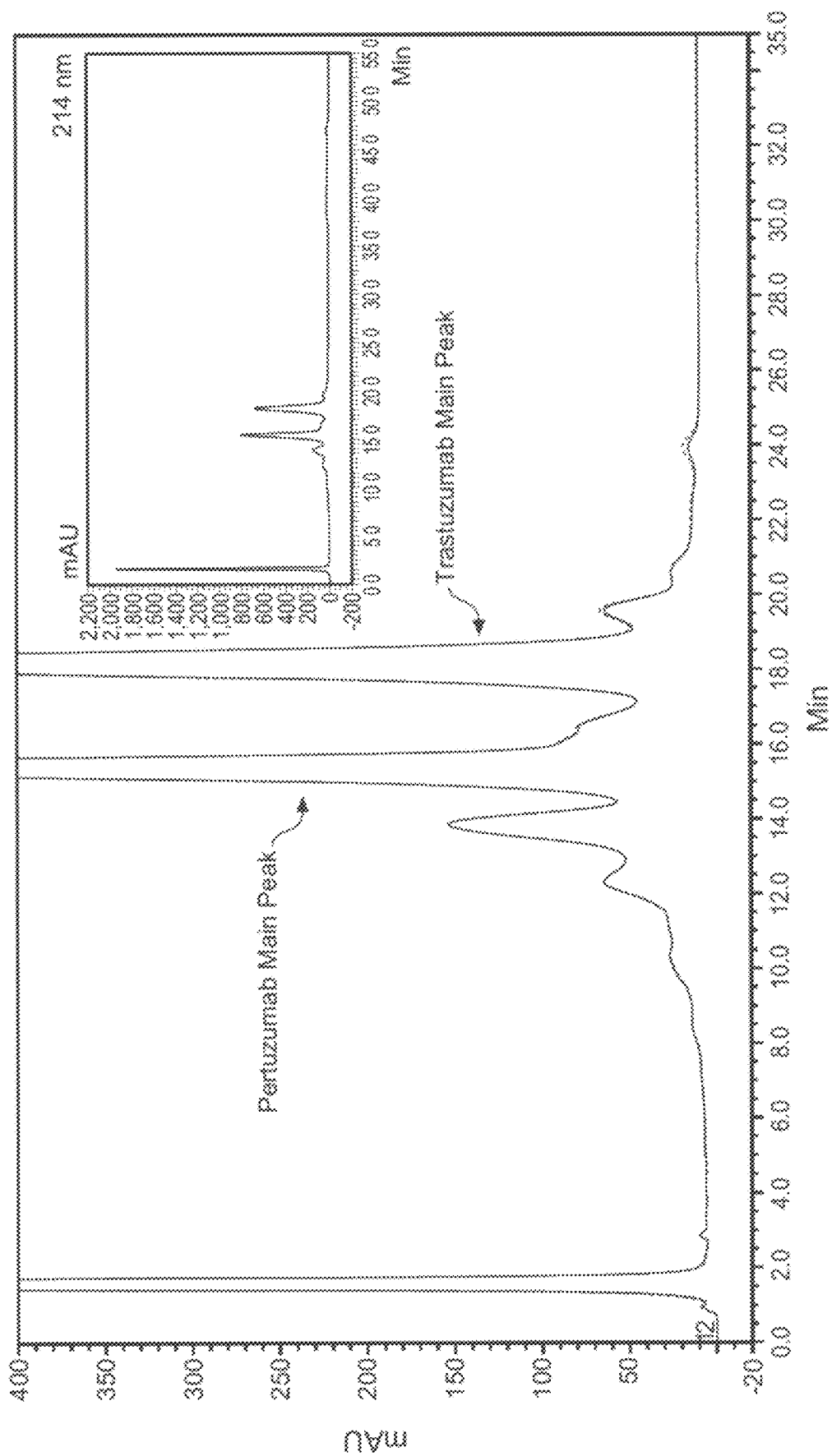
FIG. 18 depicts Trastuzumab IEC profile of Pertuzumab/Trastuzumab mixture at 30° C. in 0.9% saline PO IV infusion bags (1) Time=0; (2) Time=24 hrs. Expanded view; Full view (inset).

Two product specific methods for Pertuzumab or Trastuzumab IEC was utilized to analyze the Pertuzumab/Trastuzumab mixture (FIGS. 17 and 18). In the cation-exchange chromatography assays, each molecule typically contain three distinct areas that are eluted based on relative charge, with the early eluting acidic variants, followed by the main peak, and lastly the late eluting basic variants. In the Pertuzumab and Trastuzumab alone chromatograms, the profile exhibiting the acidic variants, main peak, and the basic variants was observed and deemed comparable between the starting material and post storage at 30° C. These results are also consistent with prior studies conducted in saline IV infusion bags for the either Pertuzumab or Trastuzumab alone. For the Pertuzumab/Trastuzumab mixture chromatogram, the Pertuzumab peaks elute first followed by the Trastuzumab peaks. Due to the nature of cation-exchange separation and the net charge difference between Pertuzumab (~pI 8.7) and Trastuzumab (~pI 8.9),

TABLE 12

Dose I 840 mg: Stability data for Pertuzumab/Trastuzumab mixture, Pertuzumab, or Trastuzumab in 0.9% saline PO IV infusion bags (n = 1)

| | | | | | | | | Light Obscuration | |
|---|---|---|---|---|---|---|---|---|---|
| Sample | IV bag type | Amount mg | Timepoint Hour(s) | Temp ° C. | $CAC^a$ liquid | Conc. mg/mL | Turbidity AU | total particles ≥10 um/mL | total particles ≥25 um/mL |
| pertuzumab/ trastuzumab mixture | PO | 840 | 0 | 30 | CL, CO | 2.7 | 0.016 | 1 | 0 |
| | | 840 | 24 | 30 | CL, CO | 2.7 | 0.016 | 6 | 0 |
| pertuzumab | PO | 420 | 0 | 30 | CL, CO | 1.4 | 0.012 | 3 | 0 |
| | | 420 | 24 | 30 | CL, CO | 1.4 | 0.011 | 4 | 0 |
| trastuzumab | PO | 420 | 0 | 30 | CL, CO | 1.5 | 0.012 | 1 | 0 |
| | | 420 | 24 | 30 | CL, CO | 1.5 | 0.011 | 6 | 0 |
| saline only | — | — | — | — | — | — | — | 2 | 1 |

$^a$Color, Appearance and Clarity: CL = clear; SOPL = slightly opalescent, CO = colorless.
RT = room temperature After storage, the Pertuzumab/Trastuzumab mixture, Pertuzumab alone, and Trastuzumab alone samples appeared as a clear and colorless liquid with no visible particles as observed by CAC. The concentration and turbidity measurements showed no measureable changes in any of the three sample types after 24 hours at 30° C. Particulate analysis by HIAC Royco detected no more than 6 particles greater than or equal to 10 μm size and no particles greater than 25 μm two main peaks, or major charged species, are observed in the Pertuzumab/Trastuzumab mixture. In contrast, the SEC assay separates based on the hydrodynamic size of the molecule and show only one main peak due to the size similarity between Pertuzumab and Trastuzumab. The charged regions of each molecule appear to overlap with each other in the Pertuzumab/Trastuzumab mixture. Specifically, the Pertuzumab basic variants expected to elute at approximately 32 minutes and at 35 minutes appear to overlap with the main peak of Trastuzumab (FIGS. 17 and 18). Furthermore, the acidic variants of Trastuzumab expected to elute before the Trastuzumab main peak co-elute with the Pertuzumab basic variants and main peak. Despite the overlapping peak regions, the Pertuzumab/Trastuzumab mixture exhibited comparable chromatographic peak profiles before and after storage in IV saline bags for 24 hours at 30° C.

Figure 19:
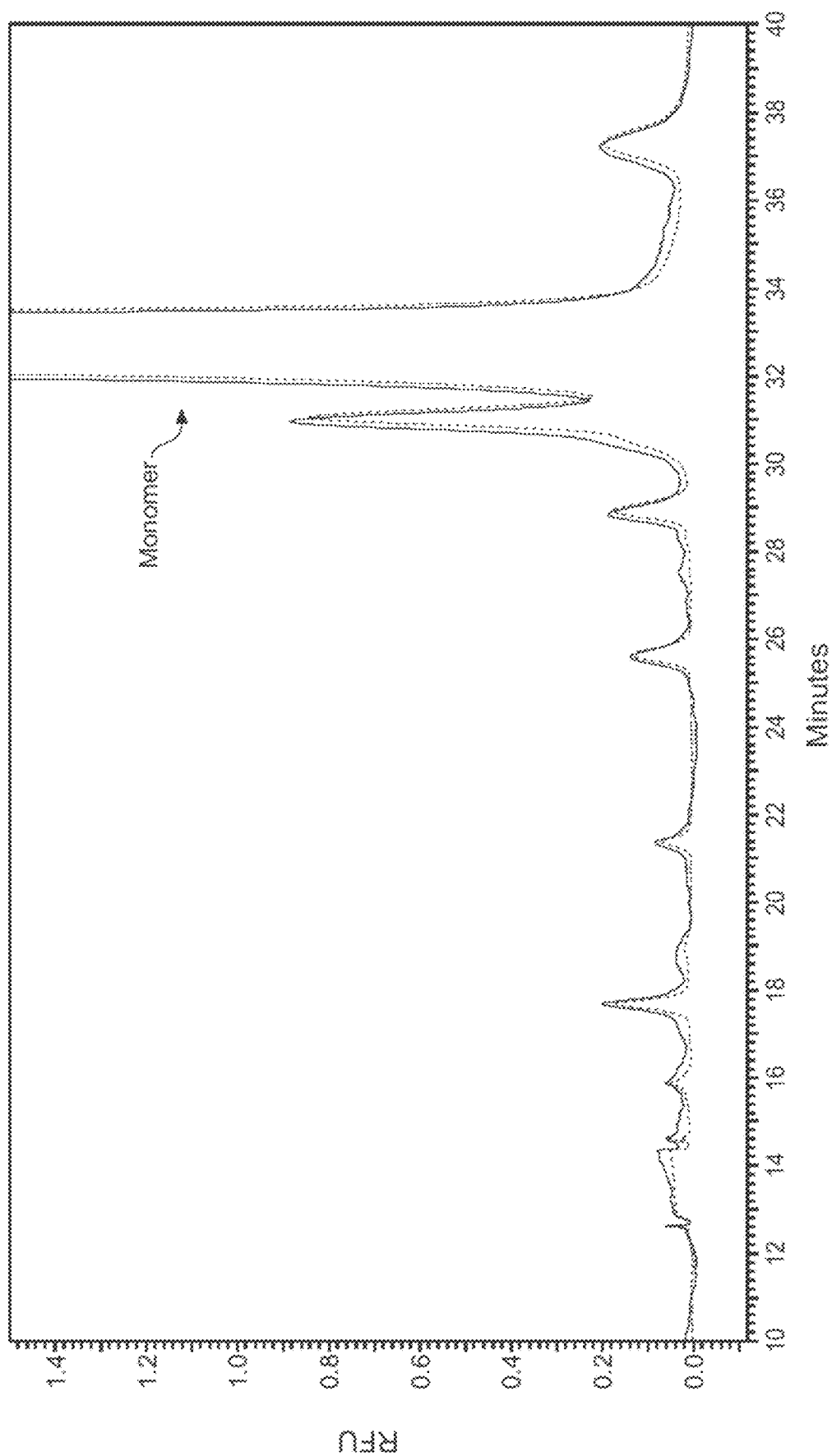
FIG. 19 depicts CE-SDS LIF non-reduced profile of Pertuzumab/Trastuzumab mixture at 30° C. in 0.9% saline PO IV infusion bags (1) Time=0; (2) Time=24 hrs. Expanded view.
Figure 20:
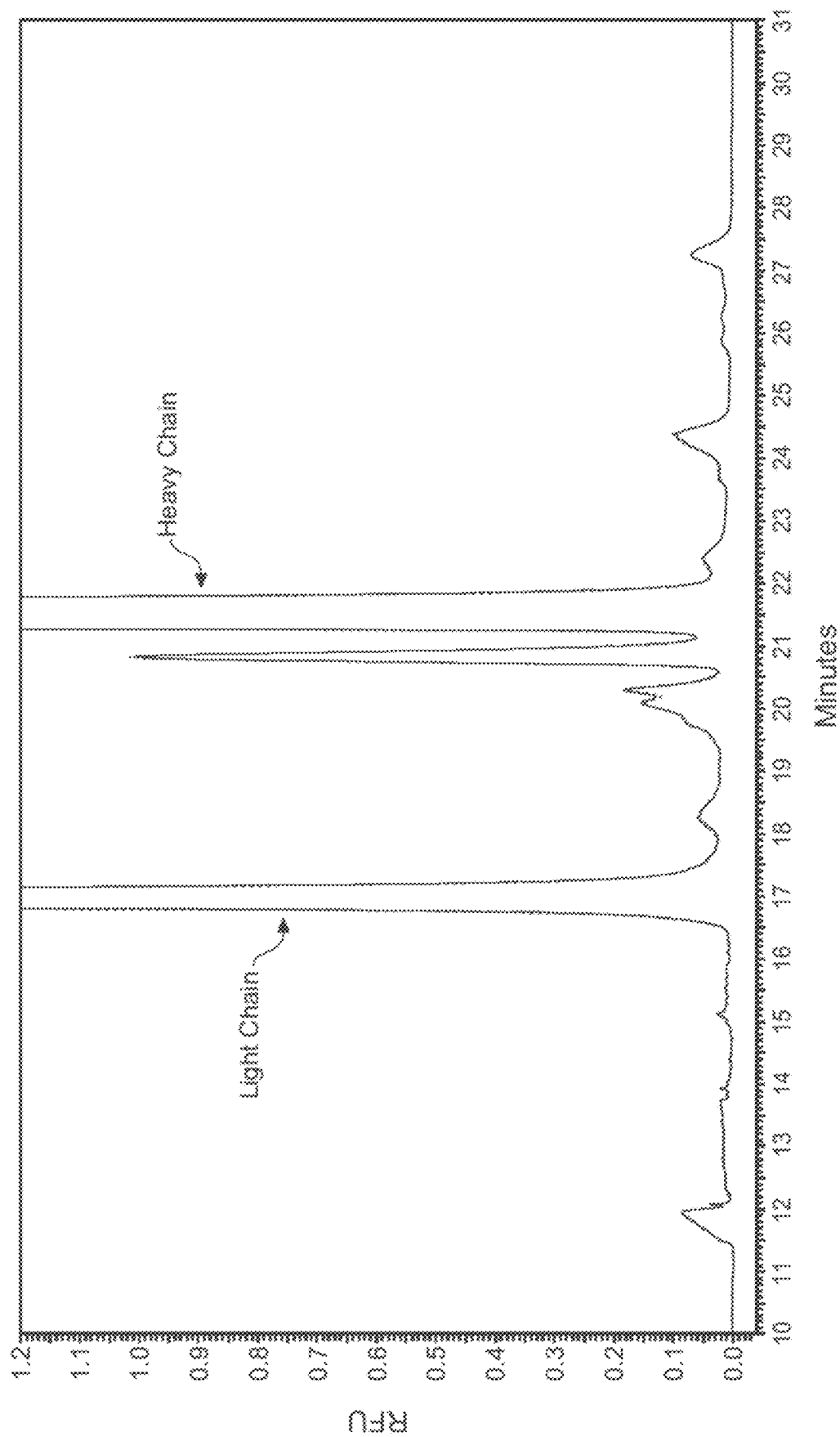
FIG. 20 shows CE-SDS LIF reduced profile of Pertuzumab/Trastuzumab mixture at 30° C. in 0.9% saline PO IV infusion bags (1) Time=0; (2) Time=24 hrs. Expanded view.

The Pertuzumab/Trastuzumab mixture, Pertuzumab alone, and Trastuzumab alone samples were also assayed on CE-SDS LIF under non-reduced conditions after storage for 24 hours at 30° C. The Pertuzumab/Trastuzumab mixture showed consistent peak profiles with no observable changes after storage compared to the starting material (FIGS. 19 and 20). A very slight baseline level variation attributed to noise is also observed and does not impact peak area. Similar to SEC, the non-reduced Pertuzumab/Trastuzumab mixture showed only one superimposed monomer constituting both the Pertuzumab and Trastuzumab main species. The Pertuzumab and Trastuzumab alone samples showed no changes at T0 compared to T24. However, individual molecular attributes, e.g. fragment peak level and species, between Pertuzumab/Trastuzumab mixture, Pertuzumab alone, and Trastuzumab alone was observed as expected.

Two major peaks known as the light chain (LC) and heavy chain (HC) are detected at 17 and 21.5 minutes, respectively, when Pertuzumab/Trastuzumab mixture, Pertuzumab alone, and Trastuzumab alone was run on CE-SDS LIF reduced with DTT (FIG. 20). No increase in fragmentation or concomitant decrease in the LC and HC was seen post storage at 30° C. for the Pertuzumab/Trastuzumab mixture. Furthermore, no detectable peak profile differences were noticed in the Pertuzumab and Trastuzumab alone samples post storage.

Figure 21:
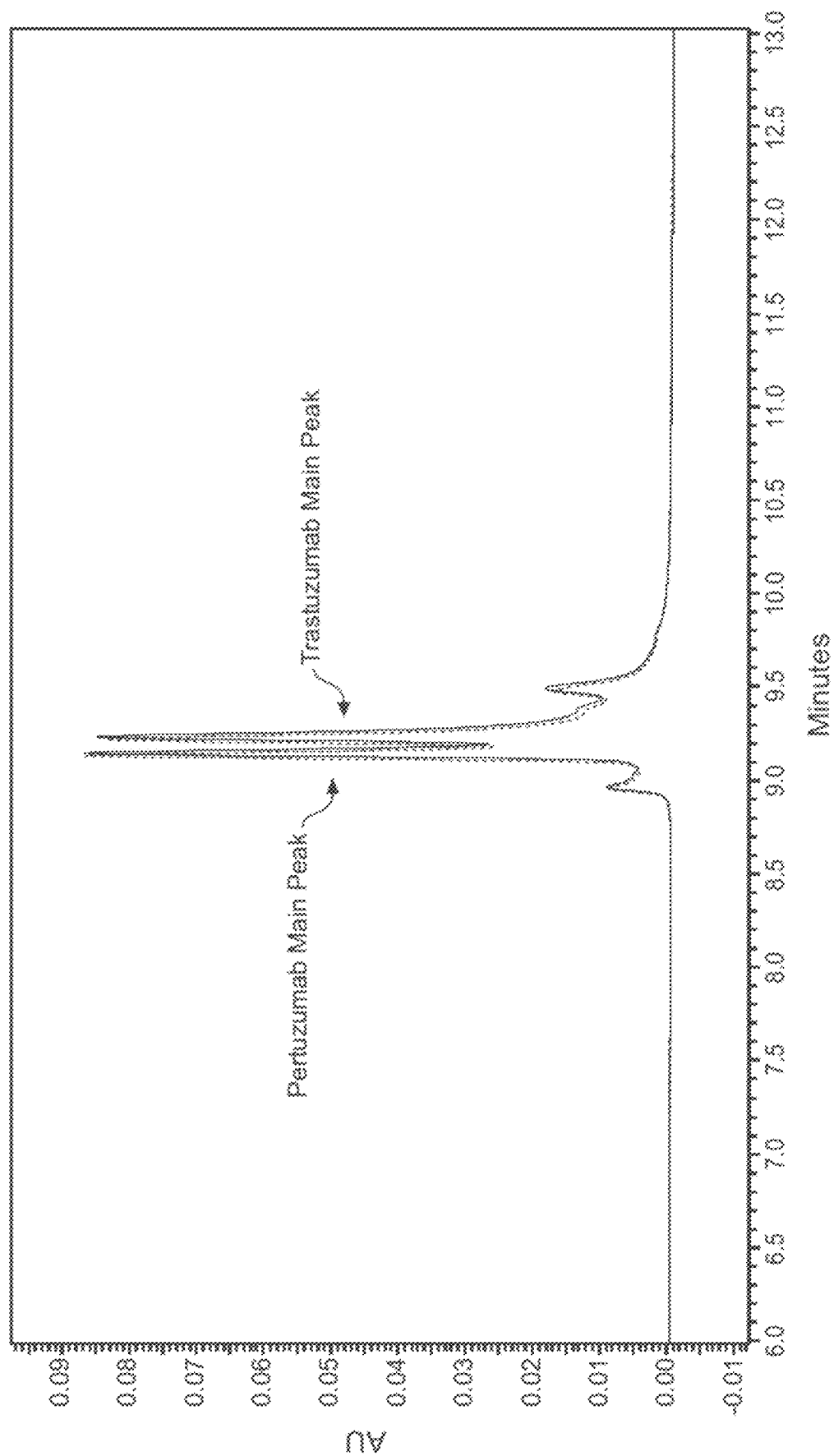
FIG. 21 is CZE of Pertuzumab/Trastuzumab mixture at 30° C. in 0.9% saline PO IV infusion bags (1) Time=0; (2) Time=24 hrs. Full view.
Figure 22:
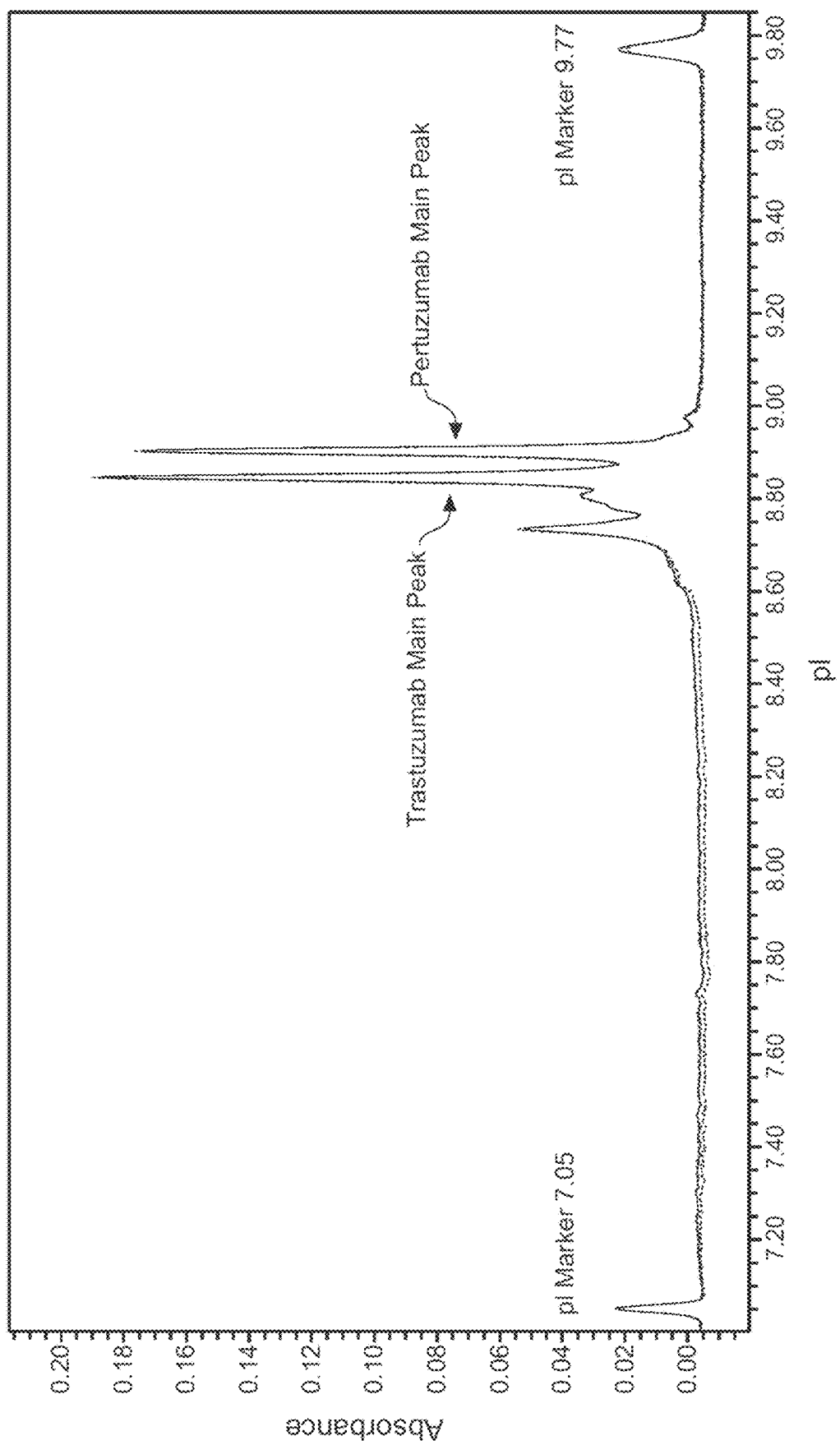
FIG. 22 shows iCIEF of Pertuzumab/Trastuzumab mixture at 30° C. in 0.9% saline PO IV infusion bags (1) Time=0; (2) Time=24 hours. Full view.

The charge separation assays CZE and iCIEF show comparable peak profiles for the Pertuzumab/Trastuzumab mixture after storage at 30° C. (FIGS. 21 and 22). The Pertuzumab and Trastuzumab alone when compared to their respective T0 also showed consistent peak profiles with no changes after storage. Furthermore, the presence of various minor species was also observed, although no new peaks were detected upon dilution in the IV bag saline solution. As seen in the charge based IEC assay, two main peaks flanked by smaller overlapping peaks can be detected and was attributed to the difference in the molecular pI.

Figure 23:
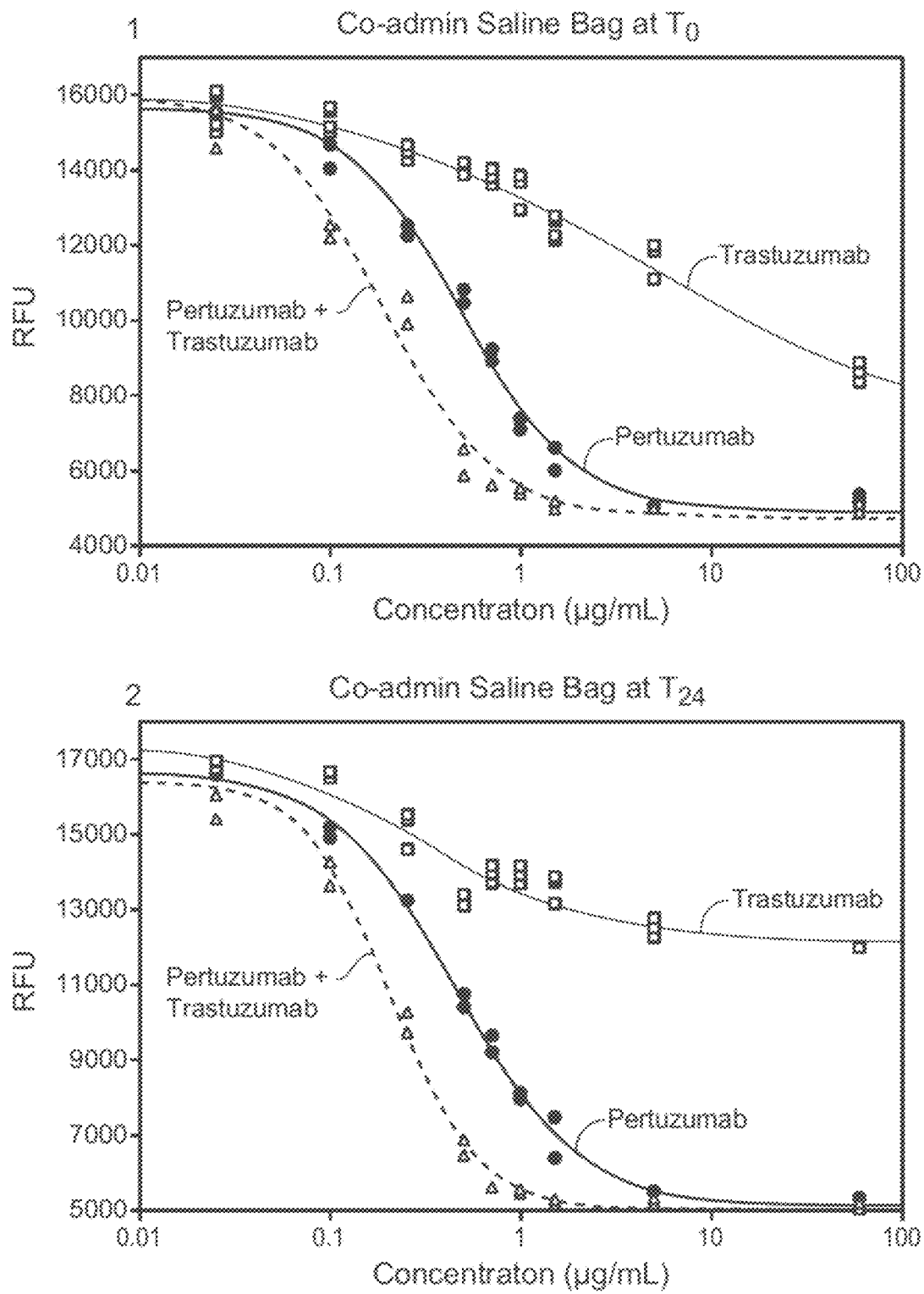
FIG. 23 shows potency dose response curves (μg/mL versus RFU) of Pertuzumab/Trastuzumab mixture, Pertuzumab alone, and Trastuzumab alone in 0.9% saline PO IV infusion bags (1) Time=0; (2) Time=24 hours.
Figure 24:
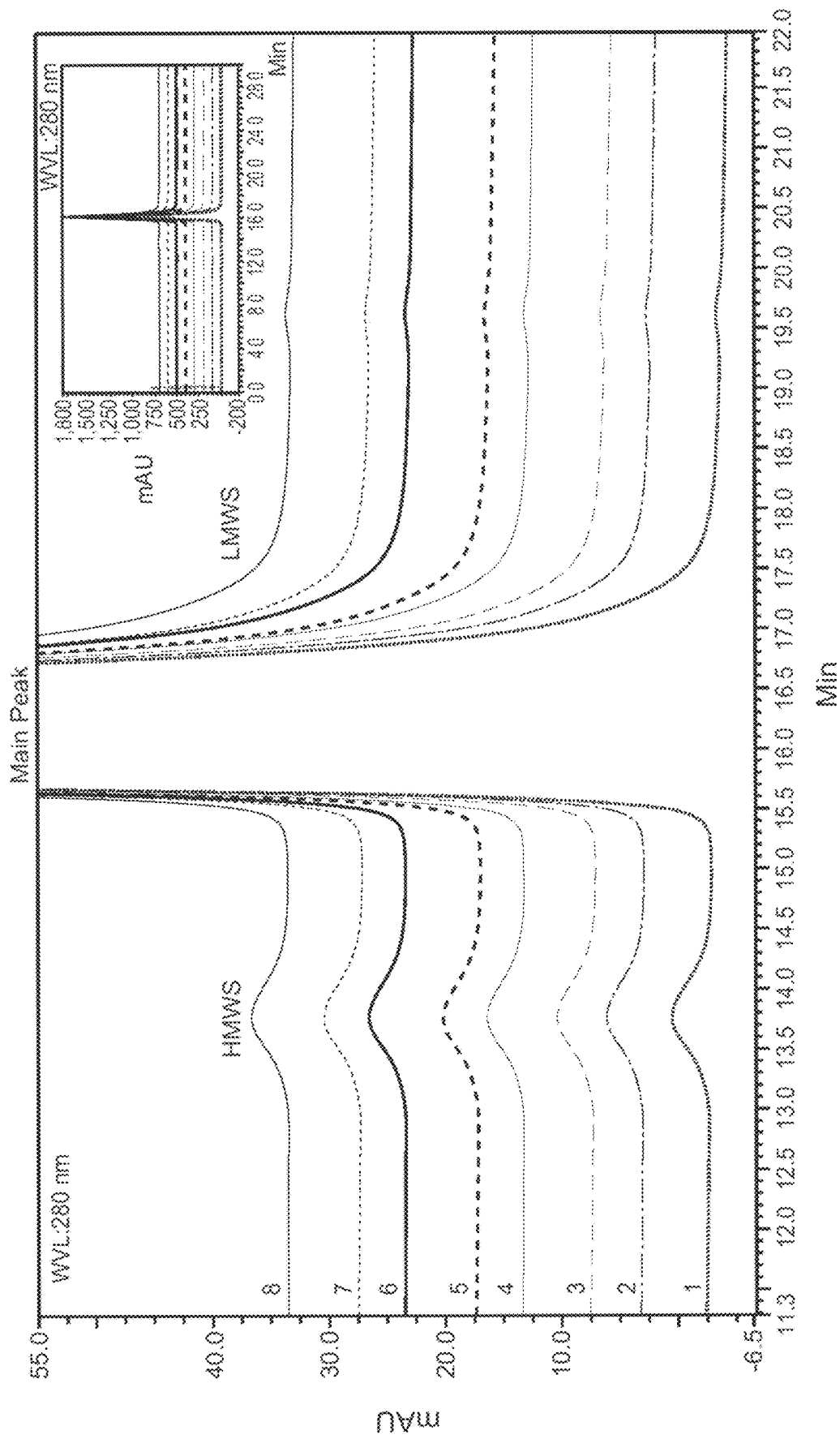
FIG. 24 depicts Pertuzumab SEC profile of Pertuzumab/Trastuzumab mixture (1560 mg) in 0.9% saline IV infusion bags (1) PO 5° C. T0; (2) PO 5° C. T24 hrs; (3) PO 30° C. T0; (4) PO 30° C. T24 hrs; (5) PVC 5° C. T0; (6) PVC 5° C. T24 hrs; (7) PVC 30° C. T0; (8) PVC 30° C. T24 hrs. Expanded view; full view (inset).
Figure 25:
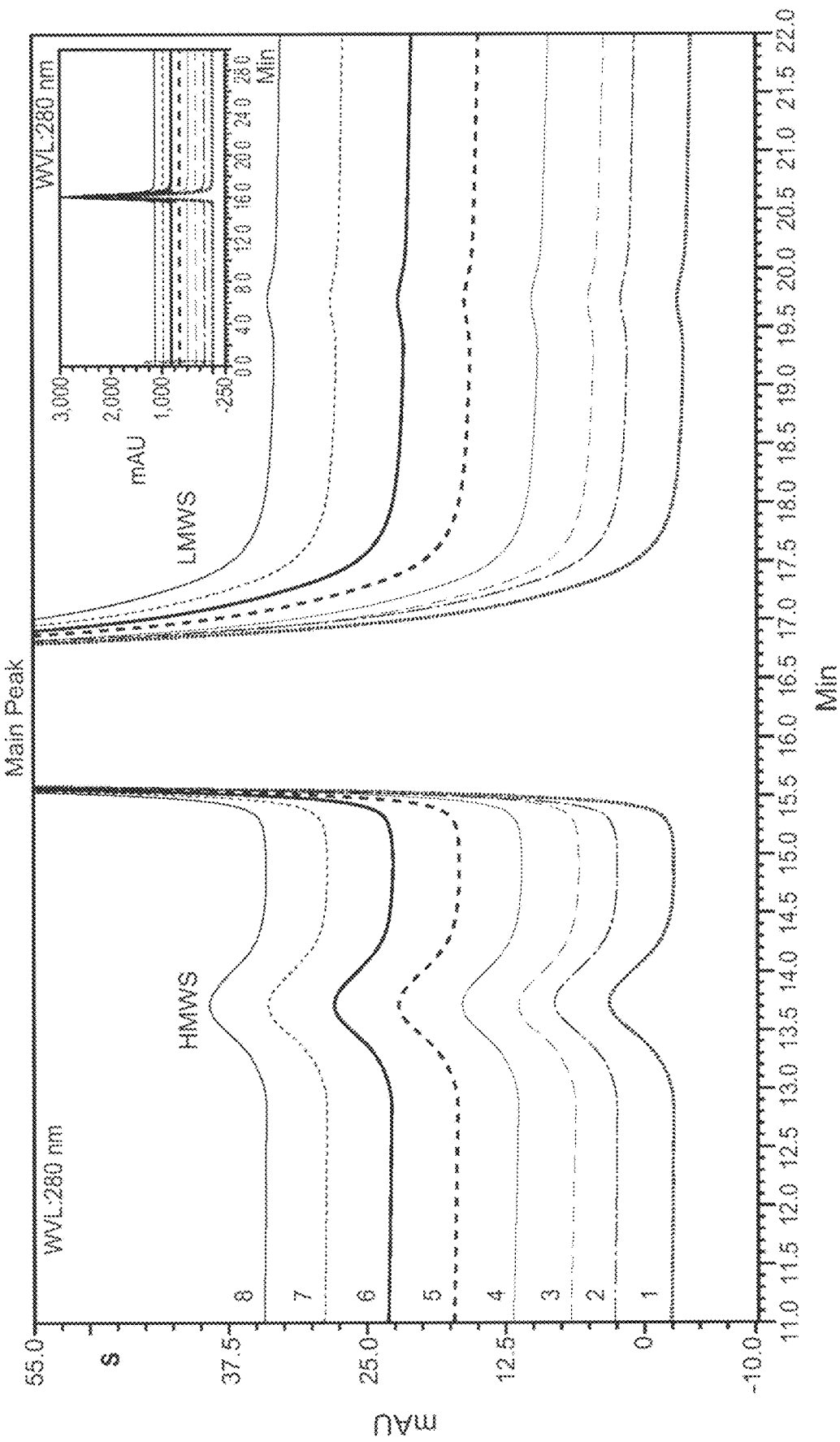
FIG. 25 shows Trastuzumab SEC profile of Pertuzumab/Trastuzumab mixture (1560 mg) in 0.9% saline IV infusion bags (1) PO 5° C. T0; (2) PO 5° C. T24 hrs; (3) PO 30° C. T0; (4) PO 30° C. T24 hrs; (5) PVC 5° C. T0; (6) PVC 5° C. T24 hrs; (7) PVC 30° C. T0; (8) PVC 30° C. T24 hrs. Expanded view; full view (inset).

The potency results based on comparison of the dose response curve showed no impact on the potency of the Pertuzumab/Trastuzumab mixture stored at 30° C. for 24 hours compared to its corresponding T0 dose response curve (FIG. 23). The Trastuzumab alone showed little activity in the Pertuzumab potency assay. The Pertuzumab/Trastuzumab mixture dose response curve compared to the dose response curve of Pertuzumab or Trastuzumab alone showed that lower doses of the Pertuzumab/Trastuzumab mixture were needed to inhibit the growth of cells as compared to Pertuzumab alone, suggesting there may be an additive or synergistic effect on the inhibition of cell proliferation for the mixture.

Dose II: 1560 mg Total Pertuzumab/Trastuzumab Mixture (840 mg Pertuzumab and 720 mg Trastuzumab)

In addition to the dose I study at 840 mg total mAb, a higher dose of 1560 mg mixture (840 mg Pertuzumab and 720 mg Trastuzumab), and their individual drug product controls (840 mg Pertuzumab alone and 720 mg Trastuzumab alone) was selected to investigate the impact of diluting these three mAb types in PO or PVC IV infusion bags at 5° C. or 30° C. for up to 24 hours. The product quality of these IV infusion bags before and after storage was assessed by CAC, UV-spec scan (concentration and turbidity), and HIAC-ROYCO™ are summarized in Table 13 and SEC and IEC are shown in FIGS. 24-27.

TABLE 13

Dose II 1560 mg: Stability data for Pertuzumab/Trastuzumab mixture, Pertuzumab, or Trastuzumab in 0.9% saline PO IV infusion bags (n = 1 for control; n = 2 for mixture)

| Sample | IV bag type | Amount mg | Temp °C. | Timepoint Hour(s) | CAC[a] liquid | Conc. mg/mL | Turbidity AU | Light Obscuration total particles ≥10 um/mL | Light Obscuration total particles ≥25 um/mL |
|---|---|---|---|---|---|---|---|---|---|
| pertuzumab/ trastuzumab mixture | PO | 1560 | 5 | 0 | CL, CO | 4.9 | 0.013 | 20 | 1 |
| | | | | 24 | CL, CO | 4.7 | 0.016 | 15 | 1 |
| | | 1560 | 30 | 0 | CL, CO | 5.0 | 0.014 | 8 | 0 |
| | | | | 24 | CL, CO | 4.9 | 0.018 | 18 | 0 |
| pertuzumab | PO | 840 | 5 | 0 | CL, CO | 2.9 | 0.007 | 1 | 0 |
| | | | | 24 | CL, CO | 2.9 | 0.005 | 6 | 0 |
| | | 840 | 30 | 0 | CL, CO | 2.8 | 0.006 | 6 | 0 |
| | | | | 24 | CL, CO | 2.8 | 0.004 | 9 | 0 |
| trastuzumab | PO | 720 | 5 | 0 | CL, CO | 2.6 | 0.004 | 4 | 0 |
| | | | | 24 | CL, CO | 2.6 | 0.005 | 13 | 0 |
| | | 720 | 30 | 0 | CL, CO | 2.5 | 0.007 | 19 | 0 |
| | | | | 24 | CL, CO | 2.5 | 0.004 | 14 | 0 |
| pertuzumab/ trastuzumab mixture | PVC | 1560 | 5 | 0 | CL, CO | 4.9 | 0.016 | 18 | 0 |
| | | | | 24 | CL, CO | 4.7 | 0.015 | 18 | 0 |
| | | 1560 | 30 | 0 | CL, CO | 4.8 | 0.016 | 24 | 0 |
| | | | | 24 | CL, CO | 4.8 | 0.012 | 17 | 0 |
| pertuzumab | PVC | 840 | 5 | 0 | CL, CO | 2.9 | 0.006 | 13 | 0 |
| | | | | 24 | CL, CO | 2.7 | 0.004 | 10 | 0 |
| | | 840 | 30 | 0 | CL, CO | 2.8 | 0.006 | 6 | 0 |
| | | | | 24 | CL, CO | 2.8 | 0.006 | 11 | 0 |

TABLE 13-continued

Dose II 1560 mg: Stability data for Pertuzumab/Trastuzumab mixture, Pertuzumab, or Trastuzumab in 0.9% saline PO IV infusion bags (n = 1 for control; n = 2 for mixture)

| Sample | IV bag type | Amount mg | Temp °C. | Timepoint Hour(s) | CAC[a] liquid | Conc. mg/mL | Turbidity AU | Light Obscuration total particles ≥10 um/mL | total particles ≥25 um/mL |
|---|---|---|---|---|---|---|---|---|---|
| trastuzumab | PVC | 720 | 5 | 0 | CL, CO | 2.5 | 0.007 | 7 | 0 |
| | | | | 24 | CL, CO | 2.5 | 0.004 | 9 | 0 |
| | | 720 | 30 | 0 | CL, CO | 2.5 | 0.003 | 18 | 0 |
| | | | | 24 | CL, CO | 2.5 | 0.005 | 19 | 0 |

[a]Color, Appearance and Clarity: CL = clear; SOPL = slightly opalescent, CO = colorless.

Two PO or PVC IV infusion bags each were prepared for the Pertuzumab/Trastuzumab mixture condition while only one IV infusion bag was prepared for the Pertuzumab and Trastuzumab alone samples.

Particulates from these bags were determined by visual observation, turbidity, and HIAC-Royco measurements. All samples appeared clear and colorless after storage at 5° C. or 30° C. for up to 24 hours. No visible particulate matter was observed and there was no significant change in the turbidity post storage. For the Pertuzumab/Trastuzumab mixture, Pertuzumab alone, and Trastuzumab alone, the HIAC-Royco showed comparable particle values before and after storage, with zero to 10 particles increase per milliliter at ≥10 m and zero particle increase per milliliter at ≥25 m for both PO and PVC IV infusion bags stored at either 5° C. or 30° C. Similarly, the Pertuzumab and Trastuzumab alone samples also exhibited no significant particle differences before and after storage in PO or PVC IV infusion bags. For all three sample types, the UV-spec scan showed no changes beyond normal assay variability in protein concentration, indicating the absence of protein adsorption or precipitation in the IV infusion bags between T0 and T24 hours at 5° C. or 30° C. storage.

The Pertuzumab/Trastuzumab mixture, Pertuzumab alone, and Trastuzumab alone samples were analyzed using Pertuzumab or Trastuzumab specific SEC and IEC methods to assess their physical and chemical stability, respectively, as previously described. For the Pertuzumab/Trastuzumab mixture, no changes in SEC were observed in the chromatographic profiles between the T0 and the T24 hour samples at 5° C. or 30° C. in either PO or PVC IV infusion bags (FIGS. 24 and 25), similar to the 840 mg mixture dose I results. In addition, no increase or decrease in the high molecular weight species (HMWS), main peak, and low molecular weight species (LMWS) was observed, which indicates a stable dosing solution at the upper ranges of protein content in 0.9% saline. Likewise, Pertuzumab alone and Trastuzumab alone samples also showed no changes after storage in the IV infusion bags.

Figure 26:
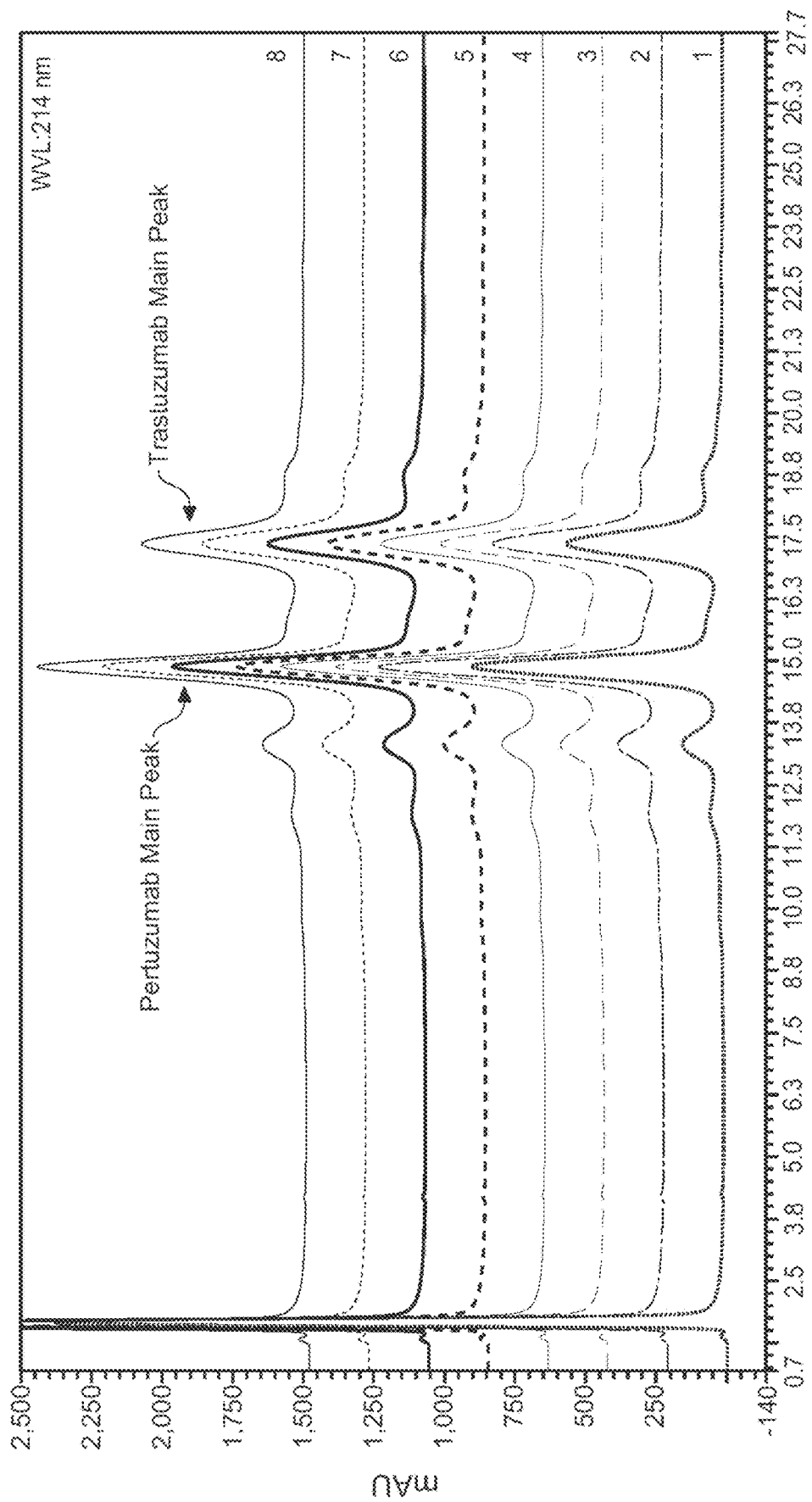
FIG. 26 shows Pertuzumab IEC (Pertuzumab-fast) profile of Pertuzumab/Trastuzumab mixture (1560 mg) in 0.9% saline IV infusion bags (1) PO 5° C. T0; (2) PO 5° C. T24 hrs; (3) PO 30° C. T0; (4) PO 30° C. T24 hrs; (5) PVC 5° C. T0; (6) PVC 5° C. T24 hrs; (7) PVC 30° C. T0; (8) PVC 30° C. T24 hrs. Full view.
Figure 27:
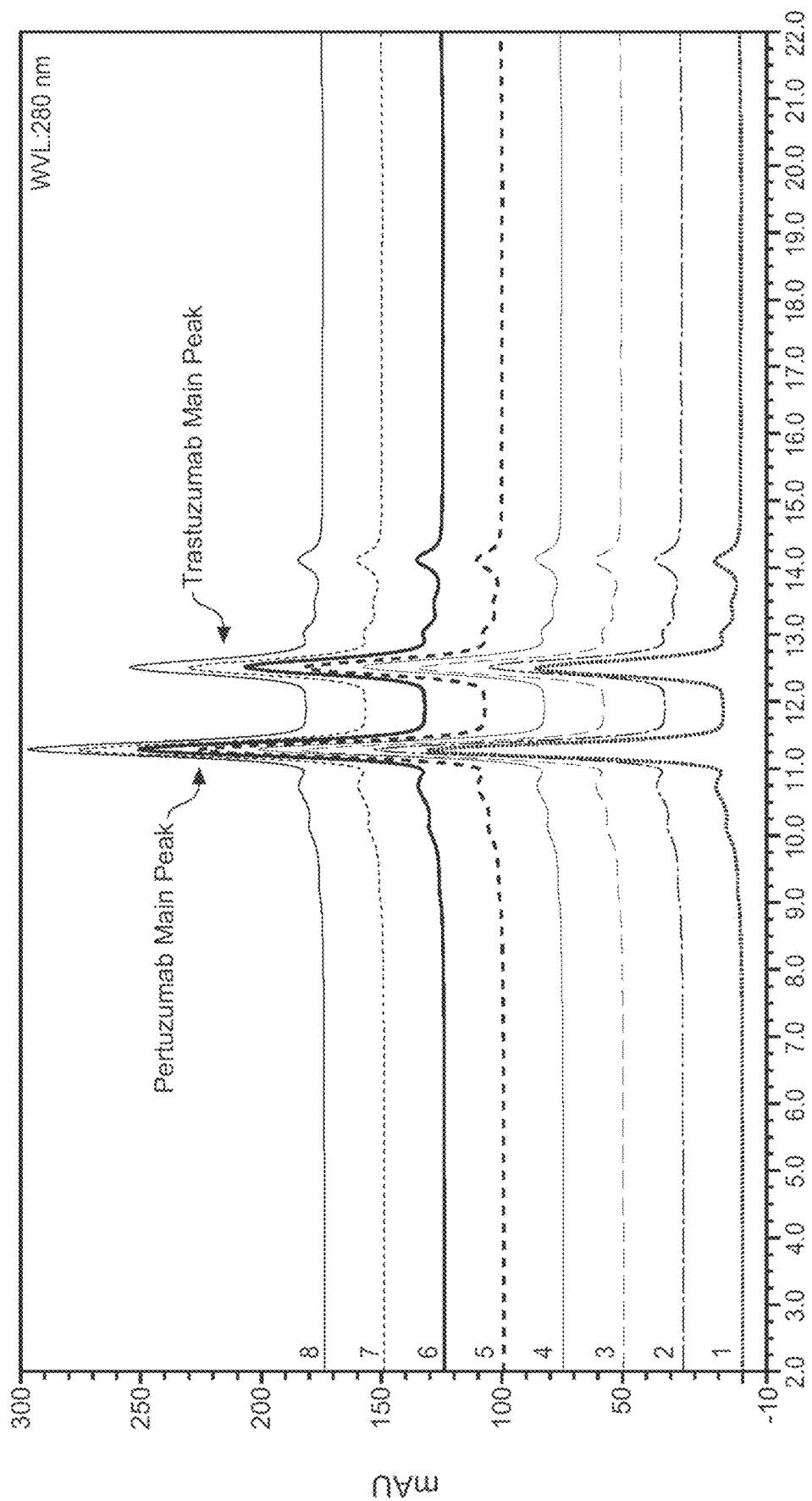
FIG. 27 shows Trastuzumab IEC profile of Pertuzumab/Trastuzumab mixture (1560 mg) in 0.9% saline IV infusion bags (1) PO 5° C. T0; (2) PO 5° C. T24 hrs; (3) PO 30° C. T0; (4) PO 30° C. T24 hrs; (5) PVC 5° C. T0; (6) PVC 5° C. T24 hrs; (7) PVC 30° C. T0; (8) PVC 30° C. T24 hrs. Full view.

IEC analysis, using both the Pertuzumab or Trastuzumab specific methods, of the Pertuzumab/Trastuzumab mixture was used to assess chemical stability and showed comparable charge variant peak profiles with no observed changes relative to the initial time point after exposure to 5° C. or 30° C. in the PO or PVC IV infusion bags (FIGS. 26 and 27). Although a significant overlap of the charge variant species of the two mAbs were observed, these peaks species were not impacted from the increase in the mAb content of the IV infusion bag. Pertuzumab alone or Trastuzumab alone samples in PO or PVC IV infusion bags showed no changes before and after exposure to 5° C. or 30° C. These results are consistent with the 840 mg dose I study.

CONCLUSION

All physicochemical assays indicate no significant changes in the mixtures (up to 840 mg Pertuzumab and 720 mg Trastuzumab for a 1560 mg total dose) or in the individual Pertuzumab (up to 840 mg) and Trastuzumab (up to 720 mg) IV infusion bags (PO or PVC) for T0 to T24 hours at 5° C. or 30° C. Furthermore, the potency of the mixture (up to 840 mg) and the individual mAbs before and after storage were comparable. No differences were observed in the IV bags that contained the admixture of Pertuzumab and Trastuzumab when compared to the individual mAb components in IV bags over the course of this study. The current study also demonstrates that many of the assays used to measure the individual mAbs were sufficient to qualitatively characterize the admixture.

Example 7

Figure 28:
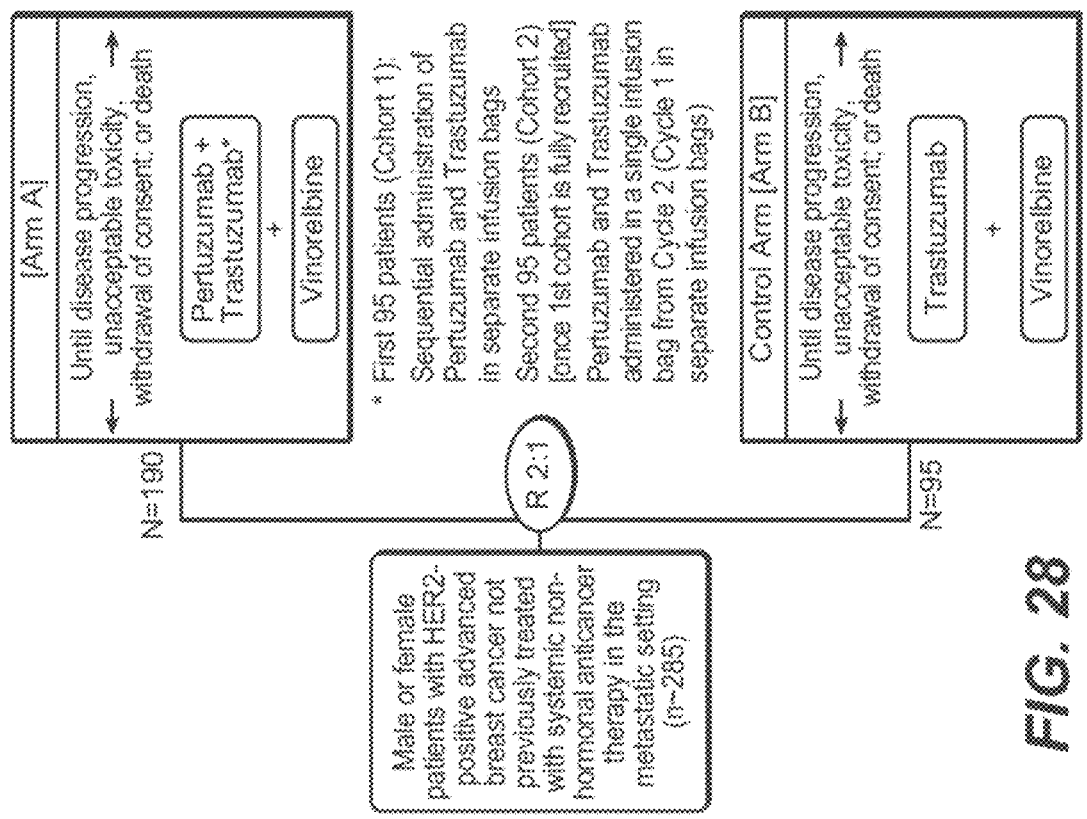
FIG. 28 depicts study schema for Example 7.

Co-Administration of Pertuzumab and Trastuzumab, and Combination Therapy with Vinorelbine This is a randomized, two-arm, open-label, multicenter Phase II trial to evaluate Pertuzumab in patients with HER2-positive advanced breast cancer (metastatic or locally advanced) who have not previously received systemic non-hormonal anticancer therapy in the metastatic setting. The study design is shown in FIG. 28.

Patients are randomly assigned in a 2:1 ratio to one of two treatment arms:

Pertuzumab given in combination with Trastuzumab and vinorelbine (Arm A)

Trastuzumab and vinorelbine (control arm Arm B)

Arm A will consist of two cohorts as follows:

Cohort 1: (first 95 patients): Pertuzumab and Trastuzumab administered sequentially in separate infusion bags, followed by vinorelbine. Patients will receive Pertuzumab followed by Trastuzumab sequentially in separate infusion bags, followed by vinorelbine.

Pertuzumab (IV Infusion)

Administered on Day 1 of the first treatment cycle as a loading dose of 840 mg, followed by 420 mg on Day 1 of each subsequent 3 weekly cycle.

Initial infusions of Pertuzumab will be administered over 90 (±10) minutes and patients observed for at least 30 minutes from the end of infusion for infusion-related symptoms such as fever, chills etc. Interruption or slowing of the infusion may reduce such symptoms. If the infusion is well tolerated, subsequent infusions may be administered over 30 (±10) minutes with patients observed for a further 30 minutes.

Trastuzumab (IV Infusion)

Day 1 of the first treatment cycle as a loading dose of 8 mg/kg, followed by 6 mg/kg on Day 1 of each subsequent 3 weekly cycle; to be administered in line with product labeling.

Vinorelbine (IV Infusion after Trastuzumab)

Day 1 and Day 8 of the first treatment cycle at a dose of 25 mg/m$^2$ followed by 30-35 mg/m$^2$ on Day 1 and Day 8 of each subsequent 3 weekly cycle; to be administered in line with product labeling.

Cohort 2: The second 95 patients will receive Pertuzumab and Trastuzumab administered together in a single infusion bag from Cycle 2 onwards, followed by vinorelbine.

Cycle 1 Dosing

For the first cycle of treatment, Pertuzumab and Trastuzumab will be administered in separate infusion bags as described for Cohort 1.

Vinorelbine will be administered after Pertuzumab and Trastuzumab as described for Cohort 1.

Subsequent Cycle Dosing

If administration of all three drugs was well tolerated in Cycle 1, then on Day 1 of each subsequent 3 weekly treatment cycle, Pertuzumab 420 mg and Trastuzumab 6 mg/kg will be given together in a single infusion bag.

The first combined infusion of Pertuzumab and Trastuzumab should be administered over 90 (±10) minutes with cardiac monitoring and close observation for infusion-associated reactions during the procedure, followed by a 60 minute observation period. If this first combined infusion is well tolerated, subsequent combined infusions can be administered over 60 (±10) minutes followed by a 30 minute observation period with cardiac monitoring.

Vinorelbine will be administered after Pertuzumab and Trastuzumab as described for Cohort 1.

Control Arm—Arm B

A total of 95 patients will be randomized to arm B.

Trastuzumab (IV Infusion)

Day 1 of the first treatment cycle as a loading dose of 8 mg/kg, followed by 6 mg/kg on Day 1 of each subsequent 3 weekly cycle; to be administered in line with product labeling.

Vinorelbine (IV Infusion after Trastuzumab)

Day 1 and Day 8 of the first treatment cycle at a dose of 25 mg/m$^2$ followed by 30-35 mg/m$^2$ on Day 1 and Day 8 of each subsequent 3 weekly cycle; to be administered in line with product labeling.

Efficacy Outcomes:

Primary

To compare objective overall response rates (ORR) assessed by a blinded independent review committee (IRC) of Pertuzumab given in combination with Trastuzumab and vinorelbine versus Trastuzumab and vinorelbine Secondary Within the Pertuzumab treatment group to compare the efficacy and safety of Pertuzumab and Trastuzumab administered together in a single infusion bag versus conventional sequential administration in separate infusion bags To compare Pertuzumab given in combination with Trastuzumab and vinorelbine versus Trastuzumab and vinorelbine with respect to:

ORR assessed by the Investigator
Time to response assessed by IRC and Investigator
Duration of response assessed by IRC and Investigator
Progression free survival (PFS)
Time to progression (TTP)
Overall survival (OS)
Safety and tolerability
Quality of life (EQ-5D and FACT-B questionnaires)

Inclusion Criteria

Patients must meet the following criteria to be eligible for this study according to the timing of the Schedule of Assessments:

1. Female or male patients aged 18 years or older
2. Histologically or cytologically confirmed and documented adenocarcinoma of the breast with metastatic or locally advanced disease not amenable to curative resection
3. HER2-positive (defined as either immunohistochemistry (IHC) 3+ or in situ hybridization (ISH) positive) as assessed by local laboratory on primary or metastatic tumor (ISH positivity is defined as a ratio of 2.0 or greater for the number of HER2 gene copies to the number of signals for CEP17, or for single probe tests, a HER2 gene count greater than 4).
4. At least one measurable lesion and/or non-measurable disease evaluable according to Response Evaluation Criteria In Solid Tumors (RECIST) version 1.1
5. ECOG performance status 0 or 1
6. Left ventricular ejection fraction (LVEF) of at least 50%
7. Negative pregnancy test in women of childbearing potential (premenopausal or less than 12 months of amenorrhea post-menopause, and who have not undergone surgical sterilization)
8. For women of childbearing potential who are sexually active, agreement to use a highly-effective, non-hormonal form of contraception or two effective forms of non-hormonal contraception during and for at least 6 months post study treatment
9. Fertile males willing and able to use effective non-hormonal means of contraception (barrier method of contraception in conjunction with spermicidal jelly, or surgical sterilization) during and for at least 6 months post-study treatment
10. Life expectancy of at least 12 weeks Exclusion Criteria Patients who meet any of the following exclusion criteria will not be eligible for this study:

1. Previous systemic non-hormonal anticancer therapy in the metastatic or locally advanced breast cancer setting
2. Previous approved or investigative anti-HER2 agents in any breast cancer treatment setting, except Trastuzumab in the adjuvant or neoadjuvant setting
3. Disease progression while receiving Trastuzumab in the adjuvant or neoadjuvant setting
4. Disease-free interval from completion of adjuvant or neo-adjuvant systemic non-hormonal treatment to recurrent disease of less than 6 months
5. History of persistent grade 2 or higher (NCI-CTC, Version 4.0) hematological toxicity resulting from previous adjuvant or neoadjuvant therapy
6. Radiographic evidence of central nervous system (CNS) metastases as assessed by CT or MRI
7. Current peripheral neuropathy of grade 3 or greater (NCI-CTC, Version 4.0)
8. History of other malignancy within the last 5 years, except for carcinoma in situ of the cervix or basal cell carcinoma 9. Serious uncontrolled concomitant disease that would contraindicate the use of any of the investigational drugs used in this study or that would put the patient at high risk for treatment related complications
10. Inadequate organ function, evidenced by the following laboratory results:
    Absolute neutrophil count <1,500 cells/mm³
    Platelet count <100,000 cells/mm³
    Hemoglobin <9 g/dL
    Total bilirubin greater than upper limit of normal (ULN) (unless the patient has documented Gilbert's syndrome)
    AST (SGOT) or ALT (SGPT)>2.5×ULN
    AST (SGOT) or ALT (SGPT)>1.5×ULN with concurrent serum alkaline phosphatase >2.5×ULN; Serum alkaline phosphatase may be >2.5×ULN only if bone metastases are present and AST (SGOT) and ALT (SGPT)<1.5×ULN
    Serum creatinine >2.0 mg/dL or 177 μmol/L
    International normalized ratio (INR) and activated partial thromboplastin time or partial thromboplastin time (aPTT or PTT)>1.5×ULN (unless on therapeutic coagulation)
11. Uncontrolled hypertension (systolic >150 mm Hg and/or diastolic >100 mm Hg) or clinically significant (i.e. active) cardiovascular disease: cerebrovascular accident (CVA)/stroke or myocardial infarction within 6 months prior to first study medication, unstable angina, congestive heart failure (CHF) of New York Heart Association (NYHA) grade II or higher, or serious cardiac arrhythmia requiring medication
12. Current known infection with HIV, HBV, or HCV
13. Dyspnea at rest due to complications of advanced malignancy, or other disease requiring continuous oxygen therapy
14. Major surgical procedure or significant traumatic injury within 28 days prior to randomization or anticipation of need for major surgery during the course of study treatment
15. Receipt of intravenous (IV) antibiotics for infection within 14 days prior to randomization
16. Current chronic daily treatment with corticosteroids (dose equivalent to or greater than 10 mg/day methylprednisolone), excluding inhaled steroids
17. Known hypersensitivity to any of the study medications or to excipients of recombinant human or humanized antibodies
18. History of receiving any investigational treatment within 28 days prior to randomization
19. Concurrent participation in any clinical trial It is anticipated that the treatment herein will demonstrate the safety and efficacy of co-administration of pertuzmab and Trastuzumab from the same intravenous (IV) bag to patients with HER2-positive cancer (exemplified by HER2-positive breast cancer), as well as the safety and efficacy of Pertuzumab in combination in vinorelbine according to any one or more of the primary or secondary efficacy outcomes above.

Example 8

Pertuzumab Combined with Aromatase Inhibitors

Figure 29:
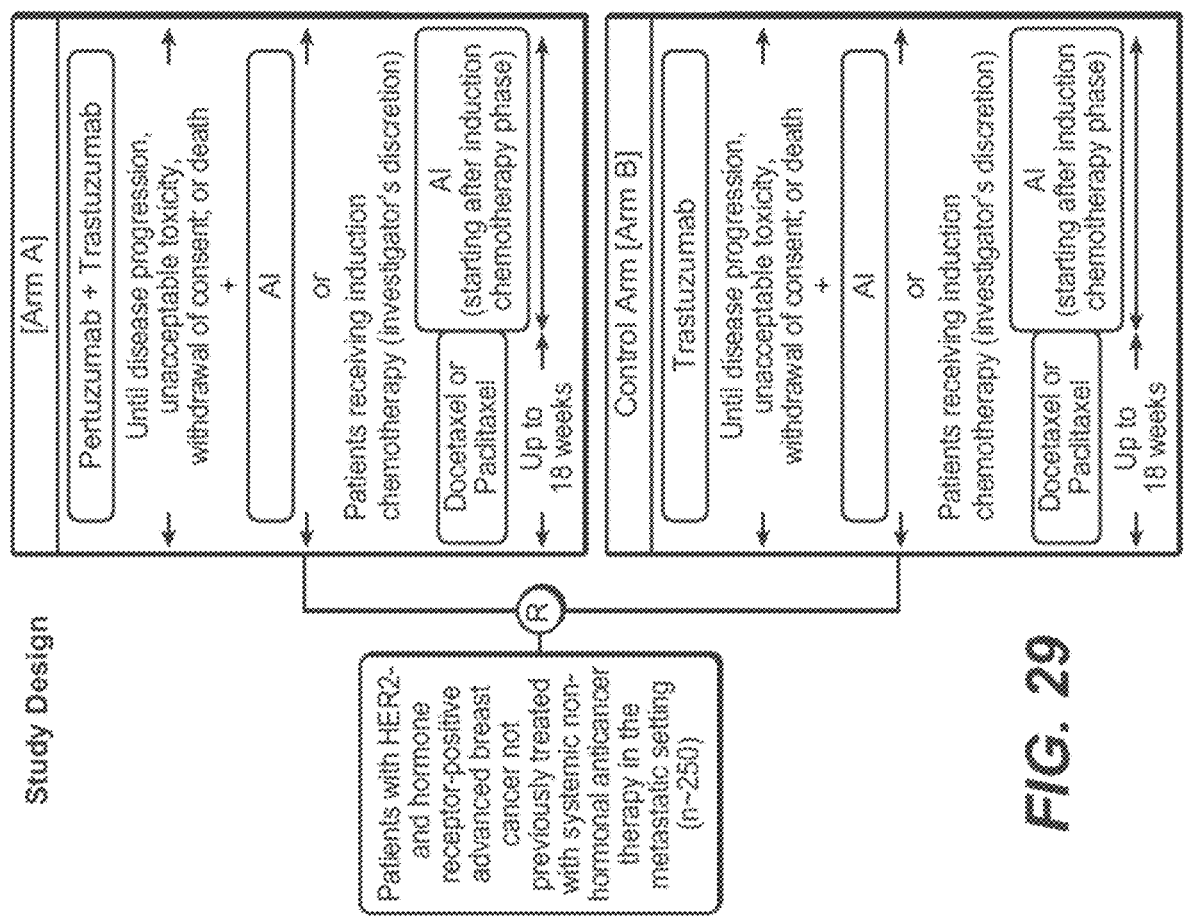
FIG. 29 shows study design for Example 8.

This example is a randomized, two-arm, open-label, multicenter phase II study demonstrating the efficacy and safety of Pertuzumab given in combination with Trastuzumab plus an aromatase inhibitor in first line patients with HER2-positive and hormone receptor-positive advanced (metastatic or locally advanced) breast cancer. The study design is shown in FIG. 29.

Primary Objectives

To compare progression-free survival (PFS) of Pertuzumab given in combination with Trastuzumab plus an aromatase inhibitor (AI) versus Trastuzumab plus an AI.

Secondary Objectives

To compare Pertuzumab given in combination with Trastuzumab plus an AI versus Trastuzumab plus an AI with respect to:
    Overall survival (OS)
    Overall response rate (ORR)
    Clinical benefit rate (CBR)
    Duration of response
    Time to response
    Safety and tolerability
    Quality of life (EQ-5D questionnaires)

Trial Design

Patients will be randomly assigned in a 1:1 ratio to one of two treatment arms:
    Pertuzumab in combination with Trastuzumab plus an AI (Arm A).
    Trastuzumab plus an AI (control arm Arm B).

At the investigator's discretion, patients may also receive induction chemotherapy (a taxane, either Docetaxel or paclitaxel), in combination with the assigned monoclonal antibody treatment arm up to the first 18 weeks of the treatment period. In patients receiving induction chemotherapy, treatment with the AI will start after the chemotherapy induction phase.

Stratification factors for analysis will be:
    Chosen to receive induction chemotherapy (Yes/No).
    Time since adjuvant hormone therapy (<12 months, ≥12 months, or no prior hormone therapy).

Patients with HER2-positive and hormone receptor-positive (estrogen receptor (ER)-positive and/or progesterone receptor (PgR)-positive) advanced breast cancer (metastatic or locally advanced) who have not previously received systemic nonhormonal anticancer therapy in the metastatic setting.

Inclusion Criteria
1. Age greater than or equal to 18 years.
2. Postmenopausal status >1 year (fulfilling one or more of National Comprehensive Cancer Network (NCCN) guideline criteria, Version 2.2011).
3. Histologically or cytologically confirmed and documented adenocarcinoma of the breast with metastatic or locally advanced disease not amenable to curative resection.
4. HER2-positive (defined as either IHC 3+ or ISH positive) as assessed by local laboratory on primary or metastatic tumor (ISH positivity is defined as a ratio of 2.0 or greater for the number of HER2 gene copies to the number of signals for CEP17, or for single probe tests, a HER2 gene count greater than 4).
5. Hormone receptor-positive defined as ER-positive and/or PgR-positive assessed locally as defined by institutional criteria.
6. At least one measurable lesion and/or non-measurable disease evaluable according to Response Evaluation Criteria In Solid Tumors (RECIST) version 1.1.
7. ECOG performance status 0 or 1.
8. Left ventricular ejection fraction (LVEF) of at least 50%.
9. Life expectancy of at least 12 weeks.

Exclusion Criteria
1. Previous systemic non-hormonal anticancer therapy in the metastatic or locally advanced breast cancer setting.
2. Disease-free interval from completion of adjuvant or neo-adjuvant systemic non-hormonal treatment to recurrence of within 6 months.
3. Previous approved or investigative anti-HER2 agents in any breast cancer treatment setting, except Trastuzumab and/or lapatinib in the neoadjuvant or adjuvant setting.
4. Disease progression while receiving Trastuzumab and/or lapatinib in the adjuvant setting.
5. History of persistent grade 2 or higher (NCI-CTC, Version 4.0) hematological toxicity resulting from previous adjuvant or neo-adjuvant therapy.
6. Radiographic evidence of central nervous system (CNS) metastases as assessed by CT or MRI.
7. Current peripheral neuropathy of grade 3 or higher (NCI-CTC, Version 4.0).
8. History of other malignancy within the last 5 years, except for carcinoma in situ of the cervix or basal cell carcinoma.
9. Serious uncontrolled concomitant disease that would contraindicate the use of any of the investigational drugs used in this study or that would put the patient at high risk for treatment related complications.
10. Inadequate organ function, evidenced by the following laboratory results:
    Absolute neutrophil count <1,500 cells/mm$_3$.
    Platelet count <100,000 cells/mm$_3$.
    Hemoglobin <9 g/dL.
    Total bilirubin greater than the upper limit of normal (ULN) (unless the patient has documented Gilbert's syndrome).
    AST (SGOT) or ALT (SGPT)>2.5×ULN.
    AST (SGOT) or ALT (SGPT)>1.5×ULN with concurrent serum alkaline phosphatase >2.5×ULN Serum alkaline phosphatase may be >2.5×ULN only if bone metastases are present and AST (SGOT) and ALT (SGPT)<1.5×ULN.
    Serum creatinine >2.0 mg/dL or 177 µmol/L.
    International normalized ratio (INR) and activated partial thromboplastin time (aPTT) or partial thromboplastin time (PTT)>1.5×ULN (unless on therapeutic coagulation).
11. Uncontrolled hypertension (systolic >150 mm Hg and/or diastolic >100 mm Hg) or clinically significant (i.e. active) cardiovascular disease: cerebrovascular accident (CVA)/stroke or myocardial infarction within 6 months prior to first study medication, unstable angina, congestive heart failure (CHF) of New York Heart Association (NYHA) grade II or higher, or serious cardiac arrhythmia requiring medication.
12. Current known infection with HIV, HBV, or HCV.
13. Dyspnea at rest due to complications of advanced malignancy, or other disease requiring continuous oxygen therapy.
14. Major surgical procedure or significant traumatic injury within 28 days prior to randomization or anticipation of needed for major surgery during the course of study treatment.
15. Lack of physical integrity of the upper gastrointestinal tract, clinically significant malabsorption syndrome, or inability to take oral medication.
16. Receipt of intravenous antibiotics for infection within 14 days prior to randomization.
17. Current chronic daily treatment with corticosteroids (dose of 10 mg/day methylprednisolone equivalent), excluding inhaled steroids.
18. Known hypersensitivity to any of the study medications or to excipients of recombinant human or humanized antibodies.
19. History of receiving any investigational treatment within 28 days prior to randomization.
20. Concurrent participation in any clinical trial.

Arm A
Pertuzumab (IV Infusion)
Administered on Day 1 of the first treatment cycle as a loading dose of 840 mg, followed by 420 mg on Day 1 of each subsequent 3 weekly cycle.
Initial infusions of Pertuzumab will be administered over 90 (±10) minutes and patients observed for at least 30 minutes from the end of infusion for infusion-related symptoms such as fever, chills etc. Interruption or slowing of the infusion may reduce such symptoms. If the infusion is well tolerated, subsequent infusions may be administered over 30 (±10) minutes with patients observed for a further 30 minutes.

Trastuzumab (IV infusion administered after Pertuzumab)
Day 1 of the first treatment cycle as a loading dose of 8 mg/kg, followed by 6 mg/kg on Day 1 of each subsequent 3 weekly cycle; to be administered in line with product labeling.

AI (Oral)
Administered in line with product labeling (anastrozole: 1 mg once daily; letrozole: 2.5 mg once daily).

Induction Chemotherapy
Patients receiving induction chemotherapy up to the first 18 weeks of the treatment period will receive a taxane (Docetaxel every 3 weeks or paclitaxel weekly), administered in line with the respective product labeling. Chemotherapy will be administered after the monoclonal antibody (Pertuzumab and/or Trastuzumab) infusions.
In patients receiving induction chemotherapy treatment with the AI will start after the chemotherapy induction phase.

Control Arm—Arm B
Trastuzumab (IV Infusion)
Day 1 of the first treatment cycle as a loading dose of 8 mg/kg, followed by 6 mg/kg on Day 1 of each subsequent 3 weekly cycle; to be administered in line with product labeling.

AI (Oral)
Administered in line with product labeling (anastrozole: 1 mg once daily; letrozole: 2.5 mg once daily).

Induction Chemotherapy
Same as for investigational arm.

Primary Efficacy Outcome
PFS (defined as the time from randomization until the first radiographically documented progression of disease or death from any cause, whichever occurs first).

Secondary Efficacy Outcome
  OS
  ORR
  CBR
  Duration of response
  Time to response Safety
  Incidence and severity of adverse events (AEs) and serious adverse events (SAEs)
  Incidence of CHF
  LVEF over the course of the study
  Laboratory test abnormalities It is anticipated that the combination of Pertuzumab, Trastuzumab and AI will be safe and effective in the patient population and that the addition of Pertuzumab to Trastuzumab and an AI will extend progression-free survival (PFS) compared to Trastuzumab plus an AI without Pertuzumab.

Example 9

Pertuzumab for Improving Overall Survival (OS) in Cancer Patients

Background: In the CLEOPATRA study in Example 3 above, 808 patients with HER2-positive first-line (1L) metastatic breast cancer (MBC) were randomized to treatment with Placebo+Trastuzumab+Docetaxel (Pla+T+D) or Pertuzumab+Trastuzumab+Docetaxel (P+T+D). The primary endpoint of independently reviewed progression-free survival was significantly improved with P+T+D vs Pla+T+D (hazard ratio (HR)=0.62; P<0.0001; medians, 18.5 vs 12.4 mths) (Example 3 above). This example includes a second interim overall survival (OS) analysis after longer follow-up.

Methods: This interim overall survival (OS) analysis was performed applying the Lan-DeMets α-spending function with the O'Brien-Fleming (OBF) stopping boundary to maintain the overall Type I error at 5%. Based on the number of OS events observed, the OBF boundary for statistical significance at this analysis was P≤0.0138. The log-rank test, stratified by prior treatment status and geographic region, was used to compare OS between arms in the intention-to-treat population. The Kaplan-Meier approach was used to estimate the median OS in both arms; a stratified Cox proportional hazard model was used to estimate HR and 95% CIs. Subgroup analyses of OS were performed for the stratification factors and other key baseline characteristics.

Results: At the time of this analysis, median follow-up was 30 months and 267 deaths (69% of planned events for the final analysis) had occurred. The results showed a statistically significant improvement in OS in favor of P+T+D (HR=0.66; 95% confidence interval (CI), 0.52-0.84; P=0.0008). This HR represents a 34% reduction in the risk of death. The analysis achieved statistical significance and is therefore considered the confirmatory OS analysis. The median OS was 37.6 mths in the Pla arm and has not yet been reached in the P arm. The treatment effect was generally consistent in predefined subgroups based on baseline variables and stratification factors, including: prior (neo)adjuvant therapy (HR=0.66; 95% CI, 0.46-0.94); no prior (neo)adjuvant therapy (HR=0.66; 95% CI, 0.47-0.93); prior (neo)adjuvant T (HR=0.68; 95% CI, 0.30-1.55); hormone receptor-negative disease (HR=0.57; 95% CI, 0.41-0.79); and hormone receptor-positive disease (HR=0.73; 95% CI, 0.50-1.06). Kaplan-Meier estimates of OS rates show survival benefit with P+T+D at 1, 2, and 3 yrs.

TABLE 14

Overall Survival Benefit with Pertuzumab

| | Pla + T + D | P + T + D | Δ |
|---|---|---|---|
| | Survival rates, % | | |
| 1 yr | 89.0 | 94.4 | 5.4 |
| 2 yrs | 69.4 | 80.7 | 11.3 |
| 3 yrs | 50.4 | 65.8 | 15.4 |

The majority of pts received anti-cancer therapy after discontinuation of study treatment (64% Pla arm, 56% P arm). Subsequent therapy with HER2-directed agents (T, lapatinib, T emtansine) was balanced between arms. Causes of death remained unchanged from the first interim OS analysis, with the most common cause being progressive disease. Adverse events leading to death were rare and balanced between arms.

Conclusions: Treatment of patients with HER2-positive 1L MBC with P+T+D compared with Pla+T+D was associated with an improvement in OS, which was both statistically significant and clinically meaningful. These results show that combined HER2 blockade and chemotherapy using the P+T+D regimen can be considered a standard of care for patients with HER2-positive MBC in the 1L setting.

These data regarding OS can be included on the package insert with prescribing information regarding Pertuzumab in an article of manufacture as in Example 4 above, for example.

Example 10

Pertuzumab and Trastuzumab with a Taxane as First-Line Therapy for Patients with HER2-Positive Advanced Breast Cancer (PERUSE)

Background: Pertuzumab (P), a humanized monoclonal antibody, inhibits signaling downstream of HER2 by binding to the dimerization domain of the receptor and preventing heterodimerization with other HER family members. The epitope recognized by P is distinct from that bound by Trastuzumab (H) and so their complementary mechanisms of action result in a more comprehensive HER2 blockade. Data from the phase III trial CLEOPATRA showed significantly improved PFS in patients (pts) receiving P+H+docetaxel compared with H+docetaxel+placebo as first-line treatment for HER2-positive metastatic breast cancer (BC).

Trial design: This is a phase IIIb, multicenter, open-label, single-arm study in pts with HER2-positive metastatic or locally recurrent BC who have not been treated with systemic nonhormonal anticancer therapy for metastatic cancer. Pts will receive, P: 840 mg initial dose, 420 mg q3w IV; H: 8 mg/kg initial dose, 6 mg/kg q3w IV; taxane: docetaxel, paclitaxel, or nab-paclitaxel according to local guidelines. Treatment will be administered until disease progression or unacceptable toxicity. A planned protocol amendment will allow hormone receptor-positive pts to receive endocrine therapy alongside P+H after completion of taxane therapy, in line with clinical practice.

Eligibility criteria: At baseline, pts must have an LVEF of ≥50%, an ECOG PS of 0, 1, or 2, a disease-free interval of ≥6 months, and must not have received prior anti-HER2 agents for the treatment of metastatic BC. Prior H and/or lapatinib in the (neo)adjuvant setting is permitted, providing there was no disease progression during treatment. Pts must not have experienced other malignancies within the last 5 yrs other than carcinoma in situ of the cervix or basal cell carcinoma. There must be no clinical or radiographic evidence of CNS metastases or clinically significant cardiovascular disease.

Specific aims: As H was not widely available in the (neo)adjuvant setting prior to CLEOPATRA recruitment, a relatively low proportion of pts in CLEOPATRA had previously received H. PERUSE will assess the safety and tolerability of P+H+choice of taxane as first-line therapy for pts with HER2-positive metastatic or locally advanced BC in a pt population likely to have experienced wider exposure to prior H therapy.

Statistical methods: The primary endpoints of the PERUSE study are safety and tolerability. Secondary endpoints include PFS, OS, ORR, CBR, duration of response, time to response and QoL. The final analysis will be performed when 1500 pts have been followed up for at least 12 months after the last pt receives last study treatment unless they have been lost to follow-up, withdrawn consent, or died, or if the study is prematurely terminated by the sponsor. Safety analyses are planned after enrollment of ~350, 700, and 1000 pts. Additionally, a data and safety monitoring board will review safety data after ~50 pts have been enrolled and then every 6 months.

It is anticipated that the Pertuzumab and Trastuzumab with a taxane will be effective as first-line therapy for patients with HER2-positive advanced breast cancer according to the protocol in this example.

Example 11

Pertuzumab in Combination with Chemotherapy in Low HER3 Ovarian Cancer

Epithelial ovarian cancer, along with primary peritoneal, and fallopian tube carcinoma, is the fifth leading cause of cancer-related deaths in women in Europe (Bray et al. *Int. J. Cancer* 113:977-90 (2005)). Ovarian cancer is often not diagnosed until it has progressed to an advanced stage, at which point the standard treatment is surgical resection followed by chemotherapy. Although the addition of taxanes to platinum-based chemotherapy has resulted in approximately 80% of patients achieving complete response (CR), the disease recurs in most patients, and more than 50% of patients diagnosed with epithelial ovarian cancer eventually die from their disease (Du Bois et al. *Cancer* 115:1234-1244 (2009)). Following failure of platinum-based chemotherapy, there are few therapeutic options. Patients with platinum-sensitive disease (disease recurrence occurs more than 6 months after last cycle of platinum-based chemotherapy) are often retreated with platinum-based therapy and have a progression-free survival (PFS) of approximately 9-10; however, for patients with primary platinum-resistant disease, the prognosis is considerably worse. For these patients, re-treatment with platinum-based therapy or surgery is not reasonable, instead, patients with platinum-resistant are often treated with single-agent chemotherapy such as topotecan, pegylated liposomal doxorubicin (PLD), paclitaxel and gemcitabine.

Objective response rates for patients with platinum-resistant disease ranges between 10-20% while median progression free survival (PFS) ranges between 3.5-4 months. Platinum-resistant disease is not curable; the goals of treatment for these patients include palliation of symptoms, prolonged survival and improvements in quality of life (QoL). Overall, results from major clinical trials conducted over the last 20 years show that the median PFS for patients with advanced disease ranges between 16-23 months while median overall survival (OS) ranges between 31-65 months.

The majority of ovarian cancer cell lines and many ovarian cancer biopsy samples express all members of the HER family of receptors (Campiglio et al. *J. Cell Biochem* 73:522-32 (1999)). EGFR and HER2 have been studied the most extensively, and multiple agents targeting the receptor or associated intracellular tyrosine kinases have been tested.

In a recent study, quantitative HER2 protein analyses demonstrated that malignant ovarian tumors have significantly higher levels of HER2 compared with benign ovarian tumors and normal ovaries. Furthermore, a correlation between HER2 and HER3 protein levels has been seen (Steffensen et al. *Int J Oncol.* 33:195-204 (2008)). Studies in cell culture systems have shown that heregulin-activated HER3-HER2 heterodimers elicit the strongest proliferative and transformation responses of any possible receptor combination (Pinkas-Kramarski et al. *EMBO J.* 15:2452-67 (1996); Riese et al. *Mol Cell Biol* 15:5770-6 (1995). Erratum in: *Mol Cell Biol* 16:735 (1996)). The potency of these biologic responses is likely the result of the dual and efficient activation of the MAP kinase and PI3 kinase pathways. Furthermore, HER3 is the most potent activator of the PI3 kinase/AKT pathway (Olayioye et al. *EMBO J* 19:3159-67 (2000)). Studies in HER2-amplified breast cancer cell lines show that HER3 but not EGFR was critical for HER2 signaling, and that HER3 inhibited growth in three-dimensional culture and induced rapid tumor regression of in vivo xenografts (Lee-Hoeflich et al. *Cancer Res* 68:5878-87 (2008)).

Additionally, HER3 expression has been implicated as a possible risk factor in ovarian cancer (Tanner et al. *J Clin Oncol* 24:4317-23 (2006)).

In a Phase II multicenter trial (TOC2689g) in patients with advanced ovarian cancer that recurred after treatment with or were refractory to platinum-based chemotherapy, patients who were enrolled in Cohort 1 (n=61) received a loading dose of 840 mg Pertuzumab, followed by 420 mg Pertuzumab on Day 1 of each 3-week cycle, and patients in Cohort 2 (n=62) received 1050 mg Pertuzumab on Day 1 of each 3-week cycle. Similar outcomes were observed in both cohorts in terms of overall response rate and median PFS. Eight patients (4 in each cohort) had evidence of stable disease (SD) lasting at least 6 months. Median PFS and OS were 6.6 weeks and 52.7 weeks, respectively, for the overall population.

The results of this study led to two randomized Phase II trials in platinum-sensitive and platinum-resistant populations. In Study TOC3258g, the efficacy and safety of gemcitabine+Pertuzumab versus gemcitabine+placebo were evaluated in patients with advanced ovarian, primary peritoneal, or fallopian tube cancer that was resistant to platinum-based chemotherapy (Amler et al. *J Clin Oncol* 26:5552 (2008)). The study allowed patients to cross over to receive Pertuzumab at the time of disease progression. There was a median PFS of 2.6 months in the gemcitabine+placebo arm and 2.9 months in the gemcitabine+Pertuzumab arm. Median OS was similar between the treatment arms. Of the most common adverse events (AEs), those increased (by at least 6 patients) in the Pertuzumab-treated cohort included fatigue, nausea, diarrhea, back pain, dyspepsia, stomatitis, headache, epistaxis, rhinorrhea, rash, and Grade 3-4 neutropenia.

In Study BO17931, 149 patients with ovarian cancer who experienced a recurrence 6 months after a platinum-based therapy were randomized to receive a combination of paclitaxel and carboplatin or gemcitabine with or without Pertuzumab. After 6 treatment cycles, chemotherapy was discontinued, and patients in the chemotherapy+Pertuzumab arm continued to receive Pertuzumab alone for up to 11 additional cycles (total of 17 cycles of Pertuzumab). There were no significant differences in the PFS or OS for the overall group. Median PFS was 34.1 weeks for the chemotherapy+Pertuzumab group versus 31.3 for the chemotherapy alone group; however, an exploratory subset analyses of HER3 mRNA expression with a treatment-free interval of 6-12 months indicated a trend toward clinical benefit in patients who express high levels of HER3 mRNA (Kaye et al. *J Clin Oncol* 26:5520 (2008)).

Archival tissue samples from patients enrolled in both randomized Phase II studies were examined by quantitative reverse transcriptase polymerase chain reaction (qRT-PCR) for mRNA expression levels of the HER receptors EGFR, HER2, HER3, and two HER ligands: amphiregulin and betacellulin.

Only tumor HER3 mRNA expression was associated with a significant difference in PFS. For patients who achieved a clinical response, PRs were observed in 9 patients on the gemcitabine+Pertuzumab arm and 3 on the gemcitabine+placebo arm. Six of the gemcitabine+Pertuzumab patients with PRs had tumor HER3 mRNA levels lower than the median level. In contrast, no patients in the gemcitabine+placebo arm whose tumor HER3 mRNA levels were lower than the median level of the study population experienced a PR. An additional 6 patients achieved PRs, and all of these patients had tumor HER3 mRNA levels at or above the median level of the study population. Of these patients, 3 received gemcitabine+Pertuzumab and 3 received gemcitabine+placebo, suggesting no effect of Pertuzumab in this population.

Patients with low HER3 mRNA expression (lower than the median level of the study population) demonstrated a PFS hazard ratio (HR) of 0.32 in contrast to 1.68 for patients with HER3 mRNA expression greater than or equal to the median level; i.e. the effect of adding Pertuzumab trended in the opposite direction. No significant benefit was detected in OS for patients with low HER3 mRNA expression; however, a trend toward greater OS was observed in patients receiving Pertuzumab. The OS for patients expressing high HER3 mRNA expression demonstrated an HR of 1.59.

To assess the prognostic value, HER3 mRNA expression was correlated with PFS and OS for patients in the gemcitabine+placebo arm. Median PFS was 1.4 months for patients with low HER3 mRNA expression (n=35), compared with 5.5 months for patients with high HER3 mRNA expression (n=24). Similarly, median OS for patients with low HER3 mRNA expression was 8.4 months, compared with 18.2 months for patients with high HER3 mRNA expression.

In Study BO17931, in patients with low HER3 mRNA expression (lower than the median level of this study population), no treatment effect was seen. However, in an exploratory analysis of patients with a treatment-free interval of 6-12 months, there was a trend toward benefit for the combination of chemotherapy with Pertuzumab in terms of PFS.

Overview of this Study

This is a multicenter trial with two parts; a non-randomized safety run-in Part 1 and a randomized, double-blind Part 2.

Figure 30:
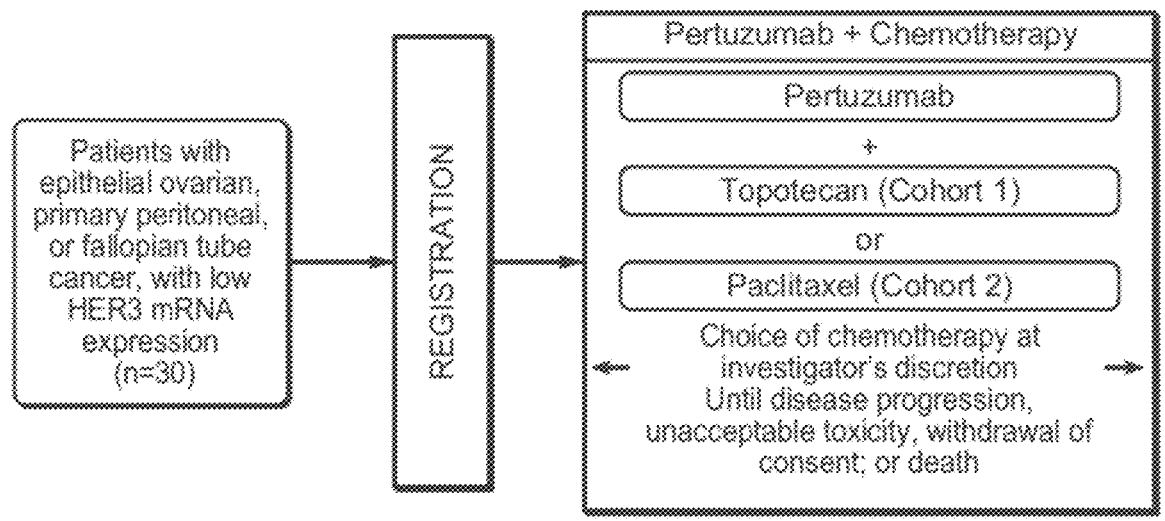
FIG. 30 shows study design for Part 1 of Example 11.

Part 1 will be performed to assess safety and tolerability of Pertuzumab in a new combination with two chemotherapeutic agents (topotecan or paclitaxel). Part 2 of the trial is a randomized, double-blind, placebo controlled, two-arm, multicenter, prospective trial of Pertuzumab in combination with chemotherapy (topotecan, paclitaxel, or gemcitabine). Patients will receive trial medication until disease progression as per the Response Evaluation Criteria in Solid Tumors (RECIST) version 1.1, disease progression according to the Gynecologic Cancer Intergroup (GCIG) criteria of CA-125 assessable disease, unacceptable toxicity, withdrawal of consent, or death. PFS will be assessed in Part 1 of the trial, but due to small number of patients and PFS events per cohort, results will be descriptive only. The trial design for Part 1 of the study is provided in FIG. 30.

In Part 2 of the trial, patients will be randomized in a 1:1 ratio to receive either:
 Arm A: Pertuzumab in combination with chemotherapy (topotecan, paclitaxel, or gemcitabine), or
 Arm B: Pertuzumab-placebo plus chemotherapy (topotecan, paclitaxel, or gemcitabine).

The allocation of study medication will be double-blind with respect to whether the patient receives Pertuzumab or Pertuzumab-placebo. The chemotherapy agent allocated will be at the discretion of the investigator.

Stratification factors for Part 2 of the trial will be:
 Selected chemotherapy cohort (topotecan vs. paclitaxel vs. gemcitabine).
 Previous anti-angiogenic therapy (yes vs. no). If a patient has previously participated in a blinded trial with an anti-angiogenic agent, the patient will be enrolled in the same stratum with patients known to have previously received an anti-angiogenic agent.
 Treatment-free interval (TFI) since platinum therapy (strictly less than 3 months vs. 3 to 6 months inclusive, prior to first study treatment).

Figure 31:
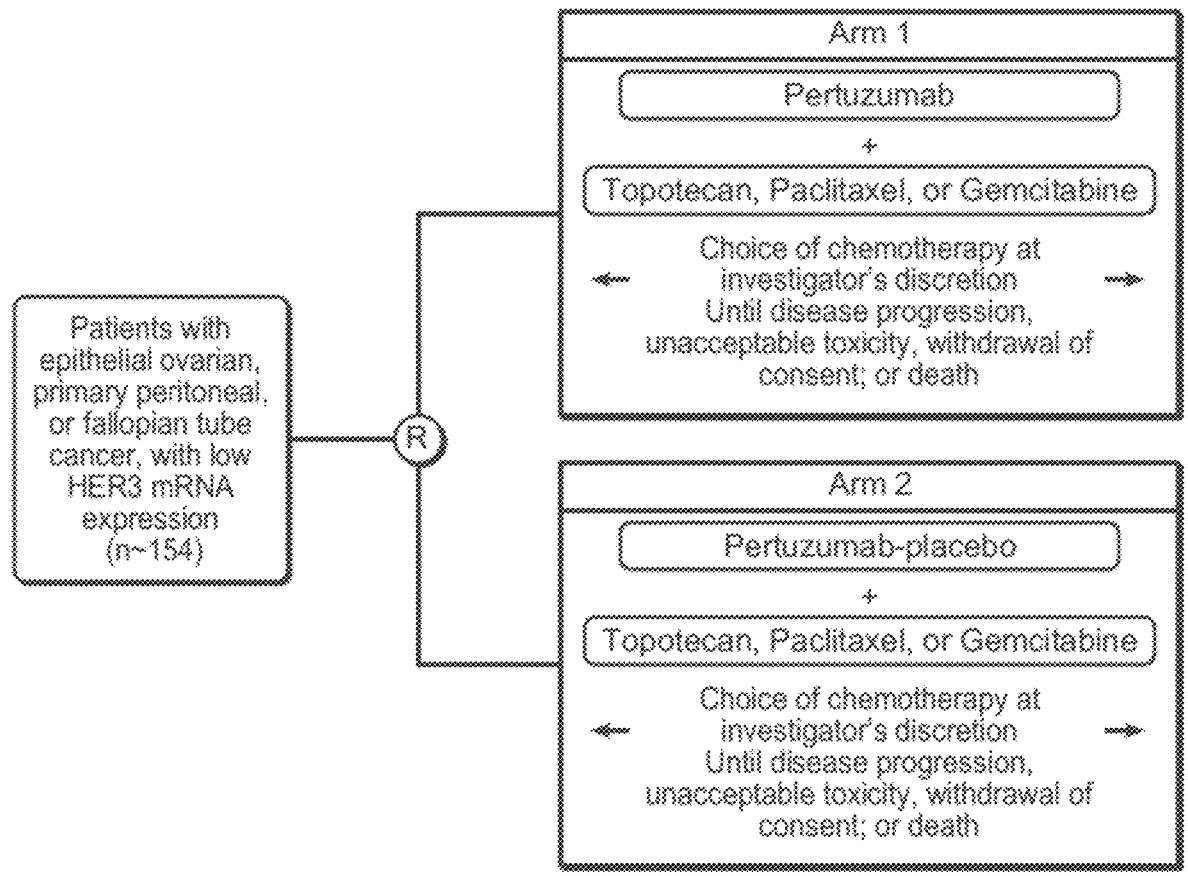
FIG. 31 shows study design for Part 2 of Example 11.

The trial design for Part 2 of the study is provided in FIG. 31.

Primary Objectives of the Study:
 Part 1: The primary objective for Part 1 of this study is to determine the safety and tolerability of Pertuzumab in combination with either topotecan or paclitaxel.
 Part 2: The primary objective for Part 2 of this study is to determine if Pertuzumab plus chemotherapy is superior to placebo plus chemotherapy as measured by PFS.

Secondary Objectives of the Study:
 Part 1: The secondary objective for Part 1 of this study is to evaluate descriptively the PFS of Pertuzumab in combination with either topotecan or paclitaxel.
 Part 2: The secondary objectives for Part 2 of this study are to determine if Pertuzumab plus chemotherapy is superior to placebo plus chemotherapy with respect to:
 OS.
 Objective response rate.
 Biological progression-free interval ($PFI_{BIO}$).
 Safety and tolerability.
 QoL.

Efficacy Outcome Measures

The following efficacy outcome measures will be measured in Part 1 of the trial:
 PFS, which is defined as the time from randomization into Part 1 of the trial, until disease progression per RECIST version 1.1 or according to GCIG criteria in CA-125 assessable disease or death from any cause, whichever occurs first.

The efficacy outcome measures for Part 2 of the trial are as follows:
 PFS, which is defined as the time from randomization into Part 2 of the trial, until disease progression per RECIST version 1.1 or according to GCIG criteria in CA-125 assessable disease or death from any cause, whichever occurs first.
 OS, defined as the time from randomization into Part 2 of the trial until death from any cause.
 Objective response rate (ORR), which will be based on RECIST version 1.1 and assessed by the best (confirmed) overall response (BOR); defined as the best response recorded from the start of the treatment in Part 2 of the trial until disease progression/recurrence (taking as reference for PD, the smallest measurements recorded since the treatment started in Part 2 of the trial). Patients need to have two consecutive assessments of partial response (PR) or complete response (CR) to be a responder. PR or CR has to be confirmed by 2 consecutive tumor evaluations spaced at least 4 weeks apart. Only patients with measurable disease at baseline will be included in the analysis of objective response.

Patients who have a response as per RECIST version 1.1 and using the 50% response criteria for CA-125 are defined as responders, whereas patients who only have response as defined per RECIST are defined as RECIST responders. Patients who do not have a response as per RECIST, but have a response defined using the 50% response criteria for CA-125 are defined as CA-125 responders.

$PFI_{BIO}$, defined on the basis of a progressive serial elevation of serum CA-125 (assessed according to the CGIG criteria) as the time from the date of randomization into Part 2 of the trial to first documented increase in CA-125 levels to: two times the upper limit of normal (for patients with normal pretreatment CA-125 or elevated pretreatment CA-125 and initial normalization on-treatment), or two times the nadir value (for patients with elevated baseline CA-125 that did not normalize on-treatment).

Safety Outcome Measures

In Part 1 of the study safety and tolerability will be assessed after all patients have received 3 cycles of treatment.

In addition, safety outcome measures for this study will be assessed in both Parts 1 and 2 of the study, and are as follows:

Incidence, nature, and severity of all AEs, serious adverse events (SAEs), AEs with NCI-CTCAE version 4.0 Grades ≥3, and AEs that caused premature withdrawal from study medication.
Premature withdrawal from the study and study treatment.
Cardiac disorders/Incidence of congestive heart failure
Laboratory test abnormalities.
Left ventricular ejection fraction Inclusion Criteria 1. Female patients aged 18 years or older.
2. Low HER3 mRNA expression levels (concentration ratio equal or lower than 2.81, as assessed by qRT-PCR on a COBAS z480® instrument).
3. Histologically or cytologically confirmed and documented epithelial ovarian cancer that is platinum-resistant or refractory (defined as progression within 6 months from completion of a minimum of 4 platinum therapy cycles or progression during platinum therapy).
4. At least one measurable lesion and/or non-measurable disease according to RECIST version 1.1, or cancer antigen-125 (CA-125) assessable disease according to Gynecologic Center Intergroup (GCIG) criteria. The following histological types are eligible:
Adenocarcinoma not otherwise specified.
Clear cell adenocarcinoma.
Endometrioid adenocarcinoma.
Malignant Brenner's tumor.
Mixed epithelial carcinoma including malignant mixed Müllerian tumors.
Mucinous adenocarcinoma.
Serous adenocarcinoma.
Transitional cell carcinoma.
Undifferentiated carcinoma.

5. Eastern Cooperative Oncology Group (ECOG) performance status 0 to 2.
6. LVEF greater than or equal to 55%.

Pertuzumab Dosage and Administration

Pertuzumab and Pertuzumab-placebo will be administered as an intravenous infusion on Day 1 of the first treatment cycle as a loading dose of 840, followed by 420 mg on Day 1 of each subsequent 3-weekly cycle. The initial infusion of Pertuzumab/Pertuzumab-placebo will be administered over 60 minutes followed by a 60-minute observational period in a seated position if the infusion is well tolerated, subsequent infusions may be given over 30 minutes, followed by a 30-minute observational period, after which the chemotherapy agent will be administered. Premedication should be implemented according to local practices and the chosen chemotherapy.

Topotecan Dosage and Administration

Topotecan should be administered 1.25 $mg/m^2$ as a 30-minute intravenous infusion daily on Days 1-5 every 3 weeks, as per the directions in the summary of product characteristics.

Paclitaxel Dosage and Administration

Paclitaxel should be administered 80 mg/m2 as a 1-hour i.v. infusion on Days 1, 8, 15 and 22. Pharmacists should follow the summary of product characteristics for information regarding the preparation and administration of the 80 mg/m2 dose.

Gemcitabine Dosage and Administration

Gemcitabine (Part 2 of the study only) should be administered 1000 mg/m2 as a 30-minute intravenous infusion on Days 1 and 8 every 3 weeks as per the directions described in the summary of product characteristics.

HER3 mRNA Expression

Patients will be asked to specifically consent to the collection and testing of primary tumor tissue samples to assess HER3 mRNA level, including mRNA and protein levels of other HER family receptors e.g. HER2, before they provide consent to participate in the trial. Only patients who have tumors expressing low levels of HER3 mRNA will be eligible to participate in the trial.

During the initial screening for HER3 mRNA levels, other receptors of the HER family (e.g. EGFR, HER2, or HER4) will be assessed at the mRNA level and/or protein level in parallel to the HER3 assessment, in order to obtain a more complete picture of the status of HER family receptors by mRNA level.

The cut-off defined for study eligibility is defined as a concentration ratio of ≤2.81 as assessed by qRT-PCR on a COBAS z480® instrument using the "COBAS® HER2 & HER3 (qRT-PCR) mRNA expression assay" provided by Roche Molecular Diagnostics. The rationale for cut off definition is based on a cut off modeling in previous studies as well as on a transformation function that had to be introduced since the assay was switched to a new instrument; the COBAS z480®. It is anticipated that 40-50% of screened patients will have HER3 mRNA levels below the cutoff of 2.81 and that 30% of patients expressing low levels of HER3 mRNA will be ineligible for enrollment owing to other inclusion/exclusion criteria.

Submission of a formalin-fixed, paraffin-embedded tumor specimen of the primary tumor from the original surgery will be required for all patients prior to screening; cytology specimens are not acceptable replacements. Patients will be assessed for HER3 mRNA expression level, as well as mRNA expression and protein expression levels of other HER family receptors by the use of a qRT-PCR assay and IHC. Such assessment of HER receptor mRNA/protein expression will occur after obtaining the patient's informed consent at any time after the primary surgery and prior to screening.

It is anticipated that Pertuzumab in combination with topotecan or paclitaxel will be safe and effective in patients with epithelial ovarian, primary peritoneal, or fallopian tube cancer.

In addition, it is anticipated that Pertuzumab plus chemotherapy (topotecan, paclitaxel, or gemcitabine) will be superior to placebo plus chemotherapy in patients with epithelial ovarian, primary peritoneal, or fallopian tube cancer where efficacy is measured by PFS.

```
                              SEQUENCE LISTING

Sequence total quantity: 22
SEQ ID NO: 1            moltype = AA  length = 195
FEATURE                 Location/Qualifiers
source                  1..195
                        mol_type = protein
                        organism = Homo sapiens
SEQUENCE: 1
TQVCTGTDMK LRLPASPETH LDMLRHLYQG CQVVQGNLEL TYLPTNASLS FLQDIQEVQG   60
YVLIAHNQVR QVPLQRLRIV RGTQLFEDNY ALAVLDNGDP LNNTTPVTGA SPGGLRELQL  120
RSLTEILKGG VLIQRNPQLC YQDTILWKDI FHKNNQLALT LIDTNRSRAC HPCSPMCKGS  180
RCWGESSEDC QSLTR                                                  195

SEQ ID NO: 2            moltype = AA  length = 124
FEATURE                 Location/Qualifiers
source                  1..124
                        mol_type = protein
                        organism = Homo sapiens
SEQUENCE: 2
TVCAGGCARC KGPLPTDCCH EQCAAGCTGP KHSDCLACLH FNHSGICELH CPALVTYNTD   60
TFESMPNPEG RYTFGASCVT ACPYNYLSTD VGSCTLVCPL HNQEVTAEDG TQRCEKCSKP  120
CARV                                                              124

SEQ ID NO: 3            moltype = AA  length = 169
FEATURE                 Location/Qualifiers
source                  1..169
                        mol_type = protein
                        organism = Homo sapiens
SEQUENCE: 3
CYGLGMEHLR EVRAVTSANI QEFAGCKKIF GSLAFLPESF DGDPASNTAP LQPEQLQVFE   60
TLEEITGYLY ISAWPDSLPD LSVFQNLQVI RGRILHNGAY SLTLQGLGIS WLGLRSLREL  120
GSGLALIHHN THLCFVHTVP WDQLFRNPHQ ALLHTANRPE DECVGEGLA             169

SEQ ID NO: 4            moltype = AA  length = 142
FEATURE                 Location/Qualifiers
source                  1..142
                        mol_type = protein
                        organism = Homo sapiens
SEQUENCE: 4
CHQLCARGHC WGPGPTQCVN CSQFLRGQEC VEECRVLQGL PREYVNARHC LPCHPECQPQ   60
NGSVTCFGPE ADQCVACAHY KDPPFCVARC PSGVKPDLSY MPIWKFPDEE GACQPCPINC  120
THSCVDLDDK GCPAEQRASP LT                                          142

SEQ ID NO: 5            moltype = AA  length = 107
FEATURE                 Location/Qualifiers
source                  1..107
                        mol_type = protein
                        organism = Mus musculus
SEQUENCE: 5
DTVMTQSHKI MSTSVGDRVS ITCKASQDVS IGVAWYQQRP GQSPKLLIYS ASYRYTGVPD   60
RFTGSGSGTD FTFTISSVQA EDLAVYYCQQ YYIYPYTFGG GTKLEIK                107

SEQ ID NO: 6            moltype = AA  length = 119
FEATURE                 Location/Qualifiers
source                  1..119
                        mol_type = protein
                        organism = Mus musculus
SEQUENCE: 6
EVQLQQSGPE LVKPGTSVKI SCKASGFTFT DYTMDWVKQS HGKSLEWIGD VNPNSGGSIY   60
NQRFKGKASL TVDRSSRIVY MELRSLTFED TAVYYCARNL GPSFYFDYWG QGTTLTVSS   119

SEQ ID NO: 7            moltype = AA  length = 107
FEATURE                 Location/Qualifiers
REGION                  1..107
                        note = Description of Artificial Sequence:
                        Syntheticpolypeptide
source                  1..107
                        mol_type = protein
                        organism = synthetic construct
```

```
SEQUENCE: 7
DIQMTQSPSS LSASVGDRVT ITCKASQDVS IGVAWYQQKP GKAPKLLIYS ASYRYTGVPS    60
RFSGSGSGTD FTLTISSLQP EDFATYYCQQ YYIYPYTFGQ GTKVEIK                 107

SEQ ID NO: 8            moltype = AA  length = 119
FEATURE                 Location/Qualifiers
REGION                  1..119
                        note = Description of Artificial Sequence:
                        Syntheticpolypeptide
source                  1..119
                        mol_type = protein
                        organism = synthetic construct
SEQUENCE: 8
EVQLVESGGG LVQPGGSLRL SCAASGFTFT DYTMDWVRQA PGKGLEWVAD VNPNSGGSIY    60
NQRFKGRFTL SVDRSKNTLY LQMNSLRAED TAVYYCARNL GPSFYFDYWG QGTLVTVSS    119

SEQ ID NO: 9            moltype = AA  length = 107
FEATURE                 Location/Qualifiers
REGION                  1..107
                        note = Description of Artificial Sequence:
                        Syntheticpolypeptide
source                  1..107
                        mol_type = protein
                        organism = synthetic construct
SEQUENCE: 9
DIQMTQSPSS LSASVGDRVT ITCRASQSIS NYLAWYQQKP GKAPKLLIYA ASSLESGVPS    60
RFSGSGSGTD FTLTISSLQP EDFATYYCQQ YNSLPWTFGQ GTKVEIK                 107

SEQ ID NO: 10           moltype = AA  length = 119
FEATURE                 Location/Qualifiers
REGION                  1..119
                        note = Description of Artificial Sequence:
                        Syntheticpolypeptide
source                  1..119
                        mol_type = protein
                        organism = synthetic construct
SEQUENCE: 10
EVQLVESGGG LVQPGGSLRL SCAASGFTFS SYAMSWVRQA PGKGLEWVAV ISGDGGSTYY    60
ADSVKGRFTI SRDNSKNTLY LQMNSLRAED TAVYYCARGR VGYSLYDYWG QGTLVTVSS    119

SEQ ID NO: 11           moltype = AA  length = 214
FEATURE                 Location/Qualifiers
REGION                  1..214
                        note = Description of Artificial Sequence:
                        Syntheticpolypeptide
source                  1..214
                        mol_type = protein
                        organism = synthetic construct
SEQUENCE: 11
DIQMTQSPSS LSASVGDRVT ITCKASQDVS IGVAWYQQKP GKAPKLLIYS ASYRYTGVPS    60
RFSGSGSGTD FTLTISSLQP EDFATYYCQQ YYIYPYTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 12           moltype = AA  length = 448
FEATURE                 Location/Qualifiers
REGION                  1..448
                        note = Description of Artificial Sequence:
                        Syntheticpolypeptide
source                  1..448
                        mol_type = protein
                        organism = synthetic construct
SEQUENCE: 12
EVQLVESGGG LVQPGGSLRL SCAASGFTFT DYTMDWVRQA PGKGLEWVAD VNPNSGGSIY    60
NQRFKGRFTL SVDRSKNTLY LQMNSLRAED TAVYYCARNL GPSFYFDYWG QGTLVTVSSA   120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKKVEPK SCDKTHTCPP CPAPELLGGP   240
SVFLFPPKPK DTLMISRTPE VTCVVVDVSH EDPEVKFNWY VDGVEVHNAK TKPREEQYNS   300
TYRVVSVLTV LHQDWLNGKE YKCKVSNKAL PAPIEKTISK AKGQPREPQV YTLPPSREEM   360
TKNQVSLTCL VKGFYPSDIA VEWESNGQPE NNYKTTPPVL DSDGSFFLYS KLTVDKSRWQ   420
QGNVFSCSVM HEALHNHYTQ KSLSLSPG                                     448

SEQ ID NO: 13           moltype = AA  length = 214
FEATURE                 Location/Qualifiers
REGION                  1..214
                        note = Description of Artificial Sequence:
                        Syntheticpolypeptide
source                  1..214
                        mol_type = protein
```

```
SEQUENCE: 13
DIQMTQSPSS LSASVGDRVT ITCRASQDVN TAVAWYQQKP GKAPKLLIYS ASFLYSGVPS    60
RFSGSRSGTD FTLTISSLQP EDFATYYCQQ HYTTPPTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 14            moltype = AA  length = 449
FEATURE                  Location/Qualifiers
REGION                   1..449
                         note = Description of Artificial Sequence:
                         Syntheticpolypeptide
source                   1..449
                         mol_type = protein
                         organism = synthetic construct
SEQUENCE: 14
EVQLVESGGG LVQPGGSLRL SCAASGFNIK DTYIHWVRQA PGKGLEWVAR IYPTNGYTRY    60
ADSVKGRFTI SADTSKNTAY LQMNSLRAED TAVYYCSRWG GDGFYAMDYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKKVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPSREE   360
MTKNQVSLTC LVKGFYPSDI AVEWESNGQP ENNYKTTPPV LDSDGSFFLY SKLTVDKSRW   420
QQGNVFSCSV MHEALHNHYT QKSLSLSPG                                     449

SEQ ID NO: 15            moltype = AA  length = 217
FEATURE                  Location/Qualifiers
REGION                   1..217
                         note = Description of Artificial Sequence:
                         Syntheticpolypeptide
source                   1..217
                         mol_type = protein
                         organism = synthetic construct
SEQUENCE: 15
VHSDIQMTQS PSSLSASVGD RVTITCKASQ DVSIGVAWYQ QKPGKAPKLL IYSASYRYTG    60
VPSRFSGSGS GTDFTLTISS LQPEDFATYY CQQYYIYPYT FGQGTKVEIK RTVAAPSVFI   120
FPPPSDEQLKS GTASVVCLLN NFYPREAKVQ WKVDNALQSG NSQESVTEQD SKDSTYSLSS   180
TLTLSKADYE KHKVYACEVT HQGLSSPVTK SFNRGEC                             217

SEQ ID NO: 16            moltype = AA  length = 449
FEATURE                  Location/Qualifiers
REGION                   1..449
                         note = Description of Artificial Sequence:
                         Syntheticpolypeptide
source                   1..449
                         mol_type = protein
                         organism = synthetic construct
SEQUENCE: 16
EVQLVESGGG LVQPGGSLRL SCAASGFTFT DYTMDWVRQA PGKGLEWVAD VNPNSGGSIY    60
NQRFKGRFTL SVDRSKNTLY LQMNSLRAED TAVYYCARNL GPSFYFDYWG QGTLVTVSSA   120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKKVEPK SCDKTHTCPP CPAPELLGGP   240
SVFLFPPKPK DTLMISRTPE VTCVVVDVSH EDPEVKFNWY VDGVEVHNAK TKPREEQYNS   300
TYRVVSVLTV LHQDWLNGKE YKCKVSNKAL PAPIEKTISK AKGQPREPQV YTLPPSREEM   360
TKNQVSLTCL VKGFYPSDIA VEWESNGQPE NNYKTTPPVL DSDGSFFLYS KLTVDKSRWQ   420
QGNVFSCSVM HEALHNHYTQ KSLSLSPGK                                     449

SEQ ID NO: 17            moltype = AA  length = 10
FEATURE                  Location/Qualifiers
REGION                   1..10
                         note = Description of Artificial Sequence: Syntheticpeptide
VARIANT                  10
                         note = D or S
source                   1..10
                         mol_type = protein
                         organism = synthetic construct
SEQUENCE: 17
GFTFTDYTMX                                                           10

SEQ ID NO: 18            moltype = AA  length = 17
FEATURE                  Location/Qualifiers
REGION                   1..17
                         note = Description of Artificial Sequence: Syntheticpeptide
source                   1..17
                         mol_type = protein
                         organism = synthetic construct
SEQUENCE: 18
DVNPNSGGSI YNQRFKG                                                   17
```

```
SEQ ID NO: 19              moltype = AA   length = 10
FEATURE                    Location/Qualifiers
REGION                     1..10
                           note = Description of Artificial Sequence: Syntheticpeptide
source                     1..10
                           mol_type = protein
                           organism = synthetic construct
SEQUENCE: 19
NLGPSFYFDY                                                            10

SEQ ID NO: 20              moltype = AA   length = 11
FEATURE                    Location/Qualifiers
REGION                     1..11
                           note = Description of Artificial Sequence: Syntheticpeptide
source                     1..11
                           mol_type = protein
                           organism = synthetic construct
SEQUENCE: 20
KASQDVSIGV A                                                          11

SEQ ID NO: 21              moltype = AA   length = 7
FEATURE                    Location/Qualifiers
REGION                     1..7
                           note = Description of Artificial Sequence: Syntheticpeptide
VARIANT                    5
                           note = R or L
VARIANT                    6
                           note = Y or E
VARIANT                    7
                           note = T or S
source                     1..7
                           mol_type = protein
                           organism = synthetic construct
SEQUENCE: 21
SASYXXX                                                               7

SEQ ID NO: 22              moltype = AA   length = 9
FEATURE                    Location/Qualifiers
REGION                     1..9
                           note = Description of Artificial Sequence: Syntheticpeptide
source                     1..9
                           mol_type = protein
                           organism = synthetic construct
SEQUENCE: 22
QQYYIYPYT                                                             9
```

What is claimed is:

1. A method of achieving a pathological complete response in a human patient with HER2-positive, estrogen receptor-negative and progesterone receptor-negative breast cancer comprising administering 6 cycles of Pertuzumab, Trastuzumab, Docetaxel, and Carboplatin as a neoadjuvant therapy to the patient every 3 weeks prior to surgery in order to achieve the pathological complete response, wherein:
   (a) the Docetaxel dose is 75 mg/m² for all 6 cycles;
   (b) the Carboplatin dose is area under the curve equals 6 (AUC6) using Calvert's Formula;
   (c) the Trastuzumab is a monoclonal antibody comprising the light chain amino acid sequence in SEQ ID NO: 13 and the heavy chain amino acid sequence in SEQ ID NO: 14, and the Trastuzumab dose is 8 mg/kg on day 1 of a first treatment and 6 mg/kg every 3 weeks thereafter;
   (d) the Pertuzumab is a monoclonal antibody comprising the light chain amino acid sequence in SEQ ID NO: 11 and the heavy chain amino acid sequence in SEQ ID NO: 12, and the Pertuzumab dose is 840 mg on day 1 of a first treatment and 420 mg every 3 weeks thereafter;
   (e) the Pertuzumab, Trastuzumab, Docetaxel, and Carboplatin are administered intravenously to the patient on day 1 of each cycle for all 6 cycles;
   (f) the HER2-positive breast cancer has HER2 protein overexpression or HER2 gene amplification; and
   (g) the HER2-positive breast cancer is early-stage and >2 cm in diameter.

2. A method of achieving a pathological complete response in a human patient with HER2-positive, estrogen receptor-negative and progesterone receptor-negative breast cancer comprising administering 6 cycles of Pertuzumab, Trastuzumab, Docetaxel, and Carboplatin as a neoadjuvant therapy to the patient every 3 weeks prior to surgery in order to achieve the pathological complete response, wherein:
   (a) the Docetaxel dose is 75 mg/m² for all 6 cycles;
   (b) the Carboplatin dose is area under the curve equals 6 (AUC6) using Calvert's Formula;
   (c) the Trastuzumab is a monoclonal antibody comprising the light chain amino acid sequence in SEQ ID NO: 13 and the heavy chain amino acid sequence in SEQ ID NO: 14, and the Trastuzumab dose is 8 mg/kg on day 1 of a first treatment and 6 mg/kg every 3 weeks thereafter;
   (d) the Pertuzumab is a monoclonal antibody comprising the light chain amino acid sequence in SEQ ID NO: 11 and the heavy chain amino acid sequence in SEQ ID NO 12, and the Pertuzumab dose is 840 mg on day 1 of a first treatment and 420 mg every 3 weeks thereafter;

(e) the Pertuzumab, Trastuzumab, Docetaxel, and Carboplatin are administered intravenously to the patient on day 1 of each cycle for all 6 cycles;

(f) the HER2-positive breast cancer has HER2 protein overexpression or HER2 gene amplification; and (g) the HER2-positive breast cancer is i) locally advanced, ii) inflammatory, or iii) early-stage and >2 cm in diameter.

3. A method of achieving a pathological complete response in a human patient with HER2-positive breast cancer comprising administering 6 cycles of Pertuzumab, Trastuzumab, Docetaxel, and Carboplatin as a neoadjuvant therapy to the patient every 3 weeks prior to surgery in order to achieve the pathological complete response, wherein:

(a) the Docetaxel dose is 75 mg/m$^2$ for all 6 cycles;

(b) the Carboplatin dose is area under the curve equals 6 (AUC6) using Calvert's Formula;

(c) the Trastuzumab is a monoclonal antibody comprising the light chain amino acid sequence in SEQ ID NO: 13 and the heavy chain amino acid sequence in SEQ ID NO: 14, and the Trastuzumab dose is 8 mg/kg on day 1 of a first treatment and 6 mg/kg every 3 weeks thereafter;

(d) the Pertuzumab is a monoclonal antibody comprising the light chain amino acid sequence in SEQ ID NO: 11 and the heavy chain amino acid sequence in SEQ ID NO: 12, and the Pertuzumab dose is 840 mg on day 1 of a first treatment and 420 mg every 3 weeks thereafter;

(e) the Pertuzumab, Trastuzumab, Docetaxel, and Carboplatin are administered intravenously to the patient on day 1 of each cycle for all 6 cycles;

(f) the HER2-positive breast cancer has HER2 protein overexpression or HER2 gene amplification; and (g) the HER2-positive breast cancer is early-stage and >2 cm in diameter.

4. A method for treating cancer with a neoadjuvant therapy in a human patient with HER2-positive breast cancer comprising administering 6 cycles of Pertuzumab, Trastuzumab, Docetaxel, and Carboplatin to the patient every 3 weeks prior to surgery, wherein:

(a) the Docetaxel dose is 75 mg/m$^2$ for all 6 cycles;

(b) the Carboplatin dose is area under the curve equals 6 (AUC6) using Calvert's Formula;

(c) the Trastuzumab is a monoclonal antibody comprising the light chain amino acid sequence in SEQ ID NO: 13 and the heavy chain amino acid sequence in SEQ ID NO: 14, and the Trastuzumab dose is 8 mg/kg on day 1 of a first treatment and 6 mg/kg every 3 weeks thereafter;

(d) the Pertuzumab is a monoclonal antibody comprising the light chain amino acid sequence in SEQ ID NO: 11 and the heavy chain amino acid sequence in SEQ ID NO: 12, and the Pertuzumab dose is 840 mg on day 1 of a first treatment and 420 mg every 3 weeks thereafter;

(e) the Pertuzumab, Trastuzumab, Docetaxel, and Carboplatin are administered intravenously to the patient on day 1 of each cycle for all 6 cycles;

(f) the HER2-positive breast cancer has HER2 protein overexpression or HER2 gene amplification; and (g) the HER2-positive breast cancer is i) locally advanced, ii) inflammatory, or iii) early-stage and >2 cm in diameter.

5. The method of claim 1, wherein the patient has a left ventricular ejection fraction (LVEF) of ≥55% prior to the start of the neoadjuvant therapy.

6. The method of claim 2, wherein the patient has a left ventricular ejection fraction (LVEF) of ≥55% prior to the start of the neoadjuvant therapy.

7. The method of claim 3, wherein the patient has a left ventricular ejection fraction (LVEF) of ≥55% prior to the start of the neoadjuvant therapy.

8. The method of claim 4, wherein the patient has a left ventricular ejection fraction (LVEF) of ≥55% prior to the start of the neoadjuvant therapy.

9. The method of claim 2, wherein the neoadjuvant therapy achieves a pathological complete response rate of 83.8% in a population of patients having the HER2-positive breast cancer.

10. The method of claim 4, wherein the neoadjuvant therapy achieves a pathological complete response rate of 66.2% in a population of patients having the HER2-positive breast cancer.

11. The method of claim 4, wherein the patient has HER2-positive, estrogen receptor-negative and progesterone receptor-negative breast cancer.

12. The method of claim 11, wherein the neoadjuvant therapy achieves a pathological complete response rate of 83.8% in a population of patients having the HER2-positive breast cancer.

13. The method of claim 4, wherein the neoadjuvant therapy has an incidence of symptomatic left ventricular systolic dysfunction of 1.3% in a population of patients having the HER2-positive breast cancer.

* * * * *